(12) United States Patent
Park et al.

(10) Patent No.: US 12,111,564 B2
(45) Date of Patent: Oct. 8, 2024

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventors: Tae Bong Park, Seoul (KR); Seung Hak Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 21 days.

(21) Appl. No.: 17/862,741

(22) Filed: Jul. 12, 2022

(65) Prior Publication Data

US 2022/0350223 A1 Nov. 3, 2022

Related U.S. Application Data

(63) Continuation of application No. 17/057,289, filed as application No. PCT/KR2019/005618 on May 10, 2019, now Pat. No. 11,415,861.

(30) Foreign Application Priority Data

May 23, 2018 (KR) .................. 10-2018-0058200
Sep. 20, 2018 (KR) .................. 10-2018-0112740

(51) Int. Cl.
*G03B 5/04* (2021.01)
*G02B 7/02* (2021.01)
(Continued)

(52) U.S. Cl.
CPC ............. *G03B 5/04* (2013.01); *G02B 7/023* (2013.01); *G03B 17/12* (2013.01); *H04N 23/51* (2023.01);
(Continued)

(58) Field of Classification Search
CPC ............................... G03B 2205/0069
See application file for complete search history.

(56) References Cited

U.S. PATENT DOCUMENTS 11,415,861 B2 * 8/2022 Park .................. G03B 5/02
2006/0136953 A1 6/2006 Kim et al.
(Continued)

FOREIGN PATENT DOCUMENTS

CN 102292673 A 12/2011
CN 102483507 A 5/2012
(Continued)

*Primary Examiner* — Noam Reisner
(74) *Attorney, Agent, or Firm* — Birch, Stewart, Kolasch & Birch, LLP

(57) ABSTRACT

A lens moving apparatus includes a substrate; a housing having a first side part and second side part facing each other and a third side part and fourth side part facing each other; a bobbin arranged inside the housing; a first coil arranged on the bobbin; and a magnet arranged in the housing. The substrate includes a second coil facing the magnet. The magnet includes a first magnet arranged on the first side part of the housing, a second magnet arranged on the second side part of the housing, and a third magnet arranged on the third side part of the housing. The second coil includes a first coil unit facing the first magnet, a second coil unit facing the second magnet, and a third coil unit facing the third magnet. The first to third coil units each includes a line having a plurality of turns.

17 Claims, 53 Drawing Sheets

(51) Int. Cl.
*G03B 17/12* (2021.01)
*H04N 23/51* (2023.01)

(52) U.S. Cl.
CPC ............ *G03B 2205/0007* (2013.01); *G03B 2205/0069* (2013.01)

(56) References Cited

U.S. PATENT DOCUMENTS

| | | |
|---|---|---|
| 2009/0116129 A1 | 5/2009 | Ochi et al. |
| 2016/0055967 A1 | 2/2016 | Nishino et al. |
| 2016/0216531 A1 | 7/2016 | Park et al. |
| 2017/0094187 A1* | 3/2017 | Sharma .................... G03B 5/02 |
| 2017/0315376 A1 | 11/2017 | Hu et al. |
| 2018/0031860 A1 | 2/2018 | Bachar et al. |
| 2018/0046063 A1* | 2/2018 | Sharma .................... G02B 7/08 |
| 2018/0091709 A1 | 3/2018 | Yeo |
| 2018/0100986 A1* | 4/2018 | Kim ....................... H04N 23/45 |
| 2018/0224628 A1 | 8/2018 | Hu et al. |
| 2018/0252893 A1 | 9/2018 | Park et al. |
| 2019/0094565 A1 | 3/2019 | Park et al. |
| 2020/0033551 A1* | 1/2020 | Lee ........................ G03B 30/00 |

FOREIGN PATENT DOCUMENTS

| | | |
|---|---|---|
| CN | 102879972 A | 1/2013 |
| CN | 104854504 A | 8/2015 |
| CN | 105527777 A | 4/2016 |
| EP | 1 918 749 A1 | 5/2008 |
| EP | 3 070 504 A1 | 9/2016 |
| EP | 3 283 915 A1 | 2/2018 |
| JP | 2017-198988 A | 11/2017 |
| KR | 10-0710753 B1 | 4/2007 |
| KR | 10-1527433 B1 | 6/2015 |
| KR | 10-2017-0108263 A | 9/2017 |
| WO | WO 01/20755 A1 | 3/2001 |
| WO | WO 2017/160094 A1 | 9/2017 |
| WO | WO 2017/208877 A1 | 12/2017 |

* cited by examiner

| X_Stroke or Y_Storke [mm] | X-axis direction Lorentz force, Fx [mN/mA] | Y-axis direction Lorentz force, Fy [mN/mA] | Fx/Fy | X-axis direction Linearity [mm] | Y-axis direction Linearity [mm] |
|---|---|---|---|---|---|
| -0.2 | 0.09642 | 0.1096297 | 0.88 | 0.04591 | 0.029857717 |
| -0.15 | 0.11138 | 0.12473302 | 0.89 | 0.00862 | 0.00151663 |
| -0.1 | 0.12336 | 0.13610702 | 0.91 | 0.00573 | 0.007432789 |
| -0.05 | 0.13200 | 0.14303602 | 0.92 | 0.00755 | 0.00596215 |
| 0 | 0.13624 | 0.14541168 | 0.94 | 0.00300 | 0.000007 |
| 0.05 | 0.13589 | 0.1429936 | 0.95 | 0.00285 | 0.005935084 |
| 0.1 | 0.13094 | 0.13605748 | 0.96 | 0.00536 | 0.007385082 |
| 0.15 | 0.12209 | 0.1247309 | 0.98 | 0.00043 | 0.001533206 |
| 0.2 | 0.10981 | 0.10957868 | 1.00 | 0.02156 | 0.029978743 |

| | 100a | | | 100b | | | 100c | | |
|---|---|---|---|---|---|---|---|---|---|
| Classification | Virtual force | | | Virtual force | | | Virtual force | | |
| | F(x) | F(y) | F(z) | F(x) | F(y) | F(z) | F(x) | F(y) | F(z) |
| OIS | -0.23 | 0.12 | -0.48 | 0.29 | 0.15 | -0.18 | 0.15 | 0.24 | -0.11 |
| Smagnet | -0.01 | 0.08 | 0.13 | 0.02 | -0.01 | 0.16 | 0.11 | 0.02 | 0.04 |

Unit : [mN]

| Classification | 100a Stroke | | | 100b Stroke | | | 100c Stroke | | | 
|---|---|---|---|---|---|---|---|---|---|
| | X | Y | Z | X | Y | Z | X | Y | Z |
| OIS | -3.78 | 2.07 | -0.97 | 4.85 | 2.45 | -0.36 | 2.54 | 3.98 | -0.22 |
| Smagnet | -0.14 | 1.36 | 0.26 | 0.26 | -0.10 | 0.33 | 1.75 | 0.32 | 0.08 |

Unit : [um]

LENS DRIVING APPARATUS, AND CAMERA MODULE AND OPTICAL DEVICE COMPRISING SAME

CROSS REFERENCE TO RELATED APPLICATIONS

This application is a Continuation of U.S. application Ser. No. 17/057,289, filed on Nov. 20, 2020, which is the National Phase of PCT/KR2019/005618 filed on May 10, 2019, which claims priority under 35 U.S.C. § 119(a) to Patent Application Nos. 10-2018-0058200 and 10-2018-0112740 filed in the Republic of Korea on May 23, 2018 and Sep. 20, 2018, all of which are hereby expressly incorporated by reference into the present application.

TECHNICAL FIELD

Embodiments relate to a lens moving apparatus, and a camera module and an optical instrument including the same.

BACKGROUND ART

It is difficult to apply technology of a voice coil motor (VCM) used in existing general camera modules to a subminiature, low-power camera module, and therefore research related thereto has been actively conducted.

For a camera module mounted in a small electronic product, such as a smartphone, the camera module may be frequently shocked during use thereof, and the camera module may minutely tremble due to shaking of a user's hand during photographing thereof. In recent years, technology for additionally installing a handshake preventing means in the camera module has been developed in consideration thereof.

DISCLOSURE

Technical Problem

Embodiments provide a lens moving apparatus capable of reducing magnetic field interference between magnets included in two adjacent lens moving apparatuses mounted in a dual camera module, maintaining balance between electromagnetic force in an X-axis direction and electromagnetic force in a Y-axis direction necessary to perform an OIS function, and reducing the weight of an OIS moving unit to reduce current consumption, and a camera module and an optical instrument including the same.

Technical Solution

In one embodiment, a lens moving apparatus includes a board, a housing including a first side portion and a second side portion opposite each other and a third side portion and a fourth side portion opposite each other, a bobbin disposed in the housing, a first coil disposed at the bobbin, and a magnet disposed at the housing, wherein the board includes a second coil opposite the magnet, the magnet includes a first magnet disposed at the first side portion of the housing, a second magnet disposed at the second side portion of the housing, and a third magnet disposed at the third side portion of the housing, the second coil includes a first coil unit opposite the first magnet, a second coil unit opposite the second magnet, and a third coil unit opposite the third magnet, each of the first to third coil units includes a line having a plurality of turns, and the width of the line of the third coil unit is less than the width of the line of the first coil unit.

The number of turns of the line of the third coil unit may be greater than the number of turns of the line of the first coil unit.

The width of the third coil unit may be equal to the width of the first coil unit.

The width of the third coil unit may be greater than the width of the first coil unit.

Each of the first to third coil units may include a spiral pattern or an oval pattern.

Each of the first to third coil units may include a first layer and a second layer disposed on the first layer, and the width of the line of each of the first layer and the second layer of the third coil unit may be less than the width of the line of each of the first layer and the second layer of the first coil unit.

The width of the line of the first coil unit and the width of the line of the second coil unit may be equal to each other.

The thickness of the first coil unit and the thickness of the second coil unit may be equal to each other.

Each of the first to third coil units may include at least one via configured to interconnect the first layer and the second layer.

The second coil may include a first side and a second side opposite each other and a third side and a fourth side opposite each other, the board may include an opening, and the board may include a first region located between the first side and the opening, the first coil unit being disposed in the first region, a second region located between the second side and the opening, the second coil unit being disposed in the second region, and a third region located between the third side and the opening, the third coil unit being disposed in the third region.

The first coil unit may include a plurality of first lines arranged in the first region in a direction from the first side to the second side, the second coil unit may include a plurality of second lines arranged in the second region in the direction from the first side to the second side, the third coil unit may include a plurality of third lines arranged in the third region in a direction from the third side to the fourth side, the width of each of the first lines may be greater than the distance between the first lines, the width of each of the second lines may be greater than the distance between the second lines, and the width of each of the third lines may be greater than the distance between the second lines.

The thicknesses of the first to third coil units may be equal to each other.

The width of the line of each of the first to third coil units may be less than the thickness of each of the first to third coil units.

A first length of each of the first and second coil units may be equal to a second length of the third coil unit, the first length may be the distance between opposite outermost ends of each of the first and second coil units, and the second length may be the distance between the outermost ends of the third coil unit.

Each of the ratio of the width of the line of the third coil unit to the width of the line of the first coil unit and the ratio of the width of the line of the third coil unit to the width of the line of the second coil unit may be 1:1.25 to 1:1.5.

In another embodiment, a lens moving apparatus includes a board, a housing including a first side portion and a second side portion adjacent to the first side portion, a bobbin disposed in the housing, a first coil disposed at the bobbin, a magnet disposed at the housing, and a second coil disposed on the board so as to be opposite the magnet, wherein the magnet includes a first magnet disposed at the first side portion of the housing and a third magnet disposed at the second side portion of the housing, the second coil includes a first coil unit opposite the first magnet and a third coil unit opposite the third magnet, and the number of windings of the third coil unit may be greater than the number of windings of the first coil unit.

The magnet may further include a second magnet disposed at a third side portion of the housing opposite the first side portion, and the second coil may further include a second coil unit opposite the second magnet.

Advantageous Effects

According to embodiments, it is possible to reduce magnetic field interference between magnets included in two adjacent lens moving apparatuses mounted in a dual camera module, to maintain balance between electromagnetic force in an X-axis direction and electromagnetic force in a Y-axis direction necessary to perform an OIS function, and to reduce the weight of an OIS moving unit to thus reduce current consumption.

BEST MODE

Figure 1:
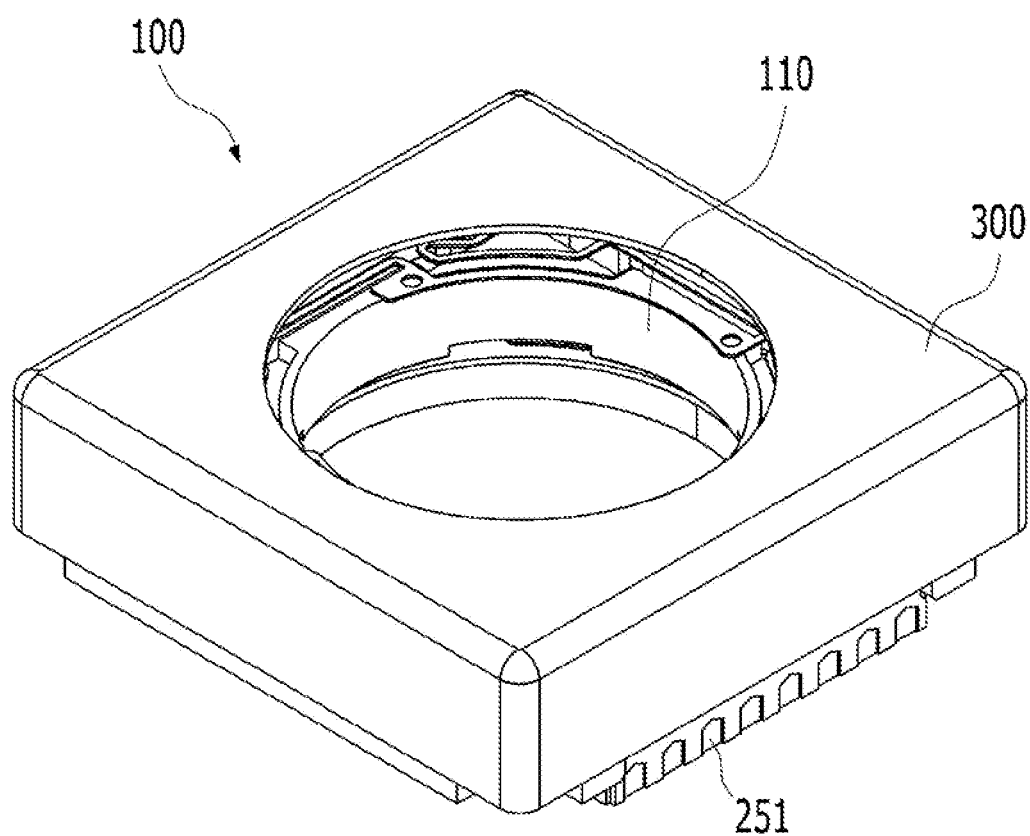
FIG. 1 is a perspective view of a lens moving apparatus according to an embodiment.

Reference will now be made in detail to embodiments, examples of which are illustrated in the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under," "under the element" as well as "on the element" may be included based on the element.

In addition, relational terms, such as "first," "second," "on/upper part/above," and "under/lower part/below," are used only to distinguish between one subject or element and another subject or element without necessarily requiring or involving any physical or logical relationship or sequence between such subjects or elements. In addition, wherever possible, the same reference numbers will be used throughout the drawings to refer to the same or like parts.

In addition, the terms "include," "comprise" and "have" mean that elements can be inherent unless otherwise stated. Therefore, the terms should be interpreted not to exclude other elements but to further include such other elements. In addition, the term "corresponding" may mean at least one of "opposite" or "overlapping."

For convenience of description, a lens moving apparatus according to an embodiment will be described using a Cartesian coordinate system (x, y, z). However, other different coordinate systems may be used, and the disclosure is not limited thereto. In the drawings, an x-axis direction and a y-axis direction are directions perpendicular to a z-axis direction, which is an optical-axis direction. The z-axis direction, which is the optical-axis direction, may be referred to as a "first direction," the x-axis direction may be referred to as a "second direction," and the y-axis direction may be referred to as a "third direction." In addition, the optical-axis direction may be defined as an optical-axis direction of a lens coupled to the lens moving apparatus.

A "handshake compensation function" applied to a small camera module of a mobile device, such as a smartphone or a tablet PC, may be a function of moving a lens in a direction perpendicular to the optical-axis direction or tilting the lens relative to the optical-axis direction to offset vibration (or movement) caused by handshake of a user. Meanwhile, the term "handshake compensation" may be used interchangeably with "optical image stabilization (OIS)."

In addition, an "autofocus function" may be a function of moving the lens in the optical-axis direction depending on the distance from a subject to automatically focus the subject in order to acquire a clear image of a subject on an image sensor.

A lens moving apparatus according to an embodiment may perform an autofocus operation to move an optical module including at least one lens in the first direction.

Also, in the following description, the term "terminal" may refer to a pad, an electrode, a conductive layer, or a bonding portion. Also, in the following description, the term "through-hole" may be referred to as a "hole."

Hereinafter, the lens moving apparatus may mean a "voice coil motor," a "lens moving motor," or an "actuator," which may be used instead thereof.

Figure 2:
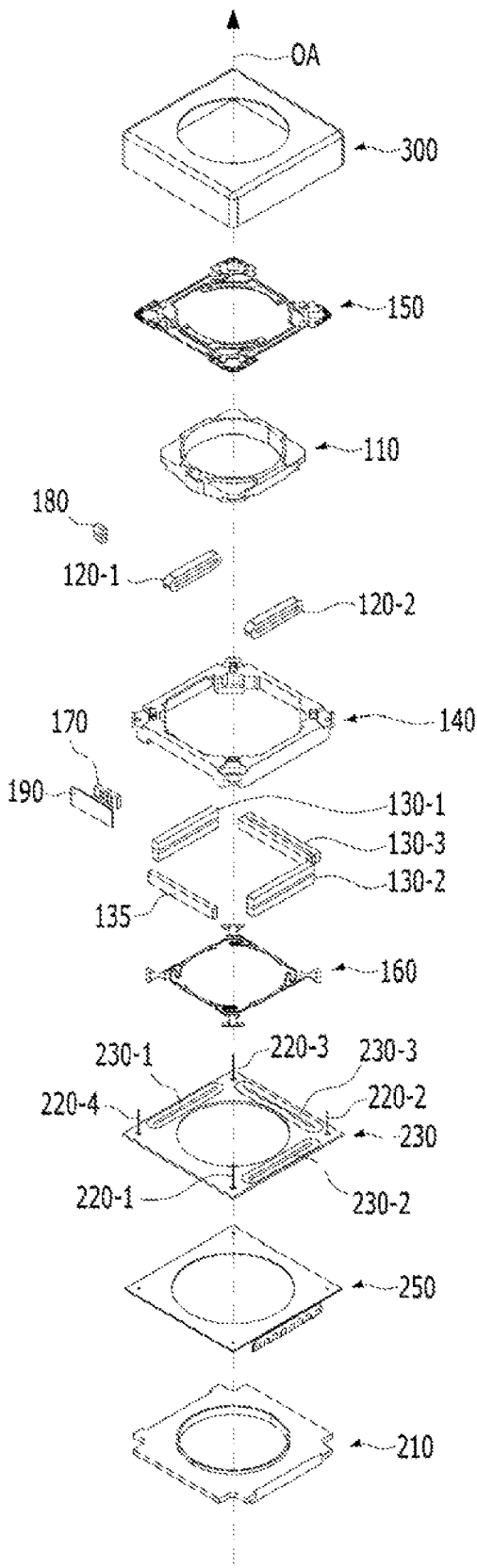
FIG. 2 is an exploded view of the lens moving apparatus of FIG. 1.
Figure 3:
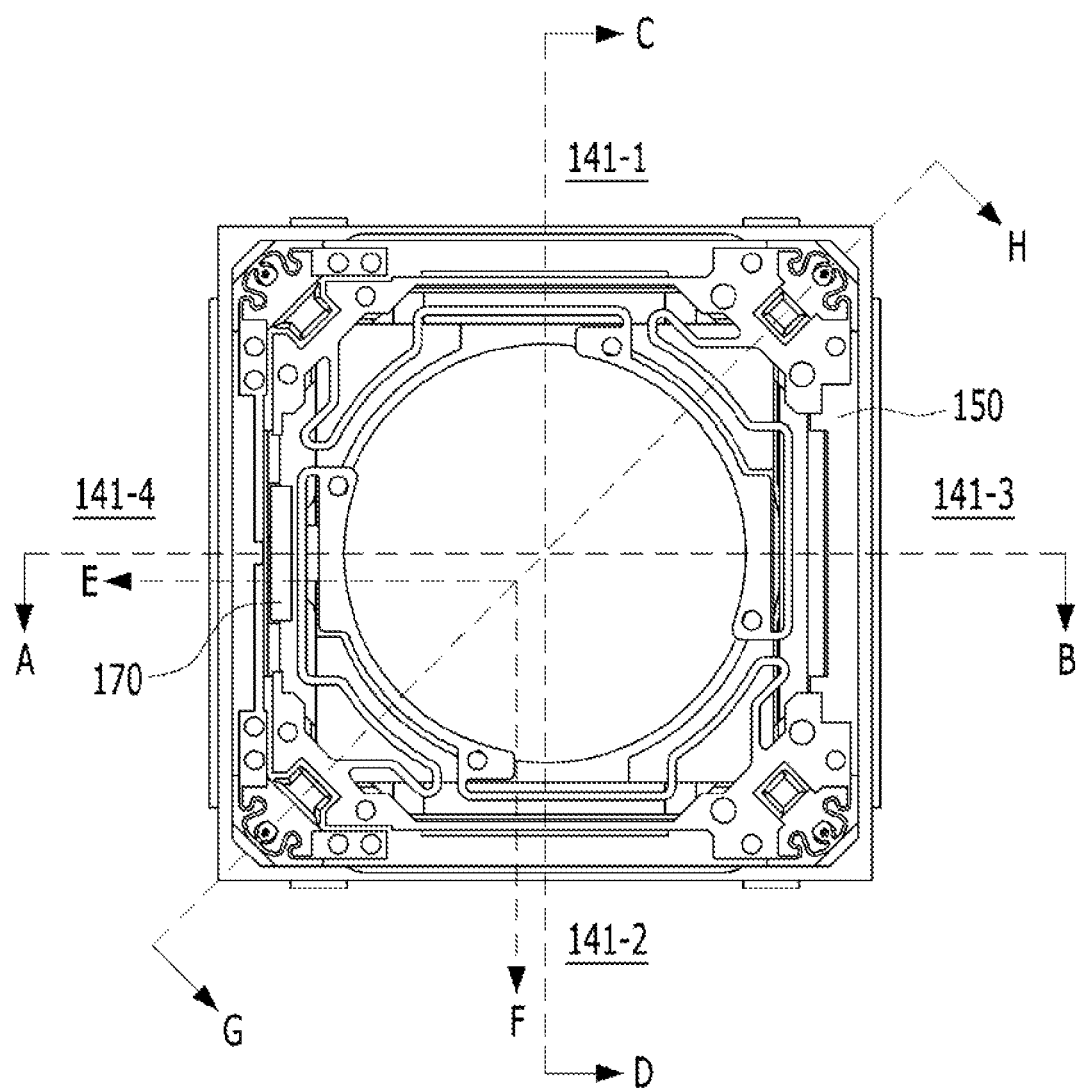
FIG. 3 is a plan view of the lens moving apparatus with a cover member removed.

FIG. 1 is a perspective view of a lens moving apparatus 100 according to an embodiment, FIG. 2 is an exploded view of the lens moving apparatus 100 of FIG. 1, and FIG. 3 is a plan view of the lens moving apparatus 100 with a cover member 300 removed.

Referring to FIGS. 1 to 3, the lens moving apparatus 100 may include a bobbin 110, a first coil 120, a housing 140, a first magnet 130-1, a second magnet 130-2, a third magnet 130-3, an upper elastic member 150, a lower elastic member 160, and a second coil 230.

The lens moving apparatus 100 may further include a dummy member 135.

The lens moving apparatus 100 may further include at least one of a base 210, a supporting member 220, and a circuit board 250.

In addition, the lens moving apparatus 100 may further include a circuit board 190 and a first position sensor 170 configured to perform AF feedback driving.

In addition, the lens moving apparatus 100 may further include a sensing magnet 180 configured to sense magnetic force of the first position sensor 170. In addition, the lens moving apparatus 100 may further include a balancing magnet 185 configured to attenuate the effect of a magnetic field of the sensing magnet 180.

In addition, the lens moving apparatus 100 may further include a second position sensor 240 (see FIG. 9B) configured to perform optical image stabilization (OIS) feedback driving. In addition, the lens moving apparatus 100 may further include a cover member 300.

The embodiment is capable of providing a lens moving apparatus including an OIS function capable of reducing or inhibiting magnetic field interference between magnets included in two adjacent lens moving units mounted in a dual camera module.

In addition, the embodiment is capable of maintaining balance between electromagnetic force generated in the X-axis direction, which is perpendicular to the optical-axis (OA) direction, and electromagnetic force generated in the Y-axis direction in order to perform the OIS function, thereby inhibiting tilt of the lens moving units in the X-axis direction or in the Y-axis direction.

In addition, the embodiment is capable of reducing the number of OIS magnets and reducing the size of the OIS magnets, thereby reducing the weight of an OIS moving unit and thus reducing current consumption.

First, the bobbin 110 will be described.

The bobbin 110 is disposed inside the housing 140, and may be moved in the optical-axis (OA) direction or the first direction (e.g. the Z-axis direction) as the result of electromagnetic interaction between the first coil 120 and the first and second magnets 130-1 and 130-2.

Figure 4A:
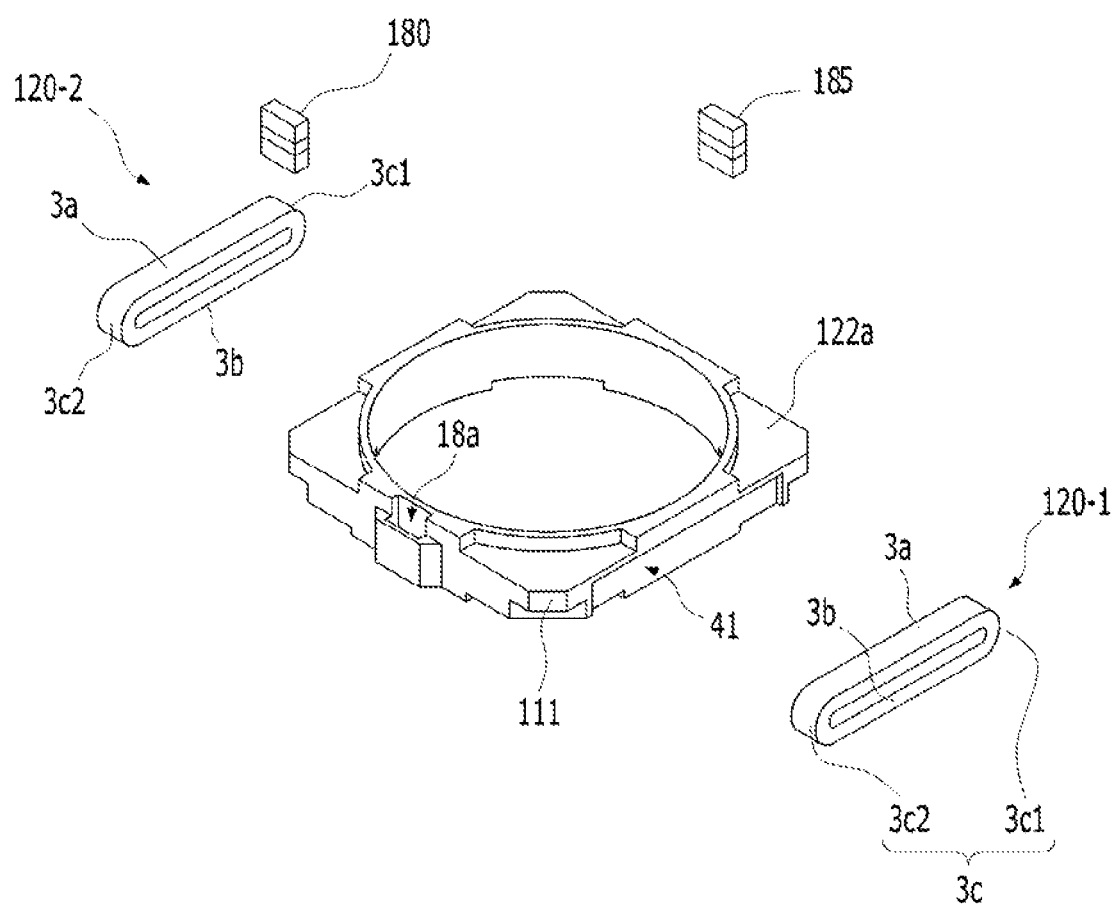
FIG. 4A is a separated perspective view of a bobbin, a first coil unit, a second coil unit, and a sensing magnet.
Figure 4B:
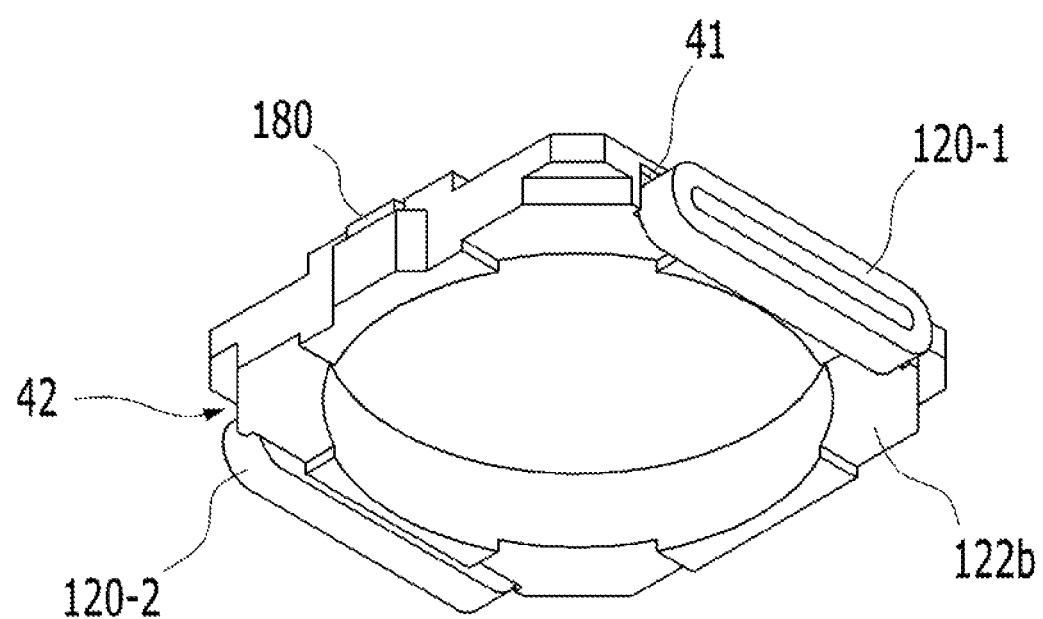
FIG. 4B is a coupled perspective view of the bobbin, the first coil unit, the second coil unit, and the sensing magnet.

FIG. 4A is a separated perspective view of the bobbin 110, a first coil unit 120-1, a second coil unit 120-2, and the sensing magnet 180, and FIG. 4B is a coupled perspective view of the bobbin 110, the first coil unit 120-1, the second coil unit 120-2, and the sensing magnet 180.

Referring to FIGS. 4A and 4B, the bobbin 110 may have an opening, in which a lens or a lens barrel is mounted. For example, the opening of the bobbin 110 may be a through-hole formed through the bobbin 110, and the shape of the opening of the bobbin 110 may be circular, oval, or polygonal. However, the disclosure is not limited thereto.

The lens may be directly mounted in the opening of the bobbin 110. However, the disclosure is not limited thereto. In another embodiment, a lens barrel, in which at least one lens is mounted or coupled, may be coupled to or mounted in the opening of the bobbin 110. The lens or the lens barrel may be coupled to an inner circumferential surface 110a of the bobbin 110 in various manners.

The bobbin 110 may include first side portions (or first sides) spaced apart from each other and second side portions (or second sides) spaced apart from each other. Each of the second side portions may interconnect two adjacent first side portions. For example, the first side portions of the bobbin 110 may be referred to as "side portions," and the second side portions of the bobbin 110 may be referred to as "corner portions or corners."

A first seating recess 41, in which the first coil unit 120-1 is mounted, seated, or disposed, may be provided in one (e.g. a first side portion) of the side portions of the bobbin 110. A second seating recess 42, in which the second coil unit 120-2 is mounted, seated, or disposed, may be provided in another (e.g. a second side portion) of the side portions of the bobbin 110.

For example, the first seating recess 41 and the second seating recess 42 may be provided in two opposite side portions, among the side portions of the bobbin 110, may be depressed from the outer surfaces of the two side portions of the bobbin 110, and may have shapes coinciding with the shapes of the first coil unit 120-1 and the second coil unit 120-2.

In another embodiment, a first protrusion, on which the first coil unit 120-1 is mounted or wound, may be provided on one side portion of the bobbin 110, and a second protrusion, on which the second coil unit 120-2 is mounted or wound, may be provided on another of the side portions of the bobbin 110.

The bobbin 110 may include a first recess 180a provided in another (e.g. a fourth side portion) of the side portions of the bobbin 110 such that the sensing magnet 180 is mounted or disposed in the first recess. For example, the fourth side portion of the bobbin 110 may be the side portion at which the first coil unit 120-1 or the second coil unit 120-2 is not disposed.

In addition, the bobbin 110 may include a second recess provided in another (e.g. a third side portion) of the side portions of the bobbin 110 such that the balancing magnet 185 is mounted or disposed in the second recess. For example, the third side portion of the bobbin 110 may be the side portion at which the first coil unit 120-1 or the second coil unit 120-2 is not disposed and which is opposite the third side portion of the bobbin 110.

The bobbin 110 may include projecting portions 111 provided on the corner portions of the bobbin 110. The projecting portions 111 may project in a direction parallel to a straight line that extends through the center of the opening of the bobbin 110 and is perpendicular to the optical-axis direction. However, the disclosure is not limited thereto.

The projecting portions 111 of the bobbin 110 may correspond to recessed portions 145 of the housing 140, may be inserted into or disposed in the recessed portions 145 of the housing 140, and may inhibit or prevent the bobbin 110 from moving or rotating about the optical axis while deviating from a predetermined range.

Escape recesses 122a configured to avoid spatial interference with a first frame connection portion 153 of the upper elastic member 150 may be provided in the upper surfaces of the corner portions of the bobbin 110.

Although not shown in FIG. 4A, the bobbin 110 may include a first stopper projecting from the upper surface thereof and a second stopper projecting from the lower surface thereof. The first and second stoppers of the bobbin 110 may prevent the upper surface of the bobbin 110 from directly colliding with the inside of an upper plate of the cover member 30 and may prevent the lower surface of the bobbin 110 from directly colliding with the base 210, the second coil 230, and/or the circuit board 250 even though the bobbin 110 is moved while deviating from a predetermined range due to external impact when the bobbin 110 is moved in the first direction in order to perform the autofocus function.

The bobbin 110 may be provided at the upper surface thereof with a first coupling portion configured to be coupled and fixed to the upper elastic member 150, and the bobbin 110 may be provided at the lower surface thereof with a second coupling portion configured to be coupled and fixed to the lower elastic member 160.

For example, in FIGS. 4A and 4B, the first and second coupling portions of the bobbin 110 may be flat. However, the disclosure is not limited thereto. In another embodiment, each of the first and second coupling portions of the bobbin 110 may have the shape of a recess or a protrusion.

Next, the first coil 120 will be described.

The first coil 120 includes a first coil unit 120-1 and a second coil unit 120-2 disposed at two opposite side portions, among the side portions of the bobbin 110. Here, the coil unit may be referred to as a coil, a coil portion, a coil block, or a coil ring.

For example, the first coil unit 120-1 may be disposed in the first seating recess 41 of the bobbin 110, and the second coil unit 120-2 may be disposed in the second seating recess 42 of the bobbin 110. However, the disclosure is not limited thereto. In another embodiment, each of the first coil unit 120-1 and the second coil unit 120-2 may be wound on at least one protrusion provided at the side portion of the bobbin 110 or may be mounted on at least one protrusion provided at the side portion of the bobbin 110

Each of the first coil unit 120-1 and the second coil unit 120-2 may include at least one of an oval shape, a track shape, and a closed-curve shape. For example, each of the first coil unit 120-1 and the second coil unit 120-2 may have the shape of a coil ring wound around an axis that extends through the center of the opening of the bobbin 110 and is perpendicular to the optical axis.

For example, each of the first coil unit 120-1 and the second coil unit 120-2 may have a first part 3a, a second part 3b disposed under the first part 3a, and a third part 3c configured to interconnect the first part 3a and the second part 3b, and may form a closed curve by the first to third parts 3a to 3c.

The third part 3c may include a first connection part 3c1 configured to interconnect one end of the first part 3b1 and one end of the second part 3b and a second connection part 3c2 configured to interconnect the other end of the first part 3b1 and the other end of the second part 3b.

For example, the first part 3a may be referred to as a "first straight portion," the second part 3b may be referred to as a "second straight portion," the third part 3c may be referred to as a "curved portion," the first connection part 3c1 may be referred to as a first curved portion, and the second connection part 3c2 may be referred to as a second curved portion.

The first coil 120 may include a connection portion (not shown), a connection coil, or a connection wire disposed between the first coil unit 120-1 and the second coil unit 120-2 so as to interconnect the first coil unit 120-1 and the second coil unit 120-2.

One end of the connection portion of the first coil 120 may be connected to one end of the first coil unit 120-1, and the other end of the connection portion of the first coil 120 may be connected to one end of the second coil unit 120-2. That is, the first coil unit 120-1 and the second coil unit 120-2 may be connected to each other in series by the connection portion of the first coil 120.

The connection portion of the first coil 120 may be opposite the third magnet 130-3, and may be disposed between the third magnet 130-3 and the bobbin 110.

Alternatively, in another embodiment, the connection portion of the first coil 120 may be disposed between the fourth side portion of the bobbin 110 and a fourth side portion of the housing 140. For example, the connection portion of the first coil 120 may be opposite the dummy member 135, and may be disposed between the dummy member 135 and the bobbin 110.

In another embodiment, the first coil unit 120-1 and the second coil unit 120-2 may be separated or spaced apart from each other.

When a driving signal (e.g. driving current) is supplied to the first coil 120, electromagnetic force may be formed through electromagnetic interaction between the first coil 120 and the first and second magnets 130-1 and 130-3, and the bobbin 110 may be moved by the formed electromagnetic force in the optical-axis (OA) direction.

At an initial position of an AF moving unit, the bobbin 110 may be moved in an upward-downward direction (e.g. the Z-axis direction), which is referred to as bidirectional driving of the AF moving unit. Alternatively, at the initial position of the AF moving unit, the bobbin 110 may be moved in only one of the upward direction and the downward direction, which is referred to as unidirectional driving of the AF moving unit.

Figure 10A:
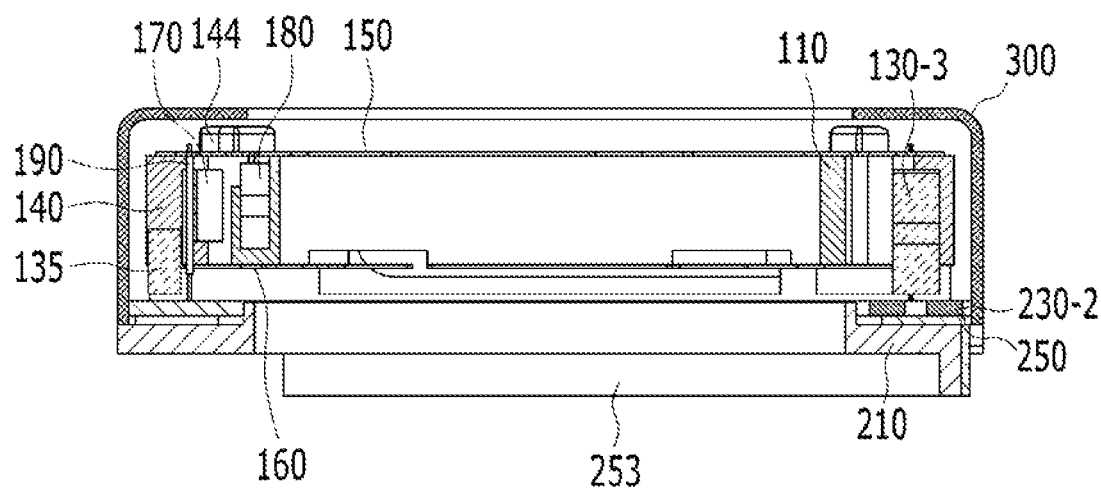
FIG. 10A is a sectional view of the lens moving apparatus in an AB direction of FIG. 3.
Figure 10B:
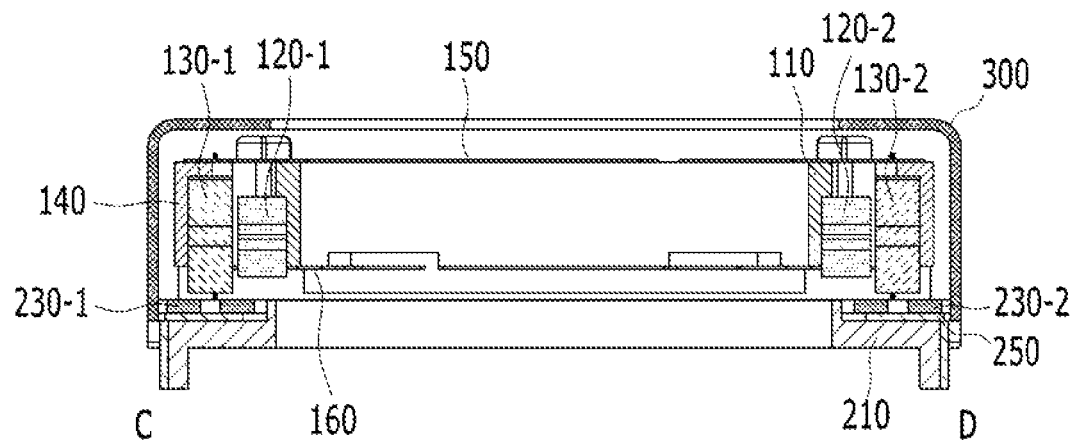
FIG. 10B is a sectional view of the lens moving apparatus in a CD direction of FIG. 3.

Referring to FIG. 10B, at the initial position of the AF moving unit, the first coil unit 120-1 may be opposite or may overlap the first magnet 130-1 in a direction that is perpendicular to the optical axis and in a direction from the optical axis to the first coil unit 120-1 (or the center of the first coil unit 120-1), but is not opposite or does not overlap the third magnet 130-3.

At the initial position of the AF moving unit, the second coil unit 120-2 may be opposite or may overlap the second magnet 130-2 in a direction that is perpendicular to the optical axis and in a direction from the optical axis to the second coil unit 120-2 (or the center of the second coil unit 120-2), but is not opposite or does not overlap the third magnet 130-3.

The AF moving unit may include the bobbin 110 and components coupled to the bobbin 110. For example, the AF moving unit may include the bobbin 110, the first coil 120, the sensing magnet 180, and/or the balancing magnet. In addition, the AF moving unit may further include the lens mounted in the bobbin 110.

The initial position of the AF moving unit may be the original position of the AF moving unit in the state in which no electric power is applied to the first coil 120 or the position at which the AF moving unit is located as the result of the upper and lower elastic members 150 and 160 being elastically deformed due only to the weight of the AF moving unit. In addition, the initial position of the AF moving unit (e.g. the bobbin 110) may be the position at which the AF moving unit is located when gravity acts in the direction from the bobbin 110 to the base 210 or when gravity acts in the direction from the base 210 to the bobbin 110.

Next, the sensing magnet 180 will be described.

The sensing magnet 180 may be disposed at one of the side portions at which the first coil unit 120-1 and the second coil unit 120-2 are not disposed, among the side portions of the bobbin 110. For example, the sensing magnet 180 may be disposed in the first recess 180a of the bobbin 110.

In the case in which the lens moving apparatus 100 includes the balancing magnet 185, the balancing magnet 185 may be disposed at another of the side portions at which the first coil unit 120-1 and the second coil unit 120-2 are not disposed, among the side portions of the bobbin 110. For example, the balancing magnet 185 may be disposed in the second recess (not shown) of the bobbin 110.

The balancing magnet 185 may offset the magnetic field effect of the sensing magnet 180 and may be balanced in weight with the sensing magnet 180, whereby an accurate AF operation may be performed.

The interface between an N pole and an S pole of the sensing magnet 180 (and/or the balancing magnet 185) may be parallel to a direction perpendicular to the optical-axis direction. However, the disclosure is not limited thereto. For example, in another embodiment, the interface between the N pole and the S pole may be parallel to the optical-axis direction.

For example, the sensing magnet 180 may be a monopolar magnetized magnet having a single N pole and a single S pole. However, the disclosure is not limited thereto. In another embodiment, the sensing magnet may be a bipolar magnetized magnet.

The sensing magnet 180 may be moved together with the bobbin 110 in the optical-axis direction OA as the result of interaction between the first coil unit 120-1 and the first magnet 130-1 and interaction between the second coil unit and the second magnet 130-2. The first position sensor 170 may sense the intensity of a magnetic field of the sensing magnet 180 moved in the optical-axis direction, and may output an output signal based on the result of sensing.

For example, a controller 830 of a camera module 200 or a controller 780 of a terminal 200A may detect the displacement of the bobbin 110 in the optical-axis direction based on the output signal output from the first position sensor 170.

In another embodiment, the sensing magnet 180 and/or the balancing magnet 185 may be omitted, the first position sensor may be mounted to the bobbin, rather than the housing, and the bobbin 2110 and the first position sensor are moved in the optical-axis direction due to interaction between the first coil 2120 and the first magnet 130, whereby the first position sensor may sense the intensity of the magnetic field of the first magnet and may output an output signal based on the result of sensing.

Next, the housing 140 will be described.

The housing 140 receives at least a portion of the bobbin 110 therein, and supports the first magnet 130-1, the second magnet 130-2, the third magnet 130-3, and the dummy member 135.

For example, the OIS moving unit (or the lens moving unit) may include the AF moving unit and the housing 140. For example, the OIS moving unit (or the lens moving unit) may include the components (e.g. 130-1 to 130-3, 135, 190, and 170) mounted to the housing 140.

For example, the OIS moving unit (or the lens moving unit) may be moved by OIS driving based on electromagnetic force caused by interaction between the first to third magnets 130-1 to 130-3 and the second coil 230.

Figure 5A:
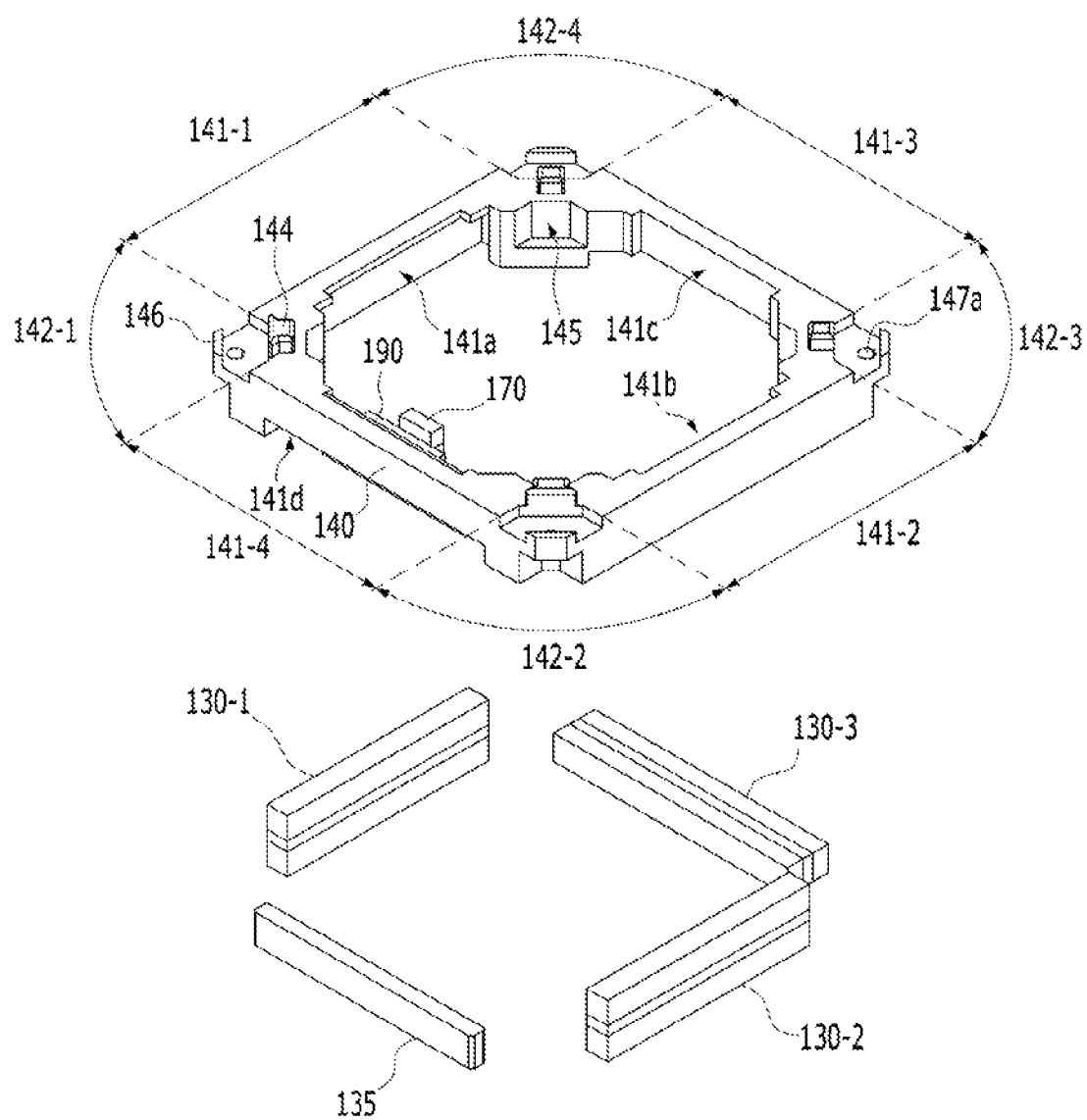
FIG. 5A is a perspective view of a housing, first to third magnets, and a dummy member.
Figure 5B:
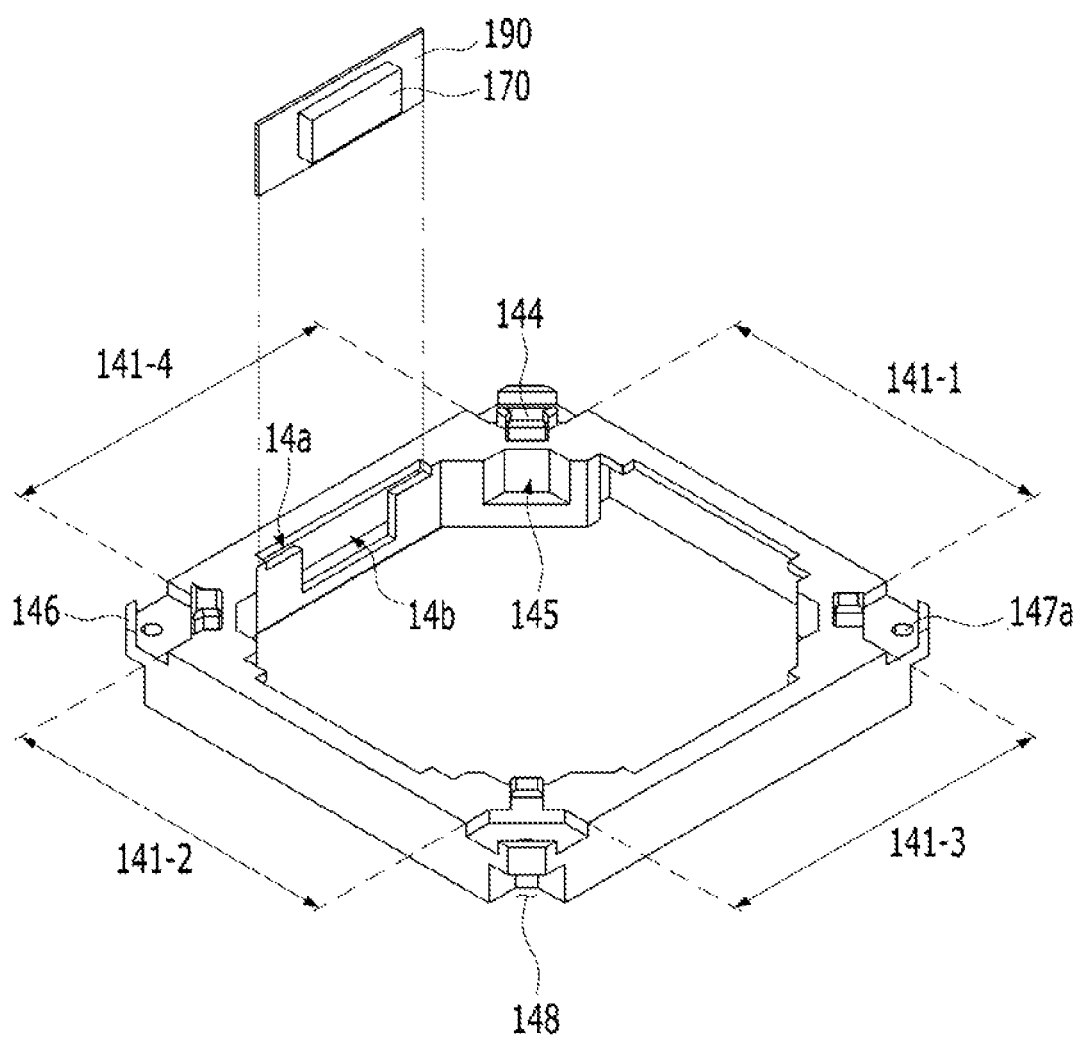
FIG. 5B is a perspective view of the housing, a first position sensor, and a circuit board.

FIG. 5A is a perspective view of the housing 140, the first to third magnets 130-1 to 130-3, and the dummy member 135, and FIG. 5B is a perspective view of the housing 140, the first position sensor 170, and the circuit board 190.

Referring to FIGS. 5A and 5B, the housing 140 may be disposed inside the cover member 300, and may be disposed between the cover member 300 and the bobbin 110. The housing 140 may receive the bobbin 110 therein.

The outer surface of the housing 140 may be spaced apart from the inner surface of a side plate of the cover member 300, and the housing 140 may be moved in a space between the housing 140 and the cover member 300 by OIS driving.

The housing 140 may generally have a hollow pillar shape including an opening or a hollow portion.

For example, the housing 140 may have a polygonal (e.g. quadrangular or octagonal) or circular opening. For example, the opening of the housing 140 may be a through-hole, in which the bobbin 110 is received.

The housing 140 may include a plurality of side portions 141-1 to 141-4 and a plurality of corner portions 142-1 to 142-4.

For example, the housing 140 may include first to fourth side portions 141-1 to 141-4 and first to fourth corner portions 142-1 to 142-4.

The first to fourth side portions 141-1 to 141-4 of the housing 140 may be spaced apart from each other. Each of the corner portions 142-1 to 142-4 of the housing 140 may be disposed or located between two adjacent side portions 141-1 and 141-2, 141-2 and 141-3, 141-3 and 141-4, or 141-4 and 141-1, and may interconnect the side portions 141-1 to 141-4.

For example, the corner portions 142-1 to 142-4 of the housing 140 may be located at the corners of the housing 140. For example, the number of side portions of the housing 140 may be four, and the number of corner portions thereof may be four. However, the disclosure is not limited thereto.

Each of the side portions 141-1 to 141-4 of the housing 140 may be disposed parallel to a corresponding one of the side plates of the cover member 300

The horizontal length of each of the side portions 141-1 to 141-4 of the housing 140 may be greater than the horizontal length of each of the corner portions 142-1 to 142-4 thereof. However, the disclosure is not limited thereto.

The first side portion 141-1 and the second side portion 141-2 of the housing 140 may be located so as to be opposite each other or to face each other, and the third side portion 141-3 and the fourth side portion 141-4 may be located so as to be opposite each other or to face each other. Each of the third side portion 141-3 and the fourth side portion 141-4 of the housing 140 may be located between the first side portion 141-1 and the second side portion 141-2.

The housing 140 may be provided on the upper portion, the upper end, or the upper surface thereof with a stopper 144 in order to prevent direct collision with the inner surface of the upper plate of the cover member 300.

For example, the stopper 144 may be provided at the upper surface (e.g. a first surface 51a) of each of the corner portions 142-1 to 142-4 of the housing 140. However, the disclosure is not limited thereto.

In addition, the housing 140 may be provided on the upper portion, the upper end, or the upper surface of each of the corner portions 142-1 to 142-4 thereof with a guide projecting portion 146 configured to guide a damper coated on the supporting member 220.

The housing 140 may be provided on the upper portion, the upper end, or the upper surface thereof with at least one first coupling portion coupled to a first outer frame 152 of the upper elastic member 150. In addition, the housing 140 may be provided on the lower portion, the lower end, or the lower surface thereof with at least one second coupling portion coupled and fixed to a second outer frame 162 of the lower elastic member 160.

Each of the first coupling portion and the second coupling portion of the housing 140 may be a plane, a recess, or a protrusion.

The first coupling portion of the housing 140 may be coupled to a hole 152a of the first outer frame 152 of the upper elastic member 150 and the second coupling portion of the housing 140 may be coupled to a hole 162a of the second outer frame 162 of the lower elastic member 160 by thermal fusion or using an adhesive.

The housing 140 may include a first seating portion 141a provided in one (e.g. the first side portion 141-1) of two side portions located opposite each other such that the first magnet 130-1 is disposed therein and a second seating portion 141b provided in the other 141-2 of the two side portions such that the second magnet 130-2 is disposed therein.

In addition, the housing 140 may include a third seating portion 141c provided in one (e.g. the third side portion 141-3) of two other side portions located opposite each other such that the third magnet 130-3 is disposed therein and a fourth seating portion 141d provided in the other 141-4 of the other two side portions such that the dummy member 135 is disposed therein.

Each of the first to third seating portions 141a to 141c of the housing 140 may be provided in the inner surface of a corresponding one of the side portions of the housing 140. However, the disclosure is not limited thereto. Each of the first to third seating portions 141a to 141c of the housing 140 may be provided in the outer surface of a corresponding one of the side portions of the housing 140.

Each of the first to third seating portions 141a to 141c of the housing 140 may be a recess having a shape corresponding to or coinciding with a corresponding one of the first to third magnets 130-1 to 130-3, e.g. a concave recess. However, the disclosure is not limited thereto.

For example, a first opening opposite the first coil unit 120-1 (or the second coil unit) and a second opening opposite a third coil unit 230-1 (or a fourth coil unit 230-2) may be formed in the first seating portion 141a (or the second seating portion 141b) of the housing 140. The openings are provided to easily mount the magnet 130. In another embodiment, at least one of the first and second openings may be omitted.

A first opening opposite the outer surface of the bobbin 110 and a second opening opposite a fifth coil unit 230-3 may be formed in the third seating portion 141c of the housing 140. However, the disclosure is not limited thereto. In another embodiment, at least one of the first and second openings may be omitted.

The fourth seating portion 141d of the housing 140 may include a first opening configured to be open toward the outer surface of the fourth side portion 141-4 of the housing 140 and a second opening configured to be open toward the lower surface of the fourth side portion of the housing 140. However, the disclosure is not limited thereto. In another embodiment, at least one of the first and second openings may be omitted.

For example, one side surface of the magnet 130-1, 130-2, or 130-3 fixed to or disposed in the seating portion 141a, 141b, or 141c of the housing 140 may be exposed through the first opening of the seating portion 141a, 141b, or 141c. In addition, the lower surface of the magnet 130-1, 130-2, or 130-3 fixed to or disposed in the seating portion 141a, 141b, or 141c of the housing 140 may be exposed through the second opening of the seating portion 141a, 141b, or 141c.

One side surface of the dummy member 135 fixed to or disposed in the seating portion 141d of the housing 140 may be exposed to the outer surface of the fourth side portion 141-4 of the housing 140 through the first opening, and the lower surface of the dummy member 135 may be exposed through the second opening.

For example, the first to third magnets 130-1, 130-2, and 130-3 and the dummy member 135 may be fixed respectively to the seating portions 141a to 141d using an adhesive.

Supporting members 220-1 to 220-4 may be disposed at the corner portions 142-1 to 142-4 of the housing 140. Holes 147a defining paths along which the supporting members 220-1 to 220-4 extend may be provided in the corner portions 142-1 to 142-4 of the housing 140.

For example, the housing 140 may include holes 147a formed through the upper portions of the corner portions 142-1 to 142-4.

In another embodiment, the holes provided in the corner portions 142-1 to 142-4 of the housing 140 may be depressed from the outer surfaces of the corner portions of the housing 140, and at least a portion of each of the holes may be open toward the outer surface of a corresponding one of the corner portions. The number of holes 147a of the housing 140 may be equal to the number of supporting members.

The housing 140 may be provided with at least one stopper (not shown) projecting from the outer surfaces of the side portions 141-1 to 141-4 thereof. The at least one stopper may prevent the housing 140 from colliding with the cover member 300 when moved in a direction perpendicular to the optical axis.

In order to prevent the lower surface of the housing 140 from colliding with the base 210 and/or the circuit board 250, the housing 140 may be further provided with a stopper (not shown) projecting from the lower surface thereof.

In order to secure paths along which the supporting members 220-1 to 220-4 extend and to secure a space to be filled with silicone capable of serving as a damper, the housing may be provided in the lower part or the lower ends of the corner portions 142-1 to 142-4 thereof with recesses 148. For example, the recesses 148 of the housing 140 and the holes 147a of the housing 140 may be connected to each other. For example, the lower ends of the holes 147a of the housing 140 may be open toward the recesses 148 of the housing 140.

The housing 140 may be provided in the fourth side portion 141-1 thereof with a first recess 14a configured to receive the circuit board 190 and a second recess 14b configured to receive the first position sensor 170.

In order to easily mount the circuit board 190, the first recess 14a of the housing 140 may be open at the upper part thereof, and may have a shape corresponding to or coinciding with the shape of the circuit board 190.

The second recess 14b may have an opening configured to be open inwardly of the housing 140, and may abut or may be connected to the first recess 14a. However, the disclosure is not limited thereto. The second recess 14b may have a shape corresponding to or coinciding with the shape of the first position sensor 170.

Next, the first magnet 130-1, the second magnet 130-2, the third magnet 130-3 will be described.

The first magnet 130-1, the second magnet 130-2, and the third magnet 130-3 may be disposed at the housing 140 so as to be spaced apart from each other. For example, each of the first to third magnets 130-1 to 130-3 may be disposed between the bobbin 110 and the housing 140.

The first magnet 130-1, the second magnet 130-2, and the third magnet 130-3 may be disposed at the side portions of the housing 140.

The first magnet 130-1 and the second magnet 130-2 may be disposed respectively at two opposite side portions 141-1 and 141-2, among the side portions 141-1 to 141-4 of the housing 140.

For example, the first magnet 130-1 may be disposed at the first side portion 141-1 of the housing 140, and the second magnet 130-2 may be disposed at the second side portion 141-2 of the housing 140, which is opposite the first side portion 141-1. For example, the third magnet 130-3 may be disposed at the third side portion 141-3 of the housing 140.

For example, each of the first to third magnets 130-1 to 130-3 may be disposed in a corresponding one of the first to third seating portions 141a to 141c of the housing 140.

The first and second coil units 120-1 and 120-2 for AF driving are disposed at two opposite side portions of the bobbin 110, and no coil unit for AF driving is disposed between the bobbin 110 and the third magnet 130-3. In addition, no coil unit for AF driving is disposed between the bobbin 110 and the dummy member 135.

In addition, for OIS driving, the third to fifth coil units 230-1 to 230-3 and the first to third magnets 130-1 to 130-3 correspond to each other in the optical-axis direction, and the second coil 230 for OIS driving is not disposed between the dummy member 135 and the circuit board 250.

For example, the first magnet 130-1 may include a first surface opposite the first coil unit 120-1, and the first surface of the first magnet 130-1 may include two poles, namely an N pole and an S pole, and a first partition 11c located between the two poles. For example, the first partition 11c may be a nonmagnetic partition.

For example, the first magnet 130-1 may include a second surface opposite the third coil unit 230-1 in the optical-axis direction, and the second surface of the first magnet 130-1 may include two poles, namely an N pole and an S pole.

For example, the second magnet 130-2 may include a first surface opposite the second coil unit 120-2, and the first surface of the second magnet 130-2 may include two poles, namely an N pole and an S pole, and a second partition 12c located between the two poles. For example, the second partition 12c may be a nonmagnetic partition.

For example, the second magnet 130-2 may include a second surface opposite the fourth coil unit 230-2 in the optical-axis direction, and the second surface of the second magnet 130-2 may include two poles, namely an N pole and an S pole.

For example, the third magnet 130-3 may include a first surface opposite the side portion of the bobbin 110 opposite the side portion 141-3 of the housing 140, at which the third magnet 130-3 is disposed, and the first surface of the third magnet 130-3 may include two poles, namely an N pole and an S pole.

In addition, for example, the third magnet 130-3 may include a second surface opposite the fifth coil unit 230-3 in the optical-axis direction, and the second surface of the third magnet 130-3 may include two poles, namely an N pole and an S pole, and a third partition 13c located between the two poles. For example, the third partition 13c may be a nonmagnetic partition 13c.

At the initial position of the AF moving unit, the first magnet 130-1 may overlap the first coil unit 120-1 in a direction that is perpendicular to the optical axis and in a direction from the optical axis to the first coil unit 120-1 (or the center of the first coil unit 120-1).

At the initial position of the AF moving unit, the second magnet 130-2 may overlap the second coil unit 120-2 in a direction that is perpendicular to the optical axis and in a direction from the optical axis to the second coil unit 120-2 (or the center of the second coil unit 120-2).

At the initial position of the AF moving unit, the third magnet 130-3 may not be opposite or may not overlap the first coil unit 120-1 and the second coil unit 120-2 in a direction that is perpendicular to the optical axis and a direction from the third side portion 141-3 to the fourth side portion 141-4 of the housing 140.

For example, each of the first to third magnets 130-1 to 130-3 may be disposed in a corresponding one of the first to third seating portions 141a to 141c of the housing 140.

The first magnet 130-1 may overlap the second magnet 130-2 in a direction that is perpendicular to the optical axis and a direction from the first side portion 141-1 to the second side portion 141-2 of the housing 140, and may not overlap the third magnet 130-3.

Each of the first to third magnets 130-1 to 130-3 may have a polyhedral shape that is easily seated or disposed in a corresponding one of the first to third seating portions 141a to 141c of the housing 140. For example, each of the first to third magnets 130-1 to 130-3 may have a flat shape. However, the disclosure is not limited thereto.

Each of the first to third magnets 130-1 to 130-3 may be a 4-pole magnet including two N poles and two S poles. Here, the 4-pole magnet may be referred to as a bipolar magnetized magnet. The first to third magnets 130-1 to 130-3 will be described later.

The dummy member 135 may be disposed at the fourth side portion 141-4 of the housing 140. The dummy member 135 may be a nonmagnetic material. However, the disclosure is not limited thereto. In another embodiment, the dummy member may include a magnetic material. For example, the dummy member 135 may be a metal or an insulator.

The dummy member 135 may have the same mass as the third magnet 130-3. However, the disclosure is not limited thereto. For weight balance, the dummy member 135 may be disposed at the side portion 141-1 located opposite the side portion 141-3 at which the third magnet 130-3 is disposed.

At the initial position of the AF moving unit, the dummy member 135 may not be opposite or may not overlap the first coil unit 120-1 and the second coil unit 120-2 in a direction that is perpendicular to the optical axis and a direction from the third side portion 141-3 to the fourth side portion 141-4 of the housing 140.

The dummy member 135 may overlap the third magnet 130-3 in a direction that is perpendicular to the optical axis and a direction from the third side portion 141-3 to the fourth side portion 141-4 of the housing 140.

For example, the dummy member 135 may not overlap the first and second magnets 130-1 and 130-2 in a direction from the third side portion 141-3 to the fourth side portion 141-4 of the housing 140.

In addition, at least a portion of the dummy member 135 may overlap the position sensor 170 in a direction that is perpendicular to the optical axis and a direction from the third side portion 141-3 to the fourth side portion 141-4 of the housing 140. However, the disclosure is not limited thereto. In another embodiment, both may not overlap each other.

In the case in which the dummy member 135 includes a magnetic material, the magnitude of magnetism of the dummy member 135 may be less than the magnitude of magnetism of the third magnet 130-3. As lens moving units are disposed such that dummy members included in the lens moving units are adjacent to each other, therefore, a camera module according to an embodiment is capable of reducing magnetic field interference between magnets included in two adjacent lens moving units.

For example, the dummy member 135 may include tungsten, and tungsten may account for 95% or more of the total weight thereof. For example, the dummy member 135 may be a tungsten alloy.

The dummy member 135 may have a polyhedral shape, such as a rectangular parallelepiped shape. However, the disclosure is not limited thereto. The dummy member 135 may have any of various shapes. For example, the dummy member 135 may be rounded or curved at the side edge thereof.

Next, the circuit board 190 and the first position sensor 170 will be described.

The first position sensor 170 and the circuit board 190 are disposed at one of the side portions of the housing 140. For example, the first position sensor 170 and the circuit board 190 may be disposed at the fourth side portion 141-4 of the housing 140, at which the dummy member 135 is disposed. This disposition is provided to avoid spatial interference between the first to third magnets 130-1 to 130-3 and the circuit board 190 at which the first position sensor 170 is mounted.

For example, the circuit board 190 may be disposed in the first recess 14a of the housing 140, and the first position sensor 170 may be disposed or mounted at the circuit board 190.

At the initial position of the AF moving unit, at least a portion of the first position sensor 170 may overlap the sensing magnet 180 in a direction that is perpendicular to the optical axis and in a direction from the optical axis to the first position sensor 170. However, the disclosure is not limited thereto.

The first position sensor 170 may be disposed at a first surface of the circuit board 190. Here, the first surface of the circuit board 190 mounted to the housing 140 may be a surface opposite the inside of the housing 140 (or the outer surface of the bobbin 110).

The first position sensor 170 may be configured in the form of a driver integrated circuit (IC) including a Hall sensor, or may be realized as a position sensor, such as a Hall sensor, alone.

In the case in which the first position sensor 170 is realized as a Hall sensor alone, the first position sensor 170 may include two input terminals and two output terminals. Each of the input terminals and the output terminals of the first position sensor 170 may be connected to a corresponding one of first to fourth pads of the circuit board 190.

For example, the circuit board 190 may be a printed circuit board or an FPCB.

For example, the first to fourth terminals of the circuit board 190 may be connected respectively to upper springs 150-1 to 150-4, and may be connected to the circuit board 250 via the supporting members 220-1 to 220-4. The first position sensor 170 may be connected to the circuit board 250. For example, the two input terminals and the two output terminals of the first position sensor 170 may be connected to terminals of the circuit board 250 via the circuit board 190, the upper springs 150-1 to 150-4, and the supporting members 220-1 to 220-4.

In the case in which the first position sensor 170 is a driver IC including a Hall sensor, the first position sensor may include four terminals configured to transmit and receive a clock signal SCL, a data signal SDA, and electric power signals VCC and GND and two terminals configured to provide a driving signal to the first coil 120.

Next, the upper elastic member 150, the lower elastic member 160, the supporting member 220, the second coil 230, the circuit board 250, and the base 210 will be described.

Figure 6:
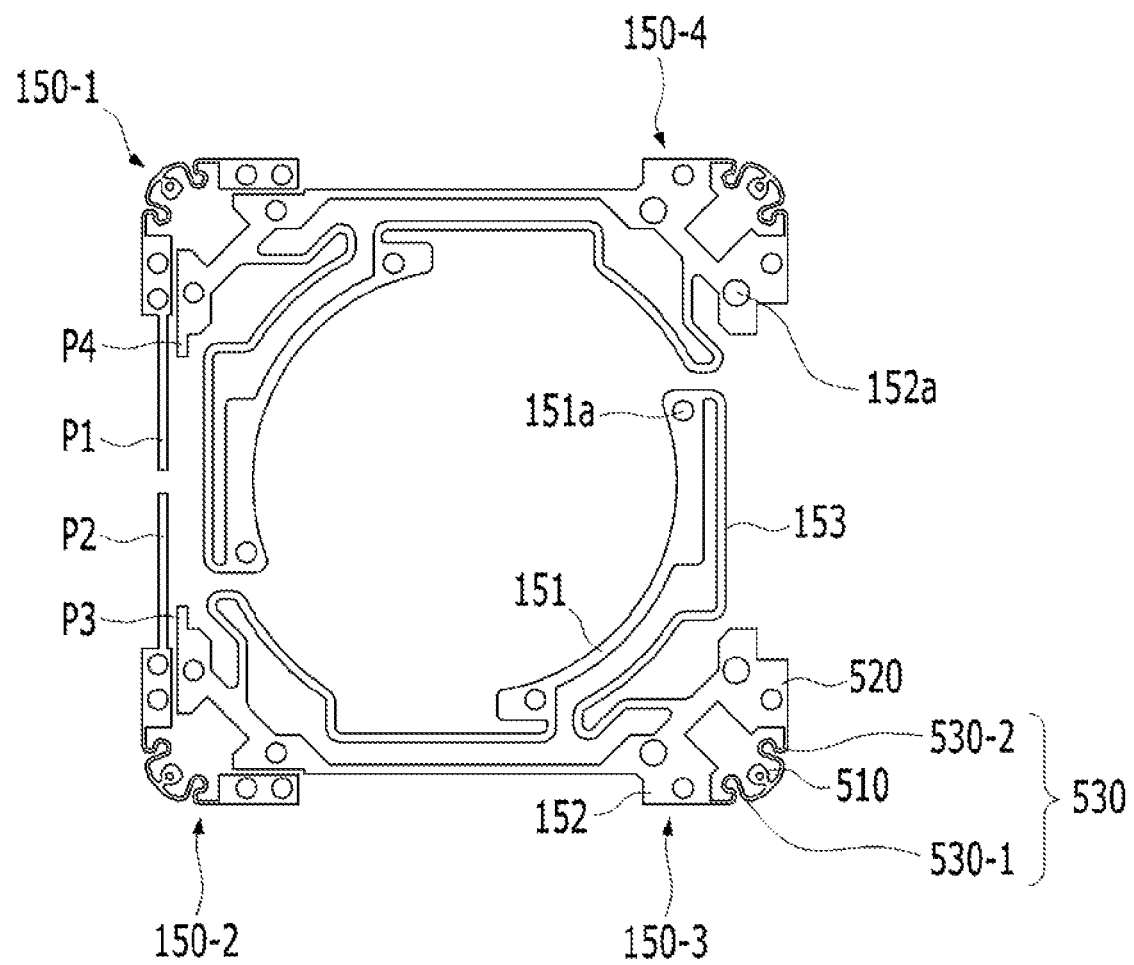
FIG. 6 is a plan view of an upper elastic member.
Figure 7:
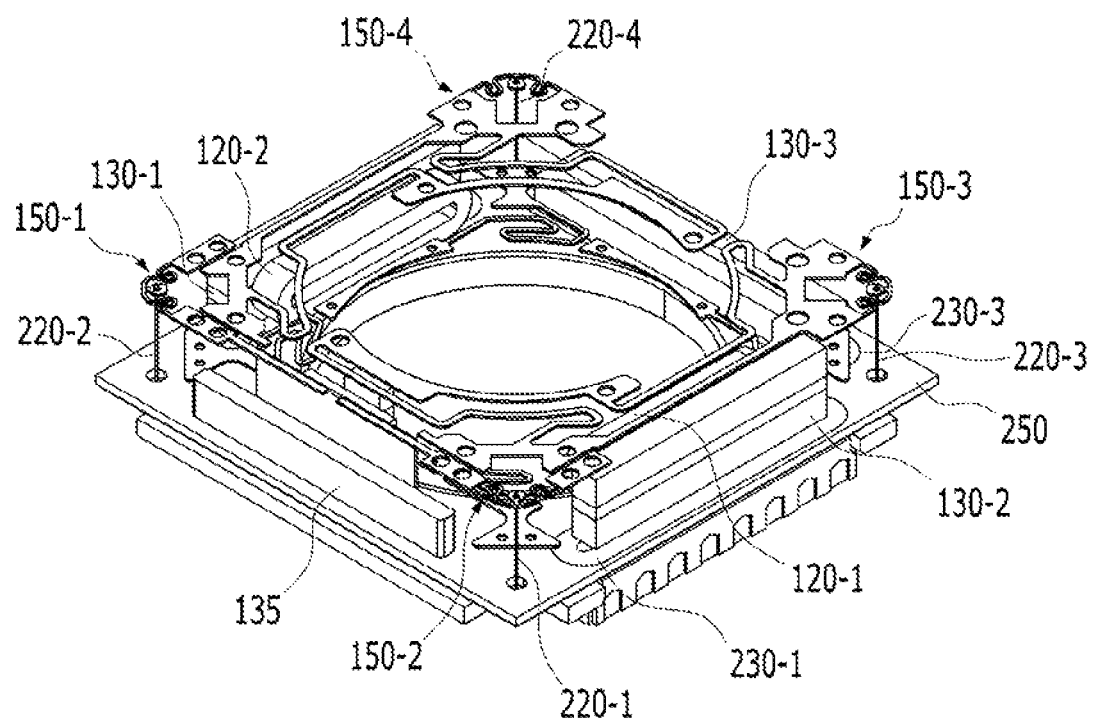
FIG. 7 is a view illustrating an electrical connection relationship between the upper elastic member, the first position sensor, and a supporting member.
Figure 8:
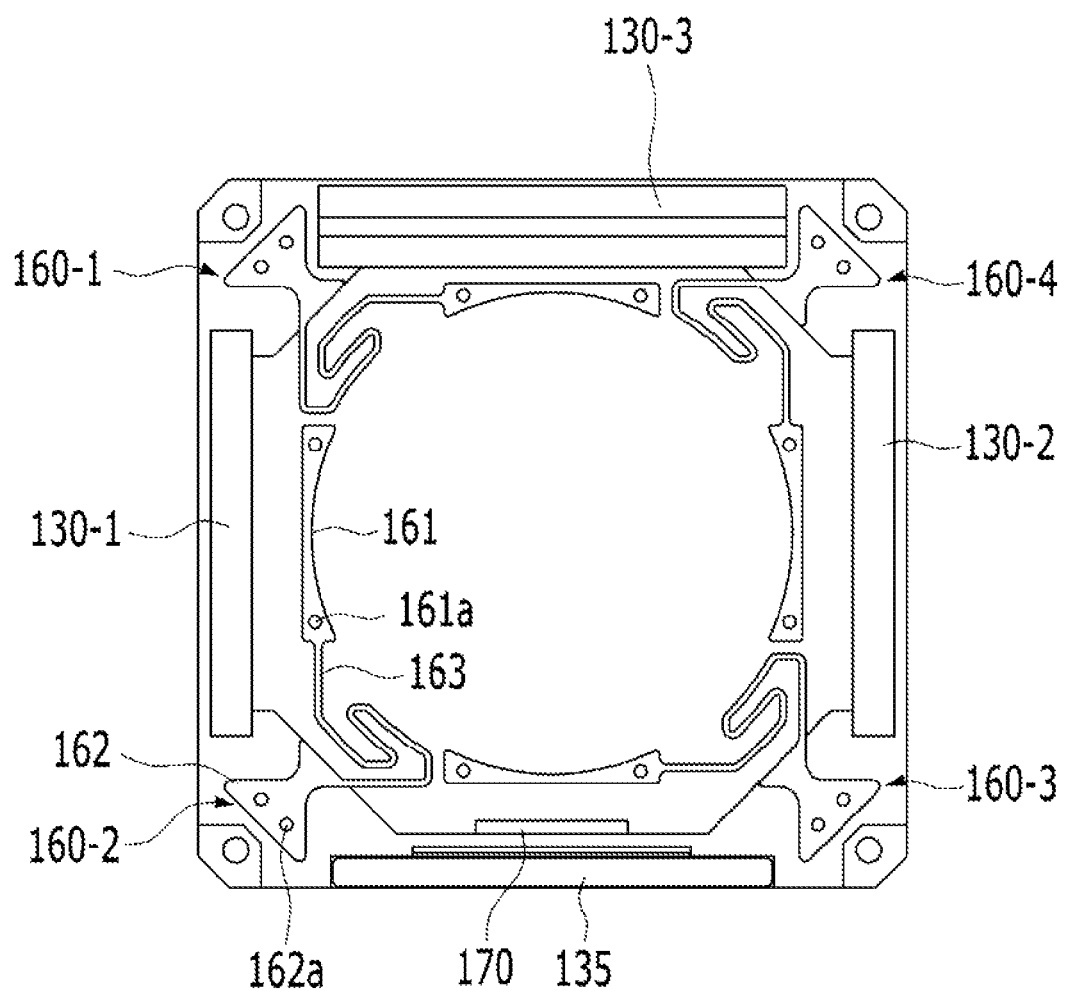
FIG. 8 is a bottom view of a lower elastic member and the housing.
Figure 9A:
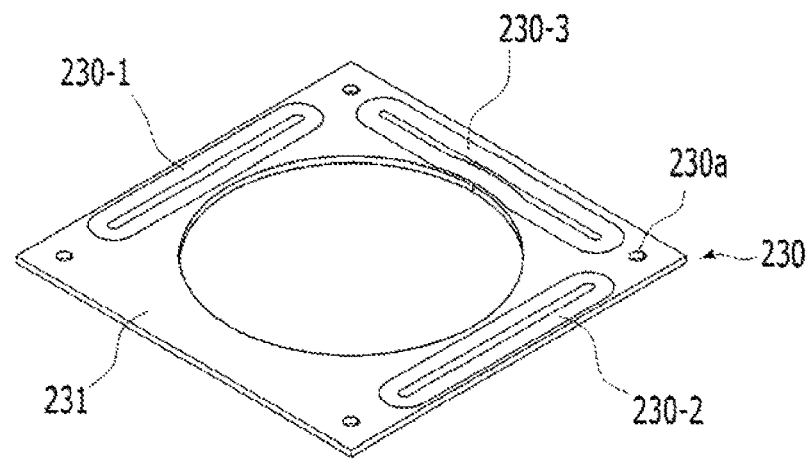
FIG. 9A is a separated perspective view of a second coil, the circuit board, and a base.
Figure 9A:
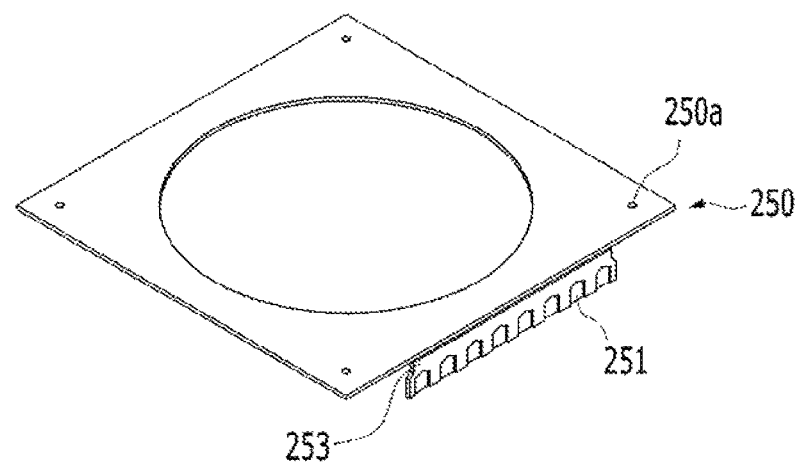
Figure 9A:
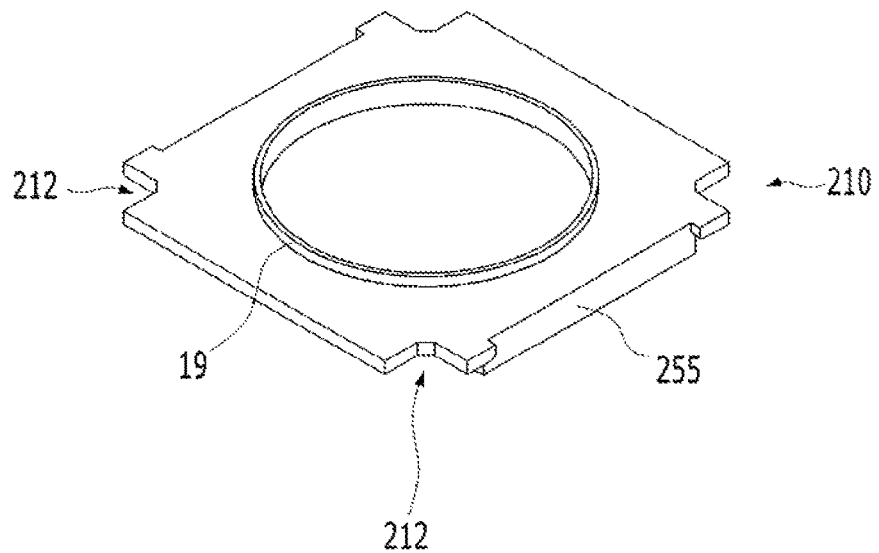
Figure 9B:
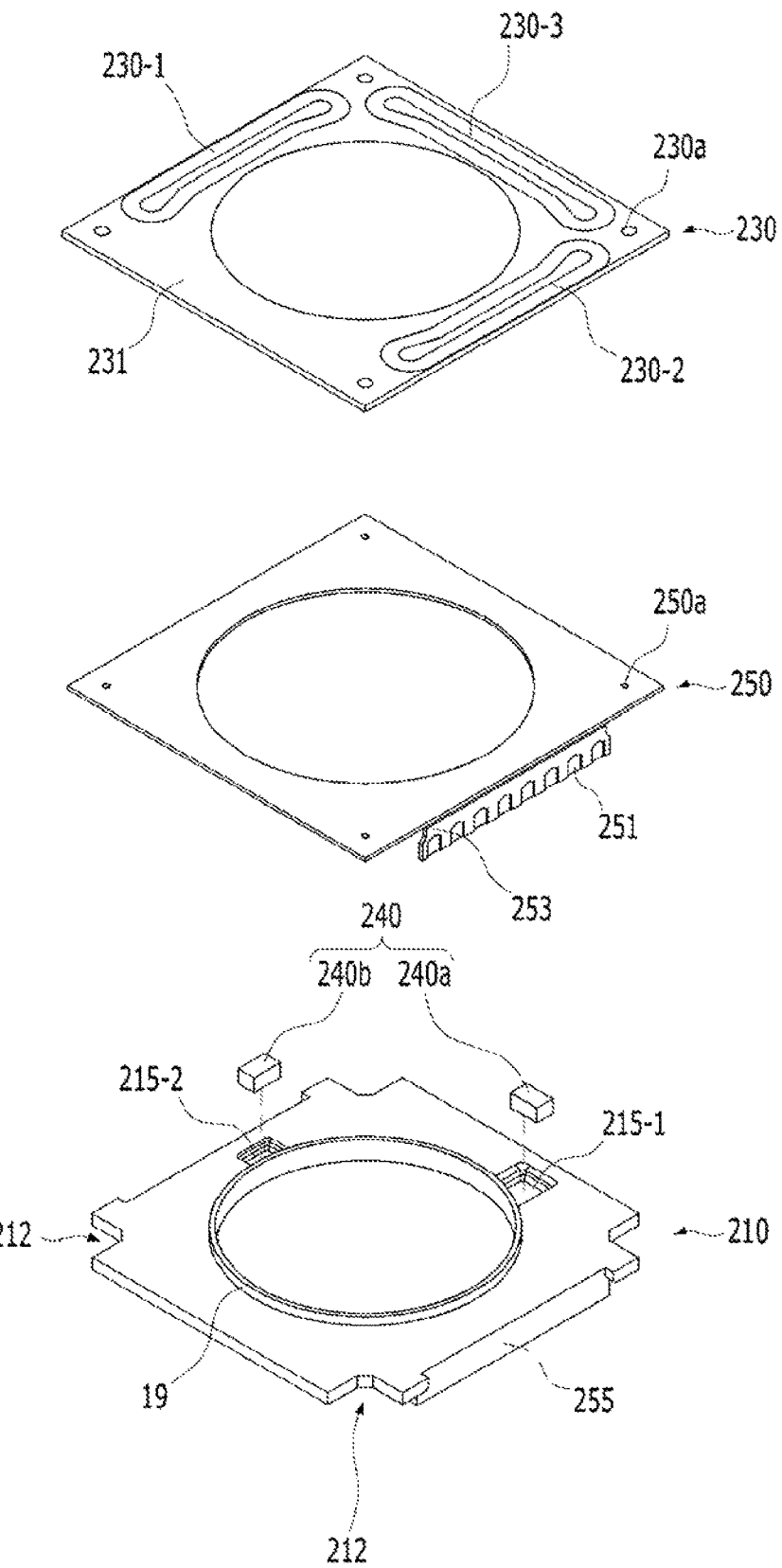
FIG. 9B shows another embodiment including a second position sensor.

FIG. 6 is a plan view of the upper elastic member 150, FIG. 7 is a view illustrating an electrical connection relationship between the upper elastic member 150, the first position sensor 170, and the supporting member 220, FIG. 8 is a bottom view of the lower elastic member 160 and the housing 140, FIG. 9A is a separated perspective view of the base 210, the second coil 230, and the circuit board 250, and FIG. 9B shows another embodiment including a second position sensor 240.

Referring to FIGS. 6 to 9A, the upper elastic member 150 may be coupled to the upper portion, the upper surface, or the upper end of the bobbin 110 and to the upper portion, the upper surface, or the upper end of the housing 140. The lower elastic member 160 may be coupled to the lower portion, the lower surface, or the lower end of the bobbin 110 and to the lower portion, the lower surface, or the lower end of the housing 140.

The upper elastic member 150 and the lower elastic member 160 may constitute an elastic member. The elastic member may be coupled to the bobbin and the housing. The elastic member may elastically support the bobbin 110 relative to the housing 140.

The upper elastic member 150 may include a plurality of upper springs 150-1 to 150-4 separated from each other. In FIG. 6, four upper springs separated from each other are shown. However, the disclosure is not limited thereto. In another embodiment, the number of upper springs may be two or more.

For example, the first upper spring 150-1 may be disposed on the first corner portion 142-1 and the fourth side portion 141-4 of the housing 140.

For example, the second upper spring 150-2 may be disposed on the fourth side portion 141-4 and the second corner portion 142-2 of the housing 140.

For example, the third upper spring 150-3 may be disposed on the second corner portion 142-2, the second side portion 141-2, and the third corner portion 142-3 of the housing 140.

For example, the fourth upper spring 150-4 may be disposed on the fourth corner portion 142-4, the first side portion 141-1, and the first corner portion 142-1 of the housing 140.

At least one of the first to fourth upper springs 150-1 to 150-4 may further include a first inner frame 151 coupled to the bobbin 110, a first outer frame 152 coupled to the housing 140, and a first frame connection portion 153 configured to interconnect the first inner frame 151 and the first outer frame 152. In another embodiment, the inner frame may be referred to as an "inner portion," the outer frame 152 may be referred to as an "outer portion," and the frame connection portion may be referred to as a "connection portion."

For example, each of the first and second upper springs 150-1 and 150-2 may include a first outer frame 152 and may not include a first inner frame and a first frame connection portion. Each of the third and fourth upper springs 150-3 and 150-4 may include a first inner frame 151, a first outer frame 152, and a first frame connection portion 153. However, the disclosure is not limited thereto.

For example, the first inner frame 151 may be provided with a hole 151a, into which the first coupling portion of the bobbin 110 is coupled. In addition, for example, the first outer frame 152 may be provided with a hole 152a, into which the first coupling portion of the housing 140 is coupled.

The first outer frames 152 of the first to fourth upper springs 150-1 to 150-4 may have contact portions P1 to P4 connected to the terminals of the circuit board 190, respectively.

The first outer frame 152 of each of the first to fourth upper springs 150-1 to 150-4 may include a first coupling portion 510 coupled to a corresponding one of the supporting members 220-1 to 220-4, a second coupling portion 520 coupled to a corresponding one of the corner portions of the housing 140, and a connection portion 530 configured to interconnect the first coupling portion 510 and the second coupling portion 520.

For example, the connection portion 530 may include a first connection portion 530-1 configured to interconnect the first coupling portion 510 and a first region of the second coupling portion 520 and a second connection portion 530-2 configured to interconnect the first coupling portion 510 and a second region of the second coupling portion 520. The connection portion 530 may include a portion that is bent or curved at least once.

The lower elastic member 160 may include two lower springs. However, the disclosure is not limited thereto. In another embodiment, the lower elastic member may include a single lower spring or three or more lower springs.

For example, each of the first and second lower springs 160-1 and 160-2 may include a second inner frame 161 coupled or fixed to the lower portion, the lower surface, or the lower end of the bobbin 110, a second outer frame 162 coupled or fixed to the lower portion, the lower surface, or the lower end of the housing 140, and a second frame connection portion 163 configured to interconnect the second inner frame 161 and the second outer frame 162.

Each of the first frame connection portion 153 of the upper elastic member 150 and the second frame connection portion 163 of the lower elastic member 160 may be formed so as to be bent or curved (or crooked) at least once in order to form a predetermined pattern. The upward and/or downward movement of the bobbin 110 in the first direction may be flexibly (or elastically) supported through positional change and minute deformation of the first and second frame connection portions 153 and 163.

The second inner frame 161 may be provided with a hole 161a, into which the second coupling portion of the bobbin 110 is coupled, and the second outer frame 162 may be provided with a hole 162a, into which the second coupling portion of the housing 140 is coupled.

Each of the upper springs 150-1 to 150-4 and the lower springs 160-1 and 160-2 may be realized as a leaf spring; however, the disclosure is not limited thereto. Each of the upper springs and the lower springs may be realized as a coil spring or the like. In addition, for the upper springs and the lower springs, the "spring" may be referred to as an "elastic unit."

In order to absorb or alleviate vibration of the bobbin 110, the lens moving apparatus 100 may further include a first damper (not shown) disposed between each of the upper springs 150-1 to 150-4 and the bobbin 110 (or the housing 140).

For example, the first damper (not shown) may be disposed in a space between the first frame connection portion 153 of each of the upper springs 150-1 to 150-4 and the bobbin 110.

In addition, for example, the lens moving apparatus 100 may further include a second damper (not shown) disposed between the second frame connection portion 163 of the lower elastic member 160 and the bobbin 110 (or the housing 140).

In addition, for example, the lens moving apparatus 100 may further include a third damper (not shown) disposed between the supporting member 220 and the hole 147a of the housing 140.

In addition, for example, the lens moving apparatus 100 may further include a fourth damper (not shown) disposed at the first coupling portion 510 and one end of the supporting member 220, and may further include a fifth damper (not shown) disposed at the other end of the supporting member 220 and the circuit board 250.

In addition, for example, a damper (not shown) may be further disposed between the inner surface of the housing 140 and the outer surface of the bobbin 110.

Next, the supporting member 220 will be described.

The supporting member 220 may support the housing 140 so as to be movable relative to the base 210 in a direction perpendicular to the optical axis. The supporting member 220 may connect at least one of the upper and lower elastic members 150 and 160 to the circuit board 250.

The supporting member 220 may include a plurality of supporting members 220-1 to 220-4.

For example, the supporting member may include first to fourth supporting members 220-1 to 220-4 corresponding to the corner portions 142-1 to 142-4 of the housing 140.

Each of the first to fourth supporting members 220-1 to 220-4 may be disposed at a corresponding one of the first to fourth corner portions 142-1 to 142-4 of the housing 140, and may connect a corresponding one of the first to fourth upper springs 150-1 to 150-4 to the circuit board 250.

For example, each of the first to fourth supporting members 220-1 to 220-4 may connect a corresponding one of the first to fourth upper springs 150-1 to 150-4 to a corresponding one of the terminals of the circuit board 250.

The first to fourth supporting members 220-1 to 220-4 may be spaced apart from the housing 140, not fixed to the housing 140, and one end of each of the first to fourth supporting members 220-1 to 220-4 may be directly connected or coupled to the first coupling portion 510 of a corresponding one of the first to fourth upper springs 150-1 to 150-4 by soldering.

In addition, the other end of each of the first to fourth supporting members 220-1 to 220-4 may be directly connected or coupled to the circuit board 250 by soldering. For example, the other end of each of the first to fourth supporting members 220-1 to 220-4 may be directly connected or coupled to the lower surface of the circuit board 250. In another embodiment, the other end of each of the supporting members 220-1 to 220-4 may be coupled to a circuit member 231 of the second coil 230 or the base 210.

For example, each of the first to fourth supporting members 220-1 to 220-4 may extend through the hole 147a formed in a corresponding one of the corner portions 142-1 to 142-4 of the housing 140. However, the disclosure is not limited thereto. In another embodiment, the supporting members may be disposed adjacent to boundary lines between the side portions 141-1 to 141-4 and the corner portions 142 of the housing 140, and may not extend through the corner portions 142-1 to 142-4 of the housing 140.

The first coil 120 may be connected to the lower elastic member 150.

In the case in which the first coil unit 120-1 and the second coil unit 120-2 are connected to each other (CASE1), one end of the first coil unit 120-1 may be connected or coupled to the second inner frame 161 of one (e.g. 160-2) of the first to fourth lower springs 160-1 to 160-4, and one end of the second coil unit 120-2 may be connected or coupled to the second inner frame 161 of another (e.g. 160-4) of the first to fourth lower springs 160-1 to 160-4.

When the first position sensor 170 is realized as a position sensor, such as a Hall sensor, alone in CASE1, the two lower springs (e.g. 160-2 and 160-4) connected to the first coil unit 120-1 and the second coil unit 120-2 may be connected to the terminals of the circuit board 250, and a single driving signal may be provided to the first coil unit 120-1 and the second coil unit 120-2 through the circuit board 250.

When the first position sensor 170 is configured in the form of a driver integrated circuit (IC) including a Hall sensor in CASE1, the two lower springs (e.g. 160-2 and 160-4) connected to the first coil unit 120-1 and the second coil unit 120-2 may be connected to the first position sensor 170, and a single driving signal may be provided to the first coil unit 120-1 and the second coil unit 120-2 through the first position sensor 170.

In the case of another embodiment in which the first coil unit 120-1 and the second coil unit 120-2 are separated from each other (CASE2), the first coil unit 120-1 may be connected or coupled to the second inner frames of two (e.g. 160-1 and 160-2) of the first to fourth lower springs 160-1 to 160-4, and the second coil unit 120-2 may be connected or coupled to the second inner frames of the other two (e.g. 160-3 and 160-4) of the first to fourth lower springs.

When the first position sensor 170 is realized as a position sensor, such as a Hall sensor, alone in CASE2, the first to fourth lower springs 160-1 to 160-4 may be connected to the circuit board 250. For example, the first to fourth lower springs 160-1 to 160-4 may be connected to the terminals of the circuit board 250, and individual driving signals (e.g. driving currents) may be provided to the first coil unit 120-1 and the second coil unit 120-2 through the circuit board 250.

When the first position sensor 170 is configured in the form of a driver integrated circuit (IC) including a Hall sensor in CASE2, the first to fourth lower springs 160-1 to 160-4 may be connected to the first position sensor 170, and individual driving signals (e.g. driving currents) may be provided to the first coil unit 120-1 and the second coil unit 120-2 through the first position sensor 170.

The supporting member 220 may be realized as an elastic supporting member, such as a suspension wire, a leaf spring, or a coil spring. Also, in another embodiment, the supporting member 220 may be integrally formed with the upper elastic member 150.

Next, the base 210, the circuit board 250, and the second coil 230 will be described.

Referring to FIG. 9A, the base 210 may disposed under the bobbin 110 (or the housing 140).

The base 210 may have an opening corresponding to the opening of the bobbin 110 and/or the opening of the housing 140, and may be formed in a shape coinciding with or corresponding to the shape of the cover member 300, such as a quadrangular shape.

A prop portion 255 or a supporting portion may be provided in a region of the base 210 opposite a terminal 251 of the circuit board 250. The prop portion 255 of the base 210 may support a terminal portion of a terminal surface 253 of the circuit board 250 at which the terminal 251 is formed.

The base 210 may be provided in each corner portion thereof with a concave recess 212 in order to avoid spatial interference with the other end of a corresponding one of the supporting members 220-1 to 220-4 coupled to the circuit board 250.

In addition, the base 210 may be provided on the upper surface around the opening thereof with a projecting portion 19, which is coupled to the opening of the circuit board 250 and an opening 231a of the circuit member 231.

In addition, the base 210 may be provided in the lower surface thereof with a seating portion (not shown), in which a filter 610 of the camera module 200 is installed.

The circuit board 250 is disposed on the upper surface of the base 210, and may have an opening corresponding to the opening of the bobbin 110, the opening of the housing 140, and/or the opening of the base 210. The circuit board 250 may be formed in a shape coinciding with or corresponding to the shape of the upper surface of the base 210, such as a quadrangular shape.

The circuit board 250 may have at least one terminal surface 253, which is bent from the upper surface thereof and at which a plurality of terminals 251 or pins configured to receive electrical signals from outside is provided. For example, the circuit board 250 may include two terminal surfaces disposed at two opposite sides, among the sides of the upper surface of the circuit board 250. However, the disclosure is not limited thereto.

Driving signals may be provided to the first coil 120 and the second coil 230 through the plurality of terminals 251 provided at the terminal surface 253 of the circuit board 250. In addition, through the terminals 251 of the circuit board 250, a driving signal may be provided to the first position sensor 170, an output signal of the first position sensor 170 may be received and output, a driving signal may be provided to the second position sensor 240, and an output signal of the second position sensor 240 may be received and output.

The driving signal provided to the first coil 120 and/or the second coil 230 may be a direct-current signal or an alternating-current signal, and may have the form of current or voltage.

The circuit board 250 may be an FPCB. However, the disclosure is not limited thereto. The terminals of the circuit board 250 may be directly formed on the surface of the base 210 using a surface electrode scheme or the like.

In order to avoid spatial interference with the supporting members, the circuit board 250 may include holes 250a through which the supporting members 220-1 to 220-4 extend. The position and number of holes 250a may correspond to or coincide with the position and number of supporting members 220-1 to 220-4.

In another embodiment, the circuit board 250 may be provided in the corner portions thereof with escape recesses instead of the holes 250a.

For example, the supporting members 220-1 to 220-4 may extend through the holes 250a of the circuit board 250 and may be connected to a circuit pattern disposed at the lower surface of the circuit board 250 via solder. However, the disclosure is not limited thereto.

In another embodiment, the circuit board 250 may have no holes, and the supporting members 220-1 to 220-4 may be connected to a circuit pattern or a pad disposed at the upper surface of the circuit board 250 via solder.

In a further embodiment, the supporting members 220-1 to 220-4 may be connected to the circuit member 231, and the circuit member 231 may connect the supporting members 220-1 to 220-4 to the circuit board 250.

The second coil 230 may be disposed under the bobbin 110 (or the housing), and may be disposed on the upper surface of the circuit board 250.

The second coil 230 may include a third coil unit 230-1 corresponding to the first magnet 130-1 disposed at the housing 140, a fourth coil unit 230-2 corresponding to the second magnet 130-2, and a fifth coil unit 230-3 corresponding to the third magnet 130-3.

For example, the third coil unit 230-1 may be opposite or may overlap the first magnet 130-1 in the optical-axis direction, the fourth coil unit 230-2 may be opposite or may overlap the second magnet 130-2 in the optical-axis direction, and the fifth coil unit 230-3 may be opposite or may overlap the third magnet 130-3 in the optical-axis direction.

Each of the third to fifth coil units 230-1 to 230-3 may have a closed-curve shape having a central hole, such as a ring shape, and the central hole may be formed so as to face the optical-axis direction.

For example, the third coil unit 230-1 and the fourth coil unit 230-2 may be disposed so as to face each other in a direction from the first magnet 130-1 to the second magnet 130-2.

In addition, for example, each of third coil unit 230-1 and the fourth coil unit 230-2 may not overlap the fifth coil unit 230-3 in the direction from the first magnet 130-1 to the second magnet 130-2.

For example, the second coil 230 may further include a quadrangular circuit member 231 at which the third to fifth coil units 230-1 to 230-3 are formed.

Here, the circuit member 231 may be referred to as a "board," and the board 231 may include the second coil 230. In addition, for example, the first coil unit 120-1 may be referred to as a first coil, the second coil unit 120-2 may be referred to as a second coil, and the second coil 230 may be referred to as a third coil. At this time, the board 231 may include the third coil.

For example, the circuit member 231 may include four sides 23a to 23d (see FIG. 11), and may include an opening 231a corresponding to the opening of the housing 140, the opening of the circuit board 250, and/or the opening of the base 210.

Each of the third to fifth coil units 230-1 to 230-3 may be disposed at a corresponding one of three sides of the circuit member 231, and no coil unit may be disposed at the remaining one side of the circuit member 231.

For example, each of the third coil unit 230-1 and the fourth coil unit 230-2 may be disposed parallel to a corresponding one of the first and second opposite sides of the circuit member 231, and the fifth coil unit 230-3 may be disposed parallel to the third side or the fourth side of the circuit member 231.

In order to avoid spatial interference with the supporting members 220-1 to 220-4, holes 230a may be provided in the corners of the circuit member 231, and the supporting members 220-1 to 220-4 may extend through the holes 230a of the circuit member 231. In another embodiment, the circuit member may have recesses provided at the corners thereof instead of the holes in order to avoid spatial interference with the supporting members.

The third to fifth coil units 230-1 to 230-3 may be connected to the circuit board 250. For example, each of the third to fifth coil units 230-1 to 230-3 may be connected to a corresponding one of the terminals of the circuit board 250.

The circuit board 250 may include bonding portions or pads connected to the third to fifth coil units 230-1 to 230-3, and the bonding portions or pads of the circuit board 250 may be connected to the terminals of the circuit board 250.

In FIG. 9, the third to fifth coil units 230-1 to 230-3 may be formed at the circuit member 231, rather than the circuit board 250. However, the disclosure is not limited thereto. In another embodiment, each of the third to fifth coil units 230-1 to 230-3 may be configured in the form of a ring-shaped coil block or an FP coil. In a further embodiment, each of the third to fifth coil units 230-1 to 230-3 may be configured in the form of a circuit pattern formed on the circuit board 250.

The circuit board 250 and the circuit member 231 are separate components, which are referred to individually. However, the disclosure is not limited thereto. In another embodiment, the circuit board 250 and the circuit member 231 may be commonly referred to as a "circuit member." In this case, the other end of each of the supporting members may be coupled to the "circuit member" (e.g. the lower surface of the circuit member).

Referring to FIG. 9B, the lens moving apparatus 100 may further include a second position sensor 240 for OIS feedback driving. The second position sensor 240 may include a first sensor 240a and a second sensor 240b.

Each of the first sensor 240a and the second sensor 240b may be a Hall sensor, and any sensor may be used as long as the sensor is capable of sensing the magnitude of a magnetic field. For example, each of the first sensor 240a and the second sensor 240b may be configured in the form of a driver including a Hall sensor, or may be realized as a position sensor, such as a Hall sensor, alone.

For example, the first sensor 240a and the second sensor 240b may be disposed or mounted at the lower surface of the circuit board 250, seating recesses 215-1 and 215-2 may be provided in the upper surface of the base 210, and the first and second sensors 240a and 240b may be disposed in the seating recesses 215-1 and 215-2 of the base 210. However, the disclosure is not limited thereto. In another embodiment, the first and second sensors may be disposed at the upper surface of the circuit board 250.

The first sensor 240a may be disposed so as to be opposite or to overlap one of the first magnet 130-1 and the second magnet 130-2 in the optical-axis direction.

The second sensor 240b may be disposed so as to be opposite or to overlap the third magnet 130-3 in the optical-axis direction.

The first sensor 240a and the second sensor 240b may be connected to the terminals of the circuit board 250. For example, driving signals may be provided to the first sensor 240a and the second sensor 240b through the terminals of the circuit board 250, and first output of the first sensor 240a and second output of the second sensor 240b may be output through the terminals of the circuit board 250.

The controller 830 of the camera module 200 or the controller 780 of the terminal 200A may sense or detect the displacement of the OIS moving unit using the first output of the first sensor 240a and the second output of the second sensor 240b.

For example, the first sensor 240a and the second sensor 240b may be disposed or mounted at the lower surface of the circuit board 250, and may be disposed in the seating recesses 215-1 and 215-2 of the base 210. However, the disclosure is not limited thereto.

The first sensor 240a and the second sensor 240b may sense the displacement of the OIS moving unit in a direction perpendicular to the optical axis OA.

As the result of interaction between the first magnet 130-1 and the third coil unit 230-1, interaction between the second magnet 130-2 and the fourth coil unit 230-2, and interaction between the third magnet 130-3 and the fifth coil unit 230-3, the OIS moving unit (e.g. the housing 140) may be moved in a direction perpendicular to the optical axis OA, e.g. the X-axis direction and/or the Y-axis direction, whereby hand-shake compensation may be performed.

Next, the cover member 300 will be described.

The cover member 300 may receive the OIS moving unit, the upper elastic member 150, the lower elastic member 160, the second coil 230, the circuit board 250, the supporting member 220, and the second position sensor 240 in a receiving space formed together with the base 210.

The cover member 300 may be formed in the shape of a box, the lower portion of which is open and which includes an upper plate and side plates. The lower portion of the cover member 300 may be coupled to the upper portion of the base 210. The shape of the upper plate of the cover member 300 may be polygonal, for example, quadrangular or octagonal.

The cover member 300 may be provided in the upper plate thereof with an opening, through which the lens (not shown) coupled to the bobbin 110 is exposed to external light. The cover member 300 may be made of a nonmagnetic material, such as SUS in order to prevent a phenomenon in which the magnet 130 attracts the cover member. The cover member 300 may be made of metal. However, the disclosure is not limited thereto. The cover member may be made of plastic. In addition, the cover member 300 may be connected to a ground of a second holder 800 of the camera module 200. The cover member 300 may block electromagnetic interference (EMI).

Figure 10C:
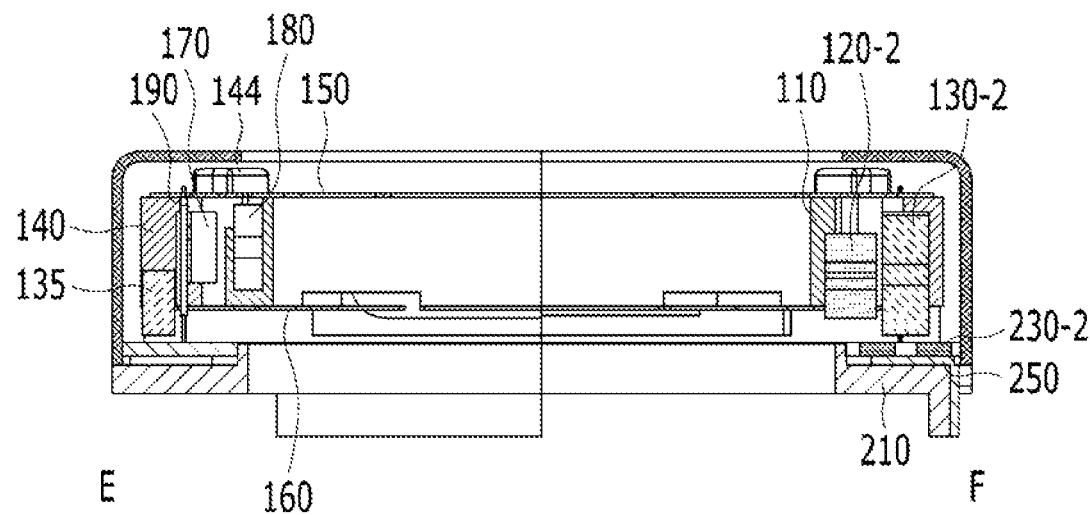
FIG. 10C is a sectional view of the lens moving apparatus in an EF direction of FIG. 3.
Figure 10D:
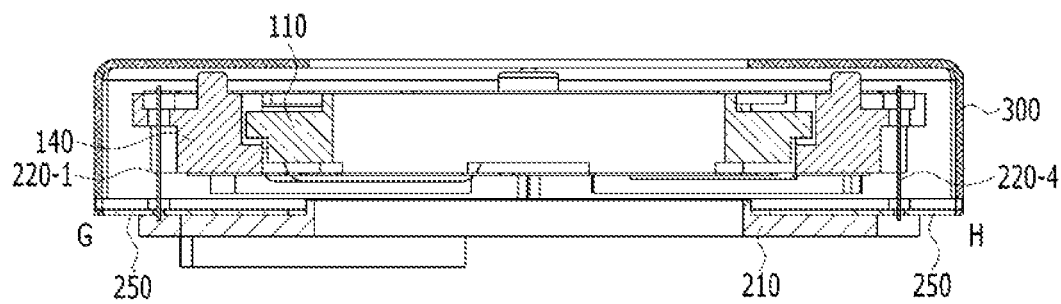
FIG. 10D is a sectional view of the lens moving apparatus in a GH direction of FIG. 3.
Figure 11:
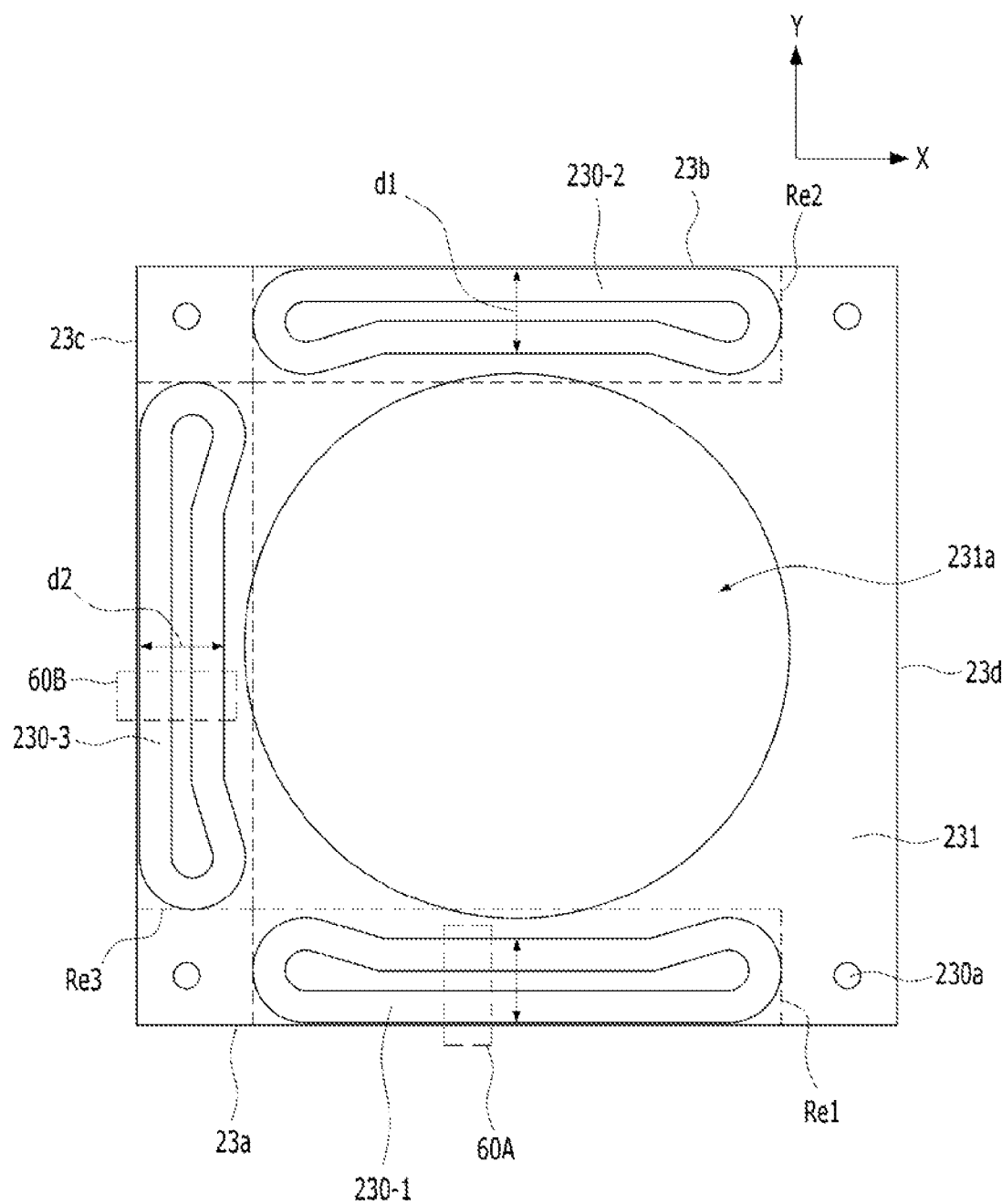
FIG. 11 is a plan view of the second coil of FIG. 9B.
Figure 12:
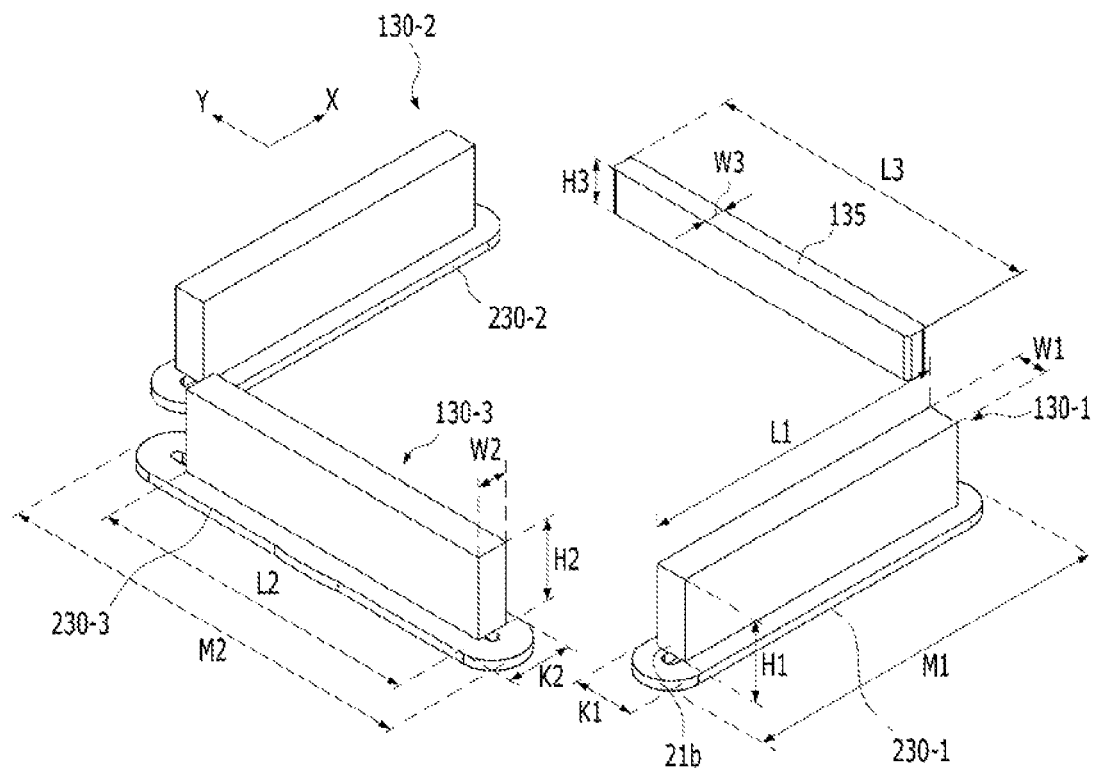
FIG. 12 is a perspective view of the first to third magnets, the dummy member, and third to fifth coil units.
Figure 13:
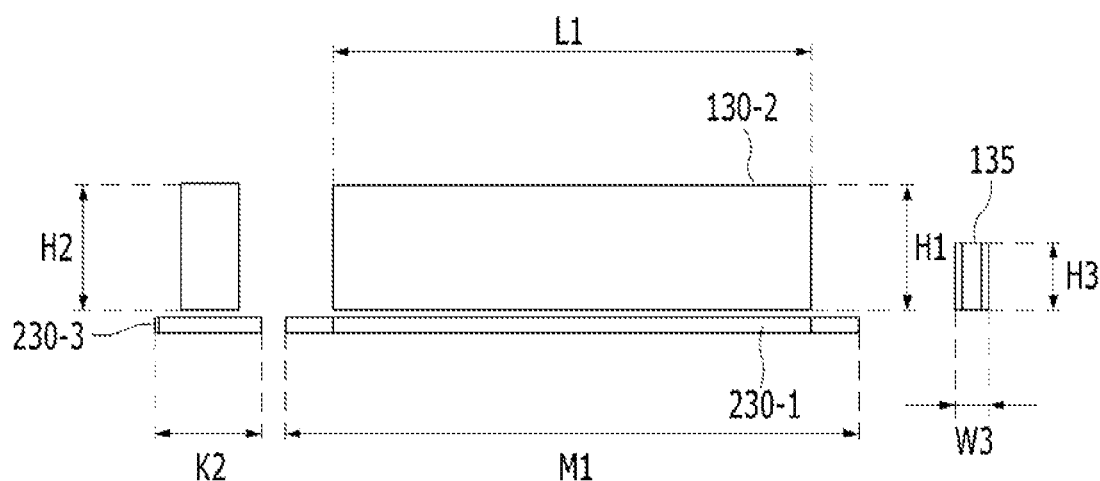
FIG. 13 is a side view of the components shown in FIG. 12.
Figure 14:
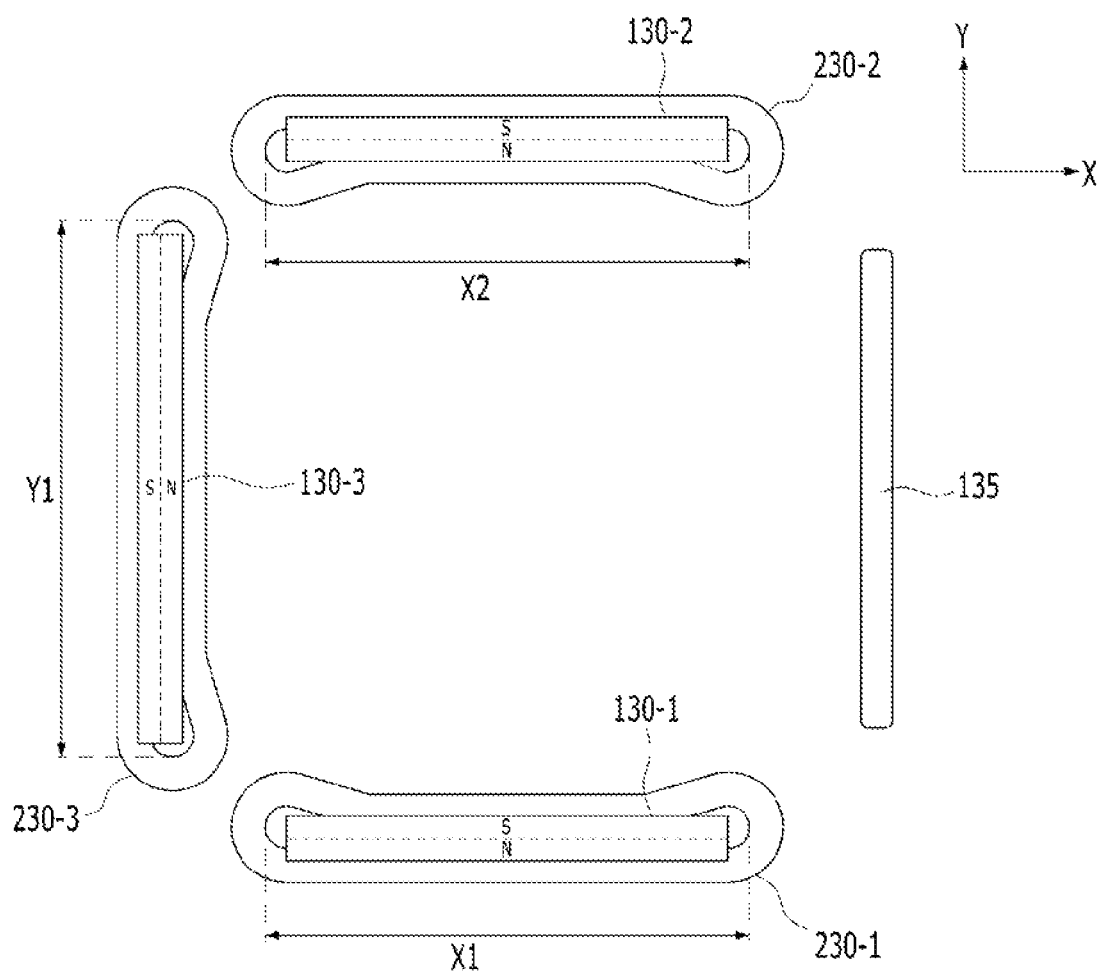
FIG. 14 is a plan view of the components shown in FIG. 12.

FIG. 10A is a sectional view of the lens moving apparatus 100 in an AB direction of FIG. 3, FIG. 10B is a sectional view of the lens moving apparatus 100 in a CD direction of FIG. 3, FIG. 10C is a sectional view of the lens moving apparatus 100 in an EF direction of FIG. 3, FIG. 10D is a sectional view of the lens moving apparatus 100 in a GH direction of FIG. 3, FIG. 11 is a plan view of the second coil 230 of FIG. 9B, FIG. 12 is a perspective view of the first to third magnets 130-1 to 130-3, the dummy member 135, and the third to fifth coil units 230-1 to 230-3, FIG. 13 is a side view of the components 130-1, 130-3, 230-1, 230-3, and 135 shown in FIG. 12, and FIG. 14 is a plan view of the components 130-1, 130-3, 230-1, 230-3, and 135 shown in FIG. 12.

Referring to FIGS. 10A to 14, the first magnet 130-1 and the second magnet 130-2 may have the same length, width, and height. However, the disclosure is not limited thereto. In addition, the third coil unit 230-1 and the fourth coil unit 230-2 may have the same length, width, and height. However, the disclosure is not limited thereto.

Lengths L1, L2, and L3, widths W1, W2, and W3, and heights H1, H2, and H3 of the first magnet 130-1, the second magnet 130-2, and the dummy member 135 will be described with reference to FIGS. 12 and 13. In addition, lengths M1 and M2, widths K1 and K2, and heights (lengths or thicknesses in the optical-axis direction) of the third to fifth coil units 230-1 to 230-3 will also be described.

Here, the lengths L1 and L2 of the first to third magnets 130-1 to 130-3 may be lengths thereof in a longitudinal direction, and the length L3 of the dummy member 135 may be a length of the dummy member 135 in the longitudinal direction. In addition, the widths W1 and W2 of the first to third magnets 130-1 to 130-3 may be lengths thereof in a width direction, and the width W3 of the dummy member 135 may be a length of the dummy member 135 in the width direction.

Here, the width direction may be perpendicular to the longitudinal direction, and may be a direction in which the length of each of the components 130-1 to 130-3 and 135 is smaller. In addition, the width of each of the components 130-1 to 130-3 and 135 may be referred to as a "thickness" of each of the components 130-1 to 130-3 and 135.

For example, the lengths L1 and L2 of the first to third magnets 130-1 to 130-3 may be lengths of the first surfaces of the first to third magnets 130-1 to 130-3 opposite the bobbin 110 in the longitudinal direction. In addition, the length L3 of the dummy member 135 may be a length of the first surface of the dummy member 135 opposite the bobbin 110 in the longitudinal direction.

In addition, for example, the widths W1, W2, and W3 of the first to third magnets 130-1 to 130-3 and the dummy member 135 may be distances from the first surfaces of the components 130-1 to 130-3 and 135 opposite the bobbin 110 to the second surfaces thereof opposite the first surfaces.

In addition, for example, the heights H1, H2, and H3 of the first to third magnets 130-1 to 130-3 and the dummy member 135 may be lengths of the components in the optical-axis direction.

In addition, for example, the heights H1, H2, and H3 may be lengths of the first surfaces of the components 130-1 to 130-3 and 135 opposite the bobbin 110 in a vertical direction. In addition, for example, the heights H1, H2, and H3 may be distances from the lower surfaces to the upper surfaces of the first surfaces of the components 130-1 to 130-3 and 135.

Each of the lengths M1 and M2 of the third to fifth coil units 230-1 to 230-3 may be a length in the longitudinal direction of a corresponding one of the first to third magnets 130-1 to 130-3 or a direction parallel thereto. For example, M1 and M2 may be lengths of the third to fifth coil units 230-1 to 230-3 in the longitudinal direction, and each of M1 and M2 may be a length between outermost ends of each of the third to fifth coil units 230-1 to 230-3.

In addition, each of lengths X1, X2, and Y1 of the third to fifth coil units 230-1 to 230-3 may be a length between outermost ends of the inner portion (or the inner surface) of each of the third to fifth coil units 230-1 to 230-3.

In addition, each of the widths K1 and K2 of the third to fifth coil units 230-1 to 230-3 may be a length in the width direction of a corresponding one of the first to third magnets 130-1 to 130-3 or a direction parallel thereto.

The height of each of the third to fifth coil units 230-1 to 230-3 may be a length in the optical-axis direction, and the heights of the third to fifth coil units 230-1 to 230-3 may be the same. However, the disclosure is not limited thereto. In another embodiment, at least one of the heights of the third to fifth coil units 230-1 to 230-3 may be different from the others.

The length L1 of the first magnet 130-1 may be less than the lengths M1 and X1 of the third coil unit 230-1 (L1<M1, X1). The length W1 of the first magnet 130-1 in the width direction may be less than the length K1 of the third coil unit 230-1 in the width direction (W1<K1).

In addition, the length of the second magnet 130-2 may be less than the lengths M1 and X2 of the fourth coil unit 230-2. The length of the second magnet 130-2 in the width direction may be less than the length of the fourth coil unit 230-2 in the width direction.

The length L2 of the third magnet 130-3 may be less than the lengths M2 and Y1 of the fifth coil unit 230-3 (L2<M2, Y1). The length W2 of the third magnet 130-3 in the width direction may be less than the length K2 of the fifth coil unit 230-3 in the width direction (W2<K2). In another embodiment, W2 and K2 may be equal to each other.

The length M2 of the fifth coil unit 230-3 in the longitudinal direction may be greater than the length M1 of the third coil unit 230-1 in the longitudinal direction and/or the length of the fourth coil unit 230-2 in the longitudinal direction (M2>M1). In addition, the length Y1 of the fifth coil unit 230-3 may be greater than the length X1 of the third coil unit 230-1 and/or the length X2 of the fourth coil unit 230-2 (Y1>X1, X2).

In addition, for example, the length X1 of the third coil unit 230-1 and the length X2 of the fourth coil unit 230-2 may be equal to each other (X1=X2).

The length L2 of the third magnet 130-3 may be greater than the length L1 of the first magnet 130-1 and/or the length of the second magnet 130-2 (L2>L1).

Since M2>M1 and L2>L1, first electromagnetic force generated by the fifth coil unit 230-3 and the third magnet 130-3 may be greater than second electromagnetic force generated by the third coil unit 230-1 and the first magnet 130-1 and may be greater than third electromagnetic force generated by the fourth coil unit 230-2 and the second magnet 130-2. As a result, the embodiment is capable of reducing the difference between the first electromagnetic force in the X-axis direction and the sum of the second and third electromagnetic forces in the Y-axis direction, thereby improving reliability in OIS operation.

In another embodiment, M2=M1 and L2=L1.

For example, L1:L2=1:1 to 1:1.5. In addition, for example, L1:L2=1:1.2 to 1:1.4.

In addition, the length K2 of the fifth coil unit 230-3 in the width direction may be greater than the length K1 of the third coil unit 230-1 in the width direction and/or the length of the fourth coil unit 230-2 in the width direction (K2>K1). However, the disclosure is not limited thereto. In another embodiment, both may be equal to each other.

The length W2 of the first magnet 130-1 in the width direction may be greater than the length W1 of the first magnet 130-1 in the width direction and/or the length of the second magnet 130-2 in the width direction (W2>W1). However, the disclosure is not limited thereto. In another embodiment, W2=W1.

For example, W1 may be a length in a direction perpendicular to the optical axis and one surface of the first magnet 130-1 (or the second magnet 130-2), and W2 may be a length in a direction perpendicular to the optical axis and one surface of the third magnet 130-3.

Since W2>W1, the embodiment is capable of reducing the difference between the first electromagnetic force in the X-axis direction and the sum of the second and third electromagnetic forces in the Y-axis direction, thereby improving reliability in OIS operation.

The height H2 of the third magnet 130-3 may be equal to the height H1 of the first magnet 130-1 and/or the height of the second magnet 130-2 (H2=H1). Here, H1 and H2 may be lengths of the magnets 130-1 to 130-3 in the optical-axis direction. Alternatively, H1 may be the distance from the lower surface to the upper surface of the first magnet 130-1 (or the second magnet 130-2), and H2 may be the distance from the lower surface to the upper surface of the third magnet 130-3.

That is, the length of the third magnet 130-3 in the optical-axis direction may be equal to the length of the first magnet 130-1 in the optical-axis direction and/or the length of the second magnet 130-2 in the optical-axis direction.

In addition, for example, the length of the first magnet 130-1 in the optical-axis direction and the length of the second magnet 130-2 in the optical-axis direction may be equal to each other.

Referring to FIG. 11, each of the third to fifth coil units 230-1 to 230-3 may have a ring shape having a hole open in the optical-axis direction.

The length L3 of the dummy member 135 may be less than the length L2 of the third magnet 130-3 in the longitudinal direction (L3<L2), and the length W3 of the dummy member 135 in the width direction may be less than the length W2 of the third magnet 130-3 in the width direction (W3<W2).

Since W3<W2, the embodiment is capable of securing a sufficient space in which the circuit board 190 and the first position sensor 170 are disposed, thereby preventing spatial interference between the circuit board 190 and the first position sensor 170 and the dummy member 135.

In another embodiment, W3=W2, and L2=L3.

In addition, a first distance between the first magnet 130-1 and the third coil unit 230-1 in the optical-axis direction, a second distance between the second magnet 130-2 and the fourth coil unit 230-2 in the optical-axis direction, and a third distance between the third magnet 130-3 and the fifth coil unit 230-2 in the optical-axis direction may be equal to each other. However, the disclosure is not limited thereto.

In another embodiment, the third distance may be less than the first distance and/or the second distance. Since the third distance is less than the first distance and/or the second distance, it is possible to further reduce the difference between the electromagnetic force generated in the X-axis direction and the electromagnetic force generated in the Y-axis direction, compared to the case in which the first to third distances are equal to each other.

The height H3 of the dummy member 135 may be less than or equal to the height H2 of the third magnet 130-3. However, the disclosure is not limited thereto. In another embodiment, the height H3 of the dummy member 135 may be greater than the height H2 of the third magnet 130-3.

Referring to FIG. 10A, for example, the height of the upper surface of the dummy member 135 disposed at the housing 140 may be less than the height of the upper surface of the position sensor 170 and may be greater than the height of the lower surface of the position sensor 170. Alternatively, the height of the upper surface of the dummy member 135 may be less than or equal to the height of the lower surface of the position sensor 170.

For example, at the initial position of the bobbin 110, the height of the upper surface of the dummy member 135 disposed at the housing 140 may be less than the height of the upper surface of the sensing magnet 180 and may be greater than the height of the lower surface of the sensing magnet 180. Alternatively, at the initial position of the bobbin 110, the height of the upper surface of the dummy member 135 may be less than or equal to the height of the lower surface of the sensing magnet 180.

For example, the height of the upper surface of the dummy member 135 may be less than the height of the upper surface of the third magnet 130-3. However, the disclosure is not limited thereto. In another embodiment, the height of the upper surface of the dummy member 135 may be greater than or equal to the height of the upper surface of the third magnet 130-3.

The height of the lower surface of the dummy member 135 may be less than the height of the lower surface of the third magnet 130-3. However, the disclosure is not limited thereto. In another embodiment, the height of the lower surface of the dummy member 135 may be greater than or equal to the height of the lower surface of the third magnet 130-3.

Referring to FIG. 10C, the height of the upper surface of the dummy member 135 may be less than the height of the upper surface of the second magnet 130-2 (or the first magnet 130-1). However, the disclosure is not limited thereto. In another embodiment, the height of the upper surface of the dummy member 135 may be greater than or equal to the height of the upper surface of the second magnet 130-2 (or the first magnet 130-1).

In addition, the height of the lower surface of the dummy member 135 may be less than the height of the lower surface of the second magnet 130-2 (or the first magnet 130-1). However, the disclosure is not limited thereto. In another embodiment, the height of the lower surface of the dummy member 135 may be greater than or equal to the height of the lower surface of the second magnet 130-2 (or the first magnet 130-1).

Embodiments include three magnets 130-1 to 130-3 and three coil units 230-1 to 230-3 for OIS corresponding thereto in order to reduce magnetic field interference between magnets included in adjacent lens moving apparatuses of a dual or more camera module.

Two 130-1 and 130-2 of the three magnets 130-1 to 130-3 may perform the AF operation based on interaction with the first and second coil units 120-1 and 120-2 and at the same time may perform the OIS operation in the Y-axis direction based on interaction with the third and fourth coil units 230-1 and 230-2.

The other 130-3 of the three magnets 130-1 to 130-3 may perform only the OIS operation in the X-axis direction based on interaction with the fifth coil unit 230-3.

Since the dummy member 135 is disposed opposite the third magnet 130-3, the embodiment is capable of preventing oscillation due to weight eccentricity at the time of the OIS operation.

Each of the first to third magnets 130-1 to 130-3 may be a monopolar magnetized magnet having a single N pole and a single S pole. For example, each of the first and second magnets 130-1 and 130-2 may be disposed such that a first surface thereof opposite the first coil 120 (or the outer surface of the bobbin 110) has an N pole and a second surface thereof opposite the first surface has an S pole. However, the disclosure is not limited thereto. Each magnet may be disposed so as to have reverse poles. The positions of the S poles and the N poles of the first and second magnets 130-1 and 130-2 may be set such that electromagnetic force due to interaction therebetween is generated according to disposition of the first coil 120.

In addition, for example, the third magnet 130-3 may be disposed such that a first surface thereof opposite the outer surface of the bobbin 110 has an N pole and a second surface thereof opposite the first surface has an S pole. However, the disclosure is not limited thereto. The magnet may be disposed so as to have reverse poles.

Alternatively, in another embodiment, each of the third magnets 130-1 to 130-3 may be configured such that the N pole and the S pole are arranged in the optical-axis direction.

Figure 15:
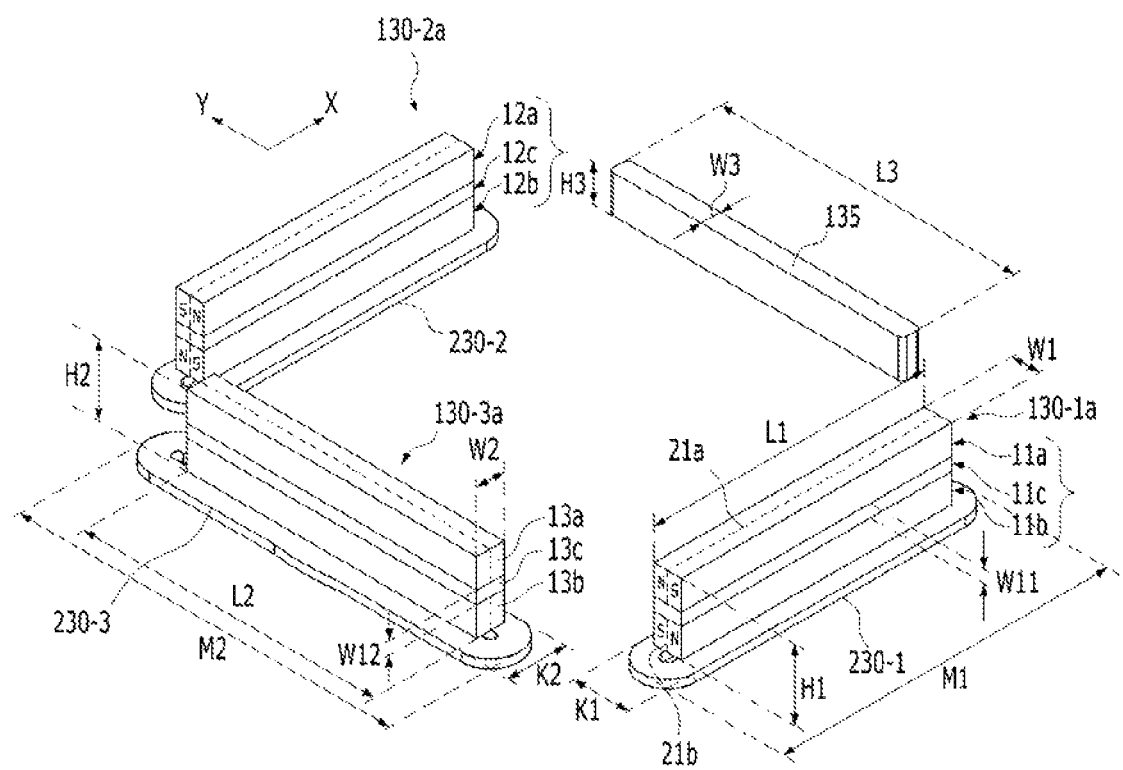
FIG. 15 shows first to third magnets according to another embodiment.

FIG. 15 shows first to third magnets 130-1a, 130-2a, and 130-3a according to another embodiment. Reference numerals of FIG. 15 identical to those of FIG. 12 indicate the same components, and a description of the same components will be briefly given or omitted.

Referring to FIG. 15, the first magnet 130-1a may include a first magnet portion 11a, a second magnet portion 11b, and a first partition 11c disposed between the first magnet portion 11a and the second magnet portion 11b.

The second magnet 130-2a may include a third magnet portion 12a, a fourth magnet portion 12b, and a second partition 12c disposed between the third magnet portion 12a and the fourth magnet portion 12b.

The third magnet 130-3a may include a fifth magnet portion 13a, a sixth magnet portion 13b, and a third partition 13c disposed between the fifth magnet portion 13a and the sixth magnet portion 13b. Here, the first partition 11c may be referred to as a "first nonmagnetic partition," the second partition 12c may be referred to as a "second nonmagnetic partition," and the third partition 13c may be referred to as a "third nonmagnetic partition."

For example, the first magnet portion 11a and the second magnet portion 11b may be spaced apart from each other in the optical-axis direction, the third magnet portion 12a and the fourth magnet portion 12b may be spaced apart from each other in the optical-axis direction, and the fifth magnet portion 13a and the sixth magnet portion 13b may be spaced apart from each other in the optical-axis direction.

The first magnet portion 11a may include an N pole, an S pole, and a first boundary surface 21a between the N pole and the S pole, and the second magnet portion 11b may include an N pole, an S pole, and a second boundary surface 21b between the N pole and the S pole.

In addition, each of the third magnet portion 12a and the fourth magnet portion 12b may include an N pole, an S pole, and a boundary surface between the N pole and the S pole. In addition, each of the fifth magnet portion 13a and the sixth magnet portion 13b may include an N pole, an S pole, and a boundary surface between the N pole and the S pole.

The first boundary surface 21a may be a portion having substantially no magnetism, may include a section having little polarity, and may be a portion that is naturally generated in order to form a magnet consisting of an N pole and an S pole.

The first partition 11c may be a portion that separates or isolates the first magnet portion 11a and the second magnet portion 11b from each other and that has substantially no magnetism, and may be a portion having little polarity. For example, the first partition 11c may be a nonmagnetic material or air. The partition may be referred to as a "neutral zone."

The first partition 11c is a portion that is artificially formed when the first magnet portion 11a and the second magnet portion 11b are magnetized. The width W11 of the first partition 11c may be greater than the width of each of the first boundary surface 21a and the second boundary surface 21b.

Here, the width W11 of the first partition 11c may be the length of the nonmagnetic partition 11c in a direction from the first magnet portion 11a to the second magnet portion 11b. Alternatively, the width W11 of the first partition 11c may be the length of the first partition 11c in the optical-axis direction.

For example, the width W11 of the first partition 11c may be 0.2 mm to 0.5 mm. Alternatively, the width W11 of the first partition 11c may be 0.3 mm to 0.4 mm.

The first magnet portion 11a and the second magnet portion 11b may be disposed such that opposite poles are opposite each other in the optical-axis direction.

For example, the N pole of the first magnet portion 11a and the S pole of the second magnet portion 11b may be disposed so as to be opposite the first coil unit 120-1. However, the disclosure is not limited thereto. Reverse disposition is possible.

A description of the boundary surfaces 21a and 21b of the first and second magnet portions 11a and 11b may be applied to a boundary surface of each of the third to sixth magnet portions 12a, 12b, 13a, and 13b. In addition, a description of the first partition 11c may be applied to the second and third partitions 12c and 13c.

Each of the first to third partitions 11c, 12c, and 13c may extend in a horizontal direction or a direction perpendicular to the optical axis.

The first magnet portion 11a, the first partition 11c, and the second magnet portion 11b may be sequentially disposed in the optical-axis direction. The third magnet portion 12a, the second partition 12c, and the fourth magnet portion 12b may be sequentially disposed in the optical-axis direction. In addition, the fifth magnet portion 13a, the third partition 13c, and the sixth magnet portion 13b may be sequentially disposed in the optical-axis direction.

For example, the first magnet portion 11a may be disposed on the first partition 11c, and the second magnet portion 11b may be disposed under the first partition 11c. In addition, the third magnet portion 12a may be disposed on the second partition 12c, and the fourth magnet portion 12b may be disposed under the second partition 12c. The fifth magnet portion 13a may be disposed on the third partition 13c, and the sixth magnet portion 13b may be disposed under the third partition 13c.

For example, each of the first to third partitions 11c, 12c, and 13c may be parallel to a straight line perpendicular to the optical axis, and the boundary surface 21a or 21b of each of the first to sixth magnet portions 11a, 11b, 12a, 12b, 13a, and 13b may be parallel to the optical axis.

For example, in each of the first to third magnets 130-1 to 130-3, an N pole and an S pole in the form of bipolar magnetization may be disposed in the optical-axis direction.

The first magnet 130-1a may be located inside a region of the third coil unit 230-1, and may overlap the third coil unit 230-1 in the optical-axis direction.

The second magnet 130-2a may be located inside a region of the fourth coil unit 230-2, and may overlap the fourth coil unit 230-2 in the optical-axis direction.

The third magnet 130-3a may be located inside a region of the fifth coil unit 230-3, and may overlap the fifth coil unit 230-3 in the optical-axis direction.

A portion of the third coil unit 230-1 may simultaneously overlap a first polar portion of the first magnet portion 11a, the first partition 11c, and a second polar portion of the second magnet portion 11b in the optical-axis direction.

Here, the first polar portion may be an N pole or an S pole, and the second polar portion may be a polar portion having polarity opposite the polarity of the first polar portion.

A portion of the fourth coil unit 230-2 may simultaneously overlap a first polar portion of the third magnet portion 12a, the second partition 12c, and a second polar portion of the fourth magnet portion 12b in the optical-axis direction.

A portion of the fifth coil unit 230-3 may simultaneously overlap a first polar portion of the fifth magnet portion 13a, the third partition 13c, and a second polar portion of the sixth magnet portion 13b in the optical-axis direction.

In another embodiment, each of the first and second magnets may be the monopolar magnetized magnet of FIG. 12, and the third magnet may be the bipolar magnetized magnet of FIG. 15.

Figure 16A:
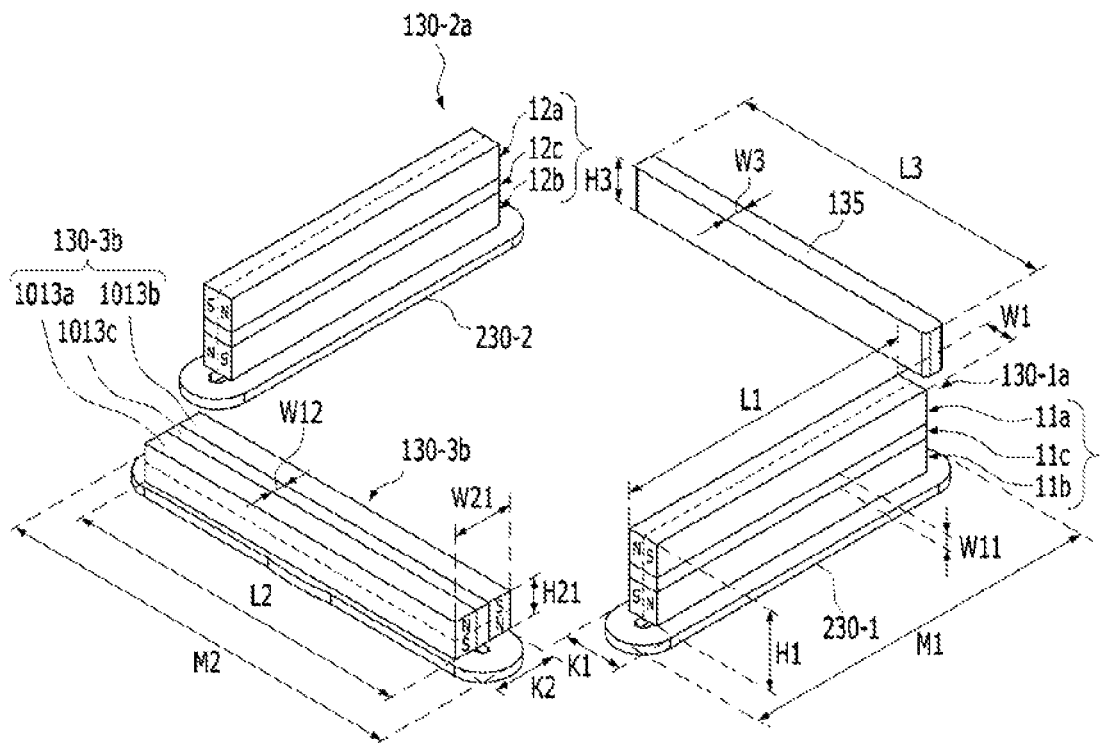
FIG. 16A shows first to third magnets according to a further embodiment.
Figure 16B:
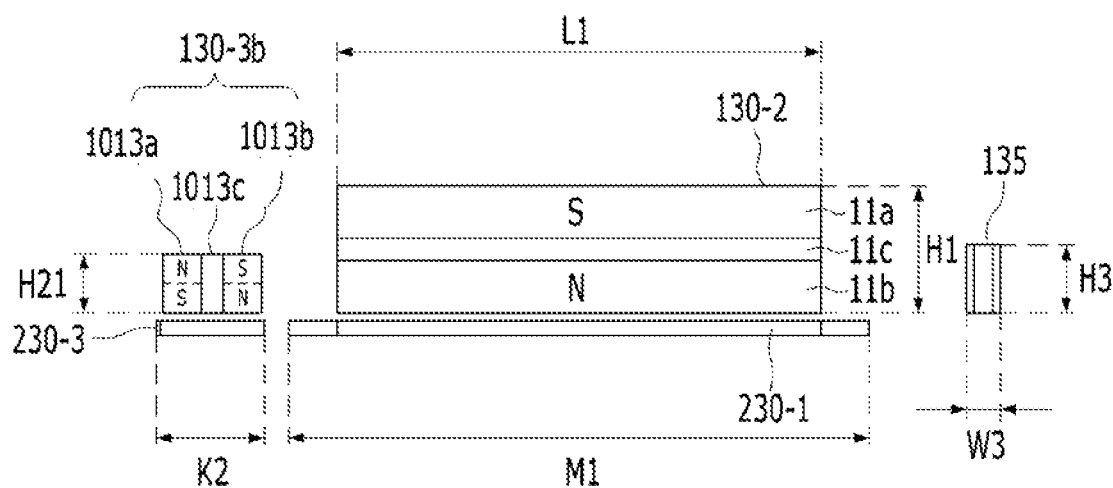
FIG. 16B is a side view of the components shown in FIG. 16A.
Figure 16C:
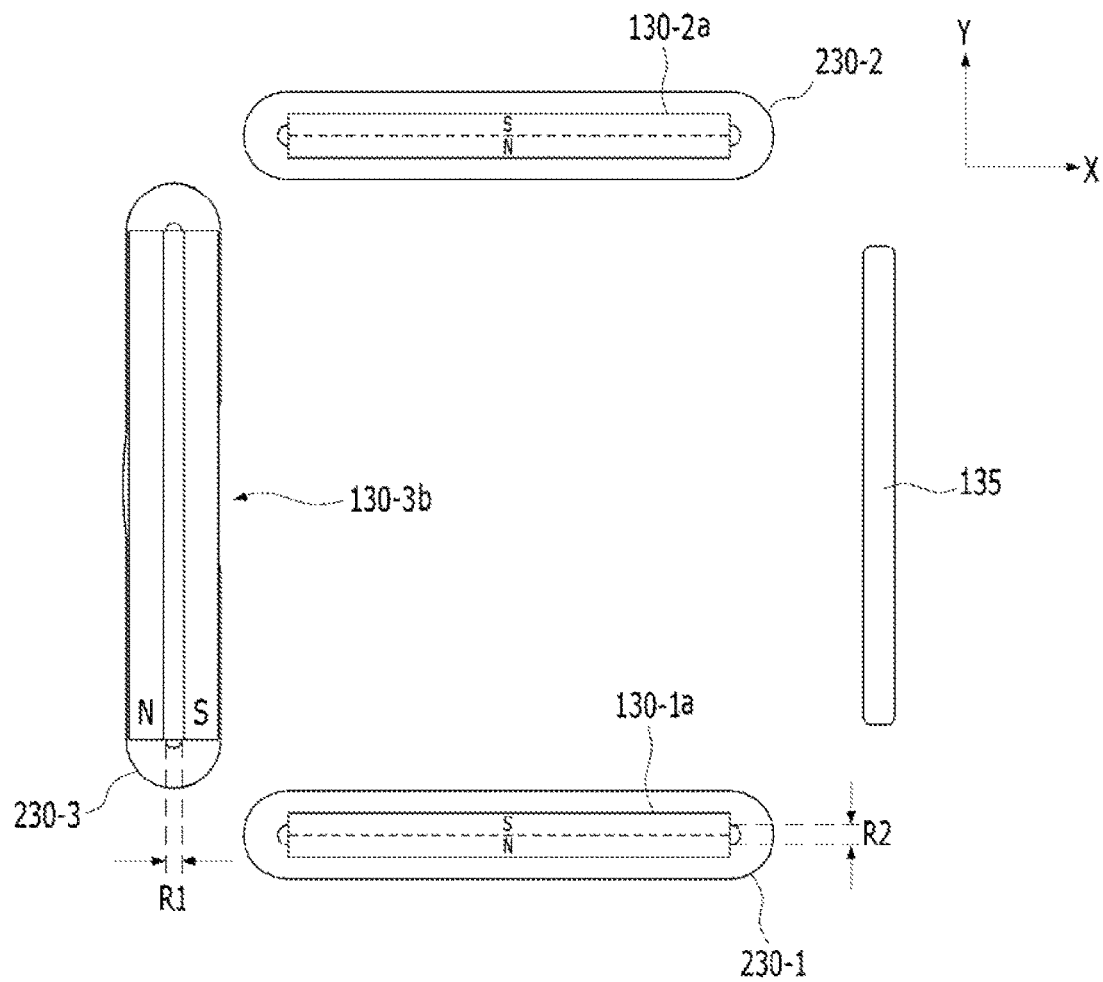
FIG. 16C is a plan view of the first to third magnets of FIG. 16A and the third to fifth coil units.
Figure 16D:
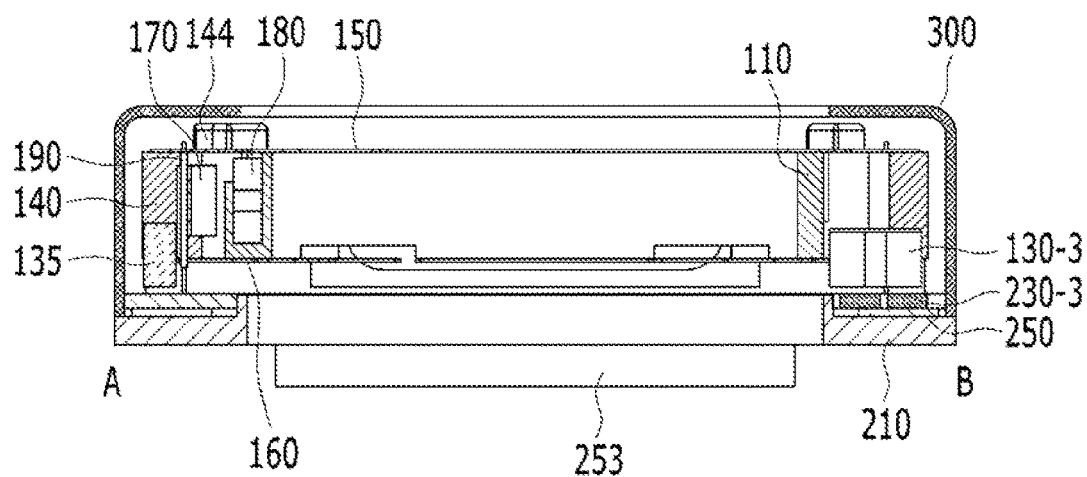
FIG. 16D is a sectional view of a lens moving apparatus including the third magnet of FIG. 16A in the CD direction.
Figure 16E:
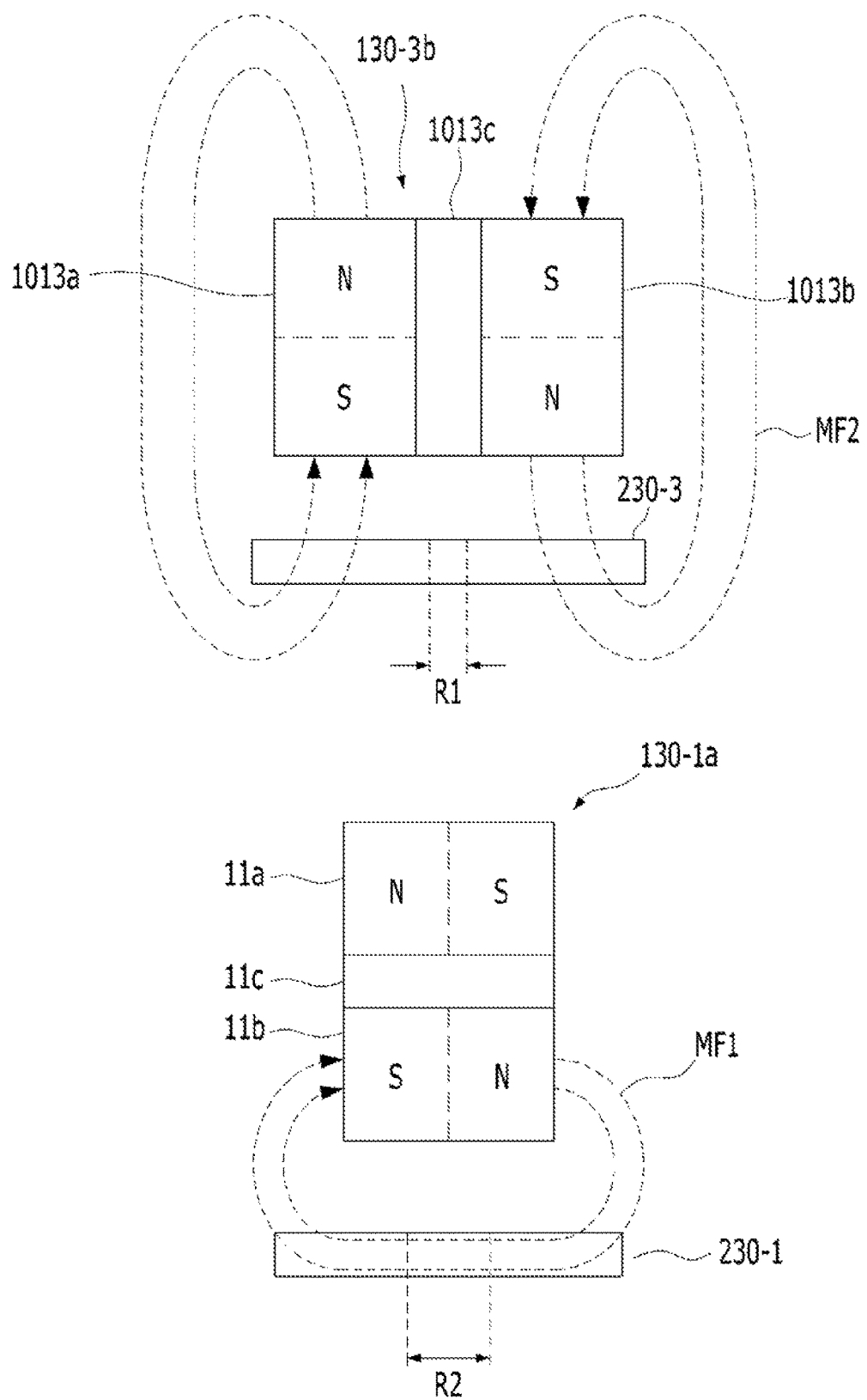
FIG. 16E shows a line of magnetic force of the third magnet of FIG. 16A with respect to the fifth coil unit and a line of magnetic force of the first magnet with respect to the third coil unit.

FIG. 16A shows first to third magnets 130-1a, 130-2a, and 130-3b according to a further embodiment, FIG. 16B is a side view of the components shown in FIG. 16A, FIG. 16C is a plan view of the first to third magnets 130-1a, 130-2a, and 130-3b of FIG. 16A and the third to fifth coil units 230-1 to 230-3, FIG. 16D is a sectional view of a lens moving apparatus including the third magnet 130-3b of FIG. 16A in the CD direction, and FIG. 16E shows a line of magnetic force of the third magnet 130-3b of FIG. 16A with respect to the fifth coil unit 230-3 and a line of magnetic force of the first magnet 130-1a with respect to the third coil unit 230-1.

Reference numerals of FIG. 16A identical to those of FIG. 15 indicate the components, and a description of the same components will be briefly given or omitted.

Referring to FIGS. 16A to 16E, the third magnet 130-3b may include a fifth magnet portion 1013a, a sixth magnet portion 1013b, and a third partition 1013c disposed between the fifth magnet portion 1013a and the sixth magnet portion 1013b.

Definition of the boundary surfaces 21a and 21b may be applied to a boundary surface 22a of the fifth magnet portion 1013a and a boundary surface 22b of the sixth magnet portion 1013b. The third partition 1013c is a portion that is artificially formed when the fifth magnet portion 1013a and the sixth magnet portion 1013b are magnetized. The width W12 of the third partition 1013c may be greater than the width of each of the boundary surfaces 22a and 22b. Here, the width W12 of the third partition 1013c may be the length of the third partition 1013c in a direction from the fifth magnet portion 1013a to the sixth magnet portion 1013b.

For example, the width W12 of the third partition 1013c may be 0.2 mm to 0.5 mm. Alternatively, the width W12 of the third partition 1013c may be 0.3 mm to 0.4 mm.

The fifth magnet portion 1013a and the sixth magnet portion 1013b may be disposed such that opposite poles are opposite each other in a direction that is perpendicular to the optical axis OA and faces the third magnet 130-3b from the optical axis OA.

For example, an N pole and an S pole of the sixth magnet portion 1013b may be disposed so as to be opposite the outer surface of the bobbin 110 corresponding to the third side portion 141-3 of the housing 140. However, the disclosure is not limited thereto. Reverse disposition is possible.

The third partition 1013c may extend in the optical-axis direction or the vertical direction.

The fifth magnet portion 1013a, the third partition 1013c, and the sixth magnet portion 1013b may be sequentially disposed in a direction that is perpendicular to the optical axis OA and in a direction from the third magnet 130-3b to the optical axis OA.

For example, the fifth magnet portion 1013a may be disposed on the left (or the right) of the third partition 1013c, and the sixth magnet portion 1013b may be disposed on the right (or the left) of the third partition 1013c.

For example, the third partition 1013c may be parallel to the optical axis, and the boundary surfaces 22a and 22b of the fifth and sixth magnet portions 1013a and 1013b may be parallel to a direction that is perpendicular to the optical axis.

A separation or isolation direction of the third partition 1013c may be perpendicular to a separation or isolation direction of each of the first and second partitions 1011c and 1012c.

The length W21 of the third magnet 130-3b in the width direction may be greater than the length W1 of the first magnet 130-1a in the width direction and/or the length of the second magnet 130-2 in the width direction (W21>W1). Since W21>W1, the embodiment is capable of reducing the difference between the first electromagnetic force in the X-axis direction and the sum of the second and third electromagnetic forces in the Y-axis direction, thereby improving reliability in OIS operation.

The height H21 of the third magnet 130-3b may be less than the height H1 of the first magnet 130-1a and/or the height of the second magnet 130-2a (H21<H1).

That is, the length of the third magnet 130-3b in the optical-axis direction may be less than the length of the first magnet 130-1a in the optical-axis direction and/or the length of the second magnet 130-2a in the optical-axis direction.

According to the direction of the line of magnetic force of the third magnet 130-3b shown in FIG. 16E, magnetic flux provided from the third magnet 130-3b to the fifth coil unit 230-3 is not greatly reduced even though the height H21 of the third magnet 130-3b is reduced (e.g. H21<H1). As a result, the decrement of electromagnetic force generated by the third magnet 130-3b and the fifth coil unit 230-3 is too small to affect the OIS operation.

Since H21<H1, the embodiment is capable of reducing the weight of the lens moving apparatus, thereby reducing power consumption for AF driving and/or OIS driving. In another embodiment, H21=H1.

In addition, for example, the height of the upper surface of the third magnet 130-3b may be greater than or equal to the height of a boundary line between the second magnet portion 11b and the first partition 11c of the first magnet 130-1a, and may be less than or equal to the height of the upper surface of the first magnet portion 11a.

In addition, for example, H21:H1=0.3:1 to 1:1. In the case in which H21/H1 is less than 0.3, the first electromagnetic force generated by the fifth coil unit 230-3 and the third magnet 130-3b may be excessively reduced, whereby the difference between the electromagnetic force in the X-axis direction and the electromagnetic force in the Y-axis direction may be increased, and therefore reliability in OIS driving may be deteriorated.

In the case in which H21/H1 is greater than 1, the first electromagnetic force in the X-axis direction may be increased, whereby the difference between the electromagnetic force in the X-axis direction and the electromagnetic force in the Y-axis direction may be increased, and therefore reliability in OIS driving may be deteriorated.

Alternatively, for example, H21:H1=0.5:1 to 0.8:1.

Referring to FIG. 16C, each of the third to fifth coil units 230-1 to 230-3 may have a ring shape having a hole open in the optical-axis direction.

The length R1 of the hole of the fifth coil unit 230-3 in a direction perpendicular to the longitudinal direction of the fifth coil unit 230-3 may be less than the length R2 of the hole of the third coil unit 230-1 in a direction perpendicular to the longitudinal direction of the third coil unit 230-1 (R1<R2). In addition, R1 may be less than the length of the hole of the fourth coil unit 230-2 in a direction perpendicular to the longitudinal direction of the fourth coil unit 230-2.

Since the first magnet 130-1a and the third magnet 130-3b are different in magnetization direction from each other, both have different distributions in the line of the magnetic force. In the case in which setting is performed such that R2>R1 in consideration of different distributions in the line of the magnetic force, it is possible to increase the electromagnetic force between the first magnet 130-1a and the third coil unit 230-1, the electromagnetic force between the second magnet 130-2a and the fourth coil unit 230-2, and the electromagnetic force between the third magnet 130-3b and the fifth coil unit 230-3.

In addition, the number of windings of a coil at the fifth coil unit 230-3 (hereinafter referred to as a "first number of windings") may be greater than the number of windings of a coil at the third coil unit 230-1 (hereinafter referred to as a "second number of windings") and/or the number of windings of a coil at the fourth coil unit 230-2 (hereinafter referred to as a "third number of windings"), whereby the difference between the electromagnetic force in the X-axis direction and the electromagnetic force in the Y-axis direction may be reduced.

In addition, for example, the second number of windings and the third number of windings may be equal to each other. However, the disclosure is not limited thereto. In another embodiment, the first number of windings and the second number of windings (or the third number of windings) may be equal to each other.

Referring to FIG. 16D, the height of the upper surface of the dummy member 135 may be greater than or equal to the height of the upper surface of the third magnet 130-3b. However, the disclosure is not limited thereto. In another embodiment, the height of the upper surface of the dummy member 135 may be less than the height of the upper surface of the third magnet 130-3b.

The height of the lower surface of the dummy member 135 may be less than the height of the lower surface of the third magnet 130-3b. However, the disclosure is not limited thereto. In another embodiment, the height of the lower surface of the dummy member 135 may be greater than the height of the lower surface of the third magnet 130-3b.

In addition, the height of the upper surface of the dummy member 135 may be less than the height of the upper surface of the second magnet 130-2a (or the first magnet 130-1a), and may be greater than the height of the lower surface of the second magnet 130-2a (or the first magnet 130-1a).

In addition, the height of the lower surface of the dummy member 135 may be less than the height of the lower surface of the second magnet 130-2a (or the first magnet 130-1a). However, the disclosure is not limited thereto. In another embodiment, the height of the lower surface of the dummy member 135 may be greater than the height of the lower surface of the second magnet 130-2a (or the first magnet 130-1a).

Embodiments include three magnets 130-1a, 130-2a, and 130-3b and three coil units 230-1 to 230-3 for OIS corresponding thereto in order to reduce magnetic field interference between magnets included in adjacent lens moving apparatuses of a dual or more camera module.

Each of the first and second magnets 130-1a and 130-2a may have a magnetization direction in which the two magnet portions 11a and 11b or 12a and 12b are disposed above and below the partition 11c or 12c. In addition, the first and second parts 3a and 3b of each of the first and second coil units 120-1 and 120-2 may be disposed so as to be opposite the two magnet portions 11a and 11b or 12a and 12b. In this disposition, it is possible to increase the electromagnetic force between the first magnet 130-1a and the first coil unit 120-1 and the electromagnetic force between the second magnet 130-2a and the second coil unit 120-2, thereby reducing current consumption.

In general, electromagnetic force in the X-axis direction by interaction between one magnet and one coil unit is less than electromagnetic force in the Y-axis direction by interaction between two magnets and two coil units. The difference between the electromagnetic force in the X-axis direction and the electromagnetic force in the Y-axis direction may cause malfunction in OIS driving.

Embodiments may be configured as follows in order to reduce the difference between the electromagnetic force in the X-axis direction and the electromagnetic force in the Y-axis direction.

The magnetization direction of the two magnet portions 1013a and 1013b of the third magnet 130-3b is formed so as to be perpendicular to the magnetization direction of the two magnet portions 11a and 11b or 12a and 12b of each of the first and second magnets 130-1a and 130-2a.

For example, the third magnet 130-3b may be disposed on the fifth coil unit 230-3 such that the third partition 1013c, which separates the two magnet portions 1013a and 1013b of the third magnet 130-3b from each other, is perpendicular to the fifth coil unit 230-3.

For example, the third magnet 130-3b may be disposed such that the third partition 1013c is parallel to the optical-axis direction.

Alternatively, for example, the third magnet 130-3b may be disposed such that the N pole of one of the two magnet portions 1013a and 1013b of the third magnet 130-3b and the S pole of the other are opposite the fifth coil unit 230-3 in the optical-axis direction.

On the other hand, the first magnet 130-1a may be disposed on the third coil unit 230-1 such that the first partition 11c is parallel to the third coil unit 230-1, and the second magnet 130-2a may be disposed on the fourth coil unit 230-2 such that the second partition 12c is parallel to the fourth coil unit 230-2.

In addition, for example, the first and second magnets 130-1a and 130-2a may be disposed such that the first partition 11c and the second partition 12c are parallel to the optical-axis direction.

Alternatively, for example, both the N pole and the S pole of one of the two magnet portions 11a and 11b of the first magnet 130-1a may be opposite the third coil unit 230-1 in the optical-axis direction, and both the N pole and the S pole of one of the two magnet portions 12a and 12b of the second magnet 130-2a may be opposite the fourth coil unit 230-2 in the optical-axis direction.

In addition, the length L2 of the third magnet 130-3b may be greater than the length L1 of the first magnet 130-1a and/or the length of the second magnet 130-2a, and the length M2 of the fifth coil unit 230-3 in the longitudinal direction may be greater than the length M1 of the third coil unit 230-1 and/or the length of the fourth coil unit 230-2. As a result, it is possible to reduce the difference between the electromagnetic force in the X-axis direction and the electromagnetic force in the Y-axis direction.

Referring to FIG. 16D, the line of magnetic force of the third magnet 130-3b with respect to the fifth coil unit 230-3 is different in direction from the line of magnetic force of the first magnet 130-1a with respect to the third coil unit 230-1.

Since the disposition of the second magnet 130-2a is identical or similar to the disposition of the first magnet 130-1a, the line of magnetic force of the second magnet 130-2a with respect to the fourth coil unit 230-2 may be identical or similar to the line of magnetic force of the first magnet 130-1a with respect to the third coil unit 230-1.

First electromagnetic force generated by the line of magnetic force MF2 of the fifth coil unit 230-3 and the third magnet 130-3b may be greater than second electromagnetic force generated by the line of magnetic force MF1 of the third coil unit 230-1 and the first magnet 130-1a.

In addition, the first electromagnetic force generated by the line of magnetic force MF2 of the fifth coil unit 230-3 and the third magnet 130-3b may be greater than third electromagnetic force generated by the line of magnetic force MF1 of the fourth coil unit 230-2 and the second magnet 130-2a.

Since the first electromagnetic force is greater than each of the second electromagnetic force and the third electromagnetic force, a design may be made such that the sum of the second electromagnetic force and the third electromagnetic force is almost equal to the first electromagnetic force. Therefore, the embodiment is capable of reducing the difference between the electromagnetic force in the X-axis direction and the electromagnetic force in the Y-axis direction at the time of OIS driving.

Figures 16F, 17A:
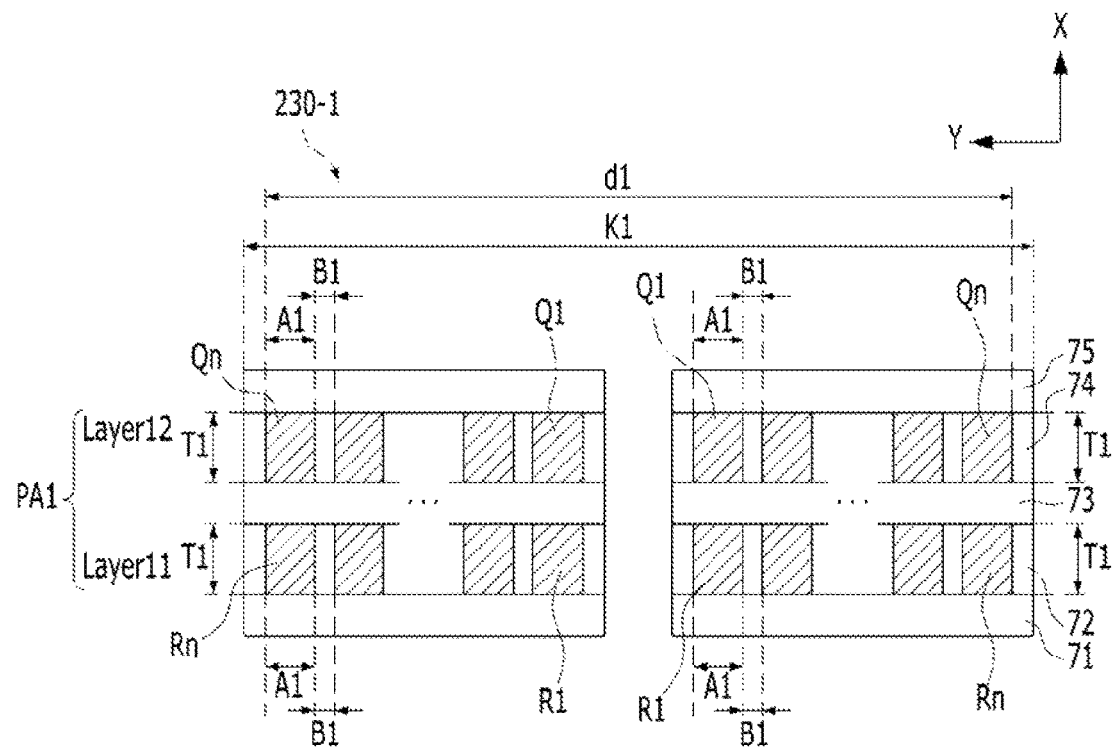
FIG. 16F shows simulation results of electromagnetic force in a Y-axis direction due to interaction between the first and second magnets and the third and fourth coil units shown in FIG. 16A and electromagnetic force in an X-axis direction due to interaction between the third magnet and the fifth coil unit.
FIG. 17A is a sectional view of a first dotted-line part of the third coil unit of FIG. 11.

FIG. 16F shows simulation results of electromagnetic force Fy in the Y-axis direction due to interaction between the first and second magnets 130-1a and 130-2a and the third and fourth coil units 230-1 and 230-2 shown in FIG. 16A and electromagnetic force Fx in the X-axis direction due to interaction between the third magnet 130-3b and the fifth coil unit 230-3. FIG. 16F also shows linearity in the X-axis direction and linearity in the Y-axis direction.

In FIG. 16F, the resistance of each of the third to fifth coil units 230-1 to 230-3 may be 6 ohm [Ω] to 8 ohm. Each of the first to third magnets 130-1a to 130-3b may be an N45H or N45SH magnet to an N50H or N50SH magnet. In the simulation of FIG. 16F, each of the first to third magnets 130-1a to 130-3b is an N48H magnet.

Referring to FIG. 16F, the ratio of Fx to Fy (Fx/Fy) is 0.88 to 1. That is, it can be seen that a deviation between Fx and Fy is less than 12%. Based on the simulation results, the embodiment is capable of reducing the difference between the electromagnetic force in the X-axis direction and the electromagnetic force in the Y-axis direction at the time of OIS driving, thereby securing reliability in OIS driving.

In addition, when each of a stroke in the X-axis direction and a stroke in the Y-axis direction has a range of −150 μm to 150 μm, each of linearity in the X-axis direction and linearity in the Y-axis direction is 10 nm or less, which is satisfactory. The linearity in the X-axis direction may mean a deviation between a trend line of the stroke in the X-axis direction and the stroke in the X-axis direction. The linearity in the Y-axis direction may mean a deviation between a trend line of the stroke in the Y-axis direction and the stroke in the Y-axis direction. In the simulation, the trend line of the stroke in the X-axis direction is y=0.0015x+0.003, and the trend line of the stroke in the Y-axis direction is y=0.0018x−7E−0.6. It is assumed that the stiffness of each of the upper elastic member 150 and the lower elastic member 160 is 70 mN/mm and the weight of a lens mounted in the bobbin 110 is 150 mg.

Meanwhile, the lens moving apparatus 100 according to the above embodiment may further include a lens and/or a lens barrel mounted in the bobbin 110. In addition, the lens moving apparatus 100 according to the embodiment may further include an image sensor. In addition, the lens moving apparatus 100 may further include a circuit board on which the image sensor is mounted. In addition, the lens moving apparatus 100 may further include a filter configured to filter light passing through the lens and to provide the filtered light to the image sensor. In addition, the lens moving apparatus 100 may further include a motion sensor or a controller.

Figure 17B:
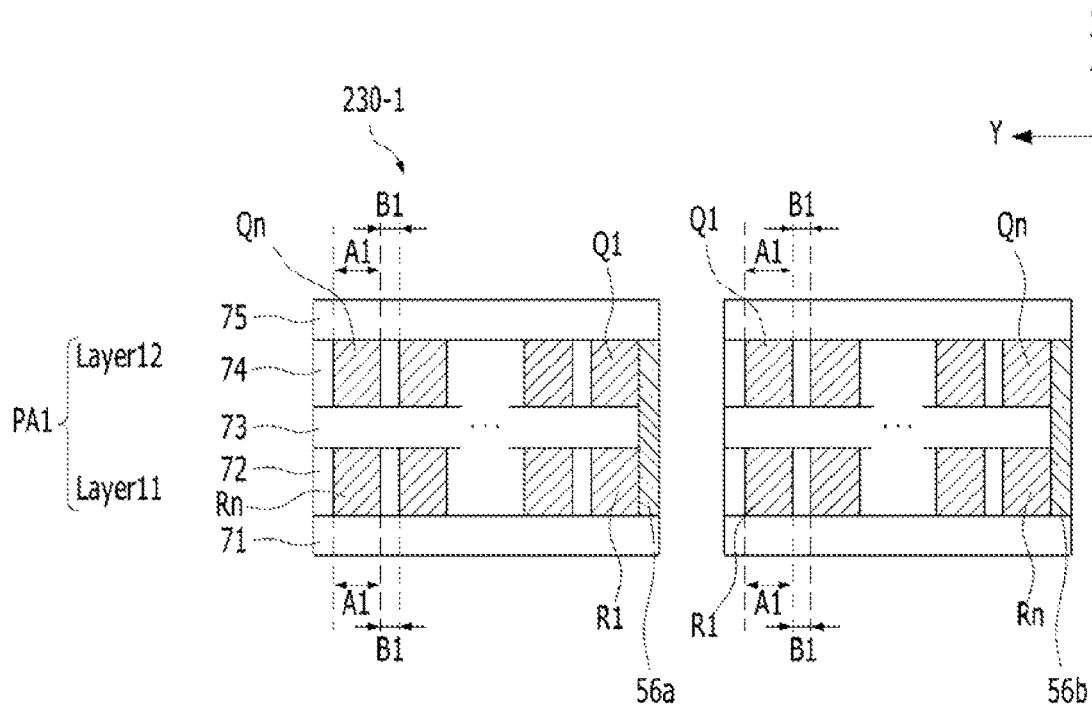
FIG. 17B shows first and second vias of the third coil unit.
Figure 18A:
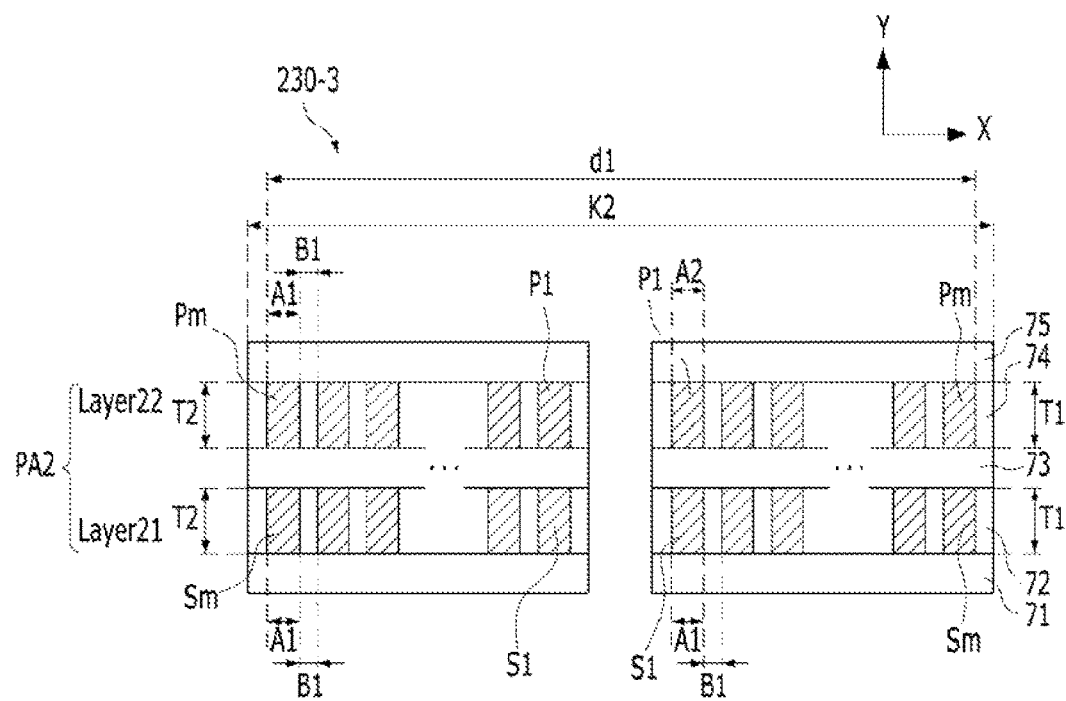
FIG. 18A is a sectional view of a second dotted-line part of the fifth coil unit of FIG. 11.
Figure 18B:
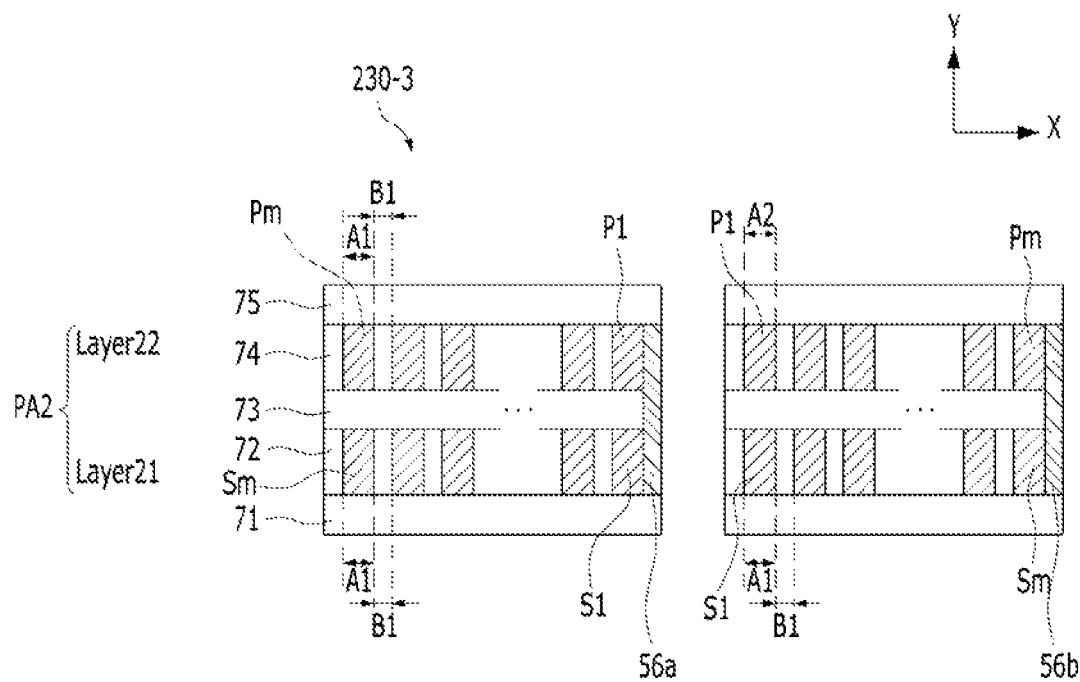
FIG. 18B shows first and second vias of the fifth coil unit.

FIG. 17A is a sectional view of a first dotted-line part 60A of the third coil unit 230-1 of FIG. 11, FIG. 17B shows first and second vias 55a and 55b of the third coil unit 230-1, FIG. 18A is a sectional view of a second dotted-line part 60B of the fifth coil unit 230-3 of FIG. 11, and FIG. 18B shows first and second vias 56a and 56b of the fifth coil unit 230-3. A description of the third coil unit 230-1 of FIG. 17 may be applied to the structure and shape of the fourth coil unit 230-2.

Referring to FIGS. 11 and 17A to 18B, the second coil 230 may be formed on the board 231, and the board 231 may include a first side 23a and a second side 23b opposite each other, a third side 23c and a fourth side 23d opposite each other, and an opening 231a.

The third coil unit 230-1 may be disposed in a first region Re1 located between the first side 23a of the circuit member 231 and the opening 231a of the circuit member 231, and may have a first number of turns (or a first number of windings).

The fourth coil unit 230-2 may be disposed in a second region Re2 located between the second side 23b of the circuit member 231 and the opening 231a of the circuit member 231, and may have a second number of turns (or a second number of windings).

The fifth coil unit 230-3 may be disposed in a third region Re3 located between the third side 23b of the circuit member 231 and the opening 231a of the circuit member 231, and may have a third number of turns (or a third number of windings). Here, each of the first to fourth sides 23a to 23d of the circuit member 231 may correspond to one of the first to fourth side portions 141-1 to 14104 of the housing 140.

Referring to FIG. 17A, the third coil unit 230-1 may include a first line having a plurality of turns.

The third coil unit 230-1 may have a first pattern PA1 having a continuous spiral, oval, and/or track shape.

The fourth coil unit 230-2 may have the same shape as the third coil unit 230-1. That is, the fourth coil unit 230-2 may include a second line having a plurality of turns.

For example, the fourth coil unit 230-2 may have a second pattern having a continuous spiral and/or track shape. For example, the second pattern may be identical to the first pattern PA1.

Referring to FIG. 18A, the fifth coil unit 230-3 may include a third line having a plurality of turns.

For example, the fifth coil unit 230-3 may have a third pattern PA2 having a continuous spiral and/or track shape.

The first pattern PA1 may be formed in the first region Re1 of the board 231, the second pattern may be formed in the second region Re2 of the board 231, and the third pattern PA2 may be formed in the third region Re3 of the board 231.

For example, each of the first to third patterns PA1 and PA2 may be made of a conductor. For example, each of the first to third patterns PA1 and PA2 may be made of a conductive metal, such as copper, gold, aluminum, silver, or an alloy including at least one thereof.

The width A2 of the third line of the fifth coil unit 230-3 is less than the width A1 of the first line of the third coil unit 230-1 and the width A1 of the second line of the fourth coil unit 230-2.

For example, the width A2 (or the line width) of the third pattern PA2 of the fifth coil unit 230-3 is less than the width A1 (or the line width) of the first pattern PA1 of the third coil unit 230-1 and the width A1 (or the line width) of the second pattern of the fourth coil unit 230-2 (A2<A1).

Here, the width of each of the first to third patterns PA1 and PA2 may be a length of each of the first to third patterns PA1 and PA2 in the width direction perpendicular to the longitudinal direction thereof.

The width of the first line of the third coil unit 230-1 and the width of the second line of the fourth coil unit 230-2 may be equal to each other. For example, the width A1 of the first pattern PA1 of the third coil unit 230-1 and the width of the second pattern of the fourth coil unit 230-2 may be equal to each other.

The ratio of A2 to A1 (A2:A1) may be 1:1.2 to 1:2.

In the case in which the value obtained by dividing A1 by A2 (A1/A2) is less than 1.2, the difference between the number of turns of the fifth coil unit 230-3 and the number of turns of the third coil unit 230-1 (or the fourth coil unit 230-2) is reduced, whereby it is not possible to reduce the difference between the electromagnetic force in the Y-axis direction due to interaction between the first and second magnets 130-1 and 130-2 and the third and fourth coil units 230-1 and 230-2 and the electromagnetic force in the X-axis direction due to interaction between the third magnet 130-3 and the fifth coil unit 230-3, and therefore reliability in OIS driving may be deteriorated.

In the case in which the value obtained by dividing A1 by A2 (A1/A2) is greater than 2, resistance of the fifth coil unit 230-3 may be increased, whereby power consumption may be increased, or the magnitude of a driving signal of the fifth coil unit 230-3 may be increased.

For example, the ratio of A2 to A1 (A2:A1) may be 1:1.25 to 1:1.5.

For example, the width A1 of each of the first and second patterns PA1 may be 24 μm to 30 μm, and the width A2 of the third pattern PA2 may be 15 μm to 20 μm.

The height (or the thickness) of the third coil unit 230-1 and the height (or the thickness) of the fourth coil unit 230-2 may be equal to each other. For example, the height of the first pattern PA1 and the height T1 of the second pattern may be equal to each other.

In addition, the height T2 (or the thickness) of the third pattern PA2 may be equal to the height T1 (or the thickness) of each of the first and second patterns PA1 (T2=T1). For example, T2=T1=45 μm to 50 μm. Here, T1 may be the length of each of the first and second patterns PA1 in the optical-axis direction, and T2 may be length of the third pattern PA2 in the optical-axis direction.

The width of each of the lines of the third to fifth coil units 230-1 to 230-3 may be less than the height (or the thickness) of each of the third to fifth coil units 230-1 to 230-3.

The widths A1 and A2 of the first to third patterns PA1 and PA2 may be less than the heights T1 and T2 (or the thicknesses) of the first to third patterns PA1 and PA2 (A1, A2<T1, T2)

FIGS. 17 and 18 illustrate that each of the third to fifth coil units 230-1 to 230-3 has a dual layer structure. However, the disclosure is not limited thereto. In another embodiment, each of the third to fifth coil units 230-1 to 230-3 may have a single layer structure or a triple or more layer structure.

For example, each of the first pattern PA1 of the third coil unit 230-1 and the second pattern of the fourth coil unit 230-2 may be a spiral pattern having a first number of turns.

Each of the third to fifth coil units 230-1 to 230-3 may include a first layer Layer11 or Layer21 and a second layer Layer12 or Layer22 disposed on the first layer Layer11 or Layer21.

For example, each of the first and second patterns PA1 may include a first layer Layer11 having a continuous spiral, oval, and/or track shape and a second layer Layer12 disposed on the first layer Layer11, the second layer having a continuous spiral, oval, and/or track shape.

In addition, for example, the third pattern PA2 of the fifth coil unit 230-3 may be a spiral pattern having a second number of turns greater than the first number of turns.

For example, the third pattern PA2 may include a first layer Layer21 having a continuous spiral, oval, and/or track shape and a second layer Layer22 disposed on the first layer Layer21, the second layer having a continuous spiral, oval, and/or track shape.

The width of the third line of each of the first and second layers Layer21 and Layer22 of the fifth coil unit 230-3 may be less than the width of the first line of each of the first and second layers of the third coil unit 230-1 and the width of the second line of each of the first and second layers of the fourth coil unit 230-2.

The width A2 of each of the first and second layers Layer21 and Layer22 of the third pattern PA2 is less than the width of each of the first and second layers Layer11 and Layer12 of each of the first and second patterns PA1.

The third coil unit 230-1 may include a plurality of lines arranged in the first region Re1 in a direction from the first side 23a to the second side 23b or in a direction from the third coil unit 230-1 to the fourth coil unit 230-2.

The first layer Layer11 of the first pattern PA1 may include a plurality of first lines R1 to Rn arranged in the first region Re1 in the direction from the first side 23a to the second side 23b or in the direction from the third coil unit 230-1 to the fourth coil unit 230-2.

In addition, the second layer Layer12 of the first pattern PA1 may include a plurality of second lines Q1 to Qn arranged in the first region Re1 in the direction from the first side 23a to the second side 23b or in the direction from the third coil unit 230-1 to the fourth coil unit 230-2.

The fourth coil unit 230-2 may include a plurality of lines arranged in the first region Re1 in a direction from the first side 23a to the second side 23b or in a direction from the third coil unit 230-1 to the fourth coil unit 230-2.

The first layer and the second layer of the second pattern may include pluralities of lines (e.g. R1 to Rn and Q1 to Qn) arranged in the second region Re2 in the direction from the first side 23a to the second side 23b of the board 231 or in the direction from the third coil unit 230-1 to the fourth coil unit 230-2.

The fifth coil unit 230-3 may include a plurality of lines arranged in the third region Re3 in a direction from the third side 23c to the fourth side 23d or in a direction perpendicular to the direction from the third coil unit 230-1 to the fourth coil unit 230-2.

In addition, the first layer Layer21 of the third pattern PA2 may include a plurality of first lines S1 to Sm arranged in the third region Re3 in the direction from the third side 23c to the fourth side 23d or in the direction perpendicular to the direction from the third coil unit 230-1 to the fourth coil unit 230-2.

The second layer Layer22 of the third pattern PA2 may include a plurality of second lines P1 to Pm arranged in the third region Re3 in the direction from the third side 23c to the fourth side 23d or in the direction perpendicular to the direction from the third coil unit 230-1 to the fourth coil unit 230-2. The "lines" may be referred to as "conductive lines" or "coil pattern lines."

For example, the second lines Q1 to Qn or P1 to Pm of each of the first to third patterns PA1 and PA2 may be disposed on the first lines R1 to Rn or S1 to Sm.

The width of each of the first lines R1 to Rn and S1 to Sm may be greater than the distance between the first lines R1 to Rn and S1 to Sm, and the width of each of the second lines Q1 to Qn and P1 to Pm may be greater than the distance between the second lines Q1 to Qn and P1 to Pm.

For example, the width of each of the first lines R1 to Rn and S1 to Sm may be greater than the shortest distance between the first lines R1 to Rn and S1 to Sm, and the width of each of the second lines Q1 to Qn and P1 to Pm may be greater than the shortest distance between the second lines Q1 to Qn and P1 to Pm.

For example, the number of the first lines R1 to Rn (n>1, n being a natural number) and the number of the second lines Q1 to Qn (n>1, n being a natural number) of each of the first and second patterns PA1 may be equal to each other.

In addition, for example, the first lines R1 to Rn (n>1, n being a natural number) and the second lines Q1 to Qn (n>1, n being a natural number) may be aligned with each other or may overlap each other in the optical-axis direction. However, the disclosure is not limited thereto.

For example, the number of the first lines S1 to Sm (m>n>1, m being a natural number) and the number of the second lines P1 to Pm (m>n>1, m being a natural number) of the third pattern PA2 may be equal to each other. In addition, for example, the first lines S1 to Sm (m>n>1, m being a natural number) and the second lines P1 to Pm (m>n>1, m being a natural number) of the third pattern PA2 may be aligned with each other or may overlap each other in the optical-axis direction. However, the disclosure is not limited thereto.

The distance B1 between the first lines R1 to Rn of each of the first and second patterns PA1 is less than the width A1 of each of the first lines R1 to Rn (B1<A1). In addition, the distance B1 between the second lines Q1 to Qn of each of the first and second patterns PA1 is less than the width A1 of each of the second lines Q1 to Qn (B1<A1).

The distance B1 between the first lines S1 to Sm of the third pattern PA2 is less than the width A2 of each of the first lines S1 to Sm (B1<A2). In addition, the distance B1 between the second lines P1 to Pm is less than the width A2 of each of the second lines P1 to Pm (B1<A2). For example, B1 may be 10 μm to 13 μm.

The width of each of the first lines R1 to Rn and the width of each of the second lines Q1 to Qn of each of the first and second patterns PA1 may be equal to each other. However, the disclosure is not limited thereto. In another embodiment, the width of each of the first lines R1 to Rn and the width of each of the second lines Q1 to Qn may be different from each other.

The width of each of the first lines S1 to Sm and the width of each of the second lines P1 to Pm of third pattern PA2 may be equal to each other. However, the disclosure is not limited thereto. In another embodiment, the width of each of the first lines S1 to Sm and the width of each of the second lines P1 to Pm may be different from each other.

The width of each of the first lines S1 to Sm of third pattern PA2 may be less than the width of each of the first lines R1 to Rn and the width of each of the second lines Q1 to Qn of each of the first and second patterns PA1.

The width of each of the second lines P1 to Pm of third pattern PA2 may be less than the width of each of the first lines R1 to Rn and the width of each of the second lines Q1 to Qn of each of the first and second patterns PA1.

For example, a first length d1 of the first pattern PA1 (or the second pattern) of the third coil unit 230-1 (or the fourth coil unit 230-2) in the width direction may be equal to a second length d2 of the third pattern PA2 of the fifth coil unit 230-2 in the width direction. However, the disclosure is not limited thereto.

d1 may be the distance between opposite outermost ends of each of the third and fourth coil units 230-1 and 230-2, and d2 may be the distance between opposite outermost ends of the fifth coil unit 230-3. For example, d1 may be the length of a central part of each of the third and fourth coil units 230-1 and 230-2, and d2 may be the length of a central part of the fifth coil unit 230-3. d1 and d2 may be the lengths of the third to fifth coil units 230-1 to 230-3 in the width direction. Alternatively, for example, d1 and d2 may be lengths in directions from the sides 23a, 23b, and 23c of the circuit member 231 at which the first and second coil units are disposed to the opening 231a.

For example, the first length may be the distance between opposite outermost ends of the spiral pattern of each of the first and second patterns PA1, and the second length may be the distance between opposite outermost ends of the spiral pattern of the third pattern PA2.

For example, d1 may be the distance between opposite outermost ends of the outermost line Rn or Qn, among the first lines R1 to Rn (or the second lines Q1 to Qn) of FIG. 17A. In addition, for example, d2 may be the distance between opposite outermost ends of the outermost line Sm or Pm, among the first lines S1 to Sm (or the second lines P1 to Pm) of FIG. 18A.

In another embodiment, the width d2 of the fifth coil unit 230-3 may be greater than the width d1 of the third coil unit 230-1 (or the fourth coil unit 230-2). For example, the second length d2 of the third pattern PA2 in the width direction may be greater than the first length d1 of the first pattern PA1 (or the second pattern) in the width direction.

In a further embodiment, the width d2 of the fifth coil unit 230-3 may be less than the width d1 of the third coil unit 230-1 (or the fourth coil unit 230-2). For example, the second length d2 of the third pattern PA2 in the width direction may be less than the first length d1 of the first pattern PA1 (or the second pattern) in the width direction.

For example, the second coil 230 may include a first dielectric layer 71, first layers Layer11 and Layer21 of the third to fifth coil units 230-1 to 230-3 disposed on the first dielectric layer 71, a second dielectric layer 73 disposed on the first layers Layer11 and Layer21, second layers Layer12 and Layer22 disposed on the second dielectric layer 73, and a third dielectric layer 75 disposed on the second layers Layer12 and Layer22.

Each of the first and third dielectric layers 71 and 75 may include a polymer organic compound or resin. For example, each of the first and third dielectric layers 71 and 75 may include polyimide and solder-resist.

The second dielectric layer 73 may include a polymer organic compound or resin. For example, the second dielectric layer 73 may include polyimide and epoxy bonds.

A fourth dielectric layer 72 may be disposed between the first lines R1 to Rn or S1 to Sm of each of the first to third patterns PA1 and PA2, and a fifth dielectric layer 74 may be disposed between the second lines Q1 to Qn or P1 to Pm of each of the first to third patterns PA1 and PA2.

Each of the third to fifth coil units 230-1 to 230-3 may include at least one via 55a and 55b or 56a and 56b configured to interconnect the first layer Layer11 or Layer21 and the second layer Layer12 or Layer22, and the first layer Layer11 or Layer21 and the second layer Layer12 or Layer22 may be connected to each other (e.g. in parallel) through the at least one via 55a and 55b or 56a and 56b.

Each of the third and fourth coil units 230-1 and 230-2 may have a first via 55a configured to interconnect one end of one (e.g. R1) of the first lines R1 to Rn and one end of one (e.g. Q1) of the second lines Q1 to Qn.

In addition, each of the third and fourth coil units 230-1 and 230-2 may have a second via 55b configured to interconnect one end of another (e.g. Rn) of the first lines R1 to Rn and one end of another (e.g. Qn) of the second lines Q1 to Qn.

The first and second vias 55a and 55b of each of the third and fourth coil units 230-1 and 230-2 may pass through or penetrate the dielectric layer 73. However, the disclosure is not limited thereto.

The first and second vias 55a and 55b of each of the third and fourth coil units 230-1 and 230-2 may interconnect the first lines R1 to Rn and the second lines Q1 to Qn. Here, the "via" may be referred to as a "contact," a "connection electrode," or a "connection pattern."

In addition, the fifth coil unit 230-3 may have a first via 56a configured to interconnect one end of one (e.g. S1) of the first lines S1 to Sm and one end of one (e.g. P1) of the second lines P1 to Pm.

In addition, the fifth coil unit 230-3 may have a second via 56b configured to interconnect one end of another (e.g. Sm) of the first lines S1 to Sm and one end of another (e.g. Pm) of the second lines P1 to Pm.

The first and second vias 55a and 55b of the fifth coil unit 230-3 may pass through or penetrate the dielectric layer 73. However, the disclosure is not limited thereto. The first and second vias of the fifth coil unit 230-3 may interconnect the first lines S1 to Sm and the second lines P1 to Pm.

A portion of each of the first to third patterns PA1 and PA2 may be open or exposed from at least one of the first and third dielectric layers 71 and 75, and the exposed portion may be connected to a corresponding one of the terminals of the circuit board 250.

For example, a portion of the first layer Layer11 or Layer21 of each of the first to third patterns PA1 and PA2 may be open or exposed from the third dielectric layer 75, and the exposed portion may be connected to a corresponding one of the terminals of the circuit board 250.

For example, a portion of the line of the first layer Layer11 of each of the first and second patterns PA1 and a portion of the first layer Layer21 of the third pattern PA2 may be open or exposed from the third dielectric layer 75, and the exposed portions may be connected to a corresponding one of the terminals of the circuit board 250.

Since the width A2 of each of the first lines S1 to Sm and the second lines P1 to Pm of the fifth coil unit 230-3 is less than the width A1 of each of the first lines R1 to Rn and the second lines Q1 to Qn of the third coil unit 230-1 (or the fourth coil unit 230-2), the number of turns (or the number of windings) of the fifth coil unit 230-3 may be greater than the number of turns (or the number of windings) of each of the third and fourth coil units 230-1 and 230-2 in the case in which the third to fifth coil units 230-1 to 230-3 are formed in the same space. As a result, it is possible to reduce the difference between the electromagnetic force generated in the X-axis direction and the electromagnetic force generated in the Y-axis direction.

For example, the ratio of the number of turns ("first number of turns") of each of the each of the third and fourth coil units 230-1 and 230-2 to the number of turns ("second number of turns") of the fifth coil unit 230-3 may be 1:1.1 to 1:2. However, the disclosure is not limited thereto.

In the case in which the value obtained by dividing the second number of turns by the first number of turns is less than 1.1, it is not possible to reduce the difference between the electromagnetic force in the Y-axis direction and the electromagnetic force in the X-axis direction, whereby reliability in OIS driving may be deteriorated.

In the case in which the value obtained by dividing the second number of turns by the first number of turns is greater than 2, resistance of the fifth coil unit 230-3 may be increased, whereby power consumption may be increased, or the magnitude of a driving signal of the fifth coil unit 230-3 may be increased.

For example, the ratio of the number of turns of each of the each of the third and fourth coil units 230-1 and 230-2 to the number of turns of the fifth coil unit 230-3 may be 1:1.1 to 1:1.5. For example, the number of turns of each of the each of the third and fourth coil units 230-1 and 230-2 may be 30, and the number of turns of the fifth coil unit 230-3 may be 34. However, the disclosure is not limited thereto.

In addition, since the number of turns of the fifth coil unit 230-3 is greater than the number of turns of each of the third and fourth coil units 230-1 and 230-2, the first electromagnetic force generated by the fifth coil unit 230-3 and the third magnet 130-3 may be greater than the second electromagnetic force generated by the third coil unit 230-1 and the first magnet 130-1 and may be greater than the third electromagnetic force generated by the fourth coil unit 230-2 and the second magnet 130-2. As a result, the embodiment is capable of reducing the difference between the first electromagnetic force in the X-axis direction and the sum of the second and third electromagnetic forces in the Y-axis direction, thereby improving reliability in OIS operation.

Each of the third coil unit 230-1 and the fourth coil unit 230-2 may include first straight portions, second straight portions, first curved portions configured to interconnect one end of each of the first straight portions and one end of a corresponding one of the second straight portions, and second curved portions configured to interconnect the other end of each of the first straight portions and the other end of a corresponding one of the second straight portions.

The fifth coil unit 230-3 may include third straight portions, fourth straight portions, third curved portions configured to interconnect one end of each of the third straight portions and one end of a corresponding one of the fourth straight portions, and fourth curved portions configured to interconnect the other end of each of the third straight portions and the other end of a corresponding one of the fourth straight portions.

The width of each of the first straight portions and the width of each of the second straight portions may be equal to each other, the width of each of the third straight portions and the width of each of the fourth straight portions may be equal to each other. In addition, the width of each of the third straight portions or the fourth straight portions may be less than the width of each of the first straight portions or the second straight portions.

For example, the width of each of the first straight portions, the width of each of the second straight portions, the width of each of the first curved portions, and the width of each of the second curved portions may be A1 described above, and the width of each of the third straight portions, the width of each of the fourth straight portions, the width of each of the third curved portions, and the width of each of the fourth curved portions may be A2 described above. A description of A1 and A2 and a description of the relationship between A1 and A2 may be equally applied.

The distance between the first straight portions, the distance between the first curved portions, the distance between the second straight portions, the distance between the second curved portions, the distance between the third straight portions, the distance between the third curved portions, the distance between the fourth straight portions, and the distance between the fourth curved portions may be B1 described above. A description of B1 may be applied.

The width A2 of the pattern of the fifth coil unit 230-3, which is an OIS coil in the X-axis direction, is configured so as to be less than the width A1 of the pattern of the third and fourth coil units 230-1 and 230-2, which are OIS coils in the Y-axis direction. Consequently, the embodiment is capable of reducing the difference between the electromagnetic force in the Y-axis direction and the electromagnetic force in the X-axis direction, thereby inhibiting dynamic tilting of the lens moving apparatus due to OIS operation.

The lens moving apparatus 100 according to the above embodiment may be realized as a camera module or an optical instrument or may be used in the camera module or the optical instrument in various fields.

For example, the lens moving apparatus 100 according to the embodiment may be included in an optical instrument configured to form an image of an object in a space using reflection, refraction, absorption, interference, diffraction, etc., which are characteristics of light, to increase the visual power of the eyes, to record or reproduce an image formed by a lens, to perform optical measurement, or to propagate or transfer an image. For example, an optical instrument according to an embodiment may include a smartphone or a portable terminal equipped with a camera.

Figure 19:
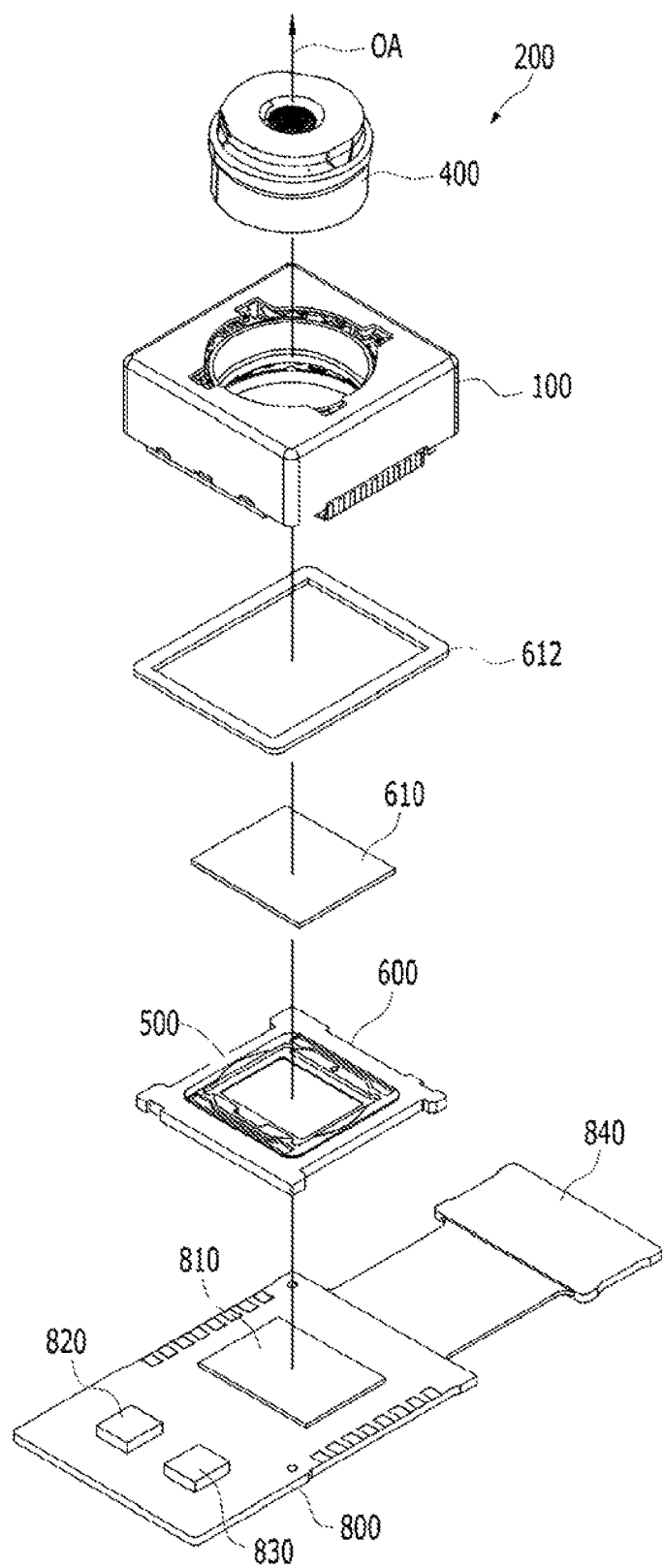
FIG. 19 is an exploded perspective view of a camera module according to an embodiment.

FIG. 19 is an exploded perspective view of a camera module 200 according to an embodiment.

Referring to FIG. 19, the camera module 200 may include a lens or lens barrel 400, a lens moving apparatus 100, an adhesive member 612, a filter 610, a first holder 600, a second holder 800, an image sensor 810, a motion sensor 820, a controller 830, and a connector 840. The lens moving apparatus 100 of FIG. 19 may be the lens moving apparatus according to the previous embodiment.

The lens or lens barrel 400 may be mounted in the bobbin 110 of the lens moving apparatus 100.

The first holder 600 may be disposed under the base 210 of the lens moving apparatus 100. The filter 610 may be mounted to the first holder 600, and the first holder 600 may have a projecting portion 500, on which the filter 610 is seated.

The adhesive member 612 may couple or adhere the base 210 of the lens moving apparatus 100 to the first holder 600. The adhesive member 612 may function to prevent foreign matter from being introduced into the lens moving apparatus 100 in addition to the function of adhesion.

For example, the adhesive member 612 may be epoxy, a thermo-hardening adhesive, or an ultraviolet-hardening adhesive.

The filter 610 may function to prevent a specific-frequency-band component of light passing through the lens barrel 400 from being incident on the image sensor 810. The filter 610 may be an infrared cutoff filter; however, the disclosure is not limited thereto. In this case, the filter 610 may be disposed parallel to the x-y plane.

An opening, through which light passing through the filter 610 is incident on the image sensor 810, may be formed in the region of the first holder 600 on which the filter 610 is mounted.

The second holder 800 may be disposed under the first holder 600, and the image sensor 810 may be mounted on the second holder 600. The image sensor 810 is a region on which light passing through the filter 610 is incident in order to form an image included in the light.

The second holder 800 may be provided with various circuits, elements, and a controller in order to convert an image formed on the image sensor 810 into an electrical signal and to transfer the electrical signal to an external apparatus.

The second holder 800 may be realized as a circuit board, on which the image sensor may be mounted, on which a circuit pattern may be formed, and on which various elements are coupled to each other.

The image sensor 810 may receive an image included in light incident through the lens moving apparatus 100, and may convert the received image into an electrical signal.

The filter 610 and the image sensor 810 may be disposed so as to be spaced apart from each other in the state of being opposite each other in the first direction.

The motion sensor 820 may be mounted on the second holder 800, and may be connected to the controller 830 via the circuit pattern provided on the second holder 800.

The motion sensor 820 outputs information about rotational angular velocity based on movement of the camera module 200. The motion sensor 820 may be realized as a two-axis or three-axis gyro sensor or an angular velocity sensor.

The controller 830 is mounted or disposed on the second holder 800. The second holder 800 may be connected to the lens moving apparatus 100. For example, the second holder 800 may be connected to the circuit board 190 of the lens moving apparatus 100.

For example, a driving signal or electric power may be provided to the first coil 120 and a driving signal or electric power may be provided to the second coil 230 via the second holder 800.

For example, a driving signal may be provided to the first position sensor 170 and the second position sensor 240 via the second holder 800. An output signal of the first position sensor 170 and an output signal of the second position sensor 240 may be transmitted to the second holder 800. For example, an output signal of the first position sensor 170 and an output signal of the second position sensor 240 may be received by the controller 830.

The connector 840 may be connected to the second holder 800, and may have a port for connection with an external apparatus.

Figure 20:
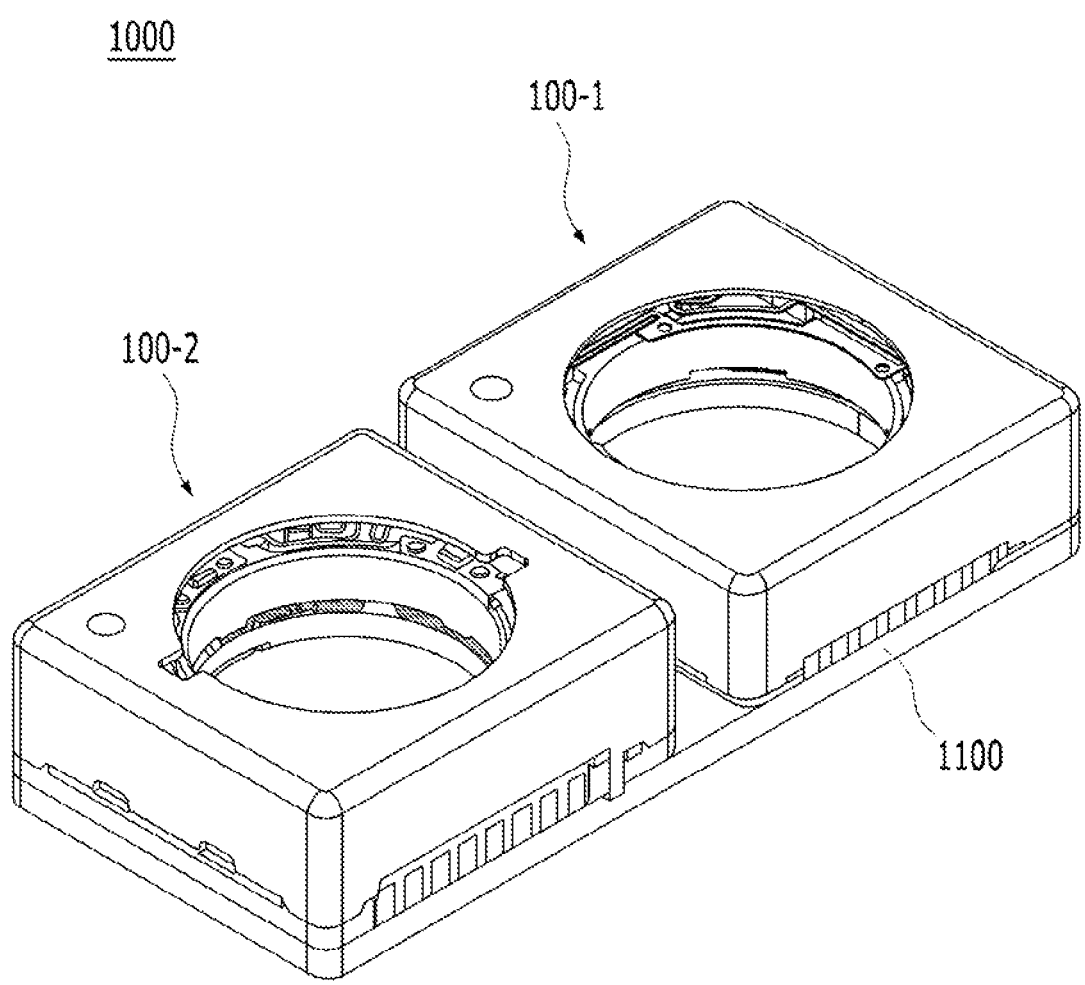
FIG. 20 is a perspective view of a camera module according to another embodiment.

FIG. 20 is a perspective view of a camera module 1000 according to another embodiment.

Referring to FIG. 20, the camera module 1000 may be a dual camera module including a first camera module 100-1 including a first lens moving apparatus and a second camera module 100-2 including a second lens moving apparatus.

Each of the first camera module 100-1 and the second camera module 100-2 may be one of an autofocus (AF) camera module or an optical image stabilization (OIS) camera module.

The AF camera module is a camera module capable of performing only an autofocus function, and the OIS camera module is a camera module capable of performing both an autofocus function and an optical image stabilization (OIS) function.

For example, the first lens moving apparatus may be the embodiment 100 shown in FIG. 1. The second lens moving apparatus may be embodiment 100 shown in FIG. 1, a lens moving apparatus for AF, or a lens moving apparatus for OIS.

The camera module 1000 may further include a circuit board 1100 on which the first camera module 100-1 and the second camera module 100-2 are mounted. In FIG. 20, the first camera module 100-1 and the second camera module 100-2 are disposed side by side on a single circuit board 1100. However, the disclosure is not limited thereto. In another embodiment, the circuit board 1100 may include a first circuit board and a second circuit board separated from each other, the first camera module 100-1 may be disposed on the first circuit board, and the second camera module 100-2 may be disposed on the second circuit board.

The first camera module 100-1 may be disposed on the circuit board 1100 such that the dummy member 135 of the first lens moving apparatus 100 of the first camera module 100-1 is located adjacent to the second camera module 100-2, whereby it is possible to reduce magnetic field interference between the first to third magnets 130-1 to 130-3 of the first camera module 100-1 and magnets included in the second lens moving apparatus of the second camera module 100-2, and therefore it is possible to secure reliability in AF driving and/or reliability in OIS driving of each of the first camera module 100-1 and the second camera module 100-2.

Figure 21A:
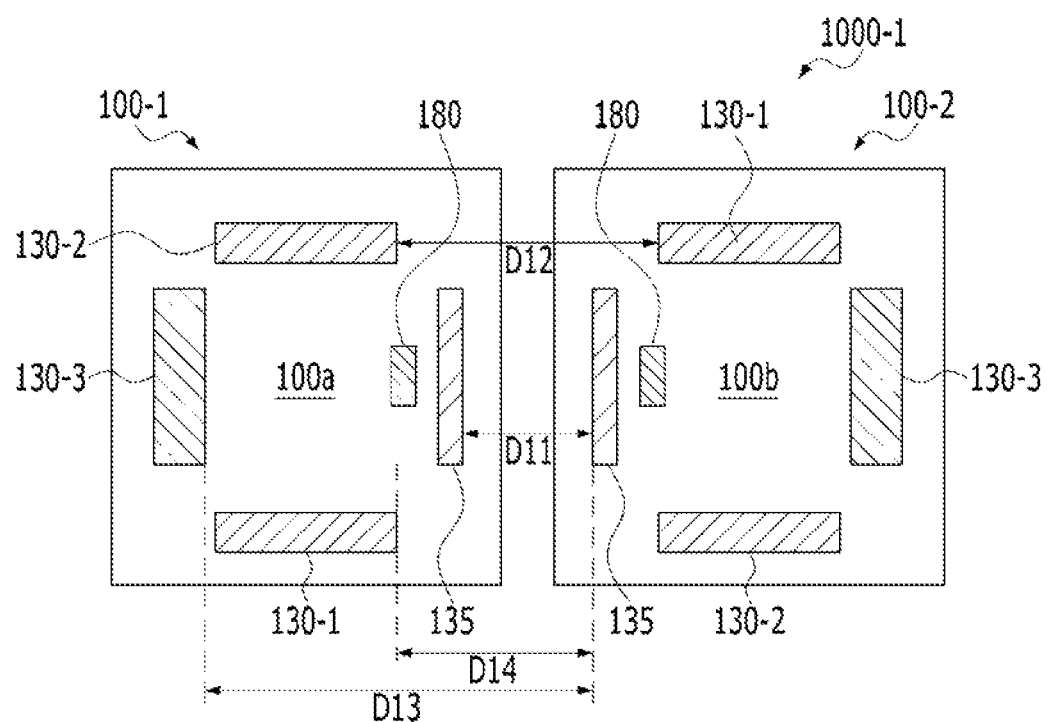
FIG. 21A is a schematic view of an embodiment of the camera module shown in FIG. 20.
Figure 21B:
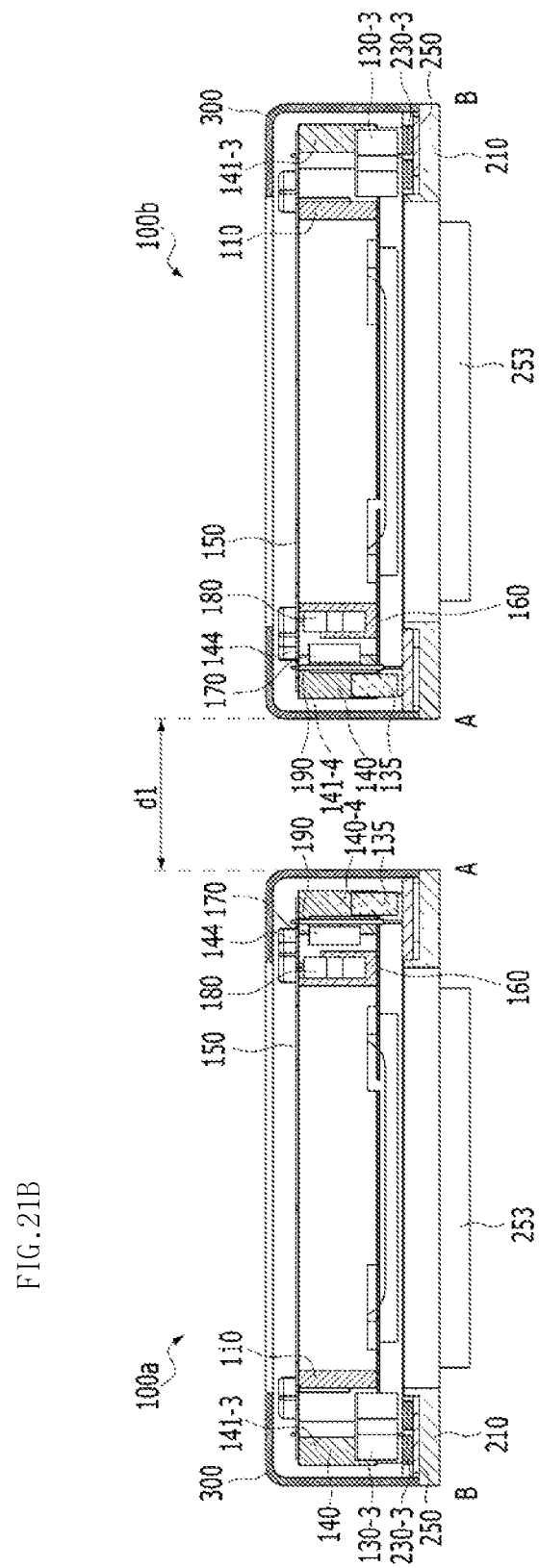
FIG. 21B is a sectional view of first and second lens moving apparatuses of FIG. 21A in the AB direction of FIG. 3.

FIG. 21A is a schematic view of an embodiment 1000-1 of the camera module shown in FIG. 20, and FIG. 21B is a sectional view of first and second lens moving apparatuses 100a and 100b of FIG. 21A in the AB direction of FIG. 3.

Referring to FIGS. 21A and 21B, the camera module 1000-1 may include a first camera module 100-1 including a first lens moving apparatus 100a and a second camera module 100-2 including a second lens moving apparatus 100b.

For example, each of the first camera module 100-1 and the second camera module 100-2 may be the camera module 200 shown in FIG. 19.

The first lens moving apparatus 100a may be the embodiment 100 shown in FIG. 2 or may be configured such that the balancing magnet 185 is omitted from the embodiment shown in FIG. 2.

The second lens moving apparatus 100b may be the embodiment 100 shown in FIG. 2 or an apparatus configured such that the balancing magnet 185 is omitted from the embodiment shown in FIG. 2. However, the disclosure is not limited thereto. For example, the second lens moving apparatus 100b may be disposed adjacent to the first lens moving apparatus 100a, and a second bobbin, in which a lens is disposed, may be moved in the optical-axis direction or in the direction perpendicular to the optical axis.

Each of the first and second lens moving apparatuses 100 and 100b may include a housing 140 or 140A including a first side portion and a second side portion opposite each other and a third side portion and a fourth side portion opposite each other, a bobbin 110 or 110A disposed in the housing 140 or 140A, a first magnet 130-1 or 130-1A disposed at the first side portion of the housing 140 or 140A, a second magnet 130-2 or 130-2A disposed at the second side portion of the housing 140 or 140A, a third magnet 130-3 or 130-3A disposed at the third side portion of the housing 140 or 140A, a dummy member 135 or 135A disposed at the fourth side portion of the housing 140 or 140A, and a first coil 120 including a first coil unit 120-1 disposed at the bobbin 110 or 110A so as to be opposite the first magnet 130-1 or 130-1A and a second coil unit 120-2 disposed at the bobbin 110 or 110A so as to be opposite the second magnet 130-2 or 130-2A. The fourth side portion of the housing 140 of the first lens moving apparatus 100a may be disposed adjacent to the fourth side portion or the third side portion of the housing 140A of the second lens moving apparatus 100b. In addition, when viewed from above, the dummy member 135 of the first lens moving apparatus 100a may be disposed between the third magnet 130-3 of the first lens moving apparatus 100a and the dummy member 135A of the second lens moving apparatus 100b.

For example, the first lens moving apparatus 100a may include a "first lens moving unit" including a first bobbin 110, a first coil 120, a first magnet 130-1, a second magnet 130-2, a third magnet 130-3, a first dummy member 135, a first housing 140, an upper elastic member 150, a lower elastic member 160, a second coil 230, and a base 210. The first lens moving unit of the first lens moving apparatus 100a may further include a first position sensor 170 and a sensing magnet 180.

In addition, the second lens moving apparatus 100b may include a "second lens moving unit" including a second bobbin 110A, a first coil 120, a fourth magnet 130-1A, a fifth magnet 130-2A, a sixth magnet 130-3A, a second dummy member 135A, a second housing 140A, an upper elastic member 150, a lower elastic member 160, a second coil 230, and a base 210. The second lens moving unit of the second lens moving apparatus 100b may further include a first position sensor 170A and a sensing magnet 180A.

In addition, each of the first and second lens moving apparatuses 100a and 100b may further include at least one of a circuit board 250, a supporting member 220, a second position sensor 240, a circuit board 190, a cover member 300, and a balancing magnet.

The first lens moving apparatus 100a and the second lens moving apparatus 100b may be disposed adjacent to each other. For example, the distance d1 between a side plate of the cover member 300 of the first lens moving apparatus 100a and a side plate of the cover member 300 of the second lens moving apparatus 100b opposite thereto may be 0.01 mm to 1 mm. For example, d1 may be 0.01 mm to 3 mm.

The fourth side portion 141-4 of the first housing 140 of the first lens moving apparatus 100a and the fourth side portion 141-4 of the second housing 140A of the second lens moving apparatus 100b may be disposed adjacent to each other.

For example, the fourth side portion 141-4 of the first housing 140 and the fourth side portion 141-4 of the second housing 140A may be disposed parallel to each other. However, the disclosure is not limited thereto.

Each of the first dummy member 135 and the second dummy member 135A may be disposed at a corresponding one of the fourth side portions of the first housing 140 and the second housing 140A adjacent to each other.

The first dummy member 135 and the second dummy member 135A may be disposed adjacent to each other.

The first bobbin 110 and the second bobbin 110A may be disposed spaced apart from each other.

The first magnet 130-1 may be disposed at a first side of the first bobbin 110, and may be disposed spaced apart from the first side of the first bobbin 110 or adjacent to the first side of the first bobbin 110.

For example, the first magnet 130-1 may be disposed between the first bobbin 110 (e.g. the first side of the first bobbin 110) and the first housing 140. For example, the first magnet 130-1 may be disposed at the first housing 140 so as to correspond to the first side of the first bobbin 110.

The second magnet 130-2 may be disposed at a second side of the first bobbin 110 opposite the first side of the first bobbin 110, and may be disposed spaced apart from the second side of the first bobbin 110 or adjacent to the second side of the first bobbin 110.

For example, the second magnet 130-2 may be disposed between the first bobbin 110 (e.g. the second side of the first bobbin 110) and the first housing 140. For example, the second magnet 130-2 may be disposed at the first housing 140 so as to correspond to the second side of the first bobbin 110.

The third magnet 130-3 may be disposed at a third side of the first bobbin 110 adjacent to the first side of the first bobbin 110, and may be disposed spaced apart from the third side of the first bobbin 110 or adjacent to the second side of the first bobbin 110.

For example, the third magnet 130-3 may be disposed between the first bobbin 110 (e.g. the third side of the first bobbin 110) and the first housing 140. For example, the third magnet 130-3 may be disposed at the first housing 140 so as to correspond to the third side of the first bobbin 110.

The fourth magnet 130-1A may be disposed at a first side of the second bobbin 110A, and may be disposed spaced apart from the first side of the second bobbin 110A or adjacent to the first side of the second bobbin 110A.

For example, the fourth magnet 130-1A may be disposed between the second bobbin 110A (e.g. the first side of the second bobbin 110A) and the second housing 140A. For example, the fourth magnet 130-1A may be disposed at the second housing 140A so as to correspond to the first side of the second bobbin 110A.

The fifth magnet 130-2A may be disposed at a second side of the second bobbin 110A opposite the first side of the second bobbin 110A, and may be disposed spaced apart from the second side of the second bobbin 110A or adjacent to the second side of the second bobbin 110A.

For example, the fifth magnet 130-2A may be disposed between the second bobbin 110A (e.g. the second side of the second bobbin 110A) and the second housing 140A. For example, the fifth magnet 130-2A may be disposed at the second housing 140A so as to correspond to the second side of the second bobbin 110A.

The sixth magnet 130-3A may be disposed at a third side of the second bobbin 110A adjacent to the first side of the second bobbin 110A, and may be disposed spaced apart from the third side of the second bobbin 110A or adjacent to the third side of the second bobbin 110A.

For example, the sixth magnet 130-3A may be disposed between the second bobbin 110A (e.g. the third side of the second bobbin 110A) and the second housing 140A. For example, the sixth magnet 130-3A may be disposed at the second housing 140A so as to correspond to the third side of the second bobbin 110A.

The first dummy member 135 may be disposed at a fourth side of the first bobbin 110 opposite the third side of the first bobbin 110, and may be disposed spaced apart from the fourth side of the first bobbin 110 or adjacent to the fourth side of the first bobbin 110.

The second dummy member 135A may be disposed at a fourth side of the second bobbin 110A opposite the third side of the second bobbin 110A, and may be disposed spaced apart from the fourth side of the second bobbin 110A or adjacent to the fourth side of the second bobbin 110A.

The first coil 120 of the first lens moving apparatus 100a may include a first coil unit 120-1 disposed between the first bobbin 110 and the first magnet 130-1 and a second coil unit 120-2 disposed between the first bobbin 110 and the second magnet 130-2.

The first coil 120 of the second lens moving apparatus 100b may include a third coil unit 120-1 disposed between the second bobbin 110A and the fourth magnet 130-1A and a fourth coil unit 120-2 disposed between the second bobbin 110A and the fifth magnet 130-2A.

A description of the first magnet 130-1 may be applied to the fourth magnet 130-1A, a description of the second magnet 130-2 may be applied to the fifth magnet 130-2A, and a description of the third magnet 130-3 may be applied to the sixth magnet 130-3A. In addition, a description of the first dummy member 135 may be applied to the second dummy member 135A.

The first dummy member 135 and the second dummy member 135A may be disposed so as to overlap each other in a direction from the third magnet 130-3 to the sixth magnet 130-3A.

Alternatively, when viewed from above, the first dummy member 135 and the second dummy member 135A may be disposed so as to overlap each other in a direction from the first bobbin 110 (e.g. the fourth side) to the second bobbin 110A (e.g. the fourth side).

For example, the distance D11 between the first dummy member 135 and the second dummy member 135A may be less than the distance D12 between the magnet 130-2 (or the magnet 130-1) of the first lens moving apparatus 100a and the magnet 130-1A (or the magnet 130-2A) of the second lens moving apparatus 100b (D11<D12).

Each of D11 and D12 may be a distance in a first horizontal direction. Here, the first horizontal direction may be a direction from the first bobbin 110 (e.g. the fourth side of the first bobbin 110) to the second bobbin 110A (e.g. the fourth side of the second bobbin 110A). Alternatively, the first horizontal direction may be a direction from the fourth side portion of the first housing 140 to the fourth side portion of the second housing 140A. The first horizontal direction may be a direction from the third magnet 130-3 to the sixth magnet 130-3A.

In addition, for example, the distance D11 may be less than the distance D13 between the magnet 130-3 of the first lens moving apparatus 100a and the second dummy member 135A of the second lens moving apparatus 100b (D11<D13).

In addition, for example, the distance D11 may be less than the distance D14 between the magnet 130-1 (or the magnet 130-2) of the first lens moving apparatus 100a and the second dummy member 135A of the second lens moving apparatus 100b (D11<D14).

Since D11 is less than D12 to D14, it is possible to reduce effects on AF driving force and OIS driving force due to magnetic field interference between the magnets 130-1 and 130-2 of the first lens moving apparatus 100a and the second magnets 130-1A and 130-2A of the second lens moving apparatus 100b.

In addition, the first position sensor 170 of the first lens moving apparatus 100a and the first position sensor 170A of the first lens moving apparatus 100b may be disposed at a corresponding one of the fourth side portions of the first housing 140 and the second housing 140A adjacent to each other.

The sensing magnet 180 (hereinafter referred to as a "first sensing magnet") of the first lens moving apparatus 100a may be disposed at one side portion (or one side surface) of the first bobbin 110 corresponding to or opposite the fourth side portion of the first housing 140, e.g. the fourth side of the first bobbin 110.

The sensing magnet 180A (hereinafter referred to as a "second sensing magnet") of the second lens moving apparatus 100b may be disposed at one side portion (or one side surface) of the second bobbin 110A corresponding to or opposite the fourth side portion of the second housing 140A, e.g. the fourth side of the second bobbin 110A.

For example, the magnets 130-1 and 130-2 of the first lens moving apparatus 100a and the magnets 130-1 and 130-2 of the second lens moving apparatus 100b may overlap each other in a direction from the fourth side portion 141-4 of the first housing 140 (or the fourth side of the first bobbin 110) to the fourth side portion 141-4 of the second housing 140A (or the fourth side of the second bobbin 110A). However, the disclosure is not limited thereto.

For example, the coil units 120-1 and 120-2 of the first lens moving apparatus 100a may overlap the coil units 120-1 and 120-2 of the second lens moving apparatus 100b in the direction from the fourth side portion 141-4 of the first housing 140 (or the fourth side of the first bobbin 110) to the fourth side portion 141-4 of the second housing 140A (or the fourth side of the second bobbin 110A). However, the disclosure is not limited thereto.

For example, the first sensing magnet 180 of the first lens moving apparatus 100a may overlap the second sensing magnet 180 of the second lens moving apparatus 100b in the direction from the fourth side portion 141-4 of the first housing 140 (or the fourth side of the first bobbin 110) to the fourth side portion 141-4 of the second housing 140A (or the fourth side of the second bobbin 110A). However, the disclosure is not limited thereto. In another embodiment, both may not overlap each other.

In addition, for example, the magnet 130-3 of the first lens moving apparatus 100a and the magnet 130-3A of the second lens moving apparatus 100b may overlap each other in the direction from the fourth side portion 141-4 of the first housing 140 (or the fourth side of the first bobbin 110) to the fourth side portion 141-4 of the second housing 140A (or the fourth side of the second bobbin 110A).

In addition, for example, the first dummy member 135 of the first lens moving apparatus 100a and the second dummy member 135A of the second lens moving apparatus 100b may overlap each other in the direction from the fourth side portion 141-4 of the first housing 140 (or the fourth side of the first bobbin 110) to the fourth side portion 141-4 of the second housing 140A (or the fourth side of the second bobbin 110A).

For example, the first dummy member 135 may be disposed between the magnet 130-3 of the first lens moving apparatus 100a and the magnet 130-3A of the second lens moving apparatus 100b.

For example, the first dummy member 135 may be disposed between the first bobbin 110 and the second bobbin 110A. In addition, for example, the second dummy member 135A may be disposed between the first bobbin 110 and the second bobbin 110A.

The second coil 230 of the first lens moving apparatus 100a may include a coil unit 230-1 disposed under the magnet 130-1, a coil unit 230-2 disposed under the second magnet 130-2, and a coil unit 230-3 disposed under the third magnet 130-3.

In addition, the second coil 230 of the second lens moving apparatus 100b may include a coil unit 230-1 disposed under the magnet 130-1A, a coil unit 230-2 disposed under the second magnet 130-2A, and a coil unit 230-3 disposed under the third magnet 130-3A.

In another embodiment, the second lens moving apparatus 100b may have magnet disposition different from FIG. 18A. For example, a second lens moving apparatus according to another embodiment may include a magnet disposed at at least one of the four side portions 141-1 to 141-4 of the second housing 140A. For example, the second lens moving apparatus may include four magnets disposed at the four side portions 141-1 to 141-4 of the second housing 140A. However, the disclosure is not limited thereto.

A second lens moving apparatus according to a further embodiment may include a magnet disposed at at least one of the four corners 142-1 to 142-4 of the second housing 140A. For example, the second lens moving apparatus may include four magnets disposed at the four corners 142-1 to 142-4 of the second housing 140A. However, the disclosure is not limited thereto.

A camera module according to another embodiment may include a first housing 140, a first bobbin 110 disposed in the first housing 140, magnets 130-1 to 130-3 disposed between the first housing 140 and the first bobbin 110, a coil 120 disposed between the magnets 130-1 to 130-3 and the first bobbin 110, and a dummy member 135 disposed between the first housing 140 and the first bobbin 110.

In addition, the second lens moving unit may include a second housing 140A, a second bobbin 110a disposed in the second housing 140A, magnets 130-1A to 130-3A disposed between the second housing 140A and the second bobbin 110a, and a coil 120 disposed between the magnets 130-1A to 130-3A and the second bobbin 110a.

The magnets 130-1 to 130-3 of the first lens moving unit may include a first magnet 130-1 disposed at a first side of the first housing 140, a second magnet 130-2 disposed at a second side of the first housing 140 opposite the first side of the first housing 140, and a third magnet 130-3 disposed at a third side of the first housing 140 adjacent to the first side of the first housing 140.

The dummy member 135 of the first lens moving unit may be disposed between the first bobbin 110 and the second bobbin.

Figures 22, 23A:
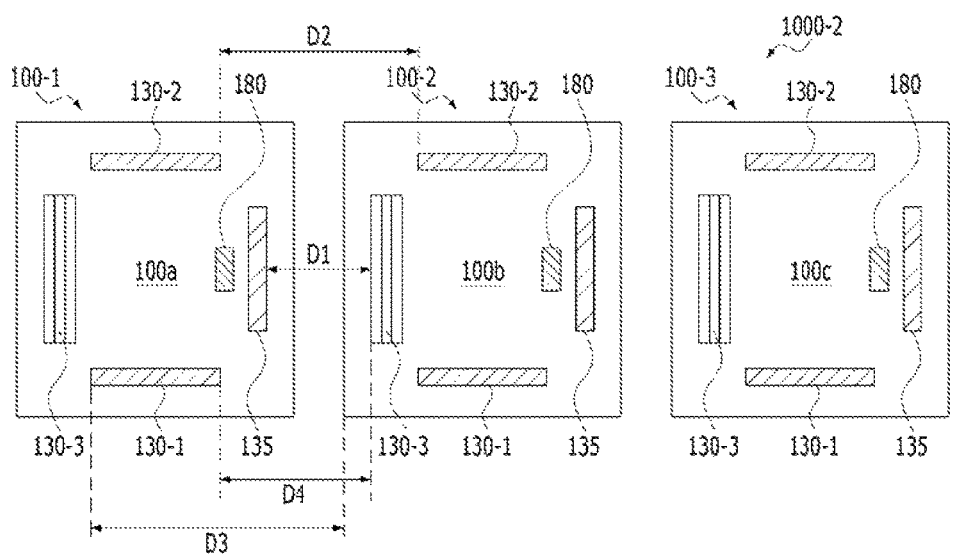
FIG. 22 is a schematic view of a camera module according to another embodiment.
FIG. 23A shows a simulation result of force applied to a third magnet and a sensing magnet of the camera module of FIG. 22.

FIG. 22 is a schematic view of a camera module 1000-2 according to another embodiment.

The camera module 1000-2 of FIG. 22 may include a first camera module 100-1 including a first lens moving apparatus 100a, a second camera module 100-2 including a second lens moving apparatus 100b, and a third camera module 100-3 including a third lens moving apparatus 100c. The first to third camera modules 100-1, 100-2, and 100-3 may be arranged side by side.

In FIG. 22, an embodiment having a triple structure including three camera modules is described. However, the disclosure is not limited thereto. In another embodiment, two camera modules (100-1 and 100-2 of FIG. 19) may be included. In a further embodiment, four or more camera modules arranged as shown in FIG. 22 may be included.

For example, each of the first to third camera modules 100-1, 100-2, and 100-3 may be the camera module 200 shown in FIG. 19, and each of the first to third lens moving apparatuses 100a, 100b, and 100c may be the embodiment 100 shown in FIG. 2 or may be configured such that the balancing magnet 185 is omitted from the embodiment shown in FIG. 2.

The first to third lens moving apparatuses 100a, 100b, and 100c may be arranged side by side adjacent to each other, and a description of d1 of FIG. 18B may be applied to the distance therebetween. The fourth side portion of one of housings of two adjacent lens moving apparatuses and the third side portion of the other may be disposed adjacent to each other.

For example, the fourth side portion 141-4 of the housing of the first lens moving apparatus 100a and the third side portion 141-3 of the housing of the second lens moving apparatus 100b may be disposed adjacent to each other.

In addition, the fourth side portion 141-4 of the housing of the second lens moving apparatus 100b and the third side portion 141-3 of the housing of the third lens moving apparatus 100c may be disposed adjacent to each other.

For example, the fourth side portion of the housing of the first lens moving apparatus 100a and the third side portion of the housing of the second lens moving apparatus 100b may be disposed adjacent to each other and parallel to each other, and the fourth side portion of the housing of the second lens moving apparatus 100b and the third side portion of the housing of the third lens moving apparatus 100c may be disposed adjacent to each other and parallel to each other.

The dummy member of one of two adjacent lens moving apparatuses and the third magnet 135 of the other may be disposed adjacent to each other.

For example, the distance D1 between the dummy member of one of two adjacent lens moving apparatuses and the third magnet 135 of the other may be less than the distance D2 between the first magnet 130-1 (or the second magnet 130-2) of one of two adjacent lens moving apparatuses and the first magnet 130-1 (or the second magnet 130-2) of the other (D1<D2).

In addition, for example, the distance D1 may be less than the distance D3 between the third magnet 130-3 of one of two adjacent lens moving apparatuses and the third magnet 130-3 of the other (D1<D3).

In addition, for example, the distance D1 may be less than the distance D4 between the first magnet 130-1 (or the second magnet 130-2) of one of two adjacent lens moving apparatuses and the third magnet 130-3 of the other (D1<D4).

Since D1 is less than D2 to D4, it is possible to reduce effects on AF driving force and OIS driving force due to magnetic field interference between magnets included in two adjacent lens moving apparatuses, and therefore it is possible to secure reliability in AF operation and OIS operation.

In addition, the position sensor of one of two adjacent lens moving apparatuses (e.g. 100-1 and 100-2 or 100-2 and 100-3) and the third magnet 130-3 of the other may be disposed at a corresponding one of adjacent third and fourth side portions of two adjacent housings.

In addition, the sensing magnet of one of two adjacent lens moving apparatuses may be disposed at a side portion (or a side surface) of the bobbin corresponding to or opposite the fourth side portion which is one of adjacent third and fourth side portions of two adjacent housings.

The sensing magnet of the other of the two adjacent lens moving apparatuses may be disposed at a side portion (or a side surface) of the bobbin corresponding to or opposite the fourth side portion located opposite the third side portion which is one of the adjacent third and fourth side portions.

For example, in a direction from the fourth side portion of one of two adjacent housings to the third side portion of the other, the first and second magnets 130-1 and 130-2 disposed at one of the housings and the first and second magnets 130-1 and 130-2 disposed at the other housing may not overlap each other.

For example, in the direction from the fourth side portion of one of two adjacent housings to the third side portion of the other, the first and second coil units 120-1 and 120-2 of one of the two adjacent lens moving apparatuses may not overlap the first and second coil units 120-1 and 120-2 of the other of the two adjacent lens moving apparatuses.

For example, in the direction from the fourth side portion of one of two adjacent housings to the third side portion of the other, the sensing magnet 180 of one of the two adjacent lens moving apparatuses may overlap the sensing magnet 180 of the other of the two adjacent lens moving apparatuses. However, the disclosure is not limited thereto. In another embodiment, both may not overlap each other.

In addition, for example, in the direction from the fourth side portion of one of two adjacent housings to the third side portion of the other, two third magnets 130-3 of the two adjacent lens moving apparatuses may overlap each other.

For example, in the direction from the fourth side portion of one of two adjacent housings to the third side portion of the other, two dummy members 135 of the two adjacent lens moving apparatuses may overlap each other.

In FIG. 22, the dummy member and the third magnet are disposed at side portions of two adjacent housings.

Consequently, the embodiment 1000-2 is capable of reducing effects on AF driving force and OIS driving force due to magnetic field interference between the first and second magnets 130-1 and 130-3 included in adjacent lens moving apparatuses, thereby securing reliability in AF operation and OIS operation.

When comparing the embodiment of FIG. 21A and the embodiment of FIG. 22, the distance between the two third magnets 130-3 and 130-3A of the two camera modules (e.g. 100-1 and 100-2) of FIG. 21A is greater than the distance between the two third magnets 130-3 of two adjacent camera modules (e.g. 100-1 and 100-2) of FIG. 22, whereby the magnetic field interference reduction effect in the embodiment of FIG. 21A may be better.

Figures 23B, 24:
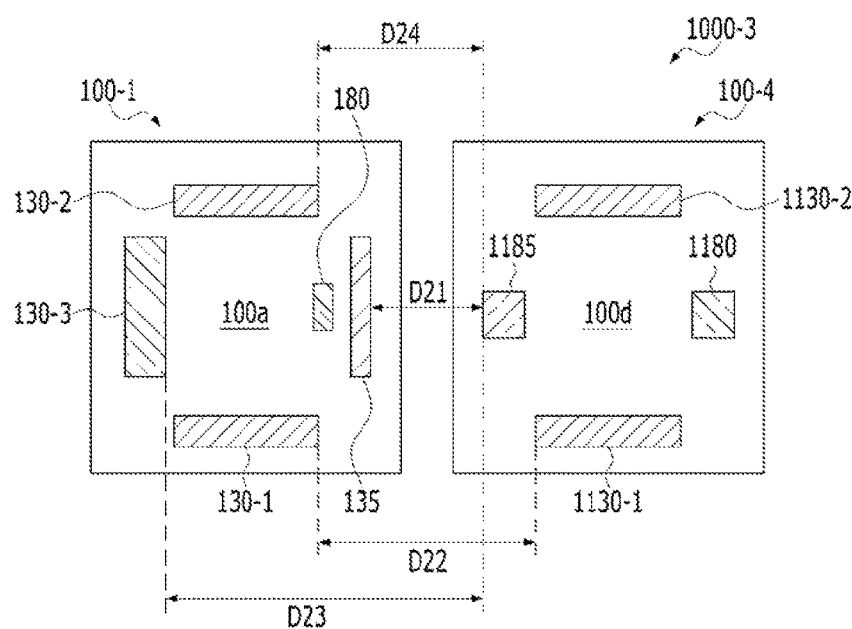
FIG. 23B shows a simulation result of stroke variation of the third magnet and the sensing magnet of the camera module of FIG. 22.
FIG. 24 is a schematic view of a camera module according to a further embodiment.

FIG. 23A shows a simulation result of force applied to the third magnet 130-3 and the sensing magnet 180 of the camera module 1000-2 of FIG. 22, and FIG. 23B shows a simulation result of stroke variation (displacement) of the third magnet 130-3 and the sensing magnet 180 of the camera module of FIG. 22. In FIGS. 23A and 23B, OIS indicates the magnets 130-1 and 130-2, and Smagnet indicates the sensing magnets.

FIGS. 23A and 23B show the simulation results of force and stroke variation at the initial position of the lens moving apparatus of each camera module. Here, the initial position of the lens moving apparatus may be the original position of the OIS moving unit in the state in which no driving signals are provided to the first coil 120 and the second coil 230 or the position at which the OIS moving unit is located as the result of the upper and lower elastic members 150 and 160 and the supporting member 220 being elastically deformed due only to the weight of the OIS moving unit. In addition, the initial position may be the position at which the OIS moving unit is located when gravity acts in the direction from the bobbin 110 to the base 210 or when gravity acts in the direction from the base 210 to the bobbin 110.

It is assumed that the spring constant of OIS in the X-axis and Y-axis directions is 60 mN/mm and the spring constant of OIS in the Z-axis direction is 500 mN/mm. It is assumed that the distance between two adjacent camera modules is 0.75 mm, the lengths of each camera module in the horizontal direction and the vertical direction are 12 mm, and the thickness of each camera module is 3.3 mm.

Referring to FIG. 23A, it can be seen that force applied to the third magnet 130-3 of each of the camera modules 100-1 to 100-3 due to magnetic field interference is less than 0.5 mN in a positive (+) direction and a negative (−) direction. In addition, it can be seen that force applied to the sensing magnet 180 of each of the camera modules 100-1 to 100-3 due to magnetic field interference is less than 0.5 mN in the positive (+) direction and the negative (−) direction.

Here, "less than 0.5 mN" is merely an analysis error based on simulation. Consequently, it may be estimated that the force applied to each of the third magnet 130-3 and the sensing magnet 180 of each of the camera modules 100-1 to 100-3 due to magnetic field interference is substantially insignificant.

For example, force applied to the third magnet 130-3 of one camera module may include force applied to the magnets 130-1, 130-2, and 130-3 and the sensing magnet 180 included in each of the first to third camera modules 100-1 to 100-3 excluding the third magnet 130-3 of the camera module.

In addition, force applied to the sensing magnet 180 of one camera module may include force applied to the magnets 130-1, 130-2, and 130-3 and the sensing magnet 180 included in each of the first to third camera modules 100-1 to 100-3 excluding the sensing magnet 180 of the camera module.

Referring to FIG. 23B, it can be seen that stroke variation of the third magnet 130-3 of each of the camera modules 100-1 to 100-3 due to magnetic field interference is less than 5 μm from the initial position in the positive (+) direction and the negative (−) direction.

Also, it can be seen that stroke variation of the sensing magnet 180 of each of the camera modules 100-1 to 100-3 due to magnetic field interference is less than 2 μm from the initial position in the positive (+) direction and the negative (−) direction.

The stroke variation of the third magnet 130-3 of less than 5 μm and the stroke variation of the sensing magnet 180 of less than 2 μm are merely analysis errors based on simulation. Consequently, it may be estimated that the stroke variation of each of the third magnet 130-3 and the sensing magnet 180 of each of the camera modules 100-1 to 100-3 due to magnetic field interference is substantially insignificant.

Based on the simulation results of FIGS. 23A and 23B, reliability in AF operation and OIS operation of the camera module according to the embodiment may be secured.

In addition, since the first to third lens moving apparatuses 100a, 100b, and 100c are arranged in the same direction, the same coordinate axes may be used, and therefore it is not necessary to correct position information of a gyro sensor due to use of different coordinate axes. In 21A and 21B, the first lens moving apparatus 100a and the second lens moving apparatus 100b use different coordinate axes, since both are disposed in left-right symmetry, and therefore it is necessary to correct position information of the gyro sensor due to use of different coordinate axes.

FIG. 24 is a schematic view of a camera module 1000-3 according to a further embodiment.

Referring to FIG. 24, the camera module 1000-3 may include a first camera module 100-1 including a first lens moving apparatus 100a and a second camera module 100-4 including a second lens moving apparatus 100d.

The first lens moving apparatus 100a may be the embodiment 100 shown in FIG. 2 or may be configured such that the balancing magnet 185 is omitted from the embodiment shown in FIG. 2. The first camera module 100-1 may be the camera module 200 shown in FIG. 19.

The second lens moving apparatus 100d may be a closed loop autofocus (CLAF) lens moving apparatus, and the second camera module 100-4 may include a CLAF lens moving apparatus instead of the lens moving apparatus 100 of the camera module 200 shown in FIG. 19.

Figure 25:
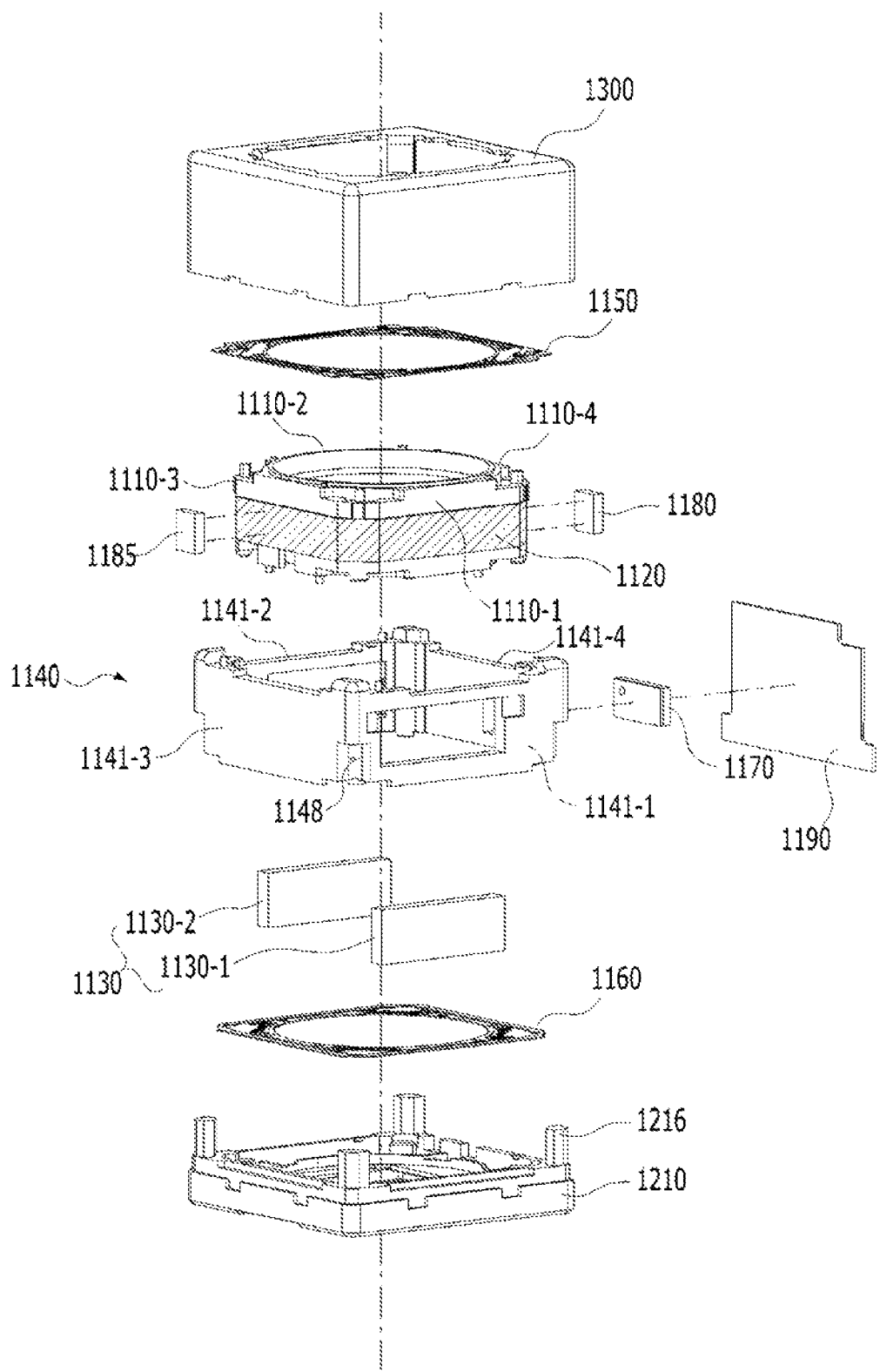
FIG. 25 shows an embodiment of a second lens moving apparatus of FIG. 24.

FIG. 25 shows an embodiment of the second lens moving apparatus 100d of FIG. 24.

Referring to FIG. 25, the second lens moving apparatus 100d may include a bobbin 1110, a coil 1120, a first magnet 1130-1, a second magnet 1130-2, a housing 1140, an upper elastic member 1150, a lower elastic member 1160, a circuit board 1190, a position sensor 1170, and a sensing magnet 1180.

In addition, the second lens moving apparatus 100d may include a balancing magnet 1185, a cover member 1300, and a base 1210.

The bobbin 1110 may have an opening, in which a lens or a lens barrel is mounted.

The coil 1120 may be disposed at the outer surface of the bobbin 1110. For example, the coil 1120 may have a closed-curved shape, such as a ring shape, in which the coil is wound around the outer circumferential surface of the bobbin 1100 in a rotational direction about the optical axis. However, the disclosure is not limited thereto. In another embodiment, the coil 1120 may include a first coil unit opposite the first magnet 1130-1 and a second coil unit opposite the second magnet 1130-2. Each of the first coil unit and the second coil unit may be a coil ring or a ring-shaped coil block, and may be fixed to the outer surface of the bobbin 1110. The first coil unit and the second coil unit may be connected to each other.

The sensing magnet 1180 may be disposed at one side portion (or one side surface) of the bobbin 1110, and the balancing magnet 1185 may be disposed at another side portion (or another side surface) of the bobbin 1110 opposite the one side portion of the bobbin 1110. The balancing magnet 1185 may offset or reduce the effect of electromagnetic force due to magnetic field interference between the sensing magnet 1180 and the first and second magnets 1130-1 and 130-2.

The bobbin 1110 may be provided in the one side portion thereof with a first seating recess, in which the sensing magnet 1180 is seated, and the bobbin 1110 may be provided in the other side portion thereof with a second seating recess, in which the balancing magnet 1185 is seated.

The sensing magnet 1180 may be disposed inside the coil 1120 in the state of being disposed in the first seating recess, and the balancing magnet 1185 may be disposed inside the coil 1120 in the state of being disposed in the second seating recess. Here, the inside of the coil 1120 may be the side of the coil 1120 toward the center of the bobbin 1110.

The housing 1140 may include an opening configured to receive the bobbin 1110, at which the coil 1120 is disposed, therein, and the bobbin 1110 may be disposed inside the housing 1140.

For example, the housing 1140 may include first to fourth side portions 1141-1 to 1141-4 spaced apart from each other and first to fourth corner portions spaced apart from each other. The first and second side portions 1141-1 and 1141-2 of the housing 1140 may be opposite each other. Third and fourth side portions 1141-3 and 1141-4 of the housing 1140 may be located between the first side portion 1141-1 and the second side portion 1141-2 of the housing 1140, and may be opposite each other.

The first magnet 1130-1 may be disposed at the first side portion 1141-1 of the housing 1140, and the second magnet 1130-2 may be disposed at the second side portion 1141-2 of the housing 1140.

Each of the first and second magnets 1130-1 and 1130-2 may be a monopolar magnetized magnet or a bipolar magnetized magnet.

The position sensor 1170 and the circuit board 1190 may be disposed at the fourth side portion 1141-4 of the housing 1140 so as to correspond to the sensing magnet 1180.

For example, the circuit board 1190 may be disposed at the outer surface of the fourth side portion 1141-4 of the housing 1140, and the position sensor 1170 may be disposed or mounted on the circuit board 1190.

The sensing magnet 1180 may be disposed at the side portion 1110-4 (or the side surface) of the bobbin 1110 corresponding to or opposite the fourth side portion 1141-4 of the housing 1140.

The balancing magnet 1185 may be disposed at the side portion 1110-3 (or the side surface) of the bobbin 1110 corresponding to or opposite the third side portion 1141-3 of the housing 1140.

In another embodiment, the circuit board 1190 and the position sensor 1170 may be disposed at the third side portion 1141-3 of the housing 1140, the sensing magnet 1180 may be disposed at the side portion (or the side surface) of the bobbin 1110 corresponding to the third side portion 1141-3 of the housing 1140, and the balancing magnet 1185 may be disposed at the side portion 1110-4 of the bobbin 1110 corresponding to the fourth side portion 1141-4 of the housing 1140.

The bobbin 1110 may be moved in the optical-axis direction by electromagnetic force due to electromagnetic interaction between the coil 1120 and the first and second magnets 1130-1 and 1130-2. The position sensor 1170 may sense a change in the intensity of a magnetic field of the sensing magnet 1180 mounted to the bobbin 1110 as the result of movement of the bobbin 1110, and may output an output signal (e.g. output voltage) based on the result of sensing. The position sensor 1170 may be a Hall sensor or a driver IC including a Hall sensor and a driver.

The upper elastic member 1150 may be coupled to the upper portion, the upper surface, or the upper end of the bobbin 1110 and to the upper portion, the upper surface, or the upper end of the housing 1140. For example, the upper elastic member 1150 may include at least one upper spring.

The lower elastic member 1160 may be coupled to the lower portion, the lower surface, or the lower end of the bobbin 1110 and to the lower portion, the lower surface, or the lower end of the housing 1140. For example, the lower elastic member 1160 may include at least one lower spring.

For example, at least one of the upper elastic member 1150 and the lower elastic member 1160 may include two or more springs separated from each other.

The coil 1120 may be connected to at least one of the upper elastic member 1150 and the lower elastic member 1160. In addition, at least one of the upper elastic member 1150 and the lower elastic member 1160 may be connected to the circuit board 1190.

The circuit board 1190 may include a plurality of terminals for connection with the outside. The position sensor 1170 may be connected to a corresponding one of the plurality of terminals of the circuit board 1190.

The coil 1120 may be connected to a corresponding one of the plurality of terminals of the circuit board 1190 via the upper elastic member 1150 or the lower elastic member 1160.

The base 1210 may be disposed under the housing 1140. For example, the base 1210 may be disposed under the lower elastic member 1160.

The cover member 1300 may be formed in the shape of a box, the lower portion of which is open and which includes an upper plate and side plates, and may cover the housing 1140 and the bobbin 1110. The lower portion of the cover member 1300 may be coupled to the upper portion of the base 1210. The base 1210 and the cover member 1300 may form a receiving space for the bobbin 1110 and the housing 1140.

The base 1210 may have an opening corresponding to the opening of the bobbin 1110 and/or the opening of the housing 1140.

The housing 1140 may be provided in the first to fourth corner portions thereof with guide recesses 1148, into which guide portions 1216 of the base 1210 are inserted, and the guide portions 1216 of the base 1210 may be fastened or coupled to the guide recesses 1148 of the housing 1140 using an adhesive member (not shown), such as epoxy or silicone.

Referring to FIGS. 24 and 25, the first lens moving apparatus 100*a* and the second lens moving apparatus 100*b* may be disposed adjacent to each other, and a description of d1 of FIGS. 21A and 21B may be applied to the distance therebetween.

The first lens moving apparatus 100*a* may include a first housing 140 including a first side portion and a second side portion opposite each other and a third side portion and a fourth side portion opposite each other, a first bobbin 110 disposed in the first housing 140, a first magnet 130-1 disposed at the first side portion of the first housing 140, a second magnet 130-3 disposed at the second side portion of the first housing 140, a third magnet 130-3 disposed at the third side portion of the first housing 140, a dummy member 135 and a first coil sensor 170 disposed at the fourth side portion of the first housing 140, a first coil 120 including a first coil unit 120-1 disposed at the first bobbin 110 so as to be opposite the first magnet 130-1 and a second coil unit 120-2 disposed at the first bobbin 110 so as to be opposite the second magnet 130-2, and a sensing magnet 180 (or a fourth magnet) disposed at the first bobbin so as to be opposite the first position sensor 170.

The second lens moving apparatus 100*d* may include a second bobbin 1110, a coil 1120 disposed at the second bobbin 1110, a first magnet 1130-1 and a second magnet 1130-2 opposite the coil 1120, a position sensor 1170, and a sensing magnet 1180 (or a third magnet) disposed at the second bobbin 1110 so as to be opposite the position sensor 1170. In addition, when viewed from above, the first dummy member 135 of the first lens moving apparatus 100*a* may be disposed between the third magnet 130-3 of the first lens moving apparatus 100*a* and the sensing magnet 1180 of the second lens moving apparatus 100*d*.

The fourth side portion 141-4 of the first housing 140 of the first lens moving apparatus 100*a* and the third side portion 1141-3 of the second housing 1140 of the second lens moving apparatus 100*d* may be disposed adjacent to each other.

For example, the fourth side portion 141-4 of the first housing 140 and the third side portion 1141-3 of the second housing 1140 may be disposed parallel to each other. However, the disclosure is not limited thereto.

The dummy member 135 of the first lens moving apparatus 100*a* and the balancing magnet 1185 of the second lens moving apparatus 100*d* may be disposed at a corresponding one of the fourth side portion 141-4 of the first housing 140 and the third side portion 1141-3 of the second housing 1140 located adjacent to each other.

For example, the distance D21 between the dummy member 135 and the balancing magnet 1185 may be less than the distance D22 between the first magnet 130-1 (or the second magnet 130-2) of the first lens moving apparatus 100*a* and the first magnet 1130-1 (or the second magnet 1130-2) of the second lens moving apparatus 100*d* (D21<D22).

In addition, for example, the distance D21 may be less than the distance D23 between the third magnet 130-3 of the first lens moving apparatus 100a and the balancing magnet 1185 of the second lens moving apparatus 100d (D21<D23).

In addition, for example, the distance D21 may be less than the distance D24 between the first magnet 130-1 (or the second magnet 130-2) of the first lens moving apparatus 100a and the balancing magnet 1185 of the second lens moving apparatus 100d (D21<D24).

Since D21 is less than D22 to D24, it is possible to reduce effects on AF driving force and OIS driving force due to magnetic field interference between the first and second magnets 130-1 and 130-2 of the first lens moving apparatus 100a and the first and second magnets 1130-1 and 1130-2 of the second lens moving apparatus 100d.

For example, the first and second magnets 130-1 and 130-2 of the first lens moving apparatus 100a and the first and second magnets 1130-1 and 1130-2 of the second lens moving apparatus 100d may not overlap each other in a direction from the fourth side portion 141-4 of the first housing 140 to the third side portion 1141-3 of the second housing 1140.

For example, the sensing magnet 180 of the first lens moving apparatus 100a may overlap the balancing magnet 1185 of the second lens moving apparatus 100d in the direction from the fourth side portion 141-4 of the first housing 140 to the third side portion 1141-3 of the second housing 1140. However, the disclosure is not limited thereto. In another embodiment, both may not overlap each other.

A second lens moving apparatus according to another embodiment may have magnet disposition different from FIGS. 24 and 25. For example, as a modification of FIGS. 24 and 25, a second lens moving apparatus according to another embodiment may include a magnet disposed at at least one of four side portions of a housing of the second lens moving apparatus. For example, the second lens moving apparatus according to the other embodiment may include four magnets disposed at the four side portions of the housing. However, the disclosure is not limited thereto.

In addition, as a modification of FIGS. 24 and 25, a second lens moving apparatus according to a further embodiment may include a magnet disposed at at least one of four corners of a housing of the second lens moving apparatus. For example, the second lens moving apparatus according to the further embodiment may include four magnets disposed at the four corners of the housing. However, the disclosure is not limited thereto.

Figure 26A:
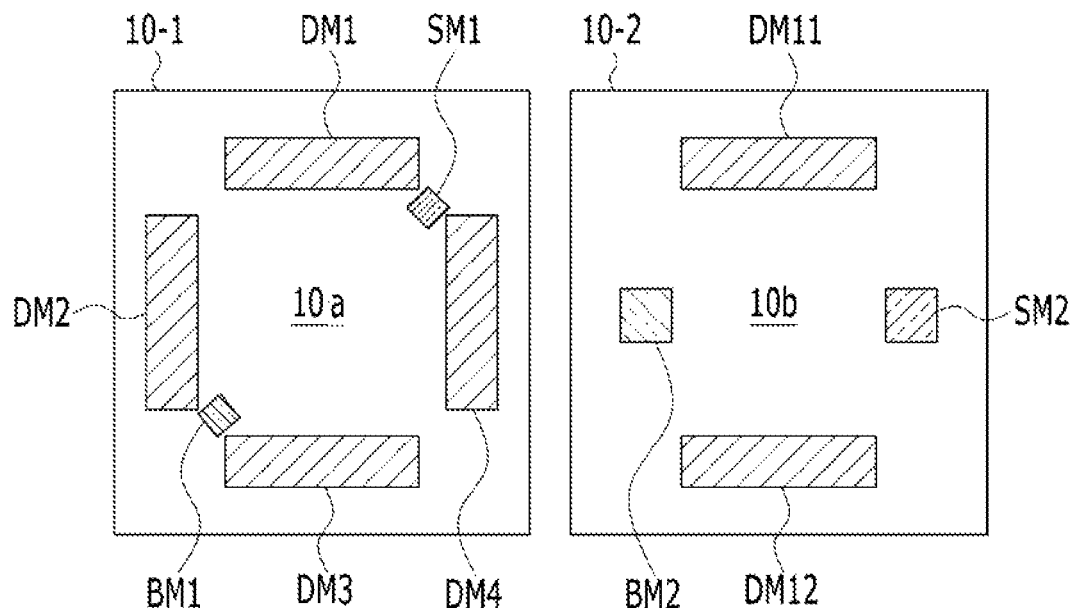
FIG. 26A shows an example of disposition of magnets, a sensing magnet, and a balancing magnet of two adjacent lens moving apparatuses of a dual camera.

FIG. 26A shows an example of disposition of magnets, a sensing magnet, and a balancing magnet of two adjacent lens moving apparatuses of a dual camera.

Referring to FIG. 26A, the dual camera may include a first camera module 10-1 including a first lens moving apparatus 10a for OIS and a second camera module 10-2 including a first lens moving apparatus 10b for CLAF.

A fourth side portion of a first housing (not shown) of the first lens moving apparatus 10a for OIS and a fourth side portion of a second housing (not shown) of the first lens moving apparatus 10b for CLAF may be disposed adjacent to each other.

The first lens moving apparatus 10a for OIS may include four magnets DM1 to DM4, a first sensing magnet SM1, and a first balancing magnet BM1.

The four magnets DM1 to DM4 may be disposed at first to fourth side portions of the first housing, the first sensing magnet SM1 may be disposed at one side portion (or one side surface) of a bobbin corresponding to a first corner of the first housing adjacent to the fourth side portion of the first housing, and the first balancing magnet BM1 may be disposed at a side portion of the bobbin opposite to the side portion at which the first sensing magnet SM1 is disposed.

The first lens moving apparatus 10b for CLAF may include two magnets DM11 and DM12 disposed at first and second side portions of the second housing, a second balancing magnet BM2 disposed at a side portion of a bobbin opposite the fourth side portion of the second housing, and a second sensing magnet SM2 disposed at another side portion of the bobbin corresponding to or opposite a third side portion of the second housing opposite the fourth side portion of the second housing. Positions of the second balancing magnet BM2 and the second sensing magnet SM2 may be reversed.

In FIG. 26A, an OIS magnet is disposed at one of the fourth side portion of the first housing and the fourth side portion of the second housing, whereby the second balancing magnet (or the second sensing magnet) of the first lens moving apparatus 10b for CLAF may be subject to great magnetic field interference due to the magnet DM4 of the first lens moving apparatus 10a for OIS. In addition, reliability in AF operation and OIS operation of the first lens moving apparatus 10a for OIS and AF operation of the first lens moving apparatus 10b for CLAF may be deteriorated due to magnetic field interference between the magnet DM4 of the first lens moving apparatus 10a for OIS and the magnets DM11 and DM12 of the first lens moving apparatus 10b for CLAF.

Figure 26B:
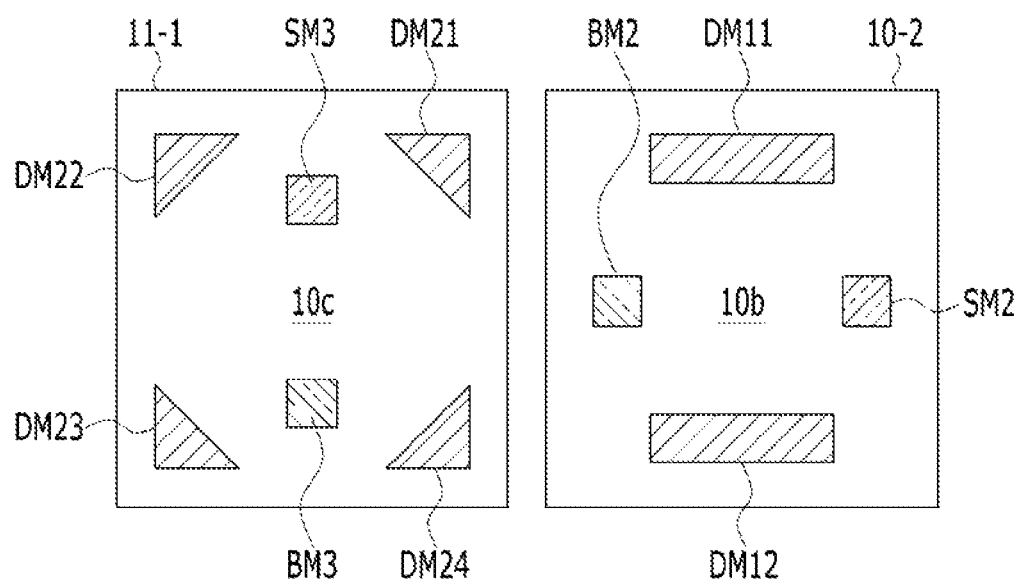
FIG. 26B shows another example of the disposition of the magnets, the sensing magnet, and the balancing magnet of the two adjacent lens moving apparatuses of the dual camera.

FIG. 26B shows another example of the disposition of the magnets, the sensing magnet, and the balancing magnet of the two adjacent lens moving apparatuses of the dual camera.

In order to reduce effects by the magnetic field interference described with reference to FIG. 26A, magnets DM21 to DM24, a sensing magnet SM3, and a balancing magnet BM3 may be disposed in a first lens moving apparatus 10c for OIS, as shown in FIG. 26B.

The first lens moving apparatus 10c may include a first housing including a first corner and a second corner opposite each other in a diagonal direction and a third corner and a fourth corner opposite each other in the diagonal direction, a first bobbin disposed in the first housing, a coil disposed at the first bobbin, first magnets DM21 to DM24 disposed at the first to fourth corners of the first housing, a position sensor disposed between the first corner and the third corner of the first housing adjacent to each other, and a sensing magnet SM3 (or a second magnet) disposed at the first bobbin so as to be opposite the position sensor.

The second lens moving apparatus 10b may include a second bobbin, a coil disposed at the second bobbin, a first magnet DM11 and a second magnet DM12 opposite the coil, a position sensor 1170, and a sensing magnet SM2 (or a third magnet) disposed at the second bobbin so as to be opposite the position sensor. The second lens moving apparatus 10b may be disposed adjacent to the second corner and the third corner of the first housing of the first lens moving apparatus 10c, and the direction in which the first magnet DM11 and the second magnet DM12 of the second lens moving apparatus 10b are opposite each other may correspond to the direction in which the third corner and the second corner of the first housing of the first lens moving apparatus 10c are joined to each other.

A fourth side portion of the first housing of the first lens moving apparatus 10c and a fourth side portion of the second housing of the second lens moving apparatus 10b may be disposed adjacent to each other. A third side portion of the first housing may be opposite the fourth side portion of the first housing, and a first side portion and a second side portion of the first housing may be disposed between the third side portion and the fourth side portion of the first housing so as to be opposite each other.

The magnets DM21 to DM24 may be disposed at the corner portions of the first housing of the first lens moving apparatus 10c. Each of the corner portions of the first housing of the first lens moving apparatus 10c may be disposed at two adjacent side portions, among the first to fourth side portions of the first housing.

The sensing magnet SM3 may be disposed at a side surface of the bobbin opposite the first side portion of the first housing, and the balancing magnet BM3 may be disposed at a side portion of the bobbin opposite the second side portion of the first housing. In addition, positions of the balancing magnet BM3 and the sensing magnet SM3 may be reversed.

In FIG. 26B, the magnets DM21 to DM24 are disposed at the corner portions of the first housing, whereby the first lens moving apparatus and the second lens moving apparatus have different coordinate axes for indicating OIS driving directions, and therefore it is necessary to correct the position information value of a gyro sensor. As a result, the driving speed of the camera module may be reduced.

Also, in FIG. 26B, the balancing magnet is necessary to offset magnetic field interference of the sensing magnet in the first lens moving apparatus 10c.

Also, in FIG. 26B, a position sensor must be disposed at the first side portion of the first housing opposite the side portion of the bobbin at which the sensing magnet SM3 is disposed. Since the magnets are disposed at the corners of the first housing adjacent to the first side portion of the first housing, however, a space in which the position sensor is to be mounted is not sufficient. Particularly, an integrated AF driver IC including a Hall sensor and a driver may not be mounted at the first housing, since the volume thereof is large.

According to the embodiment, on the other hand, in the camera module including two or more lens moving apparatuses, a dummy member 135 is disposed, but no magnet for AF or OIS is disposed, at one of two adjacent side portions of two housings of two adjacent lens moving apparatuses. Consequently, it is possible to reduce effects on AF driving force and OIS driving force due to magnetic field interference between magnets included in the two adjacent lens moving apparatuses, and therefore it is possible to secure reliability in AF operation and OIS operation.

Since the embodiment includes three magnets, the cost of the magnets may be reduced.

In addition, since the embodiment includes three magnets, the third magnet 130-3 serves as the balancing magnet even though the balancing magnet is not disposed at the side portion of the bobbin opposite the side portion of the bobbin at which the sensing magnet is located, whereby it is possible to obtain the effect of offsetting the magnetic field interference of the sensing magnet.

Also, in the embodiment, it is possible to secure a sufficient space to mount the position sensor therein since no magnet is disposed at the fourth side portion 141-4 of the housing.

Also, in the embodiment, in the case in which the magnets are disposed as shown in FIG. 22, it is not necessary to convert a gyro value of the gyro sensor, whereby it is possible to increase driving speed of the camera module.

Figure 27:
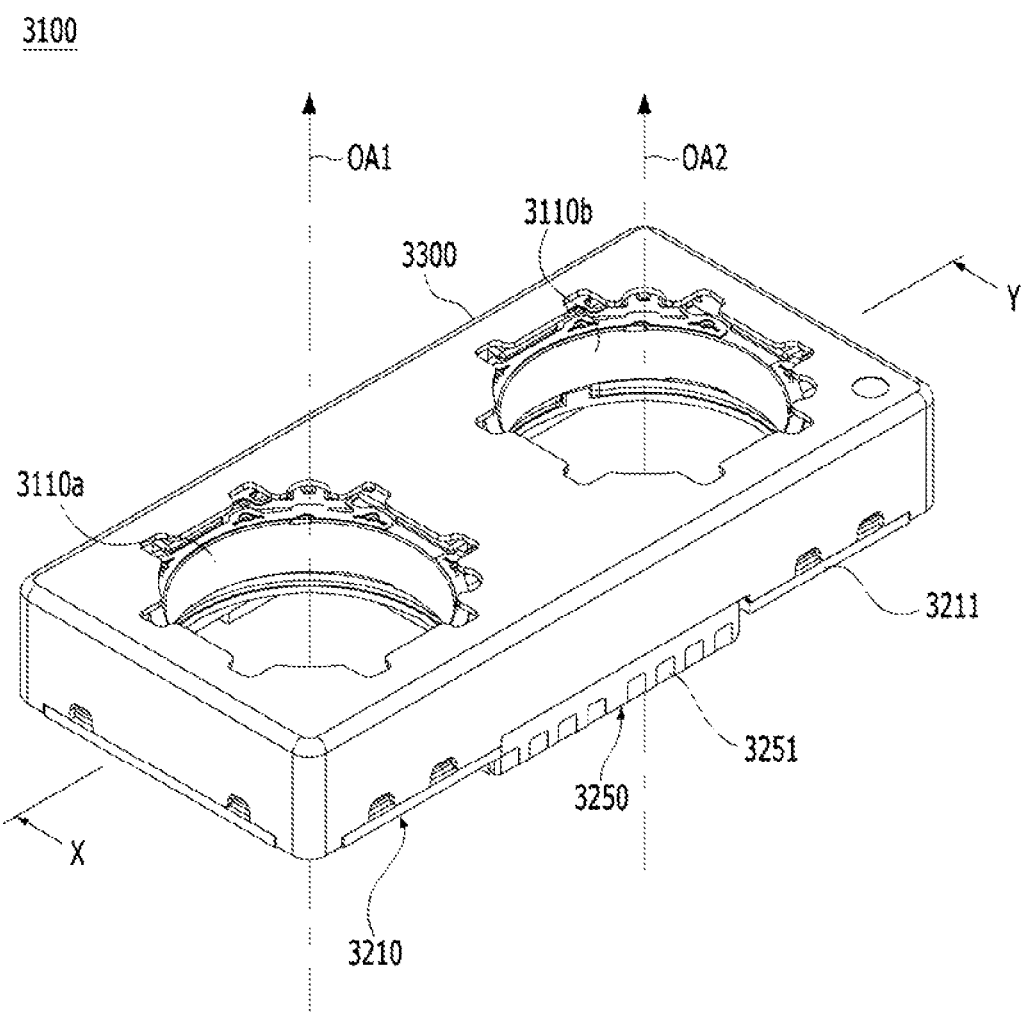
FIG. 27 is a perspective view of a lens moving apparatus according to another embodiment.
Figure 28:
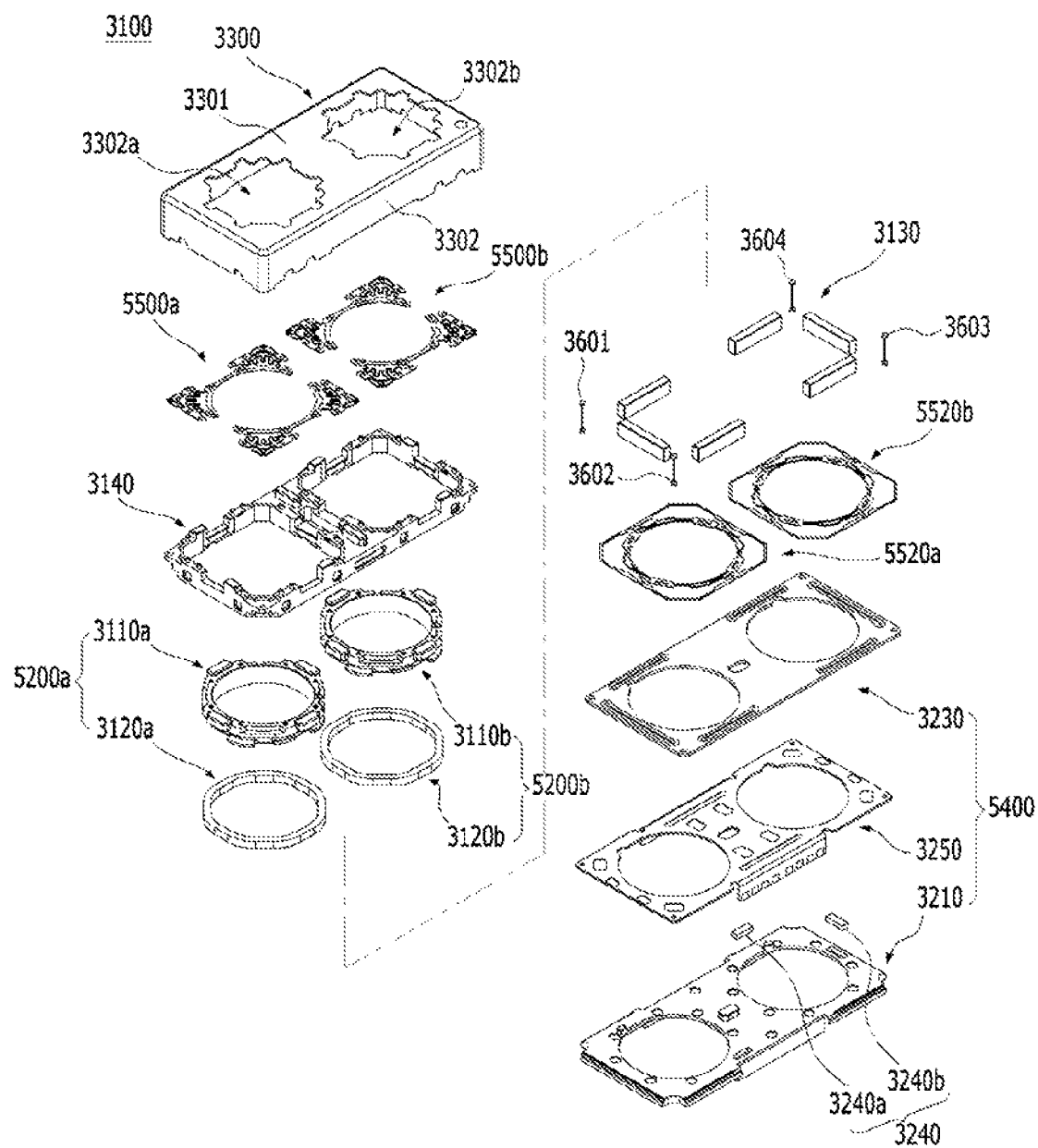
FIG. 28 is an exploded perspective view of the lens moving apparatus of FIG. 27.
Figure 29:
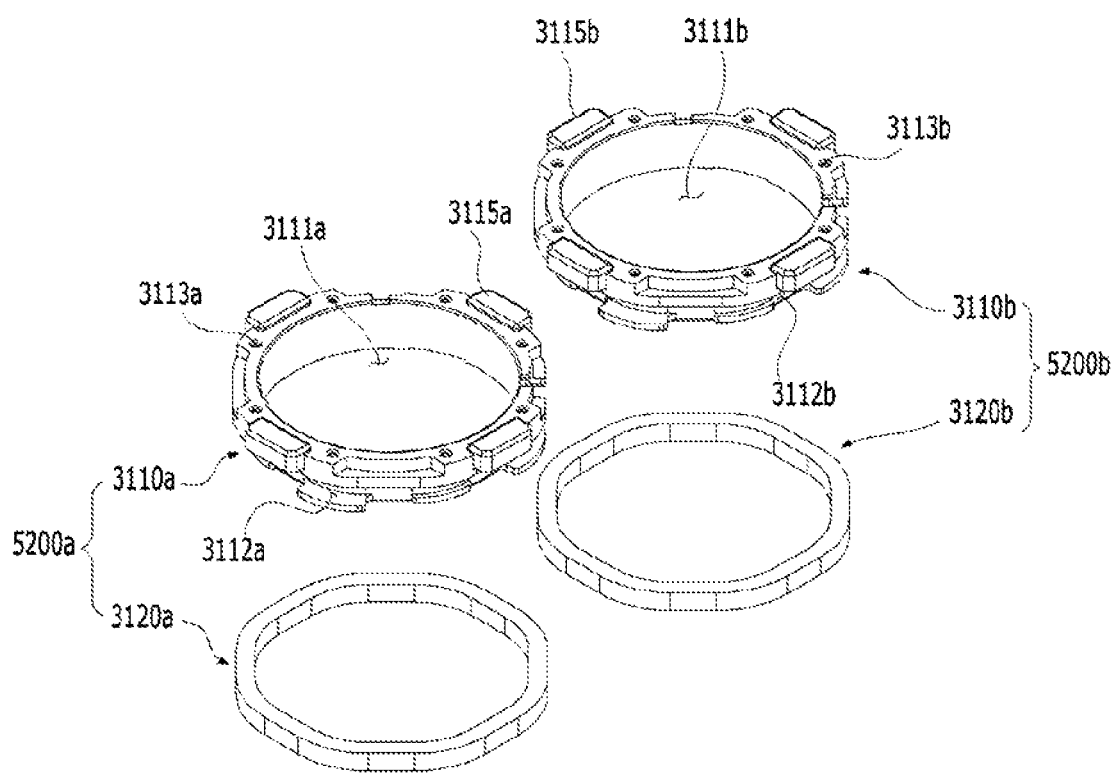
FIG. 29 is an exploded perspective view of a first AF mover and a second AF mover of FIG. 28.
Figure 30:
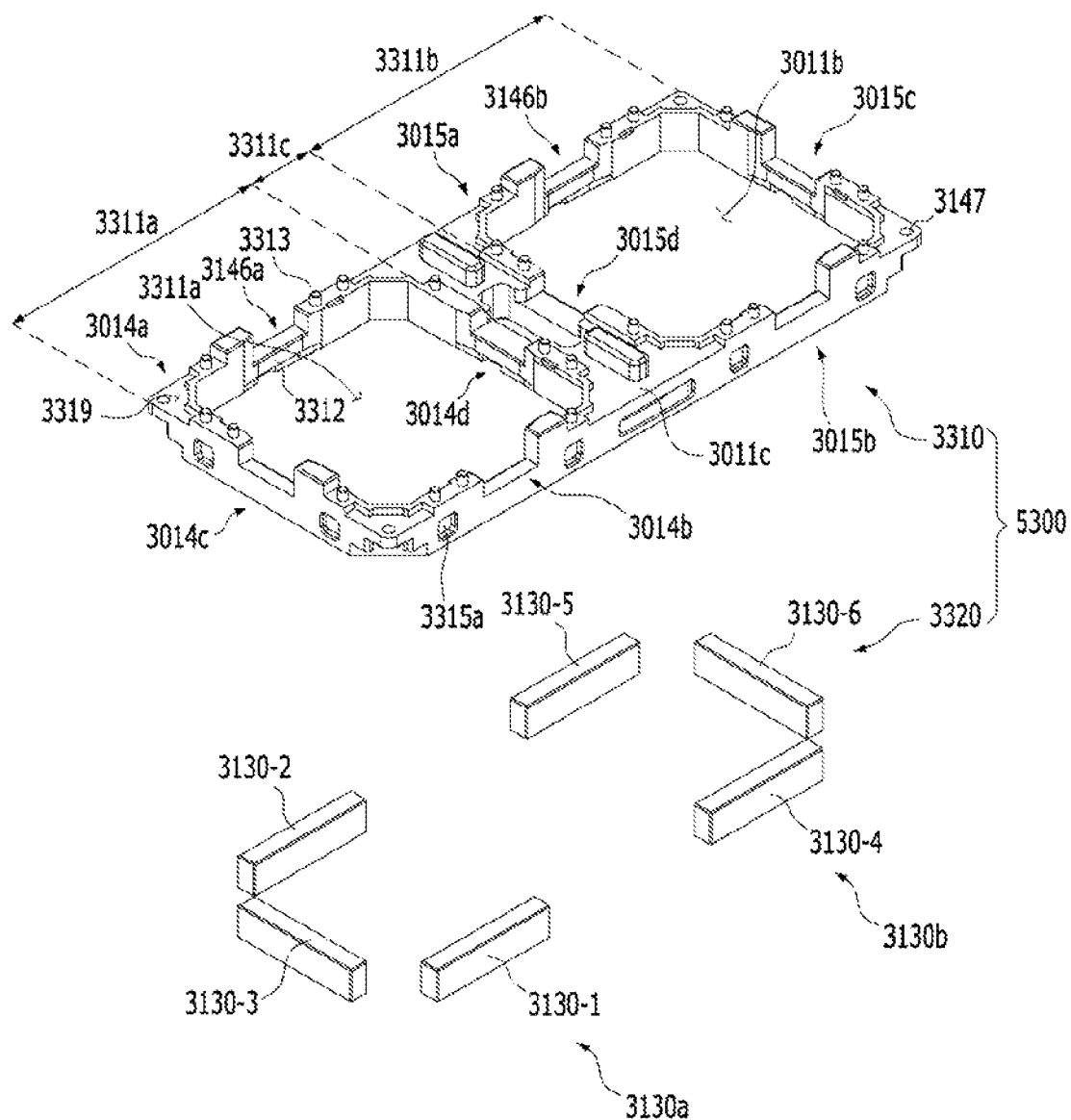
FIG. 30 is an exploded perspective view of an OIS mover.
Figure 31A:
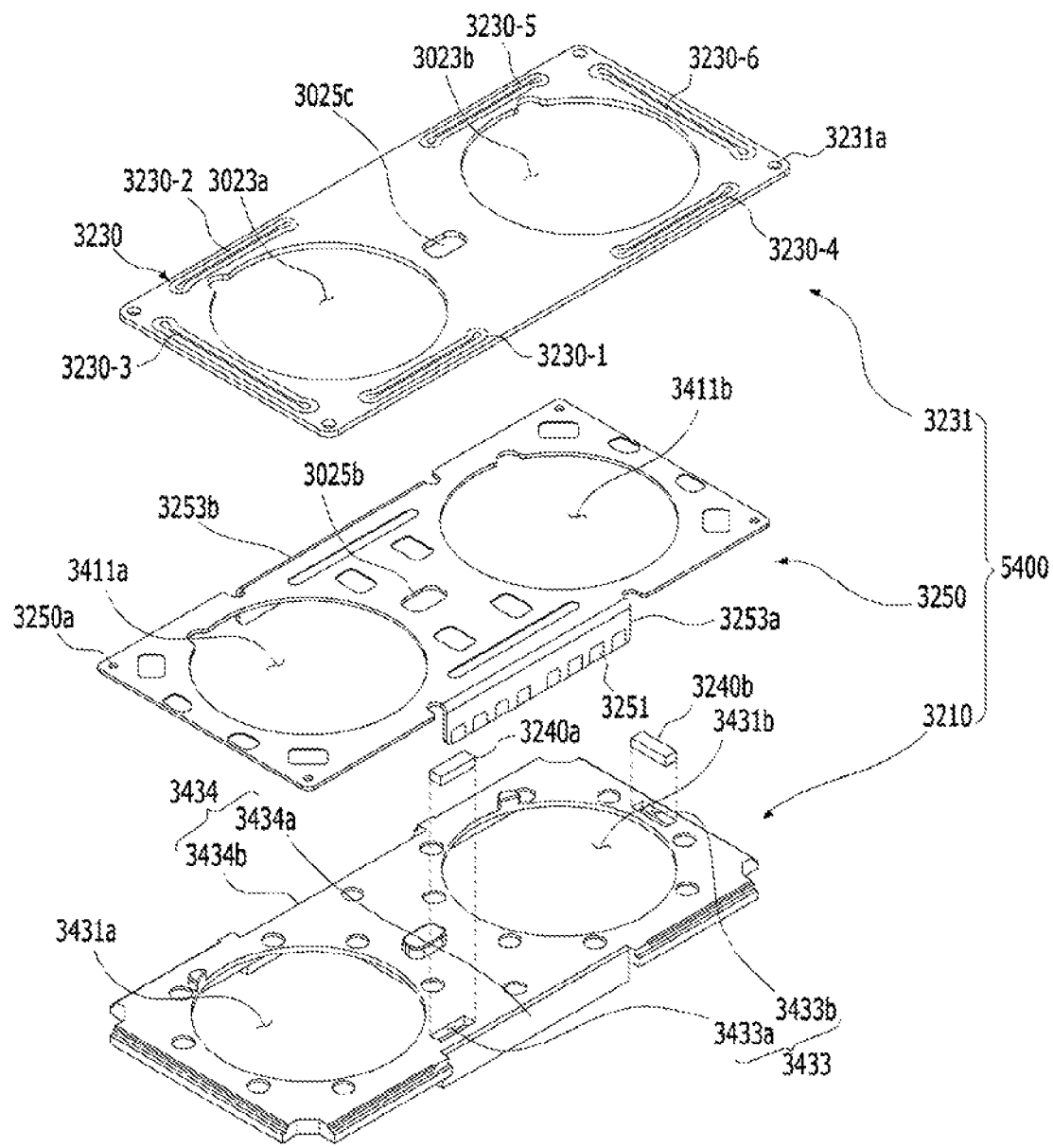
FIG. 31A is an exploded perspective view of a stator of FIG. 28.
Figure 31B:
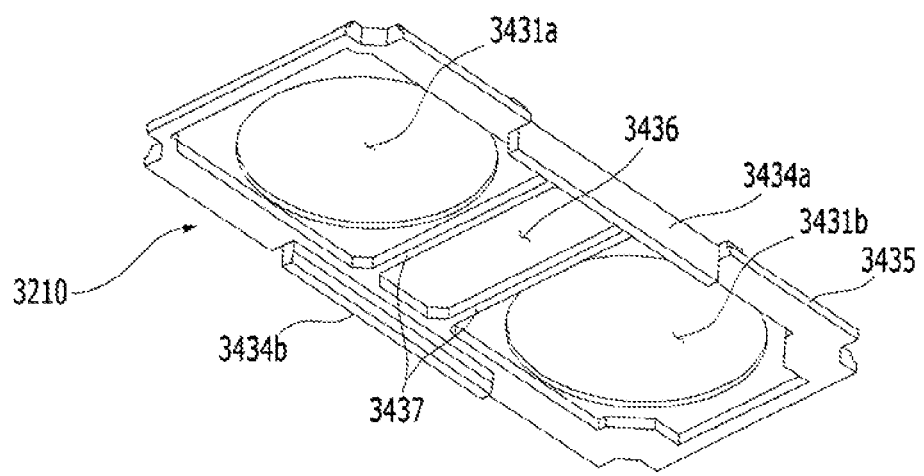
FIG. 31B is a bottom view of a base of FIG. 31A.
Figure 32:
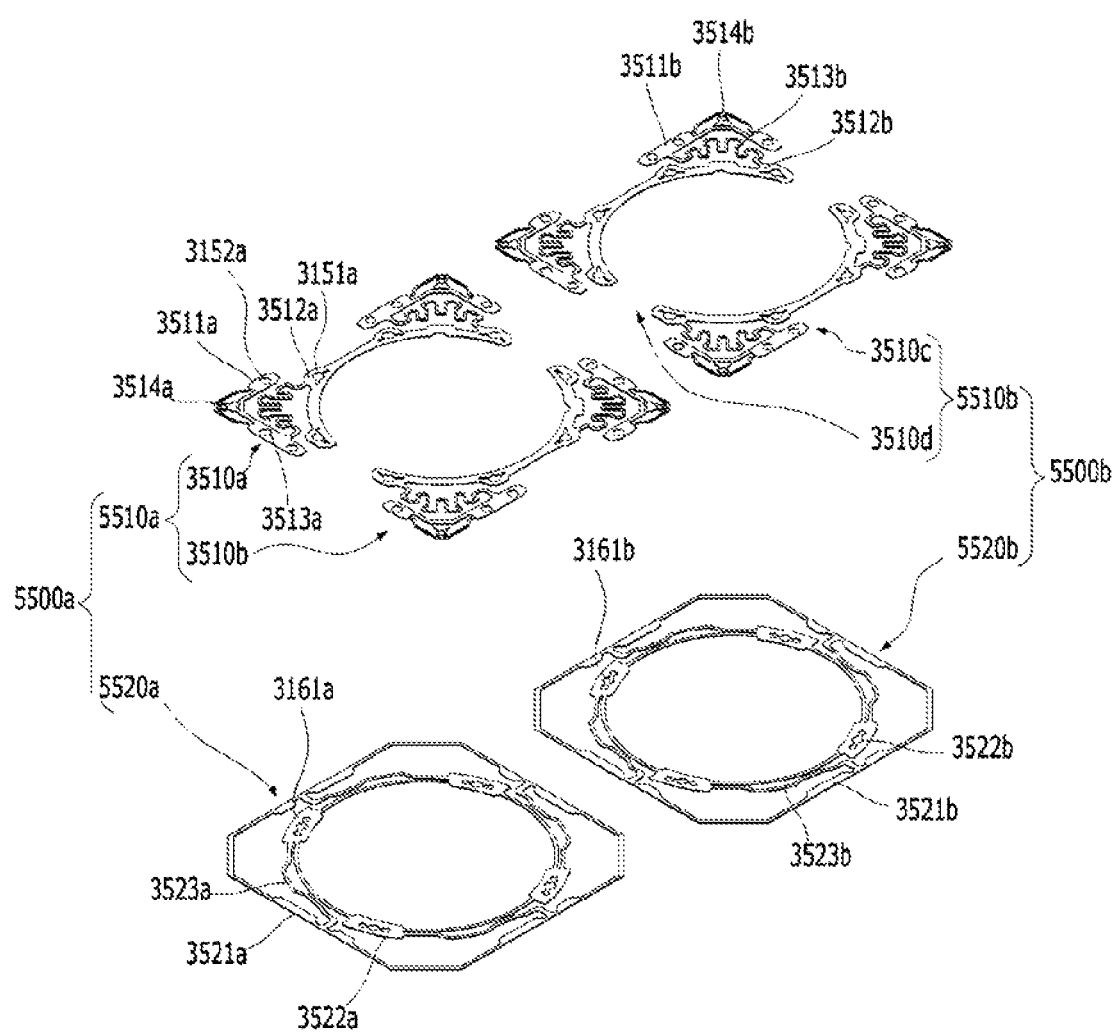
FIG. 32 is a perspective view of a first elastic member and a second elastic member of FIG. 28.
Figure 33:
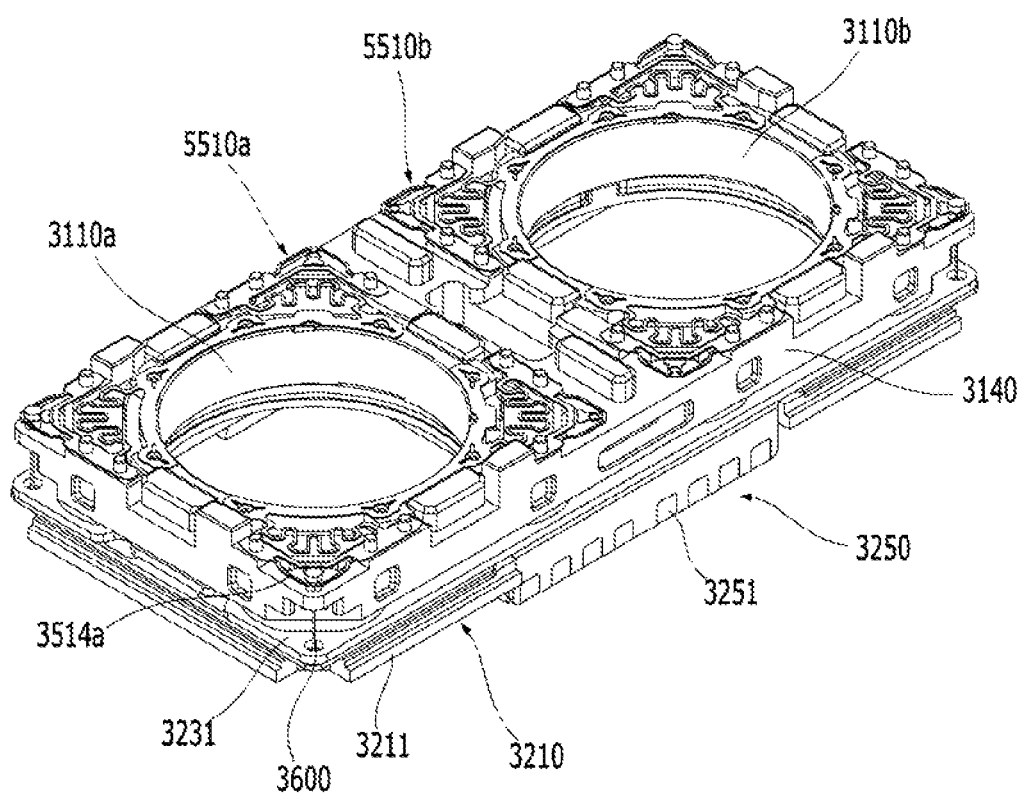
FIG. 33 is a plan view of the lens moving apparatus of FIG. 27 with a cover member removed.
Figure 34:
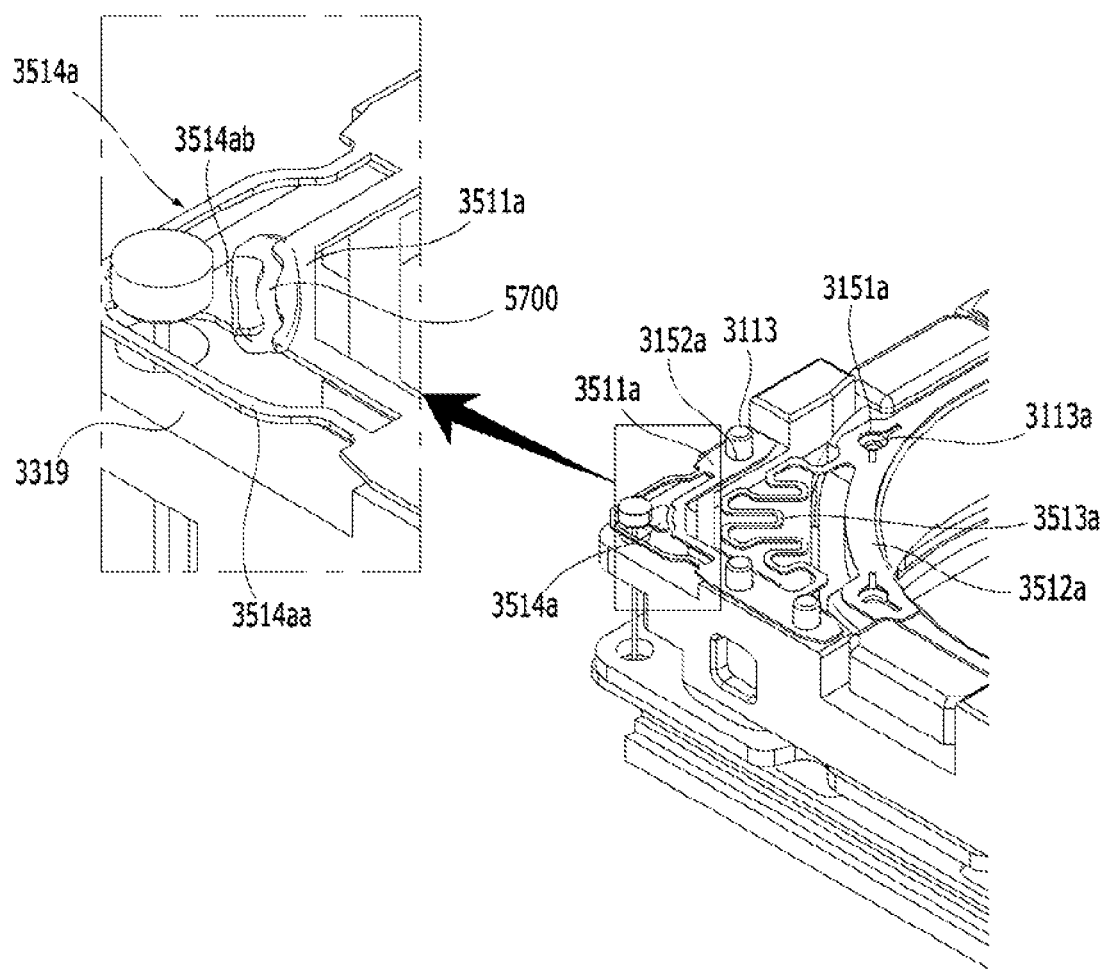
FIG. 34 is a partial enlarged view of FIG. 33.
Figure 35:
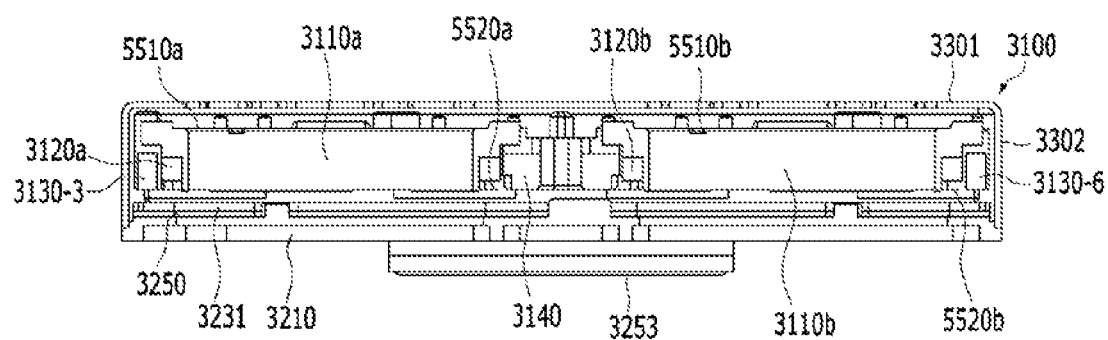
FIG. 35 is a sectional view of FIG. 27 when viewed from X-Y.

FIG. 27 is a perspective view of a lens moving apparatus 3100 according to another embodiment, FIG. 28 is an exploded perspective view of the lens moving apparatus 3100 of FIG. 27, FIG. 29 is an exploded perspective view of a first AF mover 5200a and a second AF mover 5200b of FIG. 28, FIG. 30 is an exploded perspective view of an OIS mover 5300, FIG. 31A is an exploded perspective view of a stator 5400 of FIG. 28, FIG. 31B is a bottom view of a base 3210 of FIG. 31A, FIG. 32 is an exploded perspective view of a first elastic member 5500a and a second elastic member 5500b of FIG. 28, FIG. 33 is a perspective view of the lens moving apparatus 3100 of FIG. 27 with a cover member 3300 removed, FIG. 34 is a partial enlarged view of FIG. 33, and FIG. 35 is a sectional view of FIG. 27 when viewed in an X-Y direction.

For example, the lens moving apparatus 3100 of FIG. 27 may be referred to as a "dual lens moving apparatus" since two lens modules can be mounted. Also, in the following description, the "coil" may refer to a coil unit, and the "elastic member" may refer to an elastic unit or a spring.

Referring to FIGS. 27 to 35, the lens moving apparatus 3100 may include a cover member 3300, a first AF mover 5200a, a second AF mover 5200b, an OIS mover 5300, a stator 5400, a first elastic member 5500a, a second elastic member 5500b, and a sensor 5800.

In addition, the lens moving apparatus 3100 may further include a supporting member 3600 and a damper 5700.

In another embodiment, however, at least one of the cover member 3300, the first AF mover 5200a, the second AF mover 5200b, the OIS mover 5300, the stator 5400, the first elastic member 5500a, the second elastic member 5500b, the supporting member 3600, the damper 5700, and the sensor 5800 may be omitted from the lens moving apparatus 3100. In particular, the sensor 5800, which is configured to perform handshake compensation feedback control, may be omitted.

In the aspect of AF driving, the lens moving apparatus 3100 may include a first lens moving unit and a second lens moving unit. For example, the first lens moving unit may include a first magnet unit including a first AF mover 5200a and first to third magnets 3130-1 to 3130-3.

In addition, for example, the second lens moving unit may include a second magnet unit including a second AF mover 5200b and fourth to sixth magnets 3130-4 to 3130-6.

The cover member 3300 may define the external appearance of the lens moving apparatus 3100.

The cover member 3300 may have a hexahedral shape open at the lower part thereof. However, the disclosure is not limited thereto. The cover member 3300 may be made of a nonmagnetic material. In the case in which the cover member 3300 is made of a nonmagnetic material, the magnets 3130 may be affected by magnetic force of the cover member 3300. The cover member 3300 may be made of a metal material.

More specifically, a metal sheet may be used as the cover member 3300. In this case, the cover member 3300 may block electromagnetic interference (EMI). Due to such a characteristic of the cover member 3300, the cover member 3300 may be called an "EMI shield can."

The cover member 3300 may prevent electromagnetic waves generated outside the lens moving apparatus from being introduced inside the cover member 3300. In addition, the cover member 3300 may prevent electromagnetic waves generated outside the lens moving apparatus from being discharged outside the cover member 3300.

The cover member 3300 may include an upper plate 3301 and a side plate 3302.

The cover member 3300 may include an upper plate 3301 and a side plate 3302 bent and extending from the upper plate 3301. The cover member 3300 may include an upper plate 3301 and a side plate 3302 extending downwards from the outer periphery of the upper plate 3301.

The cover member 3300 may be coupled to a base 3210. For example, a portion of the side plate 3302 of the cover member 3300 may be coupled to the base 3210.

The lower end of the side plate 3302 of the cover member 3300 may be disposed at a step portion 3211 of the base 3210. The lower end of the side plate 3302 may be coupled to the base 3210. The inner surface of the side plate 3302 of the cover member 3300 may directly contact the outer surface of the base 3210.

The inner surface of the side plate 3302 of the cover member 3300 may be coupled to the base 3210 using an adhesive (not shown). In another example, the cover member 3300 may be directly coupled to the upper surface of a circuit board 5010.

At least one of the first AF mover 5200a, the second AF mover 5200b, the OIS mover 5300, the stator 5400, the first elastic member 5500a, the second elastic member 5500b, and the supporting member 3600 may be disposed in an inner space defined by the cover member 3300 and the base 3210. In this structure, it is possible for the cover member 3300 to protect internal components from external impact and to prevent permeation of external contaminants. The cover member 3300 may be integrally formed.

The cover member 3300 may include a first opening 3302a and a second opening 3302b. For example, each of the first opening 3302a and the second opening 3302b may be a through hole formed through the upper plate 3301 of the cover member 3300.

The cover member 3300 may be provided in the upper plate 3301 thereof with a first opening 3302a formed at a position corresponding to a first bobbin 3110a and a second opening 3302b formed at a position corresponding to a second bobbin 3110b.

The openings 3302a and 3302b of the cover member 3300 may be formed in the upper plate 3301 of the cover member 3300 so as to be spaced apart from each other. The first opening 3302a of the cover member 3300 may expose a first lens module mounted in the first bobbin 3110a, and the second opening 3302b of the cover member 3300 may expose a second lens module mounted in the second bobbin 3110b.

The first opening 3302a of the cover member 3300 may be formed in a shape corresponding to the shape of the first lens module, and the second opening 3302b of the cover member 3300 may be formed in a shape corresponding to the shape of the second lens module.

The size (e.g. the diameter) of each of the first and second openings 3302a and 3302b of the cover member 3300 may be greater than the diameter of a corresponding one of the lens modules such that the lens modules can be assembled through the openings 3302a and 3302b.

Light introduced through each of the first and second openings 3302a and 3302b of the cover member 3300 may pass through a corresponding one of the lens modules. At this time, the light, after passing through each lens module, may be converted into an electrical signal by an image sensor in order to acquire an image.

The first AF mover 5200a and the second AF mover 5200b will be described.

The first AF mover 5200a is coupled to the first lens module, or receives the first lens module therein. The second AF mover 5200b is coupled to the second lens module, or receives the second lens module therein.

Each of the first AF mover 5200a and the second AF mover 5200b may be moved through interaction with the OIS mover 5300 and/or the stator 5400. At this time, the first AF mover 5200a may be moved integrally with or together with the first lens module in order to perform an autofocus function, and the second AF mover 5200b may be moved integrally with or together with the second lens module. However, the second AF mover 5200b may be moved separately from the first AF mover 5200a. The movement direction of the second AF mover 5200b and the movement direction of the first AF mover 5200a may be parallel to each other.

For example, the outer peripheral surface of the first lens module may be coupled to the inner peripheral surface of the first AF mover 5200a, and the outer peripheral surface of the second lens module may be coupled to the inner peripheral surface of the second AF mover 5200b.

The first AF mover 5200a may include the first bobbin 3110a and a component configured to be moved with the first bobbin 3110a, and the second AF mover 5200b may include the second bobbin 3110b and a component configured to be moved with the second bobbin 3110b.

For example, the first AF mover 5200a may include the first bobbin 3110a and a first coil 3120a, and the second AF mover 5200b may include the second bobbin 3110b and a second coil 3120b.

However, at least one of the first bobbin 3110a and the first coil 3120a may be omitted from the first AF mover 5200a or may be changed, and at least one of the second bobbin 3110b and the second coil 3120b may be omitted from the second AF mover 5200b or may be changed.

The first bobbin 3110a and the second bobbin 3110b may be disposed at a housing 3140 of the OIS mover 5300.

For example, the first bobbin 3110a and the second bobbin 3110b may be disposed at the housing 3140 in the state of being spaced apart from each other so as to be moved in the first direction.

The first bobbin 3110a may be disposed in a first receiving unit 3011a of the housing 3140, and the second bobbin 3110b may be disposed in a second receiving unit 3011b of the housing 3140.

Each of the first bobbin 3110a and the second bobbin 3110b may be moved relative to the housing 3140 in an optical-axis direction.

The first bobbin 3110a may be disposed in the first receiving unit 3011a of the housing 3140 so as to be moved along a first optical axis, and the second bobbin 3110b may be disposed in the second receiving unit 3011b of the housing 3140 so as to be moved along a second optical axis.

The first bobbin 3110a may have a first opening 3111a for coupling with the first lens module, and the first opening 3111a may be a through hole formed through the center of the first bobbin 3110a.

The second bobbin 3110b may have a second opening 3111b for coupling with the second lens module, and the second opening 3111b may be a through hole formed through the center of the second bobbin 3110b.

For example, the outer peripheral surface of the first lens module may be coupled to the inner peripheral surface of the first bobbin 3110a formed by the first opening 3111a, and the outer peripheral surface of the second lens module may be coupled to the inner peripheral surface of the second bobbin 3110b formed by the second opening 3111b.

For example, a screw thread corresponding to a screw thread formed at the outer peripheral surface of the first lens module may be formed at the inner peripheral surface of the first opening 3111a, and a screw thread corresponding to a screw thread formed at the outer peripheral surface of the second lens module may be formed at the inner peripheral surface of the second opening 3111b.

For example, the first lens module may be screw-engaged with the first opening 3111a of the first bobbin 3110a, and the second lens module may be screw-engaged with the second opening 3111b of the second bobbin 3110b.

For example, an adhesive may be disposed between the first lens module and the first bobbin 3110a and between the second lens module and the second bobbin 3110b. At this time, the adhesive may be epoxy hardened by at least one of ultraviolet (UV) light, heat, and laser.

The first coil 3120a may be disposed at the first bobbin 3110a, and the second coil 3120b may be disposed at the second bobbin 3110b. The first coil 3120a may be coupled to the first bobbin 3110a, and the second coil 3120b may be coupled to the second bobbin 3110b.

For example, the first coil 3120a may be coupled to the outer surface of the first bobbin 3110a, and the second coil 3120b may be coupled to the outer surface of the second bobbin 3110b.

The first bobbin 3110a may be provided at the outer surface thereof with a first driving unit coupling portion 3212a, at which the first coil 3120a is disposed or to which the first coil 3120a is coupled, and the second bobbin 3110b may be provided at the outer surface thereof with a second driving unit coupling portion 3212b, at which the second coil 3120b is disposed or to which the second coil 3120b is coupled.

The first driving unit coupling portion 3212a may be formed as a recess depressed inwardly from at least a portion of the outer surface of the first bobbin 3110a, and the second driving unit coupling portion 3212b may be formed as a recess depressed inwardly from at least a portion of the outer surface of the second bobbin 3110b.

At least a portion of the first coil 3120a may be received in the first driving unit coupling portion 3212a, and at least a portion of the second coil 3120b may be received in the second driving unit coupling portion 3212b.

The first driving unit coupling portion 3212a may be formed integrally with the outer surface of the first bobbin 3110a, and the second driving unit coupling portion 3212b may be formed integrally with the outer surface of the second bobbin 3110b.

For example, the first driving unit coupling portion 3212a may be continuously formed along the outer surface of the first bobbin 3110a, and the second driving unit coupling portion 3212b may be continuously formed along the outer surface of the second bobbin 3110b.

For example, the first coil 3120a may be wound around the first driving unit coupling portion 3212a, and the second coil 3120b may be wound around the second driving unit coupling portion 3212b. In another example, the first driving unit coupling portion 3212a may include a plurality of first driving unit coupling portions spaced apart from each other, and the first coil 3120a may include a plurality of coil units disposed at the plurality of first driving unit coupling portions. In addition, the second driving unit coupling portion 3212b may include a plurality of second driving unit coupling portions spaced apart from each other, and the second coil 3120b may include a plurality of coil units disposed at the plurality of second driving unit coupling portions.

A first coupling portion 3113a configured to be coupled to an inner portion 3512a of a first upper elastic member 5510a may be formed at the upper surface of the first bobbin 3110a, and a first coupling portion 3113b configured to be coupled to an inner portion 3512b of a second upper elastic member 5510b may be formed at the upper surface of the second bobbin 3110b.

For example, the first coupling portion 3113a of the first bobbin 3110a may be coupled to a second coupling hole 3151a formed in the inner portion 3512a of the first upper elastic member 5510a, and the first coupling portion 3113b of the second bobbin 3110b may be coupled to a second coupling hole 3151b formed in the inner portion 3512b of the second upper elastic member 5510b.

The first coupling portion 3113a of the first bobbin 3110a may be formed as the result of a portion of the upper surface of the first bobbin 3110a being depressed, and the first coupling portion 3113b of the second bobbin 3110b may be formed as the result of a portion of the upper surface of the second bobbin 3110b being depressed.

For coupling with the first and second upper elastic members 5510a and 5510b, each of the first coupling portion 3113a of the first bobbin 3110a and the first coupling portion 3113b of the second bobbin 3110b may receive an adhesive therein.

The first coupling portion 3113a of the first bobbin 3110a may be formed at a position corresponding to the second coupling hole 3151a formed in the inner portion 3512a of the first upper elastic member 5510a. The first coupling portion 3113b of the second bobbin 3110b may be formed at a position corresponding to the second coupling hole 3151b formed in the inner portion 3512b of the second upper elastic member 5510b.

The first coupling portion 3113a of the first bobbin 3110a may be formed in a shape corresponding to the shape of the second coupling hole 3151a formed in the inner portion 3512a of the first upper elastic member 5510a. The first coupling portion 3113b of the second bobbin 3110b may be formed in a shape corresponding to the shape of the second coupling hole 3151b formed in the inner portion 3512b of the second upper elastic member 5510b.

In addition, the first coupling portion 3113a or 3113b of each of the first bobbin 3110a and the second bobbin 3110b may be a recess. However, the disclosure is not limited thereto. In another embodiment, each coupling portion may be a protrusion or have a planar shape.

A second coupling portion (not shown) for coupling with an inner portion 3522a of a first lower elastic member 5520a may be formed at the lower surface of the first bobbin 3110a, and a second coupling portion (not shown) for coupling with an inner portion 3522b of a second lower elastic member 5520b may be formed at the lower surface of the second bobbin 3110b.

For example, the second coupling portion of the first bobbin 3110a may be coupled to a third coupling hole 3161a formed in the inner portion 3522a of the first lower elastic member 5520a, and the second coupling portion of the second bobbin 3110b may be coupled to a third coupling hole 3161b formed in the inner portion 3522b of the second lower elastic member 5520b.

The second coupling portion of the first bobbin 3110a may be formed as the result of a portion of the lower surface of the first bobbin 3110a being depressed, and the second coupling portion of the second bobbin 3110b may be formed as the result of a portion of the lower surface of the second bobbin 3110b being depressed.

For coupling with the first and second lower elastic members 5520a and 5520b, each of the second coupling portion of the first bobbin 3110a and the second coupling portion of the second bobbin 3110b may receive an adhesive therein.

The second coupling portion of the first bobbin 3110*a* may be formed at a position corresponding to the third coupling hole 3161*a* formed in the inner portion 3522*a* of the first lower elastic member 5520*a*. The second coupling portion of the second bobbin 3110*b* may be formed at a position corresponding to the third coupling hole 3161*b* formed in the inner portion 3522*b* of the second lower elastic member 5520*b*.

The second coupling portion of the first bobbin 3110*a* may be formed in a shape corresponding to the shape of the third coupling hole 3161*a* formed in the inner portion 3522*a* of the first lower elastic member 5520*a*. The second coupling portion of the second bobbin 3110*b* may be formed in a shape corresponding to the shape of the third coupling hole 3161*b* formed in the inner portion 3522*b* of the second lower elastic member 5520*b*.

In another embodiment, at least one of the driving unit coupling portion 3212*a* or 3212*b*, the first coupling portion 3113*a* or 3113*b*, and the second coupling portion may be omitted from each of the first bobbin 3110*a* and the second bobbin 3110*b*.

The first coil 3120*a* may be disposed at the first bobbin 3110*a*, and the second coil 3120*b* may be disposed at the second bobbin 3110*b*. For example, the first coil 3120*a* may be disposed at the outer surface of the first bobbin 3110*a*, and the second coil 3120*b* may be disposed at the outer surface of the second bobbin 3110*b*.

The first coil 3120*a* may be opposite a first magnet unit 3130*a*, and the second coil 3120*b* may be opposite a second magnet unit 3130*b*.

When a first driving signal (e.g. first current) is supplied to the first coil 3120*a*, the first coil 3120*a* and the first bobbin 3110*a* may be moved in a first optical-axis (OA1) direction due to electromagnetic interaction between the first coil 3120*a* and the first magnet unit 3130*a*.

In addition, when a second driving signal (e.g. second current) is supplied to the second coil 3120*b*, the second coil 3120*b* and the second bobbin 3110*b* may be moved in a second optical-axis (OA2) direction due to electromagnetic interaction between the second coil 3120*b* and the second magnet unit 3130*b*.

For example, the first coil 3120*a* may be a single integrated coil, and the second coil 3120*b* may be a single integrated coil.

In another example, the first coil 3120*a* may include a plurality of coil units spaced apart from each other, and the second coil 3120*b* may include a plurality of coil units spaced apart from each other.

For example, the first coil 3120*a* may include four coil units spaced apart from each other, and the four coil units may be disposed at the outer surface of the first bobbin 3110*a* such that the angle between two adjacent coil units is 90 degrees. In addition, for example, the second coil 3120*b* may include four coil units spaced apart from each other, and the four coil units may be disposed at the outer surface of the second bobbin 3110*b* such that the angle between two adjacent coil units is 90 degrees.

The first coil 3120*a* may include a pair of first lead wires for supply of first electric power or a first driving signal, and the second coil 3120*b* may include a pair of second lead wires for supply of second electric power or a second driving signal.

For example, the pair of first lead wires of the first coil 3120*a* may be connected to first and second upper elastic units 3510*a* and 3510*b* of the first upper elastic member 5510*a*. In addition, the pair of second lead wires of the second coil 3120*b* may be connected to third and fourth upper elastic units 3510*c* and 3510*d* of the second upper elastic member 5510*b*.

The first coil 3120*a* may receive the first electric power or the first driving signal via the first upper elastic member 5510*a*, and the second coil 3120*b* may receive the second electric power or the second driving signal via the second upper elastic member 5510*b*.

For example, the first coil 3120*a* may receive the first electric power or the first driving signal via a circuit board 3250, the supporting member 3600, and the first upper elastic member 5510*a*, and the second coil 3120*b* may receive the second electric power or the second driving signal via the circuit board 3250, the supporting member 3600, and the second upper elastic member 5510*b*.

Referring to FIG. 28, the OIS mover 5300 may receive at least a portion of the first AF mover 5200*a* and the second AF mover 5200*b* therein.

The OIS mover 5300 may move the first and second AF movers 5200*a* and 5200*b* or may be moved with the first and second AF movers 5200*a* and 5200*b*. The OIS mover 5300 may be moved through interaction with the stator 5400.

The OIS mover 5300 may be moved to perform a handshake compensation function. When moved to perform the handshake compensation function, the OIS mover 5300 may be moved integrally with the AF movers 5200*a* and 5200*b*.

The OIS mover 5300 may include a housing 3140 and a magnet 3320. However, at least one of the housing 3140 and the magnet 3320 may be omitted from the OIS mover 5300 or may be changed.

The housing 3140 may be disposed outside the first and second bobbins 3110*a* and 3110*b*. The housing 3140 may receive at least a portion of the first and second bobbins 3110*a* and 3110*b* and the magnet 3320 therein.

The first and second bobbins 3110*a* and 3110*b* may be disposed in the housing 3140, and the magnet may be disposed at the housing 3140.

The housing 3140 may include four side surfaces and four corner portions disposed between the four side surfaces. For example, the housing 3140 may include a hexahedral shape.

The magnet 3320 may be disposed at the four side surfaces of the housing 3140.

At least a portion of the outer surface of the housing 3140 may be formed in a shape corresponding to the shape of the inner peripheral surface of the side plate 3302 of the cover member 3300. The outer surface of the housing 3140 may be formed in a shape corresponding to the shape of the inner peripheral surface of the side plate 3302 of the cover member 3300.

The housing 3140 may be made of an insulative material. The housing 3140 may be made of a material different from the cover member 3300. The housing 3140 may be made of an injection molded material in consideration of productivity.

For example, for OIS driving, the outer surface of the housing 3140 may be spaced apart from the inner surface of the side plate 3302 of the cover member 3300. That is, for OIS driving, the housing 3140 may be moved in a space between the housing 3140 and the cover member 3300.

The upper elastic members 5510*a* and 5510*b* may be coupled to the upper part, the upper end, or the upper surface of the housing 3140, and the lower elastic members 5520*a* and 5520*b* may be coupled to the lower part, the lower end, or the lower surface of the housing 3140.

The housing 3140 may be integrally formed. That is, in the embodiment, the OIS mover 1300 may be singly controlled while the first and second AF movers 5200a and 5200b for AF driving may be separately controlled.

In other words, in the embodiment, the first lens module and the second lens module may be moved individually at the time of AF driving and integrally at the time of OIS driving. Through the embodiment, mutual interference between the magnets in the dual VCN structure for OIS may be excluded.

In the embodiment, each of the housing 3140, the base 3210, and the circuit board 3250 may be integrally formed.

The housing 3140 may include a first receiving unit 3011a, in which the first bobbin 3110a is received or seated, and a second receiving unit 3011b, in which the second bobbin 3110b is received or seated.

In addition, the housing 3140 may further include a connection unit 3011c disposed between the first receiving unit 3011a and the second receiving unit 3011b so as to interconnect the first receiving unit 3011a and the second receiving unit 3011b.

The first receiving unit 3011a and the second receiving unit 3011b may be formed inside the housing 3140.

Each of the first receiving unit 3011a and the second receiving unit 3011b may include a through hole formed through the housing 3140 in the vertical direction. For example, the first receiving unit 3011a may include a first opening or a first through hole, in which the first bobbin 3110a is received, and the second receiving unit 3011b may include a second opening or a second through hole, in which the second bobbin 3110b is received.

The first bobbin 3110a may be movably disposed in the first receiving unit 3011a, and the second bobbin 3110b may be movably disposed in the second receiving unit 3011b.

At least a portion of the first receiving unit 3011a may be formed in a shape corresponding to the shape of the first bobbin 3110a, and at least a portion of the second receiving unit 3011b may be formed in a shape corresponding to the shape of the second bobbin 3110b.

The inner surface of the first receiving unit 3011a formed by the first through hole may be located so as to be spaced apart from the outer surface of the first bobbin 3110a, and the inner surface of the second receiving unit 3011b formed by the second through hole may be located so as to be spaced apart from the outer surface of the second bobbin 3110b.

The first bobbin 3110a may have a first projecting portion or a first stopper 3115a (see FIG. 29) projecting outwards from the outer surface of the first bobbin 3110a, and the second bobbin 3110b may have a second projecting portion or a second stopper 3115b (see FIG. 29) projecting outwards from the outer surface of the second bobbin 3110b.

The first projecting portion 3115a of the first bobbin 3110a and/or the second projecting portion 3115b of the second bobbin 3110b may contact the housing 3140 or a first recessed portion 3146a (see FIG. 30) and/or a second recessed portion 3146b formed at the upper surface of the housing 3140 so as to serve as stoppers that mechanically limit the movement of the first bobbin 3110a in the first optical-axis (OA1) direction and the movement of the second bobbin 3110b in the second optical-axis (OA2) direction.

The connection unit 3011c of the housing 3140 may be disposed between the first bobbin 3110a and the second bobbin 3110b.

The housing 3140 may include a plurality of side portions 3014a to 3014d and 3015a to 3015d and a plurality of corner portions.

Each of the corner portions of the housing 3140 may be disposed between two adjacent side portions and may interconnect two adjacent side portions of the housing 3140.

For example, the first receiving unit 3011a of the housing 3140 may include first to fourth side portions 3014a to 3014d. In addition, the second receiving unit 3011b of the housing 3140 may include fifth to eighth side portions 3015a to 3015d.

In addition, the first receiving unit 3011a of the housing 3140 may include a corner portion configured to interconnect two adjacent side portions, among the first to fourth side portions 3014a to 3014d, and the second receiving unit 3011b of the housing 3140 may include a corner portion configured to interconnect two adjacent side portions, among the fifth to eighth side portions 3015a to 3015d.

Each of the first to fourth side portions 3014a to 3014d of the first receiving unit 3011a may be formed parallel to a corresponding one of side surfaces of the side plate 3302 of the cover member 3300.

Each of the fifth to eighth side portions 3015a to 3015d of the second receiving unit 3011b may be formed parallel to a corresponding one of side surfaces of the side plate 3302 of the cover member 3300.

The first side portion 3014a and the second side portion 3014b of the first receiving unit 3011a of the housing 3140 may be opposite each other, and the third side portion 3014c and the fourth side portion 3014d may be opposite each other. In addition, the fifth side portion 3015a and the sixth side portion 3015b of the second receiving unit 3011b of the housing 3140 may be opposite each other, and the seventh side portion 3015c and the eighth side portion 3015d may be opposite each other.

In addition, the first side portion 3014a and the fifth side portion 3015a of the housing 3140 may be parallel to each other or may extend in a parallel direction, the second side portion 3014b and the sixth side portion 3015b of the housing 3140 may be parallel to each other or may extend in a parallel direction, and the third side portion 3014c and the seventh side portion 3015c of the housing 3140 may be parallel to each other or may extend in a parallel direction.

The magnet 3320 may be disposed at the first to third side portions 3014a to 3014c and the fifth and seventh side portions 3015a to 3015c of the housing 3140.

Seating portions 3312, to which the magnet 3320 is coupled, may be provided in the first to third side portions 3014a to 3014c and the fifth and seventh side portions 3015a to 3015c of the housing 3140. For example, the seating portions 3312 may be formed in the inner surfaces of the side portions 3014a to 3014d and 3015a to 3015d of the housing 3140.

For example, the seating portions 3312 may be recesses formed as the result of the inner surfaces of the housing 3140 being depressed. However, the disclosure is not limited thereto. In another embodiment, each of the seating portions 3312 may have a planar shape, rather than the recess.

Each of the seating portions 3312 of the housing 3140 may be open at the lower part thereof. However, the disclosure is not limited thereto. In another embodiment, the lower part of each of the seating portions 3312 may not be open.

The magnet 3320 may be fixed or attached to the seating portions 3312 of the housing 3140 using an adhesive. However, the disclosure is not limited thereto. The housing 3140 may have at least one adhesive injection hole 3315a, through which an adhesive configured to fix the magnet 3320 is injected.

For example, the adhesive injection hole 3315a may be formed in at least one of the side portions 3014a to 3014d of the first receiving unit 3011a, the side portions 3015a to 3015d of the second receiving unit 3011b, and side portions of the connection unit 3011c. The adhesive injection hole 3315a may be formed through the side portion of the housing 3140 in a direction from the outer surface to the inner surface of the side portion of the housing 3140, and a portion of the magnet 3320 may be exposed by the adhesive injection hole. In another embodiment, the adhesive injection hole may be formed as a groove.

The housing 3140 may include first coupling portions 3313 configured to be coupled to the first and second upper elastic members 5510a and 5510b and second coupling portions (not shown) configured to be coupled to the first and second lower elastic members 5520a and 5520b.

The first coupling portions 3313 of the housing 3140 may be coupled to outer portions 3511a and 3511b of the first and second upper elastic members 5510a and 5510b.

Each of the first coupling portions 3313 of the housing 3140 may be a protrusion protruding from the upper surface of the housing 3140. However, the disclosure is not limited thereto. In another embodiment, each first coupling portion may be a recess or have a planar shape, and may be coupled to the upper elastic members using an adhesive.

For example, the first coupling portions 3313 of the housing 3140 may be coupled to first coupling holes 3152a of the outer portions 3511a and 3511b of the first and second upper elastic members 5510a and 5510b.

For example, the first coupling portions 3313 may be thermally fused in the state in which the first coupling portions 3313 are inserted into the first coupling holes 3152a, whereby the upper elastic members 5510a and 5510b may be fixed between the thermally fused first coupling portions 3313 and the housing 3140.

The second coupling portions of the housing 3140 may be coupled to outer portions 3521a and 3521b of the first and second lower elastic members 5520a and 5520b.

For example, each of the second coupling portions of the housing 3140 may be a protrusion or a recess, or may have a planar shape formed at the lower surface of the housing 3140, and the second coupling portions may be coupled to the lower elastic members by thermal fusion or using an adhesive. In addition, for example, planes or holes for coupling with the second coupling portions of the housing 3140 may be provided at the outer portions 3521a and 3521b of the first and second lower elastic members 5520a and 5520b.

The housing 3140 may include recessed portions 3319 formed as the result of a portion of the upper surface of the housing 3140 being depressed. The recessed portions 3319 may be formed in the corners or the corner portions of the housing 3140.

The recessed portions 3319 of the housing 3140 may partially overlap coupling portions 3514a and 3514b of the upper elastic members 5510a and 5510b in the optical-axis direction. In this structure, even though the damper 5700 coated on the coupling portions 3514a and 3514b of the upper elastic members 5510a and 5510b flows downwards, the recessed portions 3319 of the housing 3140 may receive the damper.

The housing 3140 may be provided in each of the corners or the corner portions thereof with a through hole 3147, through which the supporting member 3600 extends. The through hole 3147 may be formed through at least a portion of each of the corners or the corner portions of the housing 3140.

The magnet 3320 may be disposed at the housing 3140. The magnet 3320 may be disposed outside the first coil 3120a and the second coil 3120b.

The magnet 3320 may be opposite the first coil 3120a and the second coil 3120b in a direction perpendicular to the optical axes OA1 and OA2. The magnet 3320 may be disposed at the upper side of a third coil 3230. The magnet 3320 may be opposite the third coil 3230 in the optical-axis (OA1 and OA2) directions. The magnet 3320 may electromagnetically interact with the third coil 3230. The magnet 3320 may be used in common to perform an autofocus function and a handshake compensation function.

The magnet 3320 may be disposed at the side portion of the housing 3140.

The magnet 3320 may be a flat magnet. The magnet 3320 may have a flat shape.

The magnet 3320 may include a first magnet unit 3130a disposed in the first receiving unit 3011a of the housing 3140 and a second magnet unit 3130b disposed in the second receiving unit 3011b of the housing 3140.

The first magnet unit 3130a may move the first bobbin 3110a in the first optical-axis (OA1) direction through interaction with the first coil 3120a, and the second magnet unit 3130b may move the second bobbin 3110b in the second optical-axis (OA2) direction through interaction with the second coil 3120b.

For example, the first magnet unit 3130a may be disposed around the first bobbin 3110a, and may be disposed opposite the first coil 3120a. The second magnet unit 3130b may be disposed around the second bobbin 3110b, and may be disposed opposite the second coil 3120b.

The first magnet unit 3130a may include first to third magnets 3130-1 to 3130-3, and the second magnet unit 3130b may include fourth to sixth magnets 3130-4 to 3130-6.

The first magnet 3130-1 may be disposed at the first side portion 3014a of the housing 3140, the second magnet 3130-2 may be disposed at the second side portion 3014b of the housing 3140, and the third magnet 3130-2 may be disposed at the third side portion 3014c of the housing 3140.

The fourth magnet 3130-4 may be disposed at the fifth side portion 3015a of the housing 3140, the fifth magnet 3130-5 may be disposed at the sixth side portion 3015b of the housing 3140, and the sixth magnet 3130-6 may be disposed at the seventh side portion 3015c of the housing 3140.

In order to prevent magnetic field interference with respect to each of the first AF mover and the second AF mover, no magnets may be disposed at the fourth side portion 3014d of the housing 3140 and the eighth side portion 3015d of the housing 3140.

That is, in the case in which magnets are disposed at the side portions 3014d and 3015d of the housing 3140 adjacent to the connection unit 3011c of the housing 3140, an error may occur in autofocus operation of the first AF mover and/or autofocus operation of the second AF mover due to magnetic field interference between the magnets, since the distance between the magnets disposed at the side portions 3014d and 3015d of the housing 3140 is small.

Referring to FIGS. 31A and 31B, the stator 5400 may be disposed at the lower side of the housing 3140.

The stator 5400 may be disposed at the lower side of the OIS mover 5300. The stator 5400 may be opposite the OIS mover 5300.

The stator 5400 may movably support the OIS mover 5300. The stator 5400 may move the OIS mover 5300. At this time, the AF movers 5200*a* and 5200*b* may be moved together with the OIS mover 5300.

The stator 5400 may include a circuit member 3231 including a third coil 3230, a circuit board 3250, and a base 3210. However, at least one of the circuit board 3250, the third coil 3230, and the base 3210 may be omitted from the stator 5400 or may be changed.

The circuit board 3250 may be disposed under the third coil 3230.

For example, the circuit board 3250 may be disposed under the circuit member 3231 at which the third coil 3230 is formed.

The circuit board 3250 may be disposed on the base 3210.

The circuit board 3250 may be disposed between the circuit member 3231 and the base 3210.

The supporting member 3600 may be coupled to the circuit board 3250.

For example, the lower end of the supporting member 3600 may be coupled to the lower surface of the circuit board 3250 by soldering or using a conductive adhesive member. The circuit board 3250 may be integrally formed.

The circuit board 3250 may include a flexible printed circuit board (FPCB).

The circuit board 3250 may supply first electric power or a first driving signal to the first coil 3120*a* via the supporting member 3600 and the first upper elastic member 5510*a*.

The circuit board 3250 may supply second electric power or a second driving signal to the second coil 3120*b* via the supporting member 3600 and the second upper elastic member 5510*b*.

The circuit board 3250 may be connected to the third coil 3230, and may supply third electric power or a third driving signal to the third coil 3230.

The circuit board 3250 may include a first opening 3411*a*, a second opening 3411*b*, and terminal portions 3253*a* and 3253*b*. However, at least one of the first opening 3411*a*, the second opening 3411*b*, and the terminal portions 3253*a* and 3253*b* may be omitted from the circuit board 3250 or may be changed.

The first opening 3411*a* of the circuit board 3250 may be formed biased to one side of the circuit board 3250. The second opening 3411*b* of the circuit board 3250 may be formed biased to the other side of the circuit board 3250. When the circuit board 3250 is viewed from above, the circuit board 3250 may have a rectangular shape. However, the disclosure is not limited thereto.

Each of the first opening 3411*a* and the second opening 3411*b* of the circuit board 3250 may be formed through the circuit board 3250.

The first opening 3411*a* of the circuit board 3250 may be formed so as to correspond to the first bobbin 3110*a*, and the second opening 3411*b* may be formed so as to correspond to the second bobbin 3110*b*.

The first opening 3411*a* of the circuit board 3250 may allow light that has passed through the first lens module to pass therethrough, and the second opening 3411*b* of the circuit board 3250 may allow light that has passed through the second lens module to pass therethrough.

Each of the first opening 3411*a* and the second opening 3411*b* of the circuit board 3250 may be formed in a circular shape. However, the shape of the first opening 3411*a* is not limited thereto. The first opening 3411*a* may be spaced apart from the second opening 3411*b*.

The terminal portions 3253*a* and 3253*b* of the circuit board 3250 may be formed as the result of a portion of the circuit board 3250 being bent. For example, the circuit board 3250 may include a portion bent downwards from the upper surface of the circuit board, and the bent portion may form terminal portions of the circuit board 3250.

At least a portion of each of the terminal portions 3253*a* and 3253*b* of the circuit board 3250 may be exposed outside. The terminal portions 3253*a* and 3253*b* of the circuit board 3250 may be coupled to the circuit board 5010 of the camera module disposed at the lower side of the base 3210 by soldering or using a conductive adhesive member.

The lower end of each of the terminal portions 3253*a* and 3253*b* of the circuit board 3250 may directly contact the circuit board 5010 of the camera module. The terminal portions 3253*a* and 3253*b* of the circuit board 3250 may be disposed at terminal coupling portions 3434*a* and 3434*b* of the base 3210. Each of the terminal portions 3253*a* and 3253*b* of the circuit board 3250 may include a plurality of terminals 3251 for connection with the outside.

Each of the terminal portions 3253*a* and 3253*b* of the circuit board 3250 may include a plurality of terminals 3251.

For example, first and second terminals, among the plurality of terminals 3251 of the circuit board 3250, may be connected to first-axis (e.g. Y-axis) coils 3230-1, 3230-2, 3230-4, and 3230-5 of the third coil 3230.

In addition, for example, third and fourth terminals, among the plurality of terminals 3251 of the circuit board 3250, may be connected to second-axis (e.g. X-axis) coils 3230-3 and 3230-6 of the third coil 3230. The first to fourth terminals of the circuit board 3250 may be OIS terminals.

In addition, for example, fifth to eighth terminals, among the plurality of terminals 3251 of the circuit board 3250, may be connected to a first sensor 3240*a*. In addition, for example, ninth to twelfth terminals, among the plurality of terminals 3251 of the circuit board 3250, may be connected to a second sensor 3240*b*. For example, the fifth to twelfth terminals of the circuit board 3250 may be sensor terminals.

In addition, for example, thirteenth and fourteenth terminals, among the plurality of terminals 3251 of the circuit board 3250, may be connected to the first coil 3120*a*. In addition, for example, fifteenth to sixteenth terminals, among the plurality of terminals 3251 of the circuit board 3250, may be connected to the second coil 3120*b*. For example, the thirteenth to sixteenth terminals of the circuit board 3250 may be AF coil terminals.

For example, the circuit board 3250 may include a first terminal portion disposed at one of two opposite side portions (or side surfaces) thereof and a second terminal portion disposed at the other of the two opposite side portions. For example, the first and second terminal portions may be disposed at two opposite long side portions (or long side surfaces) of the circuit board 3250. Here, the two opposite long side surfaces of the circuit board 3250 may correspond to first and second side surfaces 3031*a* and 3031*b* of the circuit member 3231.

For example, eight of the first to sixteenth terminals may be provided at the first terminal portion of the circuit board 3250, and the other eight may be provided at the second terminal portion of the circuit board 3250.

For example, a first coil negative electrode terminal AF1−, a second coil negative electrode terminal AF2−, a first-axis coil negative electrode terminal OISX−, a second-axis coil negative electrode terminal OISY−, a first sensor input positive electrode terminal Hall X In+, a first sensor input negative electrode terminal Hall X In−, a first sensor output positive electrode terminal Hall X Out+, and a first sensor output negative electrode terminal Hall X Out− may be provided at the first terminal portion of the circuit board 3250.

In addition, for example, a first coil positive electrode terminal AF1+, a second coil positive electrode terminal AF2+, a first-axis coil positive electrode terminal OISX+, a second-axis coil positive electrode terminal OISY+, a second sensor input positive electrode terminal Hall Y In+, a second sensor input negative electrode terminal Hall Y In−, a second sensor output positive electrode terminal Hall Y Out+, and a second sensor output negative electrode terminal Hall Y Out− may be provided at the second terminal portion of the circuit board 3250.

The circuit board 3250 may be provided with a hole 3250a, through which the supporting member 3600 extends. For example, the hole 3250a may be provided at each corner of the circuit board 3250, and may be formed through the circuit board 3250. However, the disclosure is not limited thereto. In another embodiment, the circuit board 3250 may be provided at each corner thereof with an escape recess, rather than the hole 3250a, in order to avoid spatial interference with the supporting member 360.

The circuit member 3231 may be disposed at the base 3210.

The circuit member 3231 may be disposed at the circuit board 3250.

The circuit member 3231 may be disposed at the upper surface of the circuit board 3250.

The circuit member 3231 may be disposed at the lower side of the magnet 3320.

The circuit member 3231 may be disposed between the magnet 3320 and the base 3210.

The circuit member 3231 may include a hole 3231a, through which the supporting member 3600 extends.

The circuit member 3231 may be provided in each corner thereof with a hole 3231a having a shape corresponding to the shape of the hole 3250a formed in each corner of the circuit board 3250. The hole 3231a of the circuit member 3231 may be formed through the circuit member 3231. In another embodiment, the circuit member 3231 may have an escape recess, rather than the hole 3231a.

The circuit member 3231 may be integrally formed. The circuit member 3231 may include a board portion 3421 and a third coil 3230. However, at least one of the board portion 3421 and the third coil 3230 may be omitted from the circuit member 3231 or may be changed.

The board portion 3421 may be a circuit board. For example, the board portion 3421 may be an FPCB. The third coil 3230 may be integrally formed at the board portion 3421.

The board portion 3421 may be provided with a hole 3231a, through which the supporting member 3600 extends. In a modification, the supporting member 3600 may be coupled to the board portion 3421. At this time, the lower surface of the board portion 3421 and the lower end of the supporting member 3600 may be coupled to each other by soldering.

The circuit member 3231 may include first and second openings 3023a and 3023b corresponding to the first and second openings 3411a and 3411b of the circuit board. For example, the first and second openings 3023a and 3023b may be formed in the board portion 3421.

For example, the first opening 3023a of the circuit board 3231 may be formed so as to correspond to the first bobbin 3110a, and the second opening 3023b may be formed so as to correspond to the second bobbin 3110b.

At least a portion (e.g. the lower end) of the first bobbin 3110a may be disposed in the first opening 3023a of the circuit board 3231 and the first opening 3411a of the circuit board 3250. In addition, at least a portion (e.g. the lower end) of the second bobbin 3110b may be disposed in the second opening 3023b of the circuit board 3231 and the second opening 3411b of the circuit board 3250.

The third coil 3230 may be opposite the magnet 3320 in the first optical-axis (OA1) direction or the second optical-axis (OA2) direction.

When third electric power or a third driving signal is supplied to the third coil 3230, the magnet 3320 may be moved relative to the third coil 3230 due to electromagnetic interaction between the third coil 3230 and the magnet 3320.

The third coil 3230 may move the housing 3140 and the bobbins 3110a and 3110b relative to the base 3120 in the direction perpendicular to the optical axis through electromagnetic interaction with the magnet 3320. The third coil 3230 may be a fine pattern coil (FP coil) integrally formed at the board portion 3421. The third coil 3230 may be formed at the circuit member 3231 in the form of a fine pattern coil (FP coil).

The third coil 3230 may include a first coil unit 3230-1 opposite the first magnet 3130-1, a second coil unit 3230-2 opposite the second magnet 3130-2, a third coil unit 3230-3 opposite the third magnet 3130-3, a fourth coil unit 3230-4 opposite the fourth magnet 3130-4, a fifth coil unit 3230-5 opposite the fifth magnet 3130-5, and a sixth coil unit 3230-6 opposite the sixth magnet 3130-6 in the first optical-axis (OA1) direction or the second optical-axis (OA2) direction.

The first coil unit 3230-1, the second coil unit 3230-2, the fourth coil unit 3230-4, and the fifth coil unit 3230-5 may be a first-axis coil configured to move the OIS mover 5300 in a first-axis (e.g. Y-axis) direction.

In addition, the third coil unit 3230-3 and the sixth coil unit 3230-6 may be a second-axis coil configured to move the OIS mover 5300 in a second-axis (e.g. X-axis) direction.

The first-axis (e.g. the Y-axis) direction may be perpendicular to the second-axis (e.g. X-axis) direction.

Each of the first axis and the second axis may be perpendicular to the first optical axis OA1 of the first lens module coupled to the first bobbin 3110a. In addition, each of the first axis and the second axis may be perpendicular to the second optical axis OA2 of the second lens module coupled to the second bobbin 3110b.

The first-axis coil may further include a first connection coil configured to interconnect the four coil units 3230-1, 3230-2, 3230-4, and 3230-5 spaced apart from each other.

For example, the coil units 3230-1, 3230-2, 3230-4, and 3230-5 may be connected to each other in series via the first connection coil. That is, the coil units 3230-1, 3230-2, 3230-4, and 3230-5 may be integrally controlled. For example, the coil units 3230-1, 3230-2, 3230-4, and 3230-5 of the first-axis coil may be controlled by a single driving signal.

The second-axis coil may further include a second connection coil configured to interconnect the third coil unit 3230-3 and the sixth coil unit 3230-6. The third coil unit 3230-3 and the sixth coil unit 3230-6 may be connected to each other in series via the second connection coil.

That is, the third coil unit 3230-3 and the sixth coil unit 3230-6 may be integrally controlled. For example, the coil units 3230-3 and 3230-6 of the second-axis coil may be controlled by a single driving signal.

The first-axis coil may be integrally formed, and the second-axis coil may be integrally formed.

The first-axis coil and the second-axis coil may be separately or individually controlled.

The base 3210 may be disposed under the housing 3140. The base 3210 may be disposed under the circuit board 3250. The circuit board 3250 may be disposed at the upper surface of the base 3210.

The base 3210 may be coupled to the cover member 3300.

The base 3210 may be disposed on the circuit board 5010 of the camera module. However, a separate holder member 3120 may be disposed between the base 3210 and the circuit board 5010. The base 3210 may perform the function of a sensor holder that protects the image sensor mounted on the circuit board 5010. The base 3210 may be integrally formed.

The base 3210 may include a first opening 3431a, a second opening 3431b, a sensor coupling portion 3433, a terminal coupling portion 3434, and a step portion 3211.

The base 3210 may include a depressed portion 3436 and a partition 3437. However, at least one of the first and second openings 3431a and 3431b, the sensor coupling portion 3433, the terminal coupling portion 3434, the step portion 3211, the depressed portion 3436, and the partition 3437 may be omitted from the base 3210 or may be changed.

The first opening 3431a of the base 3210 may be formed at a position corresponding to the first bobbin 3110a, and may be a through hole formed through the base 3210. For example, each of the first and second openings 3431a and 3431b of the base 3210 may be formed through the base 3210 in the vertical direction.

The second opening 3431b of the base 3210 may be formed at a position corresponding to the second bobbin 3110b, and may be a through hole formed through the base 3210.

The depressed portion 3436 of the base 3210 may be formed as the result of a portion of the lower surface of the base 3210 being depressed. For example, the depressed portion 3436 may be disposed between the first opening 3431a and the second opening 3431b.

The partition 3437 of the base 3210 may project from the depressed surface of the depressed portion 3436 to the lower surface of the base 3210 between the first opening 3431a and the second opening 3431b, and may extend from one side surface (e.g. first long side surface) to the other side surface (e.g. second long side surface) of the base 3210.

The partition 3437 of the base 3210 may increase stiffness of the base 3210. The partition 3437 of the base 3210 may be formed in a dual structure. In this case, the stiffness of the base 3210 may be more effectively increased. The partition 3437 may prevent light to be introduced into a first image sensor from being introduced into a second image sensor through a space formed at the lower side of the base 3210. In addition, the partition 3437 may prevent light to be introduced into the second image sensor from being introduced into the first image sensor through the space formed at the lower side of the base 3210. Two partitions 3437 of the base 3210 may be disposed spaced apart from each other, whereby a space may be formed between the two partitions 3437.

An infrared filter may be disposed in at least one of the first and second openings 3431a and 3431b of the base 3210. However, the infrared filter may be coupled to a separate holder member 1020 disposed at the lower part of the base 3210.

Light passing through the first lens module may be incident on the first image sensor through the first opening 3431a of the base 3210, and light passing through the second lens module may be incident on the second image sensor through the second opening 3431b of the base 3210.

Each of the first and second openings 3431a and 3431b of the base 3210 may be formed in a circular shape. However, the disclosure is not limited thereto.

A sensor 3240 may be disposed at the sensor coupling portion 3433 of the base 3210.

The sensor coupling portion 3433 of the base 3210 may receive at least a portion of the sensor 3240.

The sensor coupling portion 3433 of the base 3210 may be a recess formed as the result of the upper surface of the base 3210 being depressed downwards.

The sensor coupling portion 3433 of the base 3210 may be formed as a plurality of recesses. In an example, the sensor coupling portion 3433 may be formed as two recesses. At this time, the sensor 3240 may be disposed in each of the two recesses.

The sensor coupling portion 3433 of the base 3210 may include a first sensor coupling portion 3433a and a second sensor coupling portion 3433b.

The first sensor coupling portion 3433a may be formed at a region of the upper surface of the base 3210 corresponding to a position at which a first sensor 3240a is disposed, and the first sensor 3240a may be disposed at the first sensor coupling portion 3433a.

For example, the first sensor coupling portion 3433a may be formed between the first opening 3431a of the base 3210 and the long side surface of the base 3210, and may be formed adjacent to a region of the base 3210 located between the first opening 3431a and the second opening 3431b of the base 3210.

Alternatively, for example, the first sensor coupling portion 3433a may be formed between the second opening 3431b of the base 3210 and the long side surface of the base 3210, and may be formed adjacent to a region of the base 3210 located between the first opening 3431a and the second opening 3431b of the base 3210.

The second sensor coupling portion 3433b may be formed at a region of the upper surface of the base 3210 corresponding to a position at which a second sensor 3240b is disposed, and the second sensor 3240b may be disposed at the second sensor coupling portion.

For example, the second sensor coupling portion 3433b may be formed between the first opening 3431a (or the second opening 3431b) of the base 3210 and the short side surface of the base 3210, and may be formed at a position of the upper surface of the base 3210 corresponding to the center of the short side surface of the base 3210.

The terminal portions 3253a and 3253b of the circuit board 3250 may be disposed at the terminal coupling portion 3434 of the base 3210.

The terminal coupling portion 3434 of the base 3210 may be a recess formed as the result of a portion of one side surface of the base 3210 being depressed inwards. At this time, at least a portion of each of the terminal portions 3253a and 3253b of the circuit board 3250 may be in surface contact with the terminal coupling portion 3434

The terminal coupling portion 3434 of the base 3210 may include a first terminal coupling portion 3434a formed at one side surface (e.g. a first long side surface) of the base 3210 and a second terminal coupling portion 3434b formed at the other side surface (e.g. a second long side surface) of the base 3210.

The first terminal coupling portion 3434a of the base 3210 may be formed at a side (e.g. a first long side surface) corresponding to a long side, among the side surfaces of the base 3210, when viewed from above. The first terminal coupling portion 3434a may be formed at the central part of one side surface of the base 3210.

For example, the first sensor coupling portion 3433a may be located adjacent to the terminal coupling portion 3434 of the base 3210.

The second terminal coupling portion 3434b of the base 3210 may be opposite the first terminal coupling portion 3434a, and may be formed in a shape corresponding to the shape of the first terminal coupling portion 3434a.

The terminal coupling portion 3434 may extend downwards from the lower surface of the base 3210. Consequently, the lower end of the terminal coupling portion 3434 may be located lower than the lower surface of the base 3210.

The width of the terminal coupling portion 3434 may correspond to or be equal to the width of each of the terminal portions 3253a and 3253b of the circuit board 3250. The length of the terminal coupling portion 3434 may correspond to or be equal to the length of a terminal portion 3412 of the circuit board 3250.

The step portion 3211 of the base 3210 may be formed at the side surface of the base 3210.

The step portion 3211 of the base 3210 may be formed around the outer surface of the base 3210. The step portion 3211 of the base 3210 may be formed as the result of the upper part of the side surface of the base 3210 being depressed. Alternatively, the step portion 3211 of the base 3210 may be formed as the result of the lower part of the side surface of the base 3210 projecting. The lower end of the side plate 3302 of the cover member 3300 may be disposed at the step portion 3211 of the base 3210.

The base 3210 may be provided at the upper surface thereof with a projecting portion 3025a for coupling with the circuit board 3250 and the circuit member 3231. For example, the projecting portion 3024a may be provided at a region of the upper surface of the base 3210 located between the first opening and the second opening. However, the present disclosure is not limited thereto.

The circuit board 3250 may have a through hole 3025b for coupling with the projecting portion 3025a of the base 3210. For example, the through hole 3025b may be disposed between the first opening 3411a and the second opening 3411b of the circuit board 3250. However, the disclosure is not limited thereto. The through hole may be formed at a position corresponding to the projecting portion 3025a of the base 3210.

The circuit member 3231 may have a through hole 3025c for coupling with the projecting portion 3025a of the base 3210. For example, the through hole 3025c may be disposed between the first opening 3023a and the second opening 3023b of the circuit member 3231. However, the disclosure is not limited thereto. The through hole may be formed at a position corresponding to the projecting portion 3025a of the base 3210. The projecting portion 3025a of the base 3210 may be coupled to the through hole 3025c of the circuit member 3231 and the through hole 3025b of the circuit board 3250, whereby it is possible to prevent the circuit board 3250 and the circuit member 3231 from being separated from each other.

Next, the elastic members 5500a and 5500b and the supporting member 3600, which are components configured to guide movement of the bobbins 3110a and 3110b and the housing 3140, will be described. However, this is merely an example, and members other than a spring and a wire may be used to guide movement of the bobbins 3110a and 3110b and the housing 3140. In an example, a ball guide may be used instead of the elastic members 5500a and 5500b and the supporting member 3600.

The first elastic member 5500a may be coupled to the first bobbin 3110a and the housing 3140. The first elastic member 5500a may elastically support the first bobbin 3110a. At least a portion of the first elastic member 5500a may be elastic.

The first elastic member 5500a may movably support the first bobbin 3110a.

The first elastic member 5500a may support the first bobbin 3110a so as to be movable relative to the housing 3140 in the optical-axis direction. That is, the first elastic member 5500a may support the first bobbin 3110a so as to perform AF driving. At this time, the first elastic member 5500a may be called an "AF supporting member."

The first elastic member 5500a may include a first upper elastic member 5510a and a first lower elastic member 5520a. However, at least one of the first upper elastic member 5510a and the first lower elastic member 5520a may be omitted from the first elastic member 5500a or may be changed. The first upper elastic member 5510a and the first lower elastic member 5520a may be integrally formed.

The first upper elastic member 5510a may be disposed at the upper side of the first bobbin 3110a, and may be coupled to the first bobbin 3110a and the housing 3140. The first upper elastic member 5510a may be disposed at the upper side of the first bobbin 3110a. The first upper elastic member 5510a may be coupled to the first bobbin 3110a and the housing 3140.

The first upper elastic member 5510a may be coupled to the upper part of the first bobbin 3110a and the upper part of the housing 3140. The first upper elastic member 5510a may be a leaf spring.

The first upper elastic member 5510a may include first and second upper elastic units 3510a and 3510b spaced apart from each other. The first and second upper elastic units 3510a and 3510b may be connected to the first coil 3120a.

The first upper elastic unit 3510a may be connected to one end of the first coil 3120a, and the second upper elastic unit 3510b may be connected to the other end of the first coil 3120a.

The first upper elastic unit 3510a may be connected to a first wire 3601, and the second upper elastic unit 3510b may be connected to a second wire 3602.

The first and second upper elastic units 3510a and 3510b may be connected to the first coil 3120a. Each of the first and second upper elastic units 3510a and 3510b may be made of a conductive material. The first coil 3120a may receive first electric power or a first driving signal (e.g. driving current) through the first and second upper elastic units 3510a and 3510b.

The first upper elastic member 5510a may include a first outer portion 3511a, a first inner portion 3512a, a first connection portion 3513a, and a coupling portion 3514a. The "outer portion" may be referred to as an "outer frame," and the "inner portion" may be referred to as an "inner frame."

For example, each of the first and second upper elastic units 3510a and 3510b may include a first outer portion 3511a, a first inner portion 3512a, a first connection portion 3513a, and a coupling portion 3514a.

However, at least one of the first outer portion 3511a, the first inner portion 3512a, the first connection portion 3513a, and the coupling portion 3514a may be omitted from the first upper elastic member 5510a or may be changed.

The first outer portion 3511a may be coupled to the housing 3140. The first outer portion 3511a may be coupled to the upper part of the housing 3140.

The first outer portion 3511*a* may be coupled to the first coupling portion 3313 of the housing 3140.

The first outer portion 3511*a* may include a first coupling hole 3152*a* coupled to the first coupling portion 3313 of the housing 3140. For example, the first coupling hole 3152*a* of the first outer portion 3511*a* may be coupled to the first coupling portion 3313 of the housing 3140 by thermal fusion.

The first inner portion 3512*a* may be coupled to the first bobbin 3110*a*. The first inner portion 3512*a* may be coupled to the upper part of the first bobbin 3110*a*.

The first inner portion 3512*a* may be coupled to the first coupling portion 3113*a* of the first bobbin 3110*a* using an adhesive. The first inner portion 3512*a* may include a second coupling hole 3151*a* corresponding to the first coupling portion 3113*a* of the first bobbin 3110*a*.

The first connection portion 3513*a* may connect the first outer portion 3511*a* and the first inner portion 3512*a* to each other. The first connection portion 3513*a* may elastically connect the first outer portion 3511*a* and the first inner portion 3512*a* to each other. The first connection portion 3513*a* may be elastic. At this time, the first connection portion 3513*a* may be called an "elastic portion." The first connection portion 3513*a* may be formed by bending twice or more.

The coupling portion 3514*a* may be coupled to the supporting member 3600. The coupling portion 3514*a* may be coupled to the supporting member 3600 by soldering. The coupling portion 3514*a* may include a hole, through which the supporting member 3600 extends. The hole of the coupling portion 3514*a* may be a through hole.

Consequently, the portion of the supporting member 3600 extending through the coupling portion 3514*a* and the upper surface of the coupling portion 3514*a* may be coupled to each other by soldering. The coupling portion 3514*a* may extend from the first outer portion 3511*a*. The coupling portion 3514*a* may extend outwards from the first outer portion 3511*a*. The coupling portion 3514*a* may include a bent portion formed by bending.

Referring to FIG. 34, the coupling portion 3514*a* may include a first extension portion 3514*aa* extending from the first outer portion 3511*a* toward the corner of the housing 3140 and a second extension portion 3514*ab* extending from the first extension portion 3514*aa* in a direction toward the center of the first upper elastic member 5510*a*.

The first extension portion 3514*aa* may extend from the first outer portion 3511*a* toward the corner of the housing 3140. The second extension portion 3514*ab* may extend from the first extension portion 3514*aa* in the direction toward the center of the first upper elastic member 5510*a*.

The second extension portion 3514*ab* may extend from the first extension portion 3514*aa* in a direction toward the first outer portion 3511*a* of the first upper elastic member 5510*a*. The second extension portion 3514*ab* and the first outer portion 3511*a* may be spaced apart from each other. However, the second extension portion 3514*ab* and the first outer portion 3511*a* may be connected to each other via the damper 5700.

The distal end of the coupling portion 3514*a* may be spaced apart from the first outer portion 3511*a*. The damper 5700 may connect the distal end of the coupling portion 3514*a* and the first outer portion 3511*a* to each other. The terms "first" and "second," which are used to distinguish between elements, may be used interchangeably. For example, the first extension portion 3514*aa* may be called a "second extension portion," and the second extension portion 3514*ab* may be called a "first extension portion." In addition, although the first extension portion 3514*aa* and the second extension portion 3514*ab* are described as constituting a single component together with the coupling portion 3514*a*, the coupling portion 3514*a* may be provided separately from the first extension portion 3514*aa* and the second extension portion 3514*ab*. In this case, the coupling portion 3514*a* may mean a portion disposed between the first extension portion 3514*aa* and the second extension portion 3514*ab* so as to be coupled to the supporting member 3600.

In this embodiment, the upper elastic member 5510*a* or 5510*b* may include an outer portion 3511*a* or 3511*b* coupled to the housing 3140, an inner portion 3512*a* or 3512*b* coupled to the first or second bobbin 3110*a* or 3110*b*, a connection portion 3513*a* or 3513*b* configured to interconnect the outer portion 3511*a* or 3511*b* and the inner portion 3512*a* or 3512*b*, a coupling portion 3514*a* or 3514*b* extending from the outer portion 3511*a* or 3511*b*, the coupling portion being coupled to the supporting member 3600, and a first extension portion 3514*ab* (see FIG. 34) extending from the coupling portion 3514*a* or 3514*b*, the first extension portion being spaced apart from the outer portion 3511*a* or 3511*b*. At this time, the damper 5700 may connect the first extension portion 3514*ab* and the outer portion 3511*a* or 3511*b* to each other.

The upper elastic member 5510*a* or 5510*b* may include a second extension portion 3514*aa* (see FIG. 34) extending from the outer portion 3511*a* or 3511*b* toward the corner of the housing 3140, the second extension portion being connected to the coupling portion 3514*a* or 3514*b*. The first extension portion 3514*ab* may extend from the coupling portion 3514*a* or 3514*b* in a direction toward the center of the upper elastic member 5510*a* or 5510*b*. The first extension portion 3514*ab* may include a portion having a width gradually increased in the direction toward the center of the upper elastic member 5510*a* or 5510*b*.

The first extension portion 3514*ab* may be connected to the second extension portion 3514*aa* via the coupling portion 3514*a* or 3514*b*. The first extension portion 3514*ab* may include a portion having curvature. A portion of the side surface of the outer portion 3511*a* or 3511*b* opposite the inner surface of the first extension portion 3514*ab* may include a shape corresponding to the shape of the inner surface of the first extension portion 3514*ab*.

The inner surface of the first extension portion 3514*ab* may include a portion having curvature. The housing 3140 may include a recessed portion 3319 formed as the result of a portion of the upper surface of the corner of the housing 3140 being depressed.

A portion of the recessed portion 3319 of the housing 3140 may overlap the coupling portion 3514*a* or 3514*b* in the optical-axis (e.g. OA1 or OA2) direction. The recessed portion 3319 of the housing 3140 may be spaced apart from the coupling portion 3514*a* or 3514*b*.

In this embodiment, the damper 5700 may be coated on the second extension portion 3514*ab* and the first outer portion 3511*a*. As a result, a resonance phenomenon that may occur at the elastic members 5500*a* and 5500*b* and the supporting member 3600 may be prevented. Furthermore, in this structure, design is easier than in the structure in which the damper 5700 is coated on the coupling portion 3514*a* and the housing 3140 or the supporting member 3600 and the housing 3140. The reason for this is that the first upper elastic member 5510*a* can be more easily changed in design and manufactured than the housing 3140. In this embodiment, on the other hand, each of the second extension portion 3514*ab* and the first outer portion 3511*a* is formed so as to have a plurality of rounded portions in order to maximize contact area with the damper 5700. That is, the characteristic shapes of the second extension portion 3514ab and the first outer portion 3511a prevent separation of the damper 5700.

In the embodiment, two dampers 5700 may be disposed at the first upper elastic member 5510a, and two dampers may be disposed at the second upper elastic member 5510b. The dampers 5700 may be disposed at the four corners of the housing 3140.

In the embodiment, although not shown, an additional damper may be coated in addition to the dampers 5700. In particular, the damper may be coated on the housing 3140 and the supporting member 3600. Furthermore, the damper may be coated on the housing 3140 and the first and second upper elastic members 5510a and 5510b. In addition, the damper may be coated on the supporting member 3600 and the first and second upper elastic members 5510a and 5510b.

At least a portion of the second extension portion 3514ab may be formed so as to have a width gradually increased in a direction toward the center of the first upper elastic member 5510a. The second extension portion 3514ab may include a portion having a width gradually increased in the direction toward the center of the first upper elastic member 5510a.

One end of the second extension portion 3514ab may be connected to the first extension portion 3514aa, and the other end of the second extension portion 3514ab may be formed as a free end. One end of the coupling portion 3514a may be connected to the outer portion 3511a, and the other end of the coupling portion 3514a may be spaced apart from the outer portion 3511a. The damper 5700 may be integrally disposed at the other end of the coupling portion 3514a and the outer portion 3511a.

The inner surface of the other end of the second extension portion 3514ab may be curved.

The other end of the second extension portion 3514ab may be formed so as to be curved.

The portion of the side surface of the first outer portion 3511a opposite the inner surface of the other end of the second extension portion 3514ab may have a shape corresponding to the shape of the inner surface of the other end of the second extension portion 3514ab. The portion of the first outer portion 3511a opposite the other end of the second extension portion 3514ab may have a shape corresponding to the shape of the second extension portion 3514ab.

The inner surface of the other end of the second extension portion 3514ab may include a portion having curvature. The end surface of the other end of the second extension portion 3514ab may be rounded. In the above structure, separation of the damper 5700 coated on the second extension portion 3514ab may be prevented. That is, in the above structure, the damper 5700 may be more securely fixed to the second extension portion 3514ab and the first outer portion 3511a.

The first lower elastic member 5520a may be disposed at the lower side of the first bobbin 3110a, and may be coupled to the first bobbin 3110a and the housing 3140. The first lower elastic member 5510a may be disposed at the lower side of the first bobbin 3110a.

The first lower elastic member 5520a may be coupled to the first bobbin 3110a and the housing 3140. The first lower elastic member 5520a may be coupled to the lower part of the first bobbin 3110a and the lower part of the housing 3140.

The first lower elastic member 5520a may be a leaf spring. The first lower elastic member 5520a may be integrally formed.

The first lower elastic member 5520a may include a second outer portion 3521a, a second inner portion 3522a, and a second connection portion 3523a. However, at least one of the second outer portion 3521a, the second inner portion 3522a, and the second connection portion 3523a may be omitted from the first lower elastic member 5520a or may be changed.

For example, the first lower elastic member 5520a may include a second outer portion 3521a coupled to the housing 3140, a second inner portion 3522a coupled to the first bobbin 3110a, and a second connection portion 3523a configured to interconnect the second outer portion 3521a and the second inner portion 3522a.

For example, the second outer portion 3521a may be coupled to the lower part of the housing 3140.

The second outer portion 3521a may be coupled to the second coupling portion of the housing 3140 using an adhesive. The second outer portion 3521a may include a coupling hole 3161b corresponding to the second coupling portion of the housing 3140.

For example, the second inner portion 3522a may be coupled to the lower part of the first bobbin 3110a.

The second inner portion 3522a may be coupled to the second coupling portion of the first bobbin 3110a using an adhesive. The second inner portion 3522a may include a coupling hole 3161a corresponding to the second coupling portion of the first bobbin 3110a.

The second connection portion 3523a may connect the second outer portion 3521a and the second inner portion 3522a to each other. The second connection portion 3523a may elastically connect the second outer portion 3521a and the second inner portion 3522a to each other. The second connection portion 3523a may be elastic. At this time, the second connection portion 3523a may be called an "elastic portion." The second connection portion 3523a may be formed by bending twice or more.

The second elastic member 5500b may be coupled to the second bobbin 3110b and the housing 3140. The second elastic member 5500b may elastically support the second bobbin 3110b. At least a portion of the second elastic member 5500b may be elastic. The second elastic member 5500b may movably support the second bobbin 3110b. The second elastic member 5500b may support the second bobbin 3110b so as to be movable relative to the housing 3140 in the optical-axis direction. That is, the second elastic member 5500b may support the second bobbin 3110b so as to perform AF driving. At this time, the second elastic member 5500b may be called an "AF supporting member."

The second elastic member 5500b may include a second upper elastic member 5510b and a second lower elastic member 5520b. However, at least one of the second upper elastic member 5510b and the second lower elastic member 5520b may be omitted from the second elastic member 5500b or may be changed.

The second upper elastic member 5510b may be disposed at the upper side of the second bobbin 3110b, and may be coupled to the second bobbin 3110b and the housing 3140. The second upper elastic member 5510b may be disposed at the upper side of the second bobbin 3110b. The second upper elastic member 5510b may be coupled to the upper part of the second bobbin 3110b and the upper part of the housing 3140. The second upper elastic member 5510b may be a leaf spring.

The second upper elastic member 5510b may include third and fourth upper elastic units 3510c and 3510d spaced apart from each other. The third and fourth upper elastic units 3510c and 3510d may be connected to the second coil 3120b.

The third upper elastic unit 3510c may be connected to one end of the second coil 3120b, and the fourth upper elastic unit 3510d may be connected to the other end of the second coil 3120b.

The third upper elastic unit 3510c may be connected to a third wire 3603, and the fourth upper elastic unit 3510d may be connected to a fourth wire 3604.

The third and fourth upper elastic units 3510c and 3510d may be connected to the second coil 3120b. Each of the third and fourth upper elastic units 3510c and 3510d may be made of a conductive material. The second coil 3120b may receive second electric power or a second driving signal (e.g. driving current) through the third and fourth upper elastic units 3510c and 3510d.

The second upper elastic member 5510b may include an outer portion 3511b, an inner portion 3512b, a connection portion 3513b, and a coupling portion 3514b. However, at least one of the outer portion 3511b, the inner portion 3512b, the connection portion 3513b, and the coupling portion 3514b may be omitted from the second upper elastic member 5510b or may be changed.

The outer portion 3511b may be coupled to the housing 3140. The outer portion 3511b may be coupled to the upper part of the housing 3140. The outer portion 3511b may be coupled to the second coupling portion of the housing 3140. The outer portion 3511b may include a coupling hole coupled to the first coupling portion of the housing 3140. The coupling hole of the outer portion 3511b may be coupled to the second coupling portion of the housing 3140 by thermal fusion.

The inner portion 3512b may be coupled to the second bobbin 3110b. The inner portion 3512b may be coupled to the upper part of the second bobbin 3110b. The inner portion 3512b may be coupled to the first coupling portion 3113b of the second bobbin 3110b using an adhesive. The inner portion 3512b may include a coupling hole corresponding to the first coupling portion 3113b of the second bobbin 3110b.

The connection portion 3513b may connect the outer portion 3511b and the inner portion 3512b to each other. The connection portion 3513b may elastically connect the outer portion 3511b and the inner portion 3512b to each other. The connection portion 3513b may be elastic. At this time, the connection portion 3513b may be called an "elastic portion." The connection portion 3513b may be formed by bending twice or more.

The coupling portion 3514b may be coupled to the supporting member 3600. The coupling portion 3514b may be coupled to the supporting member 3600 by soldering. The coupling portion 3514b may include a hole, through which the supporting member 3600 extends. Consequently, the portion of the supporting member 3600 extending through the coupling portion 3514b and the upper surface of the coupling portion 3514b may be coupled to each other by soldering. The coupling portion 3514b may extend from the outer portion 3511b. The coupling portion 3514b may extend outwards from the outer portion 3511b. The coupling portion 3514b may include a bent portion formed by bending.

The coupling portion 3514b of the second upper elastic member 5510b may include a first extension portion extending from the outer portion 3511b toward the corner of the housing 3140 and a second extension portion extending from the first extension portion in a direction toward the center of the second upper elastic member 5510b.

The first extension portion of the second upper elastic member 5510b may extend from the outer portion 3511b toward the corner of the housing 3140. The second extension portion of the second upper elastic member 5510b may extend from the first extension portion in the direction toward the center of the second upper elastic member 5510b.

The second extension portion of the second upper elastic member 5510b may extend from the first extension portion in a direction toward the outer portion 3511b of the second upper elastic member 5510b. The second extension portion and the outer portion 3511b of the second upper elastic member 5510b may be spaced apart from each other. However, the second extension portion and the outer portion 3511b of the second upper elastic member 5510b may be connected to each other via the damper 5700. That is, the damper 5700 may be coated on the second extension portion and the outer portion 3511b of the second upper elastic member 5510b. The function and effect of the damper 5700 are the same as described above.

The second lower elastic member 5520b may be disposed at the lower side of the second bobbin 3110b, and may be coupled to the second bobbin 3110b and the housing 3140. The second lower elastic member 5510b may be coupled to the lower part of the second bobbin 3110b and the lower part of the housing 3140.

The second lower elastic member 5520b may be a leaf spring. The second lower elastic member 5520b may be integrally formed.

The second lower elastic member 5520b may include an outer portion 3521b, an inner portion 3522b, and a connection portion 3523b. However, at least one of the outer portion 3521b, the inner portion 3522b, and the connection portion 3523b may be omitted from the second lower elastic member 5520b or may be changed.

The second lower elastic member 5520b may include an outer portion 3521b coupled to the housing 3140, an inner portion 3522b coupled to the second bobbin 3110b, and a connection portion 3523b configured to interconnect the outer portion 3521b and the inner portion 3522b.

The outer portion 3521b may be coupled to the housing 3140. The outer portion 3521b may be coupled to the lower part of the housing 3140. The outer portion 3521b may be coupled to the second coupling portion of the housing 3140 using an adhesive. The outer portion 3521b may include a coupling hole corresponding to the second coupling portion of the housing 3140.

For example, the inner portion 3522b may be coupled to the lower part of the second bobbin 3110b. The inner portion 3522b may be coupled to the second coupling portion of the second bobbin 3110b using an adhesive. The inner portion 3522b may include a coupling hole corresponding to the second coupling portion of the second bobbin 3110b.

The connection portion 3523b may connect the outer portion 3521b and the inner portion 3522b to each other. The connection portion 3523b may elastically connect the outer portion 3521b and the inner portion 3522b to each other. The connection portion 3523b may be elastic. At this time, the connection portion 3523b may be called an "elastic portion." The connection portion 3523b may be formed by bending twice or more.

Figure 38:
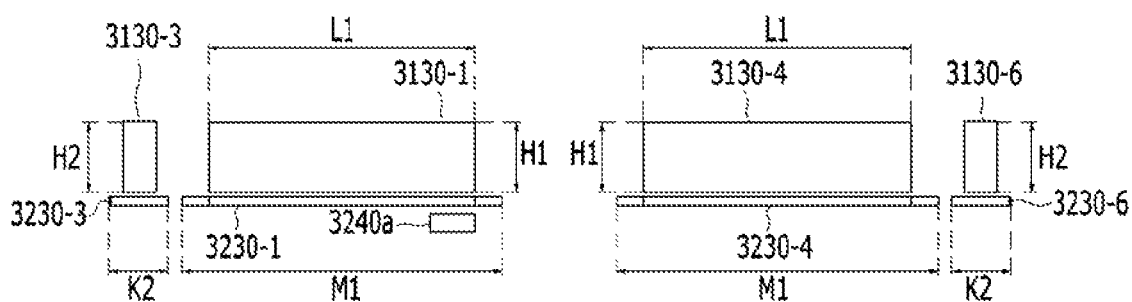
FIG. 38 is a side view of FIG. 37.

Referring to FIGS. 32, 33, and 38, the first and second upper elastic units 3510a and 3510b may be disposed opposite each other in the first-axis direction, and the third and fourth upper elastic units 3510c and 3510d may be disposed opposite each other in the first-axis direction.

In addition, the first and third upper elastic units 3510a and 3510c may be arranged in a direction parallel to the long side of the circuit member 3231, and the second and fourth upper elastic units 3510*b* and 3510*d* may be arranged in the direction parallel to the long side of the circuit member 3231.

In addition, the first and second lower elastic members 5502*a* and 5520*b* may be disposed opposite each other in the second-axis direction, and may be arranged in the direction parallel to the long side of the circuit member 3231.

The supporting member 3600 may movably support the housing 3140. The supporting member 3600 may elastically support the housing 3140.

At least a portion of the supporting member 3600 may be elastic. For example, the supporting member 3600 may support the housing 3140 so as to be movable relative to the stator 5400 in a direction perpendicular to the optical-axis direction. At this time, the bobbins 3110*a* and 3110*b* may be moved integrally with the housing 3140. In another example, the supporting member 3600 may support the housing 3140 so as to be tiltable relative to the stator 5400. That is, the supporting member 3600 may support the housing 3140 and the bobbins 3110*a* and 3110*b* so as to perform OIS driving. At this time, the supporting member 3600 may be called an "OIS supporting member." In an example, the supporting member 3600 may be a wire. In another example, the supporting member 3600 may be a leaf spring.

The supporting member 3600 may be connected to the first upper elastic member 5510*a* and the circuit board 3250. The supporting member 3600 may be connected to the second upper elastic member 5510*b* and the circuit board 3250.

The supporting member 3600 may be connected to the upper elastic members 5510*a* and 5510*b* and the stator 5400. The lower end of the supporting member 3600 may be connected to the circuit board 3250.

For example, the supporting member 3600 may extend through the circuit board 3250. In this structure, the lower end of the supporting member 3600 may be coupled to the lower surface of the circuit board 3250 by soldering. In a modification, the lower end of the supporting member 3600 may be coupled to the lower surface of the circuit member 3231 by soldering. In a modification, the lower end of the supporting member 3600 may be coupled to the board portion 3421 of the circuit member 3231. Alternatively, in a modification, the lower end of the supporting member 3600 may be coupled to the base 3210.

The upper end of the supporting member 3600 may be coupled to the coupling portions 3514*a* and 3514*b* of the upper elastic members 5510*a* and 5510*b*. The upper end of the supporting member 3600 may extend through the coupling portions 3514*a* and 3514*b* of the upper elastic members 5510*a* and 5510*b*. In this structure, the upper end of the supporting member 3600 may be coupled to the upper surfaces of the coupling portions 3514*a* and 3514*b* of the upper elastic members 5510*a* and 5510*b* by soldering. Alternatively, in a modification, the upper end of the supporting member 3600 may be coupled to the housing 3140.

The structure of the supporting member 3600 is not limited thereto, and the supporting member may have any structure as long as it is possible to support the OIS mover 5300 so as to be movable relative to the stator 5400.

The supporting member 3600 may be coupled to the second extension portions 3514*ab* of the upper elastic members 5510*a* and 5510*b*.

The supporting member 3600 may include a plurality of supporting portions or supporting members 3601 to 3604. For example, the supporting member 3600 may include first to fourth supporting members 3601 to 3604, and each of the first to fourth supporting members 3601 to 3604 may be a wire. Each of the first to fourth supporting members 3601 to 3604 may be referred to as a corresponding one of "first to fourth wires."

The lower end of each of the supporting members 3601 to 3604 may be soldered to the lower surface of the circuit board 3250. The upper end of each of the supporting members 3601 to 3604 may be soldered to the coupling portion 3514*a* of a corresponding one of the first to fourth upper elastic units 3510*a* to 3510*d*.

For example, the supporting member 3600 may include a first supporting member 3601 connected between the first upper elastic unit 3510*a* and the circuit board 3250, a second supporting member 3602 connected between the second upper elastic unit 3510*b* and the circuit board 3250, a third supporting member 3603 connected between the third upper elastic unit 3510*c* and the circuit board 3250, and a fourth supporting member 3604 connected between the fourth upper elastic unit 3510*d* and the circuit board 3250.

The damper 5700 may be made of a viscous material. A resonance phenomenon that may occur at the elastic members 5500*a* and 5500*b* and the supporting member 3600 may be prevented by the damper 5700.

The sensor 3240 may be disposed at the stator 5400. The sensor may be coupled to or mounted on the circuit board 3250, and may be connected to the circuit board 3250. For example, the sensor 3240 may be disposed or mounted on the lower surface of the circuit board 3250.

The sensor 3240 may be disposed at the base 3210. The sensor 3240 may be received in the sensor coupling portion 3433 formed in the upper surface of the base 3210.

The sensor 3240 may be a Hall sensor. Alternatively, the sensor 3240 may be a Hall integrated circuit (Hall IC).

The sensor 3240 may sense magnetic force of the magnet 3320. That is, the sensor 3240 may sense a change in magnetic force due to movement of the magnet 3320 moving together with the housing 3140, and outputs an output (e.g. voltage) based on the result of sensing.

The displacement or position of the housing 3140 may be sensed based on the output (e.g. voltage) from the sensor 3240. In addition, the movement or tilting of the housing 3140 and/or the bobbins 3110*a* and 3110*b* in a direction perpendicular to the optical axis may be sensed based on the output from the sensor 3240. Feedback OIS driving may be provided by the sensor 3240, and the sensor 3240 may be called an "OIS feedback sensor."

The amount of movement of the housing 3140 in the direction perpendicular to the optical axis may correspond to or may be equal to the amount of movement of the bobbins 3110*a* and 3110*b* and the lens modules coupled to the bobbins 3110*a* and 3110*b*.

The sensor 3240 may include a plurality of sensors. In an example, two sensors 3240 may be provided to sense x-axis and y-axis (the optical axis being the z axis) movement of the housing 3140.

The sensor 3240 may include a first sensor 3240*a* configured to sense the movement of the magnet 3320 in the first-axis direction (e.g. the Y-axis direction) and a second sensor 3240*b* configured to sense the movement of the magnet 3320 in the second-axis direction (e.g. the X-axis direction). At this time, the first axis and the second axis may be perpendicular to each other. In addition, the first axis and the second axis may be perpendicular to the optical axis.

Figure 36:
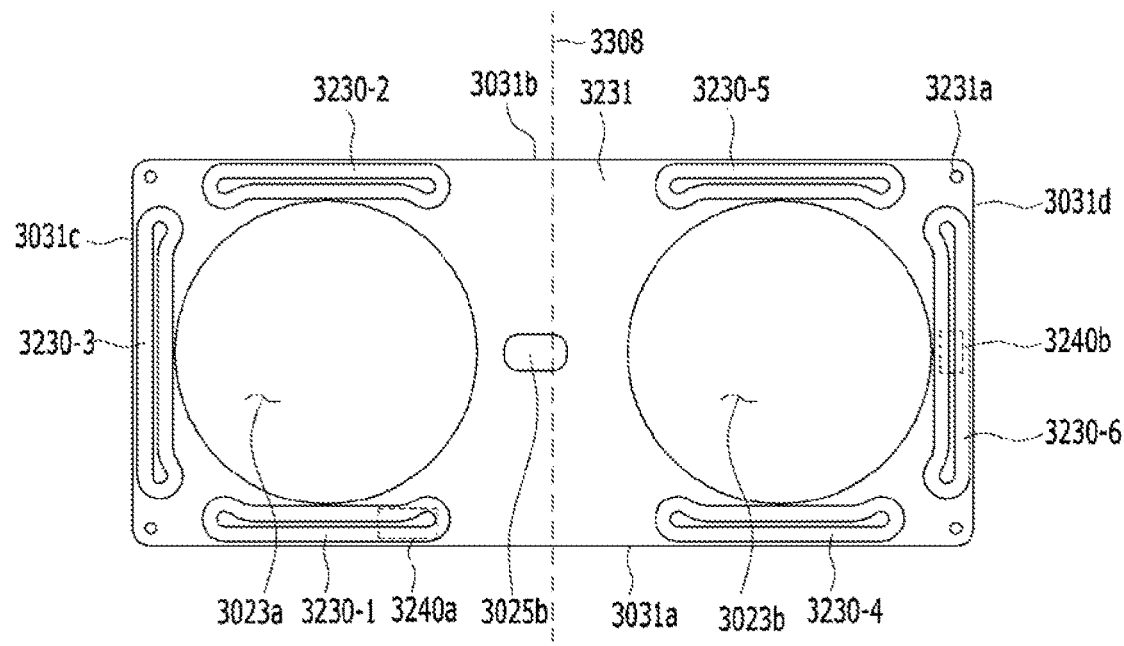
FIG. 36 is a plan view of a circuit member according to an embodiment.
Figure 37:
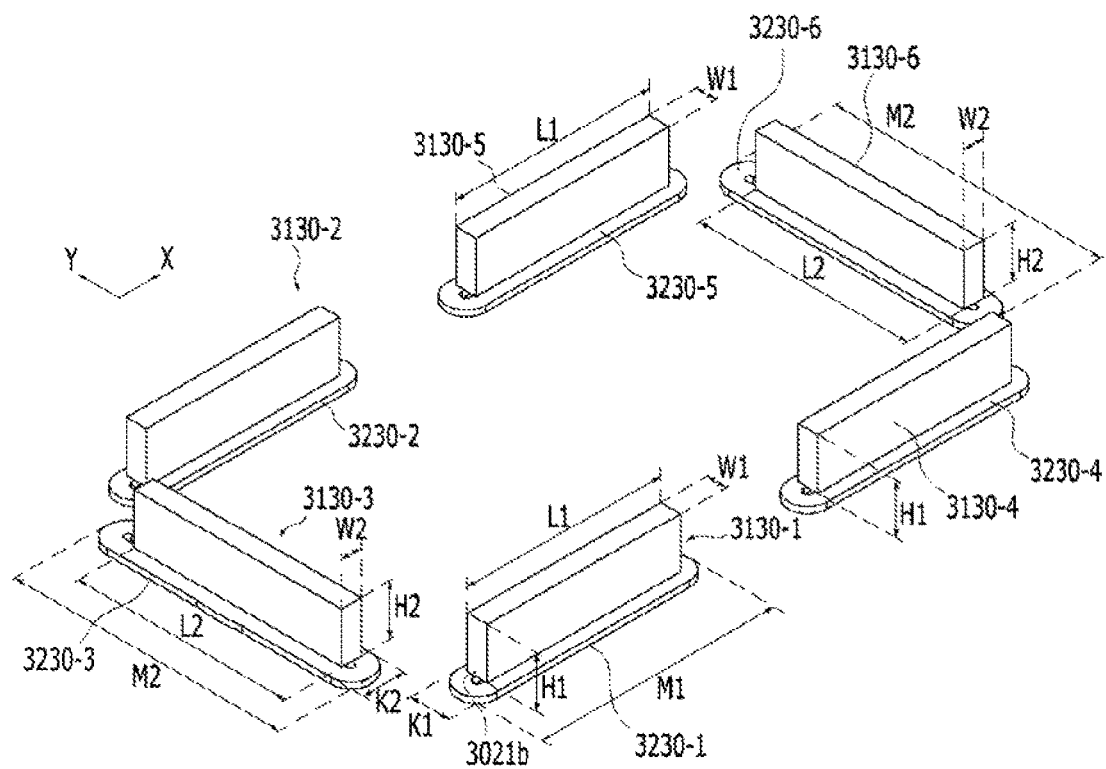
FIG. 37 is a perspective view of first to sixth coil units and first to sixth magnets.

FIG. 36 is a plan view of a circuit member 3231 according to an embodiment, FIG. 37 is a perspective view of first to sixth coil units 3230-1 to 3230-6 and first to sixth magnets

Figure 39A:
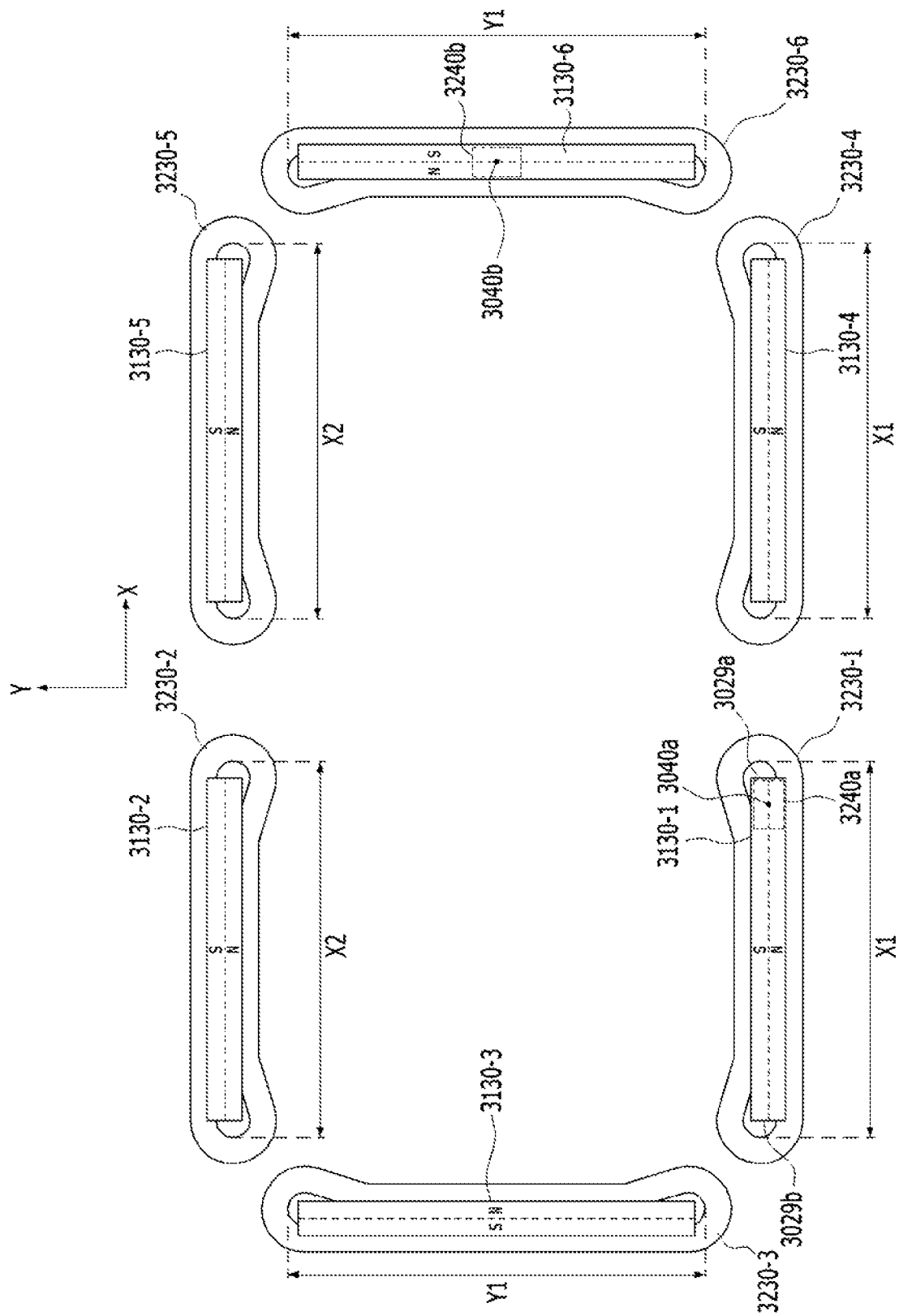
FIG. 39A is a plan view of the first to sixth coil units and the first to sixth magnets.

3130-1 to 3130-6, FIG. 38 is a side view of FIG. 37, and FIG. 39A is a plan view of the first to sixth coil units 3230-1 to 3230-6 and the first to sixth magnets 3130-1 to 3130-6.

Referring to FIGS. 36 to 39, the circuit member 3231 may include four sides 3031*a* to 3031*d* (or side surfaces).

For example, the circuit member 3231 may have a quadrangular (e.g. rectangular) shape including four sides (or side surfaces). However, the disclosure is not limited thereto.

For example, each of the first and second sides 3031*a* and 3031*b* of the circuit member 3231 may be a long side longer than each of the third and fourth sides 3031*c* and 3031*d* of the circuit member 3231, and each of the third and fourth sides 3031*c* and 3031*d* of the circuit member 3231 may be a short side.

First and second openings 3023*a* and 3023*b* may be arranged in a line in a direction from the third side 3031*c* to the fourth side 3031*d* of the circuit member 3231.

The first coil unit 3230-1 may be disposed between the first opening 3023*a* of the circuit member 3231 and the first side 3031*a* of the circuit member 3231, the second coil unit 3230-2 may be disposed between the first opening 3023*a* of the circuit member 3231 and the second side 3031*b* of the circuit member 3231, and the third coil unit 3230-3 may be disposed between the first opening 3023*a* of the circuit member 3231 and the third side 3031*c* of the circuit member 3231.

In addition, the fourth coil unit 3230-4 may be disposed between the second opening 3023*b* of the circuit member 3231 and the first side 3031*a* of the circuit member 3231, the fifth coil unit 3230-5 may be disposed between the second opening 3023*b* of the circuit member 3231 and the second side 3031*b* of the circuit member 3231, and the sixth coil unit 3230-6 may be disposed between the second opening 3023*b* of the circuit member 3231 and the fourth side 3031*d* of the circuit member 3231.

No coil unit may be formed or disposed between the first opening 3023*a* and the second opening 3023*b* of the circuit member 3231.

Referring to FIG. 37, the lengths, the widths, and the heights of the first magnet 3130-1, the second magnet 3130-2, the fourth magnet 3130-4, and the fifth magnet 3130-5 may be equal to each other. However, the disclosure is not limited thereto. In another embodiment, at least one of the lengths, the widths, and the heights may be different from each other.

In addition, the lengths, the widths, and the heights of the third magnet and the sixth magnet may be equal to each other. However, the disclosure is not limited thereto. In another embodiment, at least one of the lengths, the widths, and the heights may be different from each other.

In addition, the lengths, the widths, and the heights of the first coil unit 3230-1, the second coil unit 3230-2, the fourth coil unit 3230-4, and the fifth coil unit 3230-5 may be equal to each other. However, the disclosure is not limited thereto. In another embodiment, at least one of the lengths, the widths, and the heights may be different from each other.

The lengths, the widths, and the heights of the third coil unit 3230-3 and sixth coil unit 3230-6 may be equal to each other. However, the disclosure is not limited thereto. In another embodiment, at least one of the lengths, the widths, and the heights may be different from each other.

The lengths L1 and L2, the widths W1 and W2, and the heights H1 and H2 of the first magnet 3130-1 and the third magnet 3130-3 will be described with reference to FIG. 37.

A description of the length L1, the width W1, and the height H1 of the first magnet 3130-1 may be applied to the length, the width, and the height of each of the second magnet 3130-2, the fourth magnet 3130-4, and the fifth magnet 3130-5.

In addition, a description of the length L2, the width W2, and the height H2 of the third magnet 3130-3 may be applied to the length, the width, and the height of the sixth magnet 3130-6.

The lengths M1 and M2, the widths K1 and K2, and the heights (the lengths or the thicknesses in the optical-axis direction) will also be described with reference to FIG. 37.

A description of the length M1, the width K1, and the height (the length or the thickness in the optical-axis direction) of the first coil unit 3230-1 may be applied to the length, the width, and the height of each of the second coil unit 3230-2, the fourth coil unit 3230-4, and the fifth coil unit 3230-5.

In addition, a description of the length M2, the width K2, and the height (the length or the thickness in the optical-axis direction) of the third coil unit 3230-3 may be applied to the length, the width, and the height of the sixth coil unit 3230-6.

Here, the length L1 or L2 of each of the first to sixth magnets 3130-1 to 3130-6 may be the length thereof in a longitudinal direction. In addition, the width W1 or W2 of each of the first to sixth magnets 3130-1 to 3130-6 may be the length thereof in a width direction.

Here, the width direction may be perpendicular to the longitudinal direction and may be the direction in which the length of each of the components 3130-1 to 3130-6 is smaller. That is, the length in the width direction may be less than the length in the longitudinal direction. In addition, the width of each of the components 3130-1 to 3130-6 may be referred to as the "thickness" of each of the components 3130-1 to 3130-6.

For example, the length L1 or L2 of each of the first to sixth magnets 3130-1 to 3130-6 may be the length of a first surface of each of the first to sixth magnets 3130-1 to 3130-6 opposite the bobbin 3110 in the longitudinal direction.

In addition, for example, the width W1 or W2 of each of the first to sixth magnets 3130-1 to 3130-6 may be the distance from the first surface of each of the components 3130-1 to 3130-6 opposite the bobbin 3110 to a second surface thereof opposite the first surface.

In addition, for example, the height H1 or H2 of each of the first to sixth magnets 3130-1 to 3130-6 may be the length of each component in the optical axis direction.

Alternatively, for example, the height H1 or H2 may be the length of the first surface of each of the components 3130-1 to 3130-6 opposite the bobbin 3110 in the vertical direction. Alternatively, for example, the height H1 or H2 may be the distance from the lower surface to the upper surface of each of the components 3130-1 to 3130-6.

In addition, the length M1 or M2 of each of the first to sixth coil units 3230-1 to 3230-6 may be the length thereof in a longitudinal direction of a corresponding one of the first to sixth magnets 3130-1 to 3130-6 or a direction parallel thereto.

For example, M1 or M2 may be the length of each of the first to sixth coil units 3230-1 to 3230-6 in the longitudinal direction, and may be the length between the outermost ends of each of the first to sixth coil units 3230-1 to 3230-6.

In addition, the length X1, X2, or Y1 of each of the first to sixth coil units 3230-1 to 3230-6 may be the length between opposite ends of the inner portion (or the inner surface) of each of the first to sixth coil units 3230-1 to 3230-6.

In addition, the width K1 or K2 of each of the first to sixth coil units 3230-1 to 3230-6 may be the length thereof in a width direction of a corresponding one of the first to sixth magnets 3130-1 to 3130-6 or a direction parallel thereto. The height of each of the first to sixth coil units 3230-1 to 3230-6 may be the length thereof in the optical axis direction.

The length L1 of the first magnet 3130-1 may be less than the length M1 or X1 of the first coil unit 3230-1 (L1<M1, X1). In another embodiment, X1≤L1≤M11.

The length W1 of the first magnet 3130-1 in the width direction may be less than the length K1 of the first coil unit 3230-1 in the width direction (W1<K1).

In addition, the length of the second magnet 3130-2 may be less than the length M1 or X2 of the second coil unit 3230-2. The length of the second magnet 3130-2 in the width direction may be less than the length of the second coil unit 3230-2 in the width direction.

The length L2 of the third magnet 3130-3 may be less than the length M2 or Y1 of the third coil unit 3230-3 (L2<M2, Y1). In another embodiment, Y1≤L2≤M2.

The length W2 of the third magnet 3130-3 in the width direction may be less than the length K2 of the third coil unit 3230-3 in the width direction (W2<K2). In another embodiment, W2 and K2 may be equal to each other.

The length M2 of the third coil unit 3230-3 in the longitudinal direction may be greater than the length M1 of the first coil unit 3230-1 in the longitudinal direction and the length of the second coil unit 3230-2 in the longitudinal direction (M2 M1). In addition, the length M2 of the sixth coil unit 3230-6 in the longitudinal direction may be greater than the length of the fourth coil unit 3230-4 in the longitudinal direction and the length of the fifth coil unit 3230-5 in the longitudinal direction.

For example, the length M2 of the third coil unit 3230-3 in the first-axis direction may be greater than the length M1 of the first coil unit 3230-1 in the second-axis direction and the length of the second coil unit 3230-2 in the second-axis direction.

In addition, for example, the length of the sixth coil unit 3230-6 in the first-axis direction may be greater than the length of the fourth coil unit 3230-4 in the second-axis direction and the length of the fifth coil unit 3230-5 in the second-axis direction.

The first-axis direction may be a direction from the first surface 3031a to the second surface 3031b of the circuit member 3231 or a direction opposite thereto. The second-axis direction may be a direction perpendicular to the first-axis direction. For example, the second-axis direction may be a direction from the third surface 3031c to the fourth surface 3031d of the circuit member 3231 or a direction opposite thereto.

In addition, the length Y1 of the third coil unit 3230-3 may be greater than the length X1 of the first coil unit 3230-1 and/or the length X2 of the second coil unit 3230-2 (Y1>X1, X2). In addition, the length Y1 of the sixth coil unit 3230-6 may be greater than the length X1 of the fourth coil unit 3230-4 and/or the length X2 of the fifth coil unit 3230-5 (Y1>X1, X2).

In addition, for example, the length X1 of the first coil unit 3230-1 and the length X2 of the second coil unit 3230-2 may be equal to each other (X1=X2).

The length L2 of the third magnet 3130-3 may be greater than the length L1 of the first magnet 3130-1 and/or the length of the second magnet 3130-2 (L2>L1). In addition, the length of the sixth magnet 3130-6 may be greater than the length of the fourth magnet 3130-4 and/or the length of the fifth magnet 3130-5.

For example, the length L2 of the third magnet 3130-3 in the first-axis direction may be greater than the length L1 of the first magnet 3130-1 in the second-axis direction and/or the length of the second magnet 3130-2 in the second-axis direction (L2>L1). In addition, the length of the sixth magnet 3130-6 in the first-axis direction may be greater than the length of the fourth magnet 3130-4 in the second-axis direction and/or the length of the fifth magnet 3130-5 in the second-axis direction.

Since M2>M1 and L2>L1, first electromagnetic force generated by the third coil unit 3230-3 and the third magnet 3130-3 may be greater than each of second electromagnetic force generated by the first coil unit 3230-1 and the first magnet 3130-1 and third electromagnetic force generated by the second coil unit 3230-2 and the second magnet 3130-2. In addition, fourth electromagnetic force generated by the sixth coil unit 3230-6 and the sixth magnet 3130-6 may be greater than each of fifth electromagnetic force generated by the fourth coil unit 3230-4 and the fourth magnet 3130-4 and sixth electromagnetic force generated by the fifth coil unit 3230-5 and the fifth magnet 3130-5.

As a result, the embodiment is capable of reducing the difference between the sum of the first electromagnetic force and the fourth electromagnetic force in the second-axis (e.g. X-axis) direction and the sum of the second electromagnetic force, the third electromagnetic force, the fifth electromagnetic force, and the sixth electromagnetic force in the first-axis (e.g. Y-axis) direction, thereby improving reliability in OIS operation.

For example, L1:L2=1:1 to 1:1.5. Alternatively, for example, L1:L2=1:1.2 to 1:1.4.

In addition, the length K2 of the third coil unit 3230-3 in the width direction may be greater than the length K1 of the first coil unit 3230-1 in the width direction and/or the length of the second coil unit 3230-2 in the width direction (K2>K1). However, the disclosure is not limited thereto. In another embodiment, both may be equal to each other. For example, K2 may be the length of the third coil unit 3230-3 in the second-axis direction, and K1 may be the length of each of the first coil unit 3230-1 and the second coil unit 3230-2 in the first-axis direction.

In addition, the length of the sixth coil unit 3230-6 in the width direction (or the second-axis direction) may be greater than the length of the fourth coil unit 3230-4 in the width direction and/or the length of the fifth coil unit 3230-5 in the width direction (or the first-axis direction). However, the disclosure is not limited thereto. In another embodiment, both may be equal to each other.

The length W2 of the third magnet 3130-3 in the width direction may be greater than the length of length W1 of the first magnet 3130-1 in the width direction and/or the length of the second magnet 3130-2 in the width direction (W2>W1). However, the disclosure is not limited thereto. In another embodiment, W2=W1.

For example, W2 may be the length of the third magnet 3130-3 in the second-axis direction, and W1 may be the length of each of the first and second magnets 3130-1 and 3130-2 in the first-axis direction.

The length of the sixth magnet 3130-6 in the width direction (or the second-axis direction) may be greater than the length of the fourth magnet 3130-4 in the width direction (or the first-axis direction) and/or the length of the fifth magnet 3130-5 in the width direction (or the first-axis direction). However, the disclosure is not limited thereto. In another embodiment, both may be equal to each other.

Since W2>W1, the embodiment is capable of reducing the difference between the sum of the first electromagnetic force and the fourth electromagnetic force in the second-axis (e.g. X-axis) direction and the sum of the second electromagnetic force, the third electromagnetic force, the fifth electromagnetic force, and the sixth electromagnetic force in the first-axis (e.g. Y-axis) direction, thereby improving reliability in OIS operation.

The height H2 of the third magnet 3130-3 may be equal to the height H1 of the first magnet 3130-1 and/or the height of the second magnet 3130-2 (H2=H1). Here, H1 and H2 may be the lengths of the magnets 3130-1 to 3130-3 in the optical-axis direction or a third-axis direction (e.g. the Z-axis direction or the optical-axis direction). Here, the third-axis direction may be a direction perpendicular to the first-axis direction and the second-axis direction.

Alternatively, H1 may be the distance from the lower surface to the upper surface of the first magnet 3130-1 (or the second magnet 3130-2), and H2 may be the distance from the lower surface to the upper surface of the third magnet 3130-3.

In addition, the height of the sixth magnet 3130-6 may be equal to the height of the fourth magnet 3130-4 and/or the height of the fifth magnet 3130-5.

In addition, for example, the lengths of the first to sixth magnets 3130-1 to 3130-6 in the optical-axis direction may be equal to each other.

Referring to FIG. 36, each of the first to sixth coil units 3230-1 to 3230-6 may be formed in a ring shape having a hole open in the optical-axis direction.

In addition, the first distance between the first magnet 3130-1 and the first coil unit 3230-1 in the optical-axis direction, the second distance between the second magnet 3130-2 and the second coil unit 3230-2 in the optical-axis direction, the third distance between the third magnet 3130-3 and the third coil unit 3230-3 in the optical-axis direction, the fourth distance between the fourth magnet 3130-4 and the fourth coil unit 3230-4 in the optical-axis direction, the fifth distance between the fifth magnet 3130-5 and the fifth coil unit 3230-5 in the optical-axis direction, and the sixth distance between the sixth magnet 3130-6 and the sixth coil unit 3230-6 in the optical-axis direction may be equal to each other. However, the disclosure is not limited thereto.

In another embodiment, the third distance may be less than the first distance and/or the second distance, and the sixth distance may be less than the fourth distance and/or the fifth distance (CASE1). When comparing with the case in which the first to sixth distances are equal to each other (CASE2), the other embodiment (CASE1) is capable of further reducing the difference between electromagnetic force generated in the X-axis direction and electromagnetic force generated in the Y-axis direction.

A camera module according to an embodiment may include a first magnet unit 3130a including three magnets 3130-1 to 3130-3 for AF driving of a first lens module and a second magnet unit 3130b including three magnets 3130-4 to 3130-6 for AF driving of a second lens module.

In addition, for OIS driving, the camera module according to the embodiment may include three OIS coil units 3230-1 to 3230-4 corresponding to the first to third magnets and three OIS coil units 3230-4 to 3230-6 corresponding to the fourth to sixth magnets 3130-4 to 3130-6.

Each of the first to sixth magnets 3130-1 to 3130-6 may be a monopolar magnetized magnet having a single N pole and a single S pole. For example, each of the first to sixth magnets 3130-1 to 3130-6 may be disposed such that a first surface thereof opposite the first coil 3120 (or the outer surface of the bobbin 3110) has an N pole and a second surface thereof opposite the first surface has an S pole. However, the disclosure is not limited thereto. Each magnet may be disposed so as to have reverse poles.

The positions of the S poles and the N poles of the first to sixth magnets 3130-1 to 3130-6 may be set such that electromagnetic force due to interaction therebetween is generated according to disposition of the first and second coils 3120-1 and 3120-2.

In another embodiment, at least one of the first to sixth magnets 3130-1 to 3130-6 may be a bipolar magnetized magnet or a 4-pole magnet. For example, each of the third and sixth magnets 3130-3 and 3130-6 may be a bipolar magnetized magnet, and each of the first, second, fourth, and fifth magnets 3130-1, 3130-2, 3130-4, and 3130-5 may be a monopolar magnetized magnet.

In the case in which a bipolar magnetized magnet is provided, the magnet may include a first magnet portion, a second magnet portion, and a partition disposed between the first magnet portion and the second magnet portion. Here, the partition may be referred to as a "nonmagnetic partition." In addition, the partition may be a portion that separates or isolates the first magnet portion and the second magnet portion from each other and that has substantially no magnetism, and may be a portion having little polarity. For example, the partition may be a nonmagnetic material or air. The partition may be referred to as a "neutral zone."

For example, the first magnet portion and the second magnet portion may be spaced apart from each other in the optical-axis (OA1 and OA2) directions. The first magnet portion may include an N pole, an S pole, and a first boundary surface between the N pole and the S pole, and the second magnet portion may include an N pole, an S pole, and a second boundary surface between the N pole and the S pole.

Each of the first boundary surface and the second boundary surface may be a portion having substantially no magnetism, may include a section having little polarity, and may be a portion that is naturally generated in order to form a magnet consisting of an N pole and an S pole.

The partition is a portion that is artificially formed when the first magnet portion and the second magnet portion are magnetized. The width of the partition may be greater than the width of each of the first boundary surface and the second boundary surface.

For example, the first magnet 3130-1 may be located inside a region of the first coil unit 3230-1, and may overlap the first coil unit 3230-1 in the optical-axis direction. The second magnet 3130-2 may be located inside a region of the second coil unit 3230-2, and may overlap the second coil unit 3230-2 in the optical-axis direction. The third magnet 3130-3 may be located inside a region of the third coil unit 3230-3, and may overlap the third coil unit 3230-3 in the optical-axis direction.

In addition, the fourth magnet 3130-4 may be located inside a region of the fourth coil unit 3230-4, and may overlap the fourth coil unit 3230-4 in the optical-axis direction. The fifth magnet 3130-5 may be located inside a region of the fifth coil unit 3230-5, and may overlap the fifth coil unit 3230-5 in the optical-axis direction. The sixth magnet 3130-6 may be located inside a region of the sixth coil unit 3230-6, and may overlap the sixth coil unit 3230-6 in the optical-axis direction.

Referring to FIGS. 36 and 38, a first-axis magnet may include the first magnet 3130-1, the second magnet 3130-2, the fourth magnet 3130-4, and the fifth magnet 3130-5.

In addition, a second-axis magnet may include the third magnet 3130-3 and the sixth magnet 3130-6.

The OIS mover 5300 may be moved in the first-axis direction due to interaction between the first-axis magnet and the first-axis coil, and the OIS mover 5300 may be moved in the second-axis direction due to interaction between the second-axis magnet and the second-axis coil.

Also, in another embodiment, a description given with reference to FIGS. 11 to 16F and a description given with reference to FIGS. 17A to 18B to 16F may be applied or analogically applied to the lens moving apparatus 3100 according to the embodiment shown in FIGS. 27 to 42.

For example, the size and disposition of the first to third magnets 130-1 to 130-3, the size and disposition of the third to firth coil units 230-1 to 230-3, and the size and disposition relationship between the magnets 130-1 to 130-3 and the coil units 230-1 to 230-3 may be applied or analogically applied to the first to third magnets 3130-1 to 3130-3, the first to third coil units 3230-1 to 3230-3, the fourth to sixth magnets 3130-4 to 3130-6, and the fourth to sixth coil units 3230-4 to 3230-6 according to the embodiment shown in FIGS. 27 to 42.

The first sensor 3240a may overlap the first-axis magnet in the third-axis direction.

The first sensor 3240a may overlap one end of the first-axis magnet in the third-axis direction, and the one end of the first-axis magnet may be adjacent to a region between the first opening 3023a and the second opening 3023b of the circuit member 3231.

Alternatively, one end of the first-axis magnet may be adjacent to a central line 3308 of the circuit member 3231. The central line 3308 may be a straight line that is parallel to the first-axis direction and that is equidistant from the third side surface 3031c and the fourth side surface 3031d of the circuit member 3231. Alternatively, the central line 3308 may be a straight line that bisects the circuit member 3231 in the first-axis direction.

For example, the first sensor may overlap one end of one of the first magnet 3130-1, the second magnet 3130-2, the fourth magnet 3130-4, and the fifth magnet 3130-5 in the third-axis direction.

For example, referring to FIG. 39A, the first sensor 3240a may be disposed under a first end 3029a of the first magnet 3130-1. Here, the first end 3029a of the first magnet 3130-1 may be located spaced apart from the third magnet 3130-3 more than a second end 3029b of the first magnet 3130-1.

In addition, the first end 3029a of the first magnet 3130-1 may be closer to the region between the first opening 3023a and the second opening 3023b of the circuit member 3231 or the central line 3308 than the second end 3029b of the first magnet 3130-1.

For example, a sensing region 304a of the first sensor 3240a may overlap the first magnet 3130-1 in the third-axis direction, and may be located adjacent to the first end 3029a of the first magnet 3130-1.

As the first sensor 3240a is disposed spaced apart from the third magnet 3130-3 and the sixth magnet 3130-6, each of which is a second-axis magnet, effects on the first sensor 3240a due to magnetic field interference of the second-axis magnet may be reduced, whereby the sensing sensitivity of the first sensor 3240a may be improved, and therefore accurate OIS driving may be performed.

The second sensor 3240b may overlap the second-axis magnet in the third-axis direction.

For example, the second sensor 3240b may overlap one of the third magnet 3130-3 and the sixth magnet 3130-6 in the third-axis direction.

For example, at least a portion of the second sensor 3240b may overlap the center of one of the third magnet 3130-3 and the sixth magnet 3130-6 in the third-axis direction. As the second sensor 3240b is maximally spaced apart from the first-axis magnet, the embodiment is capable of reducing magnetic field interference of the first-axis magnet, improving sensing sensitivity of the second sensor 3240b, and performing accurate OIS driving.

Figure 40A:
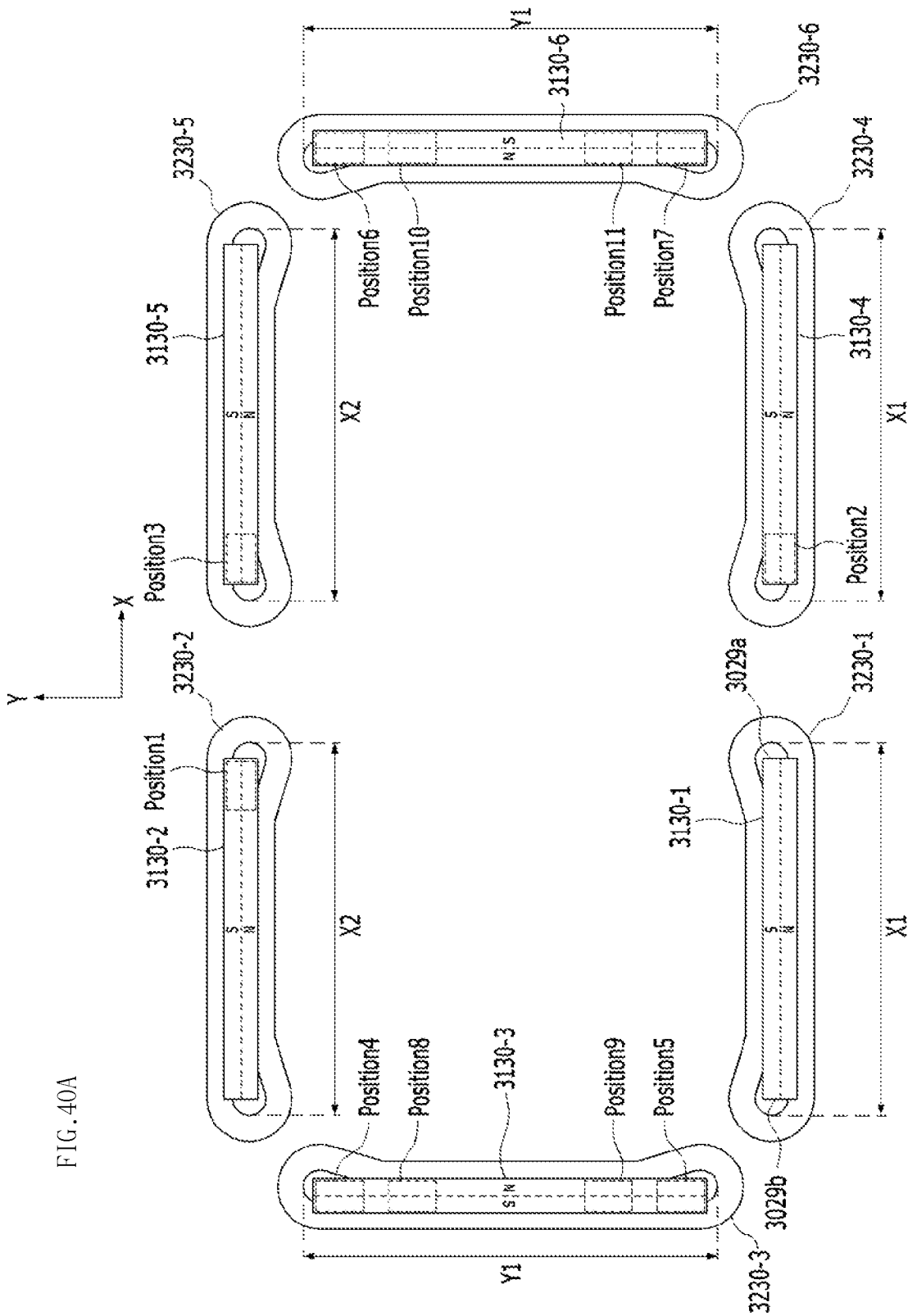
FIG. 40A shows the disposition position of a first sensor and the disposition position of a second sensor according to another embodiment.

In FIGS. 39A and 40A, the entire region of the first sensor 3240a is shown as overlapping the first-axis magnet in the third-axis direction, and the entire region of the second sensor 3240b is shown as overlapping the second-axis magnet in the third-axis direction. However, the disclosure is not limited thereto.

A sensing region 3040a of the first sensor 3240a may overlap the first-axis magnet in the third-axis direction, and a sensing region 3040b of the second sensor 3240b may overlap the second-axis magnet in the third-axis direction. In another embodiment, at least a portion of the first sensor 3240a may not overlap the first-axis magnet in the third-axis direction, and at least a portion of the second sensor 3240b may not overlap the second-axis magnet in the third-axis direction.

Also, in FIG. 39A, the first-axis magnet is shown as being disposed inside the first-axis coil, and the second-axis magnet is shown as being disposed inside the second-axis coil. However, the disclosure is not limited thereto.

In another embodiment, the first-axis magnet may include a first portion disposed outside the first-axis coil, and the first portion of the first-axis magnet may not overlap the first-axis coil in the third-axis direction. In addition, the first sensor may overlap the first portion of the first-axis magnet in the third-axis direction.

The second-axis magnet may include a first portion disposed outside the second-axis coil, and the first portion of the second-axis magnet may not overlap the second-axis coil in the third-axis direction. In addition, the second sensor may overlap the first portion of the second-axis magnet in the third-axis direction.

Figure 39B:
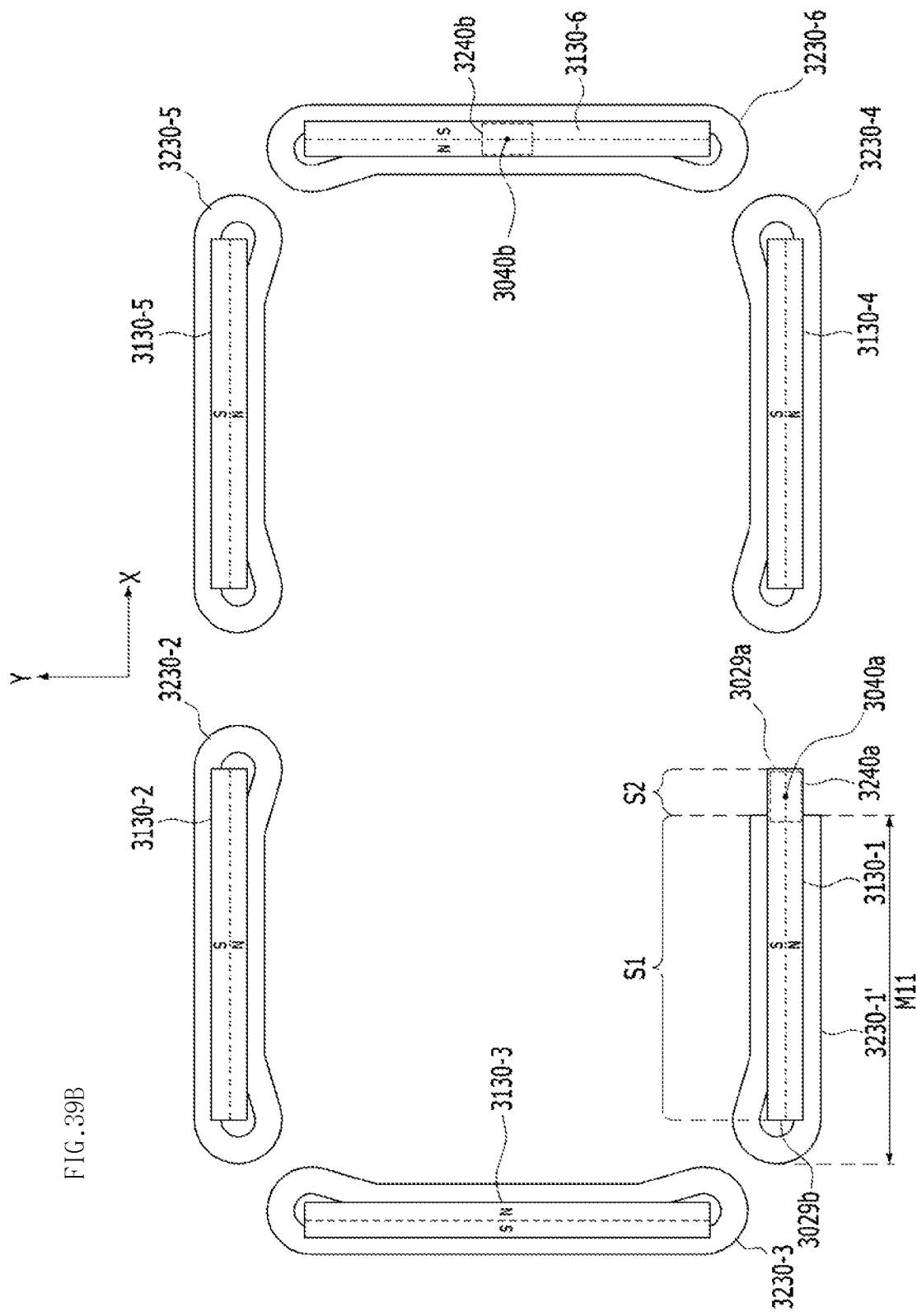
FIG. 39B is a plan view of first to sixth coil units and first to sixth magnets according to another embodiment.

FIG. 39B is a plan view of first to sixth coil units and first to sixth magnets according to another embodiment. Reference numerals of FIG. 39B identical to those of FIG. 39A indicate the same components, and a description given with reference to FIG. 39A may be applied to the same components.

Referring to FIG. 39B, the length M11 of a first coil unit 3230-1' in the second-axis direction may be less than the length M1 of each of the second coil unit 3230-2, the fourth coil unit 3230-4, and the fifth coil unit 3230-5, each of which is a first-axis coil, in the second-axis direction (M11<M1).

One end of the first magnet 3130-1 may not overlap the first coil unit 3230-1' in the third-axis direction, and may overlap the first sensor 3240a in the third-axis direction.

In addition, the other end of the first magnet 3130-1 may overlap the first coil unit 3230-1' in the third-axis direction.

In addition, both ends of the second magnet 3130-2 may overlap the second coil unit 3230-2 in the third-axis direction. Both ends of the fourth magnet 3130-4 may overlap the fourth coil unit 3230-4 in the third-axis direction. Both ends of the fifth magnet 3130-5 may overlap the fifth coil unit 3230-5 in the third-axis direction.

In addition, both ends of the third magnet 3130-3 may overlap the third coil unit 3230-3 in the third-axis direction, and both ends of the sixth magnet 3130-6 may overlap the sixth coil unit 3230-6 in the third-axis direction.

The lower surface of the first magnet 3130-1 may have one end that does not overlap the first coil unit 3230-1' in the third-axis direction, and the first sensor 3240*a* may overlap the end of the lower surface of the first magnet 3130-1 in the third-axis direction.

For example, when viewed from above, one end of the first magnet 3130-1 may be disposed outside the first coil unit 3230-1', and the other end of the first magnet 3130-1 may be disposed inside both ends of the first coil unit 3230-1'.

In addition, the first magnet 3130-1 may include a first region S1 that overlaps the first coil unit 3230-1' in the third-axis direction and a second region S2 that does not overlap the first coil unit 3230-1' in the third-axis direction.

The first sensor 3240*a* may overlap the second region S2 of the first magnet 3130-1 in the third-axis direction.

For example, the sensing region 3040*a* of the first sensor 3240*a* may overlap the second region S2 of the first magnet 3130-1 in the third-axis direction. In addition, for example, the sensing region 3040*a* may be located at the center of the first sensor 3240*a*, and the center of the first sensor 3240*a* may overlap the second region S2 of the first magnet 3130-1 in the third-axis direction.

Since the sensing region 3040*a* of the first sensor 3240*a* is disposed so as to overlap the second region S2 of the first magnet 3130-1, as described above, effects on the first sensor 3240*a* due to a magnetic field generated by the first coil unit 3230-1' may be inhibited, whereby accurate OIS feedback driving may be performed.

Figure 39C:
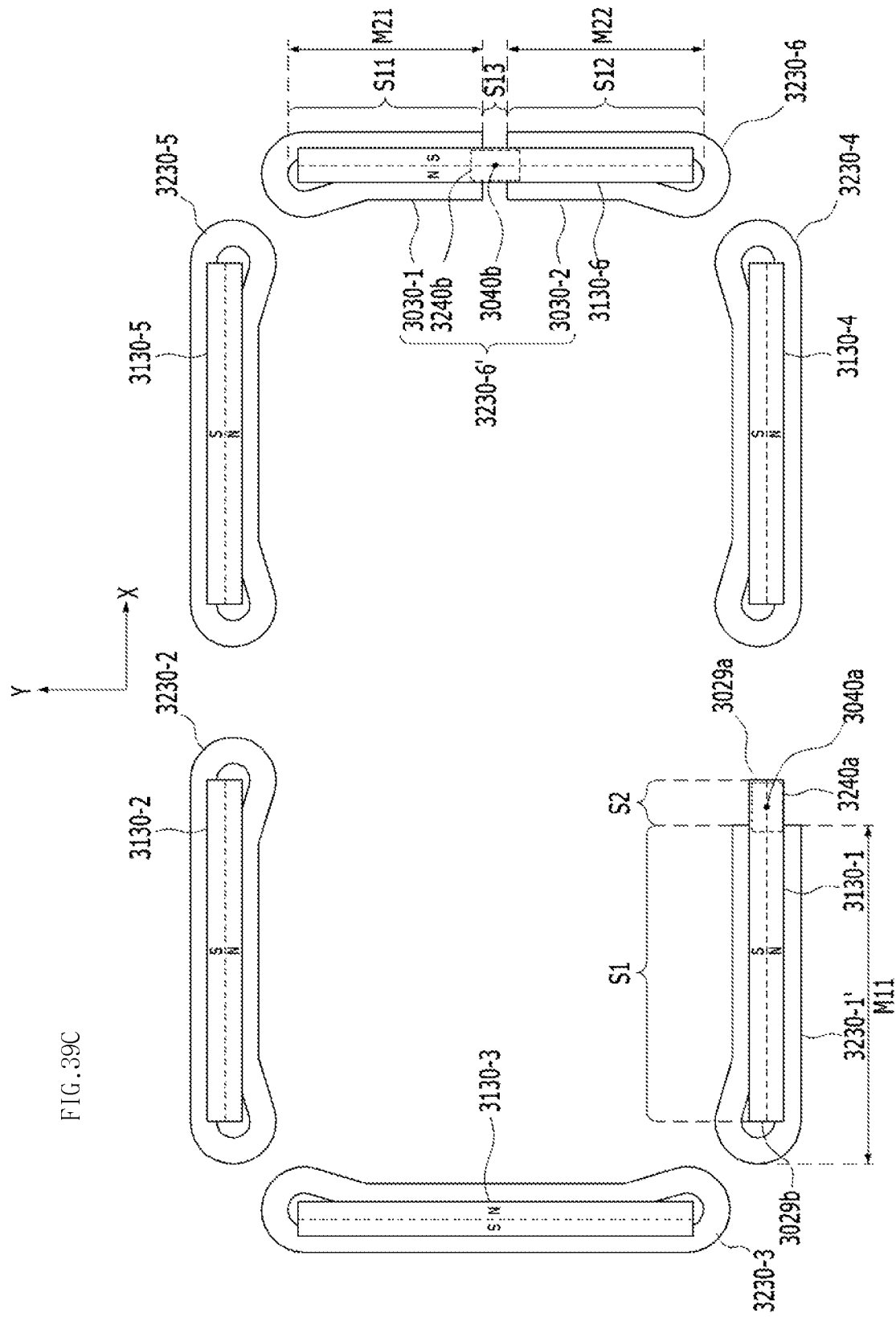
FIG. 39C is a plan view of first to sixth coil units and first to sixth magnets according to a further embodiment.

FIG. 39C is a plan view of first to sixth coil units and first to sixth magnets according to a further embodiment. Reference numerals of FIG. 39C identical to those of FIG. 39B indicate the same components, and a description given with reference to FIG. 39B may be applied to the same components.

Referring to FIG. 39C, a sixth coil unit 3230-6' may include a first coil portion 3030-1 and a second coil portion 3030-2. Here, the coil portion may be referred to as a "coil ring."

The first coil portion 3030-1 and the second coil portion 3030-2 may be connected to each other. For example, the first coil portion 3030-1 and the second coil portion 3030-2 may be connected to each other in series, and a single driving signal may be provided thereto.

For example, the sixth coil unit 3230-6' may further include a connection wire configured to interconnect the first coil portion 3030-1 and the second coil portion 3030-2. For example, the connection wire may be a single line. However, the disclosure is not limited thereto.

The first coil portion 3030-1 and the second coil portion 3030-2 may each have a ring shape, and may be spaced apart from each other. For example, the first coil portion 3030-1 and the second coil portion 3030-2 may be arranged in the first-axis direction.

The length M21 of the first coil portion 3030-1 in the first-axis direction may be less than the length M2 of the third coil unit 3230-3 in the first-axis direction (M21<M2). In addition, the length M22 of the second coil portion 3030-2 in the first-axis direction may be less than the length M2 of the third coil unit 3230-3 in the first-axis direction (M22<M2).

In addition, the length M21 or M22 of each of the first coil portion 3030-1 and the second coil portion 3030-2 in the first-axis direction may be less than the length M11 of the first coil unit 3230-1' in the second-axis direction (M21<M11, M22<M11). In another embodiment, M21=M11 and M22=M11.

In addition, the length M21 or M22 of each of the first coil portion 3030-1 and the second coil portion 3030-2 in the first-axis direction may be less than the length M1 of each of the second coil unit 3230-2, the fourth coil unit 3230-4, and the fifth coil unit 3230-5 in the second-axis direction (M21<M1, M22<M1).

A central region of the sixth magnet 3130-6, located between one end and the other end of the sixth magnet 3130-6, may not overlap the sixth coil unit 3230-6' in the third-axis direction. The central region of the sixth magnet 3130-6 may overlap the second sensor 3240*b* (or the sensing region 3040*b*) in the third-axis direction.

In addition, for example, both ends of the sixth magnet 3130-6 may overlap the sixth coil unit 3230-6'.

For example, the sixth magnet 3130-6 may include first regions S11 and S12 that overlap the first and second coil portions 3030-1 and 3030-2 in the third-axis direction and a second region S13 that does not overlap the first and second coil portions 3030-1 and 3030-2 in the third-axis direction.

The second sensor 3240*a* may overlap the second region S13 of the sixth magnet 3130-6 in the third-axis direction. For example, the sensing region 3040*b* of the second sensor 3240*b* may overlap the second region S13 of the sixth magnet 3130-6 in the third-axis direction. As a result, effects on the second sensor 3240*b* due to a magnetic field generated by the sixth coil unit 3230-6' may be inhibited, whereby accurate OIS feedback driving may be performed.

The second region S13 of the sixth magnet 3130-6 may overlap a region (or a space) between the first coil portion 3030-1 and the second coil portion 3030-2 in the third-axis direction.

In another embodiment, the second sensor 3240*a* may be disposed under the third magnet 3130-3 so as to overlap the third magnet 3130-3 in the third-axis direction. At this time, the third coil unit may be configured to include the first and second coil portions 3030-1 and 3030-2 of FIG. 39C, and a description of FIG. 19C may be applied.

In FIGS. 39B and 39C, the case in which the first sensor 3240*a* overlaps the first magnet 3130-1 was described. However, the disclosure is not limited thereto. In another embodiment, as shown in FIG. 40A, the first sensor 3240*a* may be disposed at one of first to third positions Position1 to Position3, a coil unit (e.g. 3230-2, 3230-4, or 3230-5) corresponding to each position Position1, Position2, or Position3 may be configured like the first coil unit 3230-1 of FIG. 39B, and a description of FIG. 39B may be applied.

Also, in FIGS. 39B and 39C, the first sensor 3240*a* partially overlaps the first region S1 of the first coil unit 3230-1' in the third-axis direction. However, the disclosure is not limited thereto. In another embodiment, the first sensor 3240*a* may not overlap the first coil unit in the third-axis direction. In a further embodiment, the first sensor 3240*a* may include a portion (or one end) that does not overlap the first magnet 3130-1 in the third-axis direction.

FIG. 40A shows the disposition position of a first sensor 3240*a* and the disposition position of a second sensor 3240*b* according to another embodiment.

Referring to FIG. 40A, the first sensor 3240*a* may be disposed at a first position Position1 at which the first sensor overlaps a first end of the second magnet 3130-2 in the third-axis direction. Here, the first end of the second magnet 3130-2 may be adjacent to a first end of the fifth magnet 3130-5.

Alternatively, the first sensor 3240*a* may be disposed at a second position Position2 at which the first sensor overlaps a first end of the fourth magnet 3130-4 in the third-axis direction. Here, the first end of the fourth magnet 3130-4 may be adjacent to a first end of the first magnet 3130-1.

Alternatively, the first sensor 3240a may be disposed at a third position Position3 at which the first sensor overlaps a first end of the fifth magnet 3130-5 in the third-axis direction.

When the first sensor 3240a is disposed at one of the first to third positions Position1 to Position 3, as described above, a description of the first coil unit 3230-1' and the first magnet 3130-1 of FIG. 38B may be applied.

The second sensor 3240b may be disposed at a second position Position2 at which the second sensor overlaps a first end or a second end of one of the third and sixth magnets 3130-3 and 3130-6 in the third-axis direction (Position4, Position5, Position6, or Position7).

Alternatively, the second sensor 3240b may be disposed at a second position Position2 at which the second sensor overlaps a first inner region or a second inner region of the third magnet 3130-3 in the third-axis direction (Position8 or Position9).

The first inner region of the third magnet 3130-3 may be a region located between the first end of the third magnet 3130-3 and a central region of the third magnet 3130-3. The second inner region of the third magnet 3130-3 may be a region located between the second end of the third magnet 3130-3 and the central region of the third magnet 3130-3.

Alternatively, the second sensor 3240b may be disposed at a second position Position2 at which the second sensor overlaps a first inner region or a second inner region of the sixth magnet 3130-6 in the third-axis direction (Position10 or Position11). The first inner region of the sixth magnet 3130-6 may be a region located between the first end of the sixth magnet 3130-6 and a central region of the sixth magnet 3130-6. The second inner region of the sixth magnet 3130-6 may be a region located between the second end of the sixth magnet 3130-6 and the central region of the sixth magnet 3130-6.

In FIG. 36, the first to sixth coil units 3230-1 to 3230-6 may be formed at the circuit member 3231, rather than the circuit board 3250. However, the disclosure is not limited thereto. In another embodiment, each of the first to sixth coil units 3230-1 to 3230-6 may not be formed at the circuit member 3231 but may be configured in the form of a ring-shaped coil block.

Figure 40B:
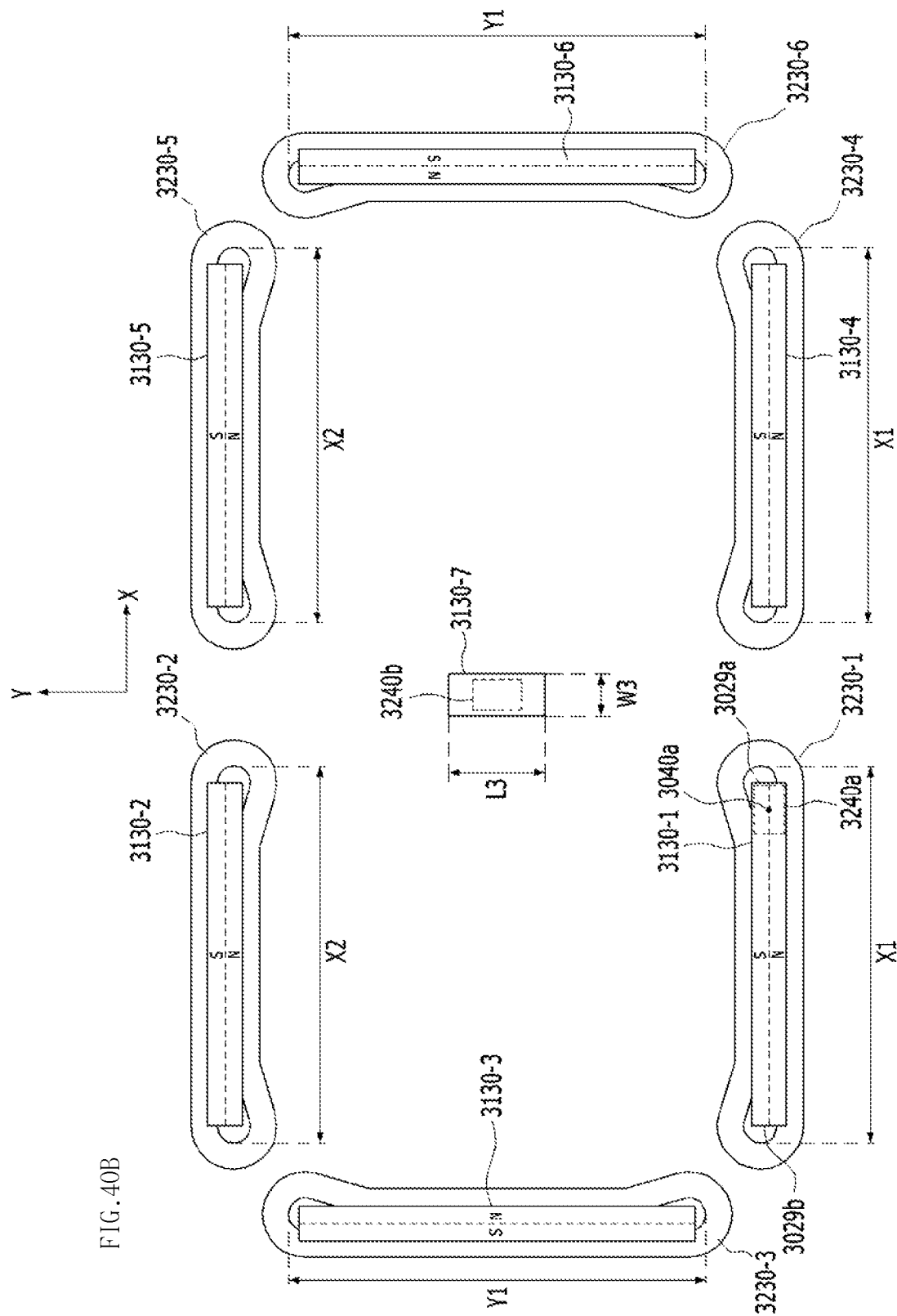
FIG. 40B shows the disposition of a first sensor and a second sensor according to a further embodiment.

FIG. 40B shows the disposition of a first sensor and a second sensor according to a further embodiment.

Referring to FIG. 40B, the lens moving apparatus 3100 may further include a separate seventh magnet 3130-7 for the second sensor 3240b.

The seventh magnet 3130-7 may be disposed at the housing 3140. The seventh magnet 3130-7 may be disposed between the first bobbin 3110a and the second bobbin 3110b.

The seventh magnet 3130-7 may be disposed at a region of the housing 3140 located between the first bobbin 3110a and the second bobbin 3110b.

For example, the seventh magnet 3130-7 may be disposed at the fourth side portion 3014d of the first receiving unit 3011a or the eighth side portion 3015d of the first receiving unit 3011b of the housing 3140.

The seventh magnet 3130-7 may not be a driving magnet configured to generate AF driving force through interaction with the first coil 3120a or the second coil 3120b, and may serve to provide a magnetic field to the second sensor 3240b in order to sense movement of the housing 3140 in the second-axis direction. That is, it is sufficient for the seventh magnet 3130-7 to provide a magnetic field that the second sensor 3240b can sense.

For example, the length L3 of the seventh magnet 3130-7 in the first-axis direction may be less than the length M1 of the first-axis magnet 3130-1, 3130-2, 3130-4, or 3130-5 in the second-axis direction and the length L2 of the second-axis magnet 3130-3 or 3130-6 in the first-axis direction (L3<M1, L2).

In addition, for example, the length W3 of the seventh magnet 3130-7 in the second-axis direction may be less than the length W1 of the first-axis magnet 3130-1, 3130-2, 3130-4, or 3130-5 in the first-axis direction and the length W2 of the second-axis magnet 3130-3 or 3130-6 in the second-axis direction (W3<W1, W2).

In addition, for example, the length W3 of the seventh magnet 3130-7 in the second-axis direction may be less than or equal to the length of the first-axis magnet 3130-1, 3130-2, 3130-4, or 3130-5 in the third-axis direction and the length W2 of the second-axis magnet 3130-3 or 3130-6 in the third-axis direction.

In the case in which the size of the seventh magnet 3130-7 is increased, effects on AF driving of a first lens unit or AF driving of a second lens unit due to a magnetic field of the seventh magnet 3130-7 may be increased, whereby AF driving may malfunction. In the embodiment, however, the size of the seventh magnet 3130-7 is formed so as to be less than the size of each of the first-axis magnet and the second-axis magnet, effects of the magnetic field of the seventh magnet 3130-7 may be reduced, whereby malfunction of AF driving may be inhibited.

For example, the seventh magnet 3130-7 may overlap at least one of the third magnet 3130-3 and the sixth magnet 3130-6 in the second-axis direction.

In addition, the seventh magnet 3130-7 may not overlap the first-axis magnet 3130-1, 3130-2, 3130-4, or 3130-5 in the first-axis direction.

In addition, the seventh magnet 3130-7 may not overlap the third coil 3230 in the third-axis direction. For example, the seventh magnet 3130-7 may not overlap the first to sixth coil units 3230-1 to 3230-6 in the third-axis direction.

For example, in order to minimize magnetic field interference with the first-axis magnet and the second-axis magnet, the seventh magnet 3130-7 may be disposed so as to be located at the center of the fourth side portion 3014d or the eighth side portion 3015d of the housing 3140. However, the disclosure is not limited thereto.

In addition, the distance between the first magnet 3130-1 (or the fourth magnet 3130-4) and the seventh magnet 3130-7 may be equal to the distance between the second magnet 3130-2 (or the fifth magnet 3130-5) and the seventh magnet 3130-7. However, the disclosure is not limited thereto. In another embodiment, both may be different from each other.

In addition, the distance between the third magnet 3130-3 and the seventh magnet 3130-7 may be equal to the distance between the sixth magnet 3130-6 and the seventh magnet 3130-7. However, the disclosure is not limited thereto. In another embodiment, both may be different from each other.

The second sensor 3240b may be disposed under the seventh magnet 3130-7.

The second sensor 3240b may overlap the seventh magnet 3130-7 in the third-axis direction. For example, the sensing region 3040b of the second sensor 3240b may overlap the seventh magnet 3130-7 in the third-axis direction.

The sensor coupling portion 3433b configured to receive the second sensor 3240b of FIG. 40B may be formed between the first opening 3431a and the second opening 3431b of the base 3210. In order to avoid spatial interference with the second sensor 3240b, the projecting portion 3025a of the base 3210 may be formed spaced apart from the sensor coupling portion 3433*b*.

The embodiment in which the first sensor is disposed at one of the first to third positions Position1 to Position3 of FIG. 40A may be applied to the disposition of the first sensor 3240*a* of FIG. 40B. In addition, a description of the first coil unit 3230-1' and the first magnet 3130-1 of FIG. 39B may be applied to the embodiment of FIG. 40B.

Figure 40C:
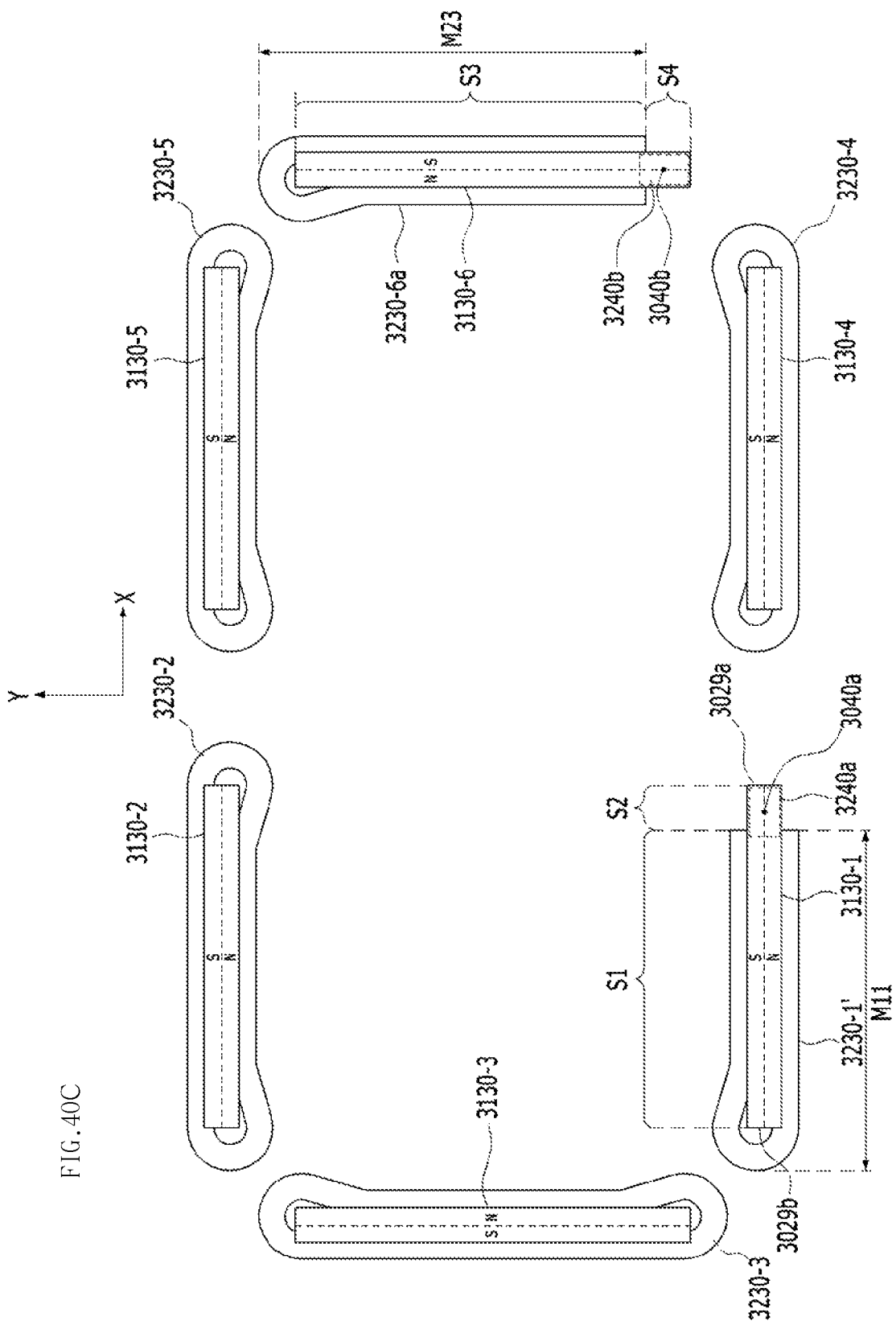
FIG. 40C shows a second sensor and a sixth coil unit disposed at a seventh position of FIG. 40B.

FIG. 40C shows a second sensor 3240*b* and a sixth coil unit 3230-6*a* disposed at the seventh position Position7 of FIG. 40B.

Referring to FIG. 40C, the length M23 of the sixth coil unit 3230-6*a* in the first-axis direction may be less than the length M2 of the third coil unit 3230-3 (M23<M2). For example, the length M23 of the sixth coil unit 3230-6*a* may be greater than the length M11 of the first coil unit 3230-1' (M23>M11). In addition, the length M23 of the sixth coil unit 3230-6*a* may be greater than or equal to the length M1 of each of the second coil unit 3230-2, the fourth coil unit 3230-4, and the fifth coil unit 3230-5 (M23≥M1). However, the disclosure is not limited thereto. In another embodiment, M23<M1.

One end of the sixth magnet 3130-6 may not overlap the sixth coil unit 3230-6*a* in the third-axis direction, and may overlap the second sensor 3240*b* in the third-axis direction. In addition, the other end of the sixth magnet 3130-6 may overlap the sixth coil unit 3230-6*a* in the third-axis direction.

The lower surface of the sixth magnet 3130-6 may have one end that does not overlap the sixth coil unit 3230-6*a* in the third-axis direction, and the second sensor 3240*b* may overlap the end of the lower surface of the sixth magnet 3130-6 in the third-axis direction.

For example, when viewed from above, one end of the sixth magnet 3130-6 may be disposed outside the sixth coil unit 3230-6*a*, and the other end of the sixth magnet 3130-6 may be disposed inside both ends of the sixth coil unit 3230-6*a*.

In addition, the sixth magnet 3130-6 may include a first region S3 that overlaps the sixth coil unit 3230-6*a* in the third-axis direction and a second region S4 that does not overlap the sixth coil unit 3230-6*a* in the third-axis direction.

The second sensor 3240*b* may overlap the second region S4 of the sixth magnet 3130-6 in the third-axis direction. For example, the sensing region 3040*b* of the second sensor 3240*b* may overlap the second region S4 of the sixth magnet 3130-6 in the third-axis direction. In addition, for example, the sensing region 3040*b* may be located at the center of the second sensor 3240*b*, and the center of the second sensor 3240*b* may be overlap the second region S4 of the sixth magnet 3130-6 in the third-axis direction. As a result, effects on the second sensor 3240*b* due to a magnetic field generated by the sixth coil unit 3230-6*a* may be inhibited, whereby accurate OIS feedback driving may be performed.

A description of FIG. 40C may be applied to or quoted in an embodiment in which the second sensor 3240*b* is disposed at the fourth position Position4, the fifth position Position5, or the sixth position Position6.

Figure 41:
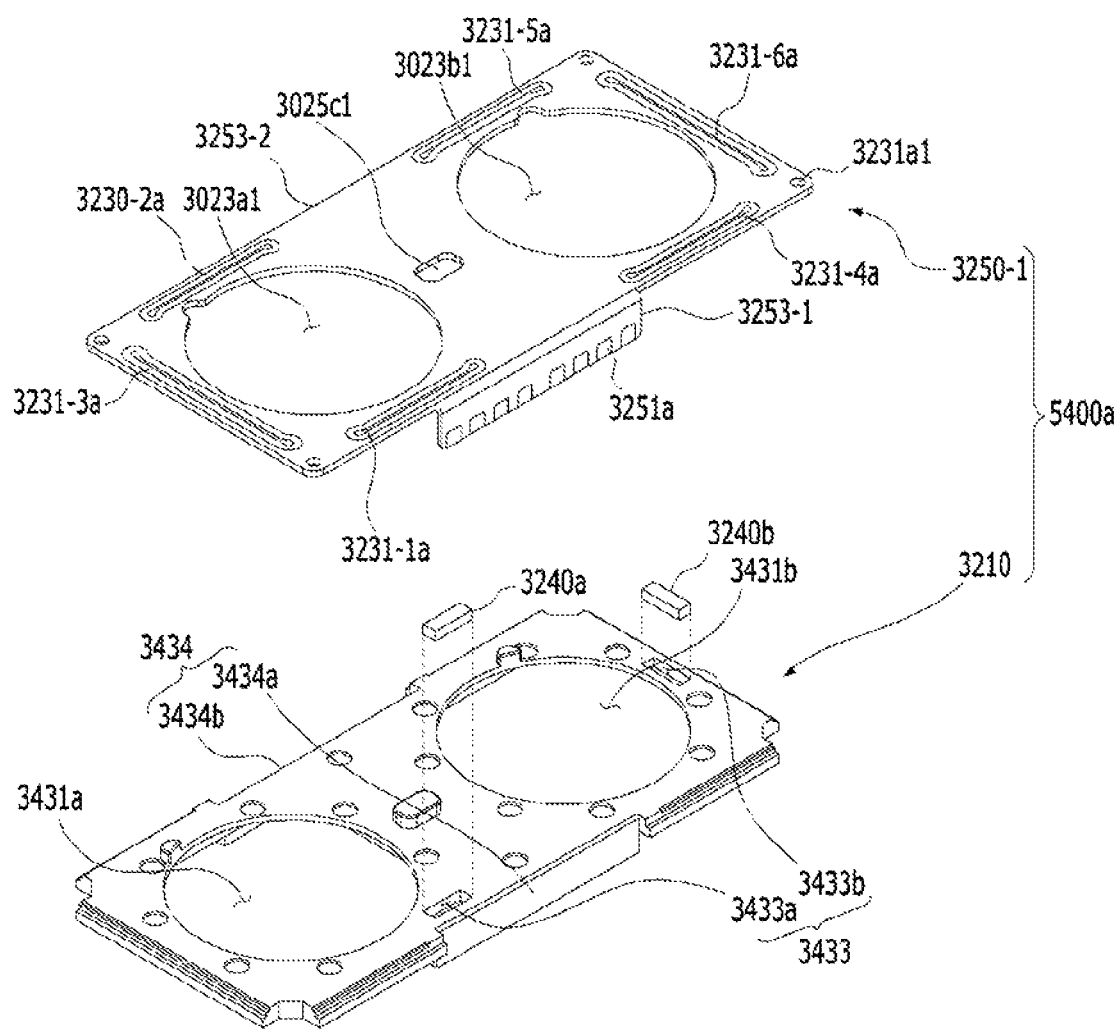
FIG. 41 is a perspective view of a stator according to another embodiment.

FIG. 41 is a perspective view of a stator 5400*a* according to another embodiment.

Referring to FIG. 41, the stator 5400*a* includes a circuit member 3250-1 and a base 3210.

In the stator 5400 of FIG. 31A, the circuit member 3231 and the circuit board 3250 are separately provided. However, the circuit member 3250-1 of the stator 5400*a* of FIG. 41 may be realized by integrally forming the circuit member 3231 and the circuit board 3250 of FIG. 31A.

That is, the circuit member 3250-1 may include a board portion 3421*a*, a third coil including first to sixth coil units 3130-1*a* to 3130-6*a*, and terminal portions 3253-1 and 3253-2 at which terminals 3251*a* are formed.

The board portion 3421*a* may include a first opening 3023*a*1 and a second opening 3023*b*1 corresponding to the first bobbin 3110*a*.

The first to sixth coil units 3130-1*a* to 3130-6*a* may be formed at the board portion 3421*a*1, and a description of the first to sixth coil units 3130-1 to 3130-6 of FIGS. 31A and 36 to 40B may be applied thereto.

The board portion 3431*a* may be provided at each corner thereof with a hole 3231*a*1, through which the supporting member 3600 extends. The board portion 3431*a* may have a through hole 3025*c*1 for coupling with the protrusion of the base 3210. A description of the hole 3231*a* and the through hole 3025*c* of FIG. 31C may be applied to the hole 3231*a*1 and the through hole 3025*c*1 of FIG. 41.

The terminal portions 3253-1 and 3253-2 may be disposed at at least one of two opposite sides (or side surfaces) of the circuit member 3250-1.

For example, the circuit member 3250-1 may include a first terminal portion 3253-1 disposed at one of two opposite long sides (or long side surfaces) of the circuit member 3250-1 and a second terminal portion 3253-2 disposed at the other of the two opposite long sides (or long side surfaces).

The terminal portions 3253-1 and 3253-2 may be formed as the result of a portion of the circuit member 3250-1 being bent. For example, the circuit member 3250-1 may include portions bent downwards from the upper surface of the circuit member 3250-1, and the bent portions may form the terminal portions of the circuit member 3250-1.

A description of the terminal portions of the circuit board 3250 of FIG. 31A may be applied to the terminal portions 3253-1 and 3253-2 of the circuit member 3250-1.

A plurality of terminals 3251*a* may be formed at the terminal portions 3253-1 and 3253-2 of the circuit member 3250-1. A description of the terminals 3251 of the circuit board 3250 may be applied to the terminals 3251*a* of the circuit member 3250-1.

The supporting member 3600 may be connected to the circuit member 3250-1. For example, each of the supporting members 3601 to 3604 may be soldered to the lower surface of the circuit member 3250-1 through a corresponding one of the holes 3231*a*1 formed in the corners of the circuit member 3250-1.

The supporting members 3601 to 3604 may be connected to four AF coil terminals, among the plurality of terminals of the circuit member 3250-1.

The first to sixth coil units 3130-1*a* to 3130-6*a* may be connected to OIS terminals, among the plurality of terminals.

For example, the first coil unit 3230-1*a*, the second coil unit 3230-2*a*, the fourth coil unit 3230-4*a*, and the fifth coil unit 3230-5*a*, each of which is a first-axis coil, may be connected to each other in series. Both ends of the first-axis coil may be connected to two OIS terminals, among the plurality of terminals of the circuit member 3250-1.

For example, the third coil unit 3230-3*a* and the sixth coil unit 3230-6*a*, each of which is a second-axis coil, may be connected to each other in series. Both ends of the second-axis coil may be connected to two other OIS terminals, among the plurality of terminals of the circuit member 3250-1.

The circuit member 3250-1 may include a first circuit pattern or a first wire configured to interconnect both ends of the first-axis coil and the two OIS terminals, and may include a second circuit pattern or a second wire configured to interconnect both ends of the second-axis coil and the other two OIS terminals.

Since the circuit member 3231 and the circuit board 3250 of FIG. 31A are integrated in the embodiment of FIG. 41, the number of parts may be reduced and the height of the lens moving apparatus may be reduced, whereby miniaturization may be achieved. In addition, malfunction due to poor contact between the circuit member 3231 and the circuit board 3250 may be prevented.

The lens moving apparatus 3100 according to the above embodiment may be realized as a camera module or an optical instrument or may be used in various fields, such as those of a camera module or an optical instrument.

For example, the lens moving apparatus 2100 according to the embodiment may be included in an optical instrument configured to form an image of an object in a space using reflection, refraction, absorption, interference, diffraction, etc., which are characteristics of light, to increase the visual power of the eyes, to record or reproduce an image formed by a lens, to perform optical measurement, or to propagate or transfer an image. For example, an optical instrument according to an embodiment may include a smartphone or a portable terminal equipped with a camera.

Figure 42:
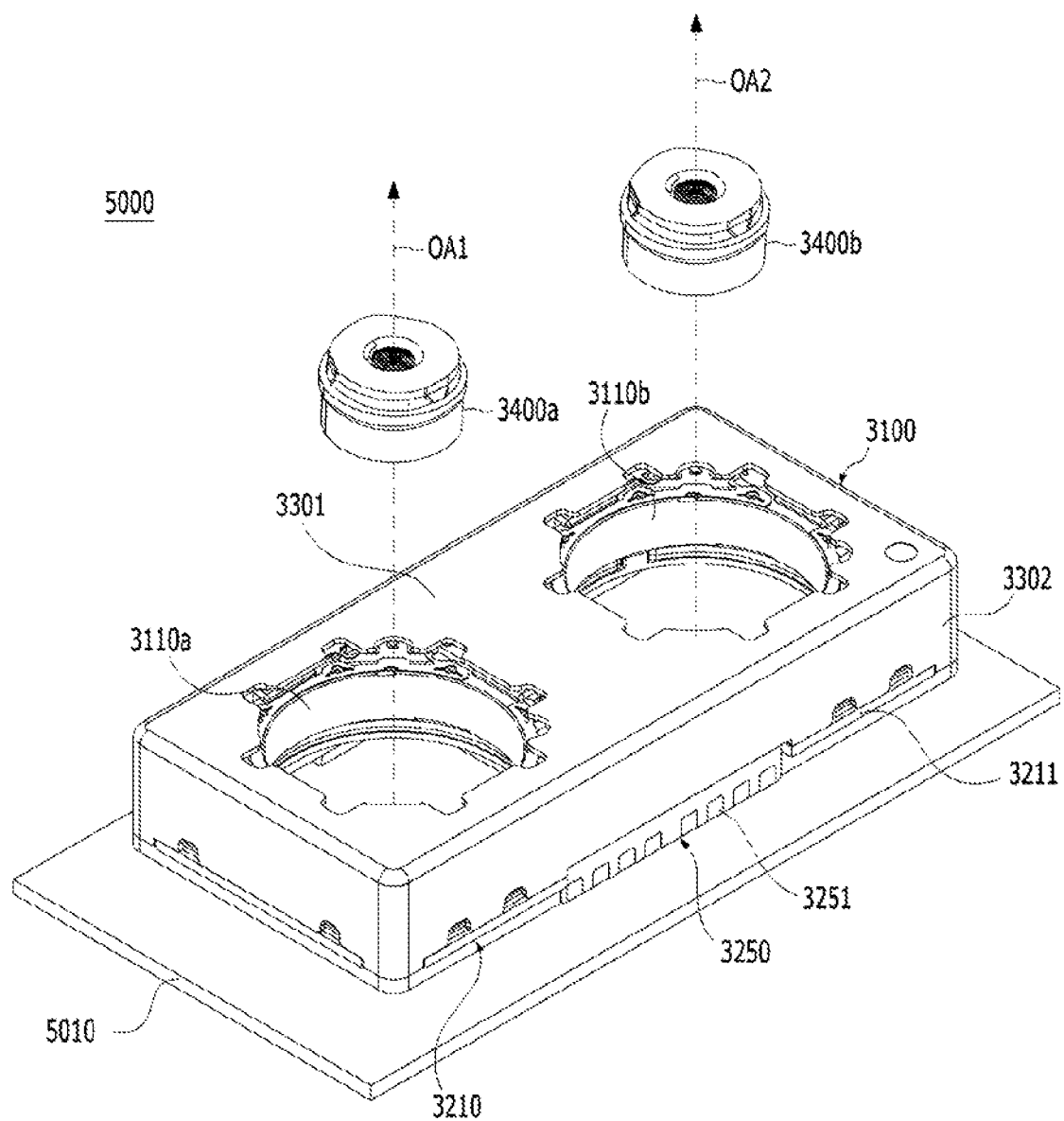
FIG. 42 is a perspective view of a camera module according to an embodiment.

FIG. 42 is a perspective view of a camera module 5000 according to another embodiment.

Referring to FIG. 42, the camera module 5000 may include a lens moving apparatus 3100, a first lens module 3400a mounted to a first bobbin 3110a, a second lens module 3400b mounted to a second bobbin 3110b, a circuit board 5010, an infrared filter (not shown), an image sensor (not shown), and a controller (not shown). However, at least one of the circuit board 5010, the infrared filter (not shown), the image sensor (not shown), and the controller (not shown) may be omitted from the camera module 5000 or may be changed. The lens moving apparatus 3100 may be the lens moving apparatus according to the embodiment described above.

Each of the first and second lens modules 3400a and 3400b may include at least one lens. Alternatively, each of the first and second lens modules 3400a and 3400b may include a lens and a lens barrel configured to receive the lens therein. However, one component of the lens module is not limited to the lens barrel, and any holder structure capable of supporting one or more lenses may be used.

The lens modules 3400a and 3400b may be coupled to the bobbins 3110a and 3110b using an adhesive (not shown). In an example, the lens modules 3400a and 3400b may be screw-engaged with the bobbins 3110a and 3110b. Meanwhile, light passing through the first and second lens modules 3400a and 3400b may be irradiated on the image sensor.

The infrared filter may prevent infrared light from being incident on the image sensor. The infrared filter may be disposed between the lens modules 3400a and 3400b and the image sensor.

In an example, the infrared filter may be disposed at a holder member provided separately from a base 3210 of the lens moving apparatus 3100. In another example, the infrared filter may be mounted in through holes 3431a and 3431b of the base 3210.

The infrared filter may include a first infrared filter and a second infrared filter.

The first infrared filter may be mounted in the first through hole 3431a of the base 3120, and may block an infrared component of the light passing through the first lens module 3400a. The second infrared filter may be mounted in the second through hole 3431b of the base 3120, and may block an infrared component of the light passing through the second lens module 3400b.

The infrared filter may be made of a film material or a glass material. The infrared filter may be formed by coating a flat optical filter, such as a cover glass for imaging surface protection, with an anti-infrared coating material. In an example, the infrared filter may be an infrared absorption filter configured to absorb infrared light. In another example, the infrared filter may be an infrared reflection filter configured to reflect infrared light.

The base 3210 of the lens moving apparatus 3100 may be disposed at the upper surface of the circuit board 5010. The camera module 5000 may further include a separate holder member (not shown) disposed between the circuit board 5010 and the base 3210.

The circuit board 5010 may supply electric power or a driving signal (driving current) to a first coil 3120a, a second coil 3120b, and a third coil 3230.

The image sensor may be disposed at the circuit board 5010, may be connected to the circuit board 5010, and may convert light irradiated on an effective image region of the image sensor into an electrical signal.

In an example, the image sensor may be coupled to the circuit board 5010 by surface mounting technology (SMT). In another example, the image sensor may be coupled to the circuit board 5010 by flip chip technology.

The image sensor may include a first image sensor configured to convert light passing through the first lens module 3400a and the first infrared filter into an electrical signal and a second image sensor configured to convert light passing through the second lens module 3400b and the second infrared filter into an electrical signal. The first image sensor may be disposed so as to be aligned in optical axis with the first lens module 3400a, and the second image sensor may be disposed so as to be aligned in optical axis with the second lens module 3400b.

The controller may be disposed at the circuit board 5010. In another example, the controller may be disposed at an external component other than the circuit board 5010.

The controller may individually control the direction, intensity, and amplitude of current that is supplied to the first to third coils 3120a, 3120b, and 3230.

The controller may control current that is supplied to the first to third coils 3120a, 3120b, and 3230 to perform at least one of an autofocus function and a handshake compensation function of the dual camera module.

In addition, the controller may perform at least one of feedback control of the autofocus function and feedback control of the handshake compensation function based on the output of a first sensor and the output of a second sensor.

Figure 43:
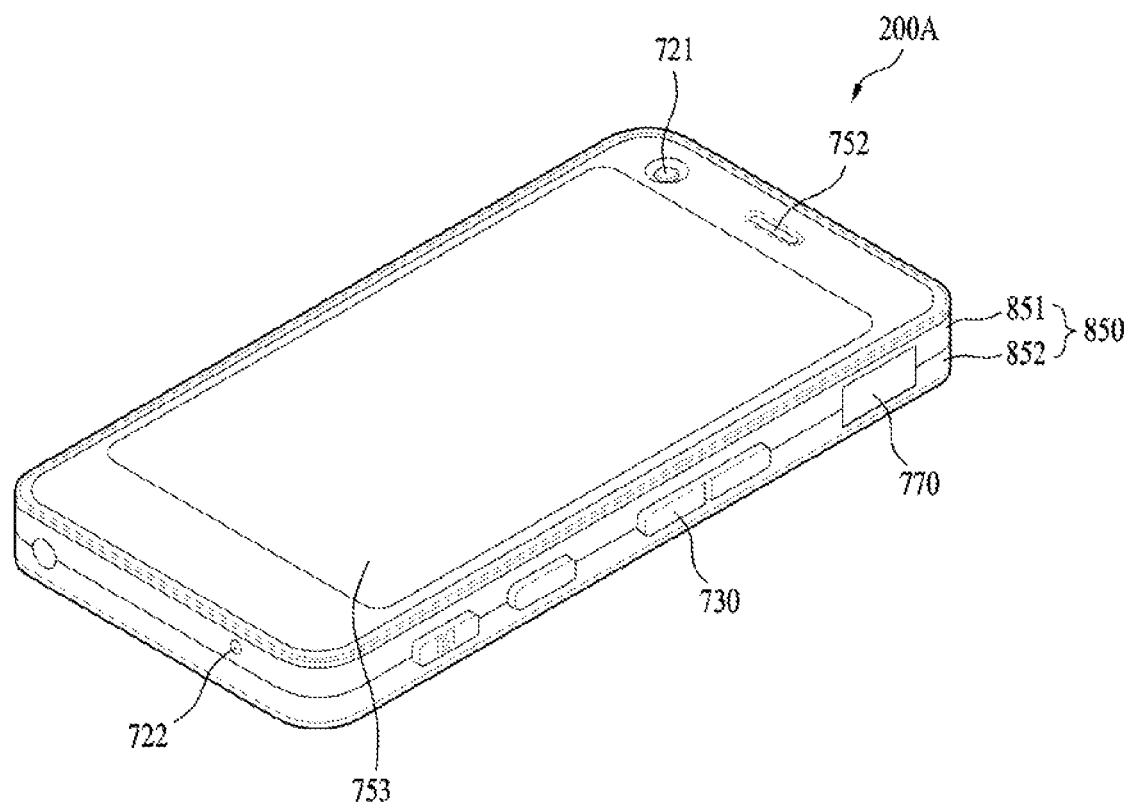
FIG. 43 is a perspective view of a portable terminal according to an embodiment.
Figure 44:
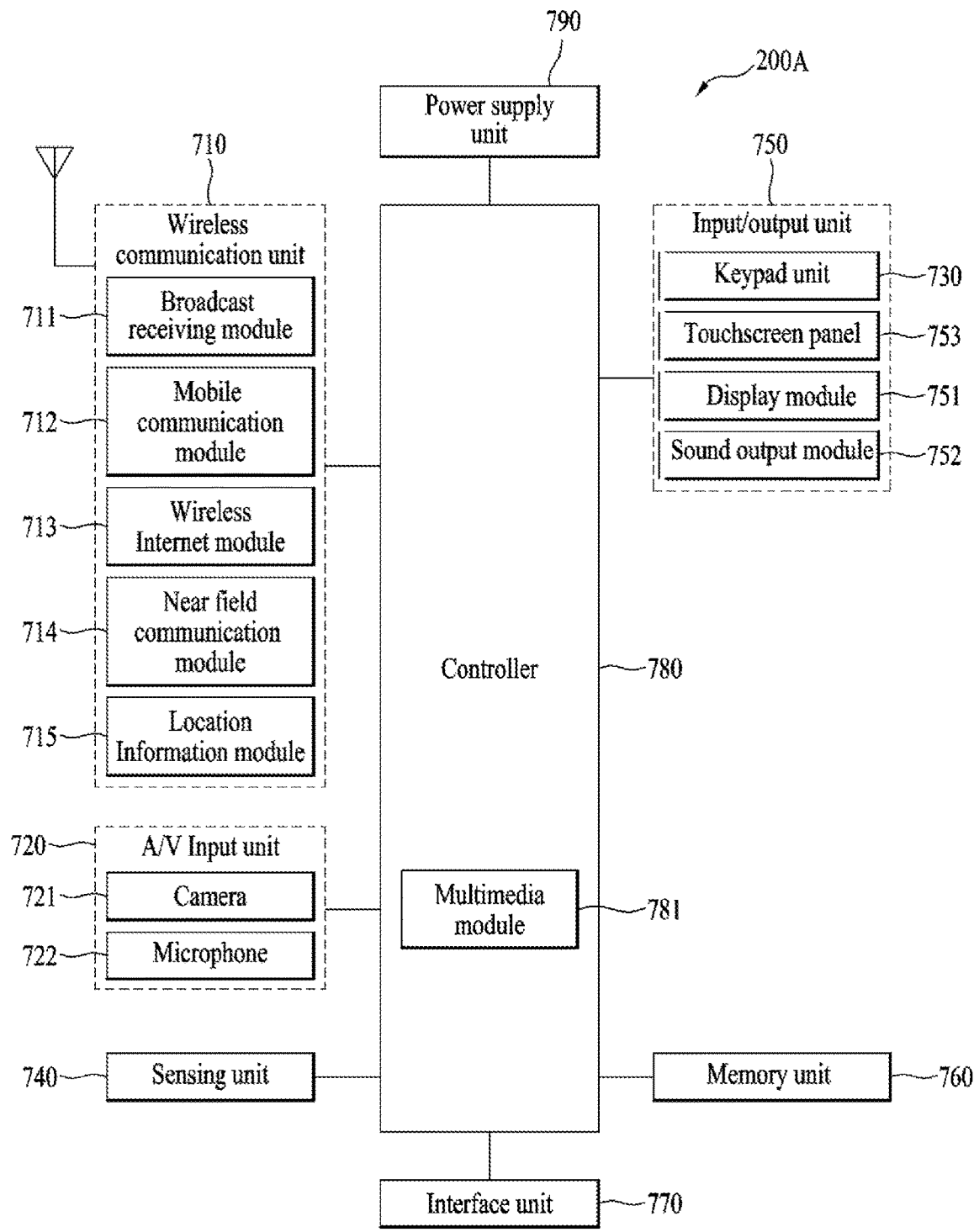
FIG. 44 is a view showing the construction of the portable terminal shown in FIG. 43.

FIG. 43 is a perspective view of a portable terminal 200A according to an embodiment, and FIG. 44 is a view showing the construction of the portable terminal 200A shown in FIG. 43.

Referring to FIGS. 43 and 44, the portable terminal 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 43 has a bar shape; however, the disclosure is not limited thereto. The body may have any of various structures, such as a slide type structure, a folder type structure, a swing type structure, and a swivel type structure, in which two or more sub-bodies are coupled so as to be movable relative to each other.

The body 850 may include a case (casing, housing, cover, etc.) that defines the external appearance thereof. For example, the body 850 may be divided into a front case 851 and a rear case 852. Various electronic parts of the terminal may be mounted in a space defined between the front case 851 and the rear case 852.

The wireless communication unit 710 may include one or more modules that enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a location information module 715.

The audio/video (A/V) input unit 720, which is provided to input an audio signal or a video signal, may include a camera 721 and a microphone 722.

The camera 721 may include the camera module 200, 1000, or 3100 according to the embodiment shown in FIG. 19, 20, or 27, and may include the camera module according to any of the other embodiments described above.

The sensing unit 740 may sense the current state of the terminal 200A, such as the opening and closing state of the terminal 200A, the position of the terminal 200A, whether a user contacts the terminal, the orientation of the terminal 200A, and acceleration/deceleration of the terminal 200A, in order to generate a sensing signal for controlling the operation of the terminal 200A. For example, in the case in which the terminal 200A is a slide phone, the sensing unit may sense whether the slide phone is open or closed. In addition, the sensing unit senses whether electric power is supplied from the power supply unit 790 and whether the interface unit 770 is coupled to an external instrument.

The input/output unit 750 is provided to generate input or output related to visual sensation, audible sensation, or tactile sensation. The input/output unit 750 may generate input data for controlling the operation of the terminal 200A, and may display information processed by the terminal 200A.

The input/output unit 750 may include a keypad unit 730, a display module 751, a sound output module 752, and a touchscreen panel 753. The keypad unit 730 may generate input data through keypad input.

The display module 751 may include a plurality of pixels, the color of which is changed according to an electrical signal. For example, the display module 751 may include at least one of a liquid crystal display, a thin film transistor-liquid crystal display, an organic light-emitting diode, a flexible display, and a three-dimensional (3D) display.

The sound output module 752 may output audio data received from the wireless communication unit 710 in a call signal reception mode, a telephone communication mode, a recording mode, a voice recognition mode, or a broadcast reception mode, or may output audio data stored in the memory unit 760.

The touchscreen panel 753 may convert a change in capacitance due to a user's touch on a specific region of the touchscreen into an electrical input signal.

The memory unit 760 may store a program for processing and control of the controller 780, and may temporarily store input/output data (for example, a telephone directory, messages, audio, still images, photographs, and video). For example, the memory unit 760 may store images, such as photographs or video, captured by the camera 721.

The interface unit 770 functions as a path for connection between the terminal 200A and an external instrument. The interface unit 770 may receive data or electric power from the external instrument and transmit the received data or electric power to internal components of the terminal 200A, or may transfer data in the terminal 200A to the external instrument. For example, the interface unit 770 may include a wired/wireless headset port, an external charger port, a wired/wireless data port, a memory card port, a port for connection with an apparatus having an identification module, an audio input/output (I/O) port, a video input/output (I/O) port, and an earphone port.

The controller 780 may control the overall operation of the terminal 200A. For example, the controller 780 may perform related control and processing for voice communication, data communication, and video communication.

The controller 780 may have a multimedia module 781 for multimedia reproduction. The multimedia module 781 may be realized in the controller 780 or may be realized separately from the controller 780.

The controller 780 may perform pattern recognition processing that is capable of recognizing writing input or drawing input performed on the touchscreen as text or an image, respectively.

The power supply unit 790 may receive external power and internal power and supply required power to respective components under control of the controller 780.

The features, structures, and effects described in the above embodiments are included in at least one embodiment, but are not limited only to one embodiment. Furthermore, features, structures, and effects illustrated in each embodiment may be combined or modified in other embodiments by those skilled in the art to which the embodiments pertain. Therefore, it is to be understood that such combinations and modifications fall within the scope of the present disclosure.

INDUSTRIAL APPLICABILITY

Embodiments may be used in a lens moving apparatus capable of reducing magnetic field interference between magnets, maintaining balance between electromagnetic force in an X-axis direction and electromagnetic force in a Y-axis direction necessary to perform an OIS function, and reducing the weight of an OIS moving unit to reduce current consumption, and a camera module and an optical instrument including the same.

What is claimed is:

1. A lens moving apparatus comprising: a board; a housing comprising a first side portion and a second side portion opposite each other and a third side portion and a fourth side portion opposite each other; a bobbin disposed in the housing; a first coil disposed on the bobbin; a magnet disposed on the housing; a sensing magnet disposed on the bobbin; a first position sensor disposed on the housing and opposite to the sensing magnet; an upper elastic member coupled to an upper portion of the bobbin and an upper portion of the housing; a supporting member coupled to the upper elastic member; a base disposed under the board; and a second position sensor disposed between the board and the base and opposite to the magnet, wherein the board comprises a second coil opposite to the magnet and configured to move the housing by an interaction with the magnet, wherein the magnet comprises a first magnet disposed on the first side portion of the housing, a second magnet disposed on the second side portion of the housing, and a third magnet disposed on the third side portion of the housing, wherein the second coil comprises a first coil unit opposite the first magnet, a second coil unit opposite the second magnet, and a third coil unit opposite the third magnet, wherein the first coil comprises a fourth coil unit opposite to the first magnet and a fifth coil unit opposite to the second magnet, and wherein a number of windings of the third coil unit is greater than a number of windings of the first coil unit.

2. The lens moving apparatus according to claim 1, wherein a number of windings of the third coil unit is greater than a number of windings of the second coil unit.

3. The lens moving apparatus according to claim 1, wherein each of the first to third coil units comprises a line having a plurality of turns, and a width of the line of the third coil unit is less than a width of the line of each of the first and second coil units.

4. The lens moving apparatus according to claim 1, wherein a width of the third coil unit is equal to a width of the first coil unit.

5. The lens moving apparatus according to claim 1, wherein a width of the third coil unit is greater than a width of the first coil unit.

6. The lens moving apparatus according to claim 1, wherein each of the first to third coil units comprises a spiral pattern or an oval pattern.

7. The lens moving apparatus according to claim 1, wherein each of the first to third coil units comprises a line having a plurality of turns, and a width of the line of the first coil unit and a width of the line of the second coil unit are equal to each other.

8. The lens moving apparatus according to claim 7, wherein a thickness of the first coil unit and a thickness of the second coil unit are equal to each other.

9. The lens moving apparatus according to claim 1, wherein each of the first to third coil units comprises a first layer and a second layer disposed on the first layer, and wherein a width of a line of each of the first layer and the second layer of the third coil unit is less than a width of a line of each of the first layer and the second layer of the first coil unit.

10. The lens moving apparatus according to claim 1, wherein the board comprises an opening and first to fourth sides surrounding the opening, and wherein the first coil unit is disposed between the first side and the opening, the second coil unit is disposed between the second side and the opening, and the third coil unit is disposed between the third side and the opening.

11. The lens moving apparatus according to claim 1, comprising a dummy member disposed at the fourth side portion of the housing.

12. The lens moving apparatus according to claim 1, wherein a height of the third magnet in an optical axis direction is less than a height of the first magnet in the optical axis direction and a height of the second magnet in the optical axis direction.

13. The lens moving apparatus according to claim 1, wherein a height of the third magnet in an optical axis direction, a height of the first magnet in the optical axis direction and a height of the second magnet in the optical axis direction are equal to each other.

14. The lens moving apparatus according to claim 1, wherein a length of the third coil unit is greater than each of a length of the first coil unit and a length of the second coil unit.

15. The lens moving apparatus according to claim 1, wherein a length of the first coil unit, a length of the second coil unit and a length of the third coil unit are equal to each other.

16. A camera module comprising: a lens; the moving apparatus according to claim 1; and an image sensor.

17. A lens moving apparatus comprising: a board; a housing comprising a first side portion and a second side portion opposite each other and a third side portion and a fourth side portion opposite each other; a bobbin disposed in the housing; a magnet comprising a first magnet disposed on the first side portion of the housing, a second magnet disposed on the second side portion of the housing, and a third magnet disposed on the third side portion of the housing; a first coil disposed on the bobbin and comprising a first coil unit opposite to the first magnet and a second coil unit opposite to the second magnet; a sensing magnet disposed on the bobbin; a first position sensor disposed on the housing and opposite to the sensing magnet; an upper elastic member coupled to an upper portion of the bobbin and an upper portion of the housing; a supporting member coupled to the upper elastic member; a base disposed under the board; a second position sensor disposed between the board and the base and opposite to the magnet; and a weight balance member disposed on the fourth side portion of the housing, wherein the board comprises a second coil configured to move the housing by an interaction with the magnet, wherein the second coil comprises a third coil unit opposite the first magnet, a fourth coil unit opposite the second magnet, and a fifth coil unit opposite the third magnet.

\* \* \* \* \*